United States Patent
Camelio et al.

(10) Patent No.: US 12,122,862 B2
(45) Date of Patent: *Oct. 22, 2024

(54) BIARYL HYDROXYTHIOPHENE GROUP IV TRANSITION METAL POLYMERIZATION CATALYSTS WITH CHAIN TRANSFER CAPABILITY

(71) Applicant: Dow Global Technologies LLC, Midland, MI (US)

(72) Inventors: Andrew M. Camelio, Midland, MI (US); Endre Szuromi, Richwood, TX (US); David D. Devore, Midland, MI (US); Robert D J Froese, Midland, MI (US); Brad C. Bailey, Midland, MI (US); Matthew D. Christianson, Midland, MI (US); Sukrit Mukhopadhyay, Midland, MI (US); Jerzy Klosin, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 550 days.

This patent is subject to a terminal disclaimer.

(21) Appl. No.: 17/311,530

(22) PCT Filed: Dec. 19, 2019

(86) PCT No.: PCT/US2019/067480
§ 371 (c)(1),
(2) Date: Jun. 7, 2021

(87) PCT Pub. No.: WO2020/132244
PCT Pub. Date: Jun. 25, 2020

(65) Prior Publication Data
US 2022/0025085 A1 Jan. 27, 2022

Related U.S. Application Data

(60) Provisional application No. 62/782,856, filed on Dec. 20, 2018.

(51) Int. Cl.
| | | |
|---|---|---|
| *C08F 4/64* | (2006.01) | |
| *C07F 7/00* | (2006.01) | |
| *C08F 4/52* | (2006.01) | |
| *C08F 4/76* | (2006.01) | |
| *C08F 210/16* | (2006.01) | |

(52) U.S. Cl.
CPC .............. *C08F 210/16* (2013.01); *C07F 7/00* (2013.01); *C07F 7/003* (2013.01); *C08F 4/64193* (2013.01)

(58) Field of Classification Search
CPC .................................................. C08F 4/64193
See application file for complete search history.

(56) References Cited

U.S. PATENT DOCUMENTS

| | | | |
|---|---|---|---|
| 11,066,488 B2 * | 7/2021 | Szuromi | C08F 110/02 |
| 11,104,751 B2 * | 8/2021 | Camelio | C08F 4/65912 |
| 11,168,161 B2 * | 11/2021 | Camelio | C08F 210/16 |
| 2006/0052554 A1 | 3/2006 | Boussie et al. | |
| 2009/0286944 A1 | 11/2009 | Ackerman et al. | |
| 2020/0131289 A1 | 4/2020 | Camelio et al. | |
| 2020/0157254 A1 | 5/2020 | Camelio et al. | |
| 2020/0190228 A1 | 6/2020 | Szuromi et al. | |
| 2022/0041764 A1 * | 2/2022 | Camelio | C08F 210/02 |
| 2022/0169756 A1 * | 6/2022 | Camelio | C08F 2/04 |

FOREIGN PATENT DOCUMENTS

| | | |
|---|---|---|
| CN | 106459288 A | 2/2017 |
| WO | 03091262 A1 | 11/2003 |
| WO | 2005108406 A1 | 11/2005 |
| WO | 2012004675 A2 | 1/2012 |
| WO | 2012006230 A1 | 1/2012 |
| WO | 2013013111 A1 | 1/2013 |
| WO | 2013036546 A2 | 3/2013 |
| WO | 2013052585 A2 | 4/2013 |
| WO | 2016003879 A1 | 1/2016 |
| WO | 2018022238 A1 | 2/2018 |
| WO | 2018236996 A1 | 12/2018 |

OTHER PUBLICATIONS

Chinese Office Action dated Jan. 5, 2023, pertaining to CN Patent Application No. 201980088837.7, 22 pgs.
International Search Report and Written Opinion pertaining to PCT/US2019/065966, dated Mar. 13, 2020.
International Search Report and Written Opinion pertaining to PCT/US2018/038492, dated Sep. 27, 2018.
Korean Office Action dated Feb. 6, 2023, pertaining to Korean patent application No. 10-2020-7000697 8 pages.
Korean Office Action dated Feb. 6, 2023, pertaining to Korean patent application No. 10-2020-7000696 8 pages.
Chinese Office Action dated Jan. 3, 2023, pertaining to Chinese patent application No. 201980089692.2 4 pages.
Chinese Search Report dated Jan. 3, 2023, pertaining to Chinese patent application No. 201980089692.2 2 pages.

(Continued)

*Primary Examiner* — Rip A Lee
(74) *Attorney, Agent, or Firm* — Dinsmore & Shohl LLP

(57) ABSTRACT

Catalyst systems that include a chain transfer agent and a metal-ligand complex according to formula (I).

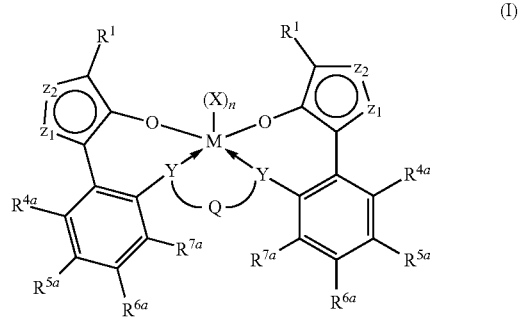

10 Claims, 6 Drawing Sheets

(56) References Cited

OTHER PUBLICATIONS

International Search Report and Written Opinion pertaining to PCT/US2019/067480, dated Mar. 17, 2020.
Chinese Office Action dated Nov. 16, 2023, pertaining to CN Patent Application No. 201980088837.7, 10 pgs.
Examination Report dated Feb. 8, 2023, pertaining to EP Application No. 19839581.6, 5 pgs.
Examination Report dated Feb. 23, 2023, petaining to EP Application No. 19832812.2, 6 pgs.
CN Office Action dated Aug. 11, 2023, pertaining to CN Patent Application No. 201980088837.7, 12 pgs.
Communication pursuant to Rules 161(1) and 162 EPC, dated Aug. 3, 2021, pertaining to EP application No. 19832812.1.
Chinese Office Action dated Dec. 20, 2023, pertaining to CN Patent Application No. 201980089692.2, 14 pgs.
Japanese Office Action dated Jan. 9, 2024, pertaining to JP Application No. 2021-533723, 6 pgs.
Japanese Office Action dated Jan. 30, 2024, pertaining to JP Patent Application No. 2021-534357, 8 pgs.
Communication pursuant to Article 94(3) EPC, dated Feb. 26, 2024, pertaining to EP Patent Application No. 19832812.2, 7 pgs.
Japanese Office Action dated Jul. 2, 2024, pertaining to JP Patent Application No. 2021-534357, 8 pgs.
Japanese Office Action dated Jul. 16, 2024, pertaining to JP Patent Application No. 2021-533723, 6 pgs.
U.S. Final Rejection dated Aug. 8, 2024, pertaining to U.S. Appl. No. 17/413,780, 6 pgs.

\* cited by examiner

BIARYL HYDROXYTHIOPHENE GROUP IV TRANSITION METAL POLYMERIZATION CATALYSTS WITH CHAIN TRANSFER CAPABILITY

CROSS-REFERENCE TO RELATED APPLICATIONS

This application is a National Stage Entry under 35 U.S.C. § 371 of International Patent Application No. PCT/US2019/067480, filed Dec. 19, 2019, which claims priority to U.S. Provisional Patent Application No. 62/782,856, filed on Dec. 20, 2018, the entire disclosure of which are hereby incorporated by reference.

TECHNICAL FIELD

Embodiments of the present disclosure generally relate to olefin polymerization catalyst systems and processes, and, more specifically, the olefin polymerization processes incorporating the catalyst systems that includes a chain shuttling agent.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin based polymers.

Ethylene-based polymers and propylene-based are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and, optionally, one or more co-monomers are present in liquid diluents (such as solvents), such as an alkane or isoalkane, for example isobutane. Hydrogen may also be added to the reactor. The catalyst systems for producing ethylene-based polymer may typically comprise a chromium-based catalyst system, a Ziegler-Natta catalyst system, and/or a molecular (either metallocene or non-metallocene (molecular)) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced. Despite the research efforts in developing catalyst systems suitable for olefin polymerization, such as polyethylene or polypropylene polymerization, there is still a need to increase the efficiencies of catalyst systems that are capable of producing polymer with high molecular weights and a narrow molecular weight distribution.

SUMMARY

Despite the currently available olefin polymerization catalyst systems, there is need for high temperature (approximately 120° C. to 150° C.) polymerization catalysts which have improved molecular properties facilitating the production of high molecular weight (Mw) polymers with narrow polydispersities (PDIs), high comonomer incorporation (i.e. more than 20%), as well as having the ability to participate in chain transfer with diethyl zinc (DEZ) to make olefin block copolymers with high chain transfer rates (i.e. Ca≥1.0). Olefin block copolymers (OBCs) exhibit superior qualities for performance differentiation which are not accessible through polymer blending.

There is a need to improve the ability of olefin polymerization catalysts to undergo chain-transfer or chain-shuttling with a chain transfer agent (also called transfer agent) and a hard segment catalyst.

Embodiments of this disclosure includes a catalyst system includes a metal ligand complex according to formula (I) and a chain transfer agent. The a metal ligand complex according to formula (I):

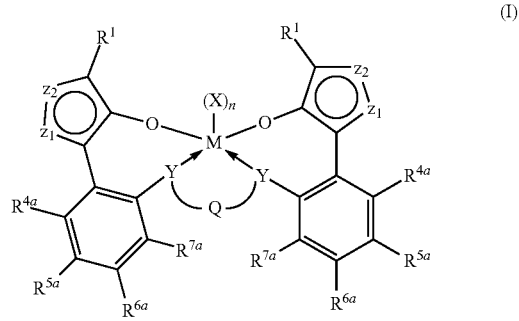

(I)

In formula (I), M is a metal chosen from titanium, zirconium, or hafnium, the metal having a formal oxidation state of +2, +3, or +4. Each X is a monodentate or bidentate ligand independently chosen from unsaturated $(C_2-C_{20})$hydrocarbon, unsaturated $(C_2-C_{50})$heterohydrocarbon, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$diene, halogen, $-OR^C$, $-N(R^N)_2$, and $-NCOR^C$; and subscript n is 1 or 2. Each Y is oxygen, sulfur, or $NR^N$.

In formula (I), each $R^1$ is chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $-P(O)(R^P)_2$, $R^CS(O)_2-$, $(R^C)_2C=N-$, $R^CC(O)O-$, $R^COC(O)-$, $R^CC(O)N(R)-$, $(R^C)_2NC(O)-$, halogen, and $-H$. Each $R^N$, $R^C$, and $R^P$ is independently selected from the group consisting of $(C_1-C_{20})$hydrocarbyl, $(C_1-C_{20})$heterohydrocarbyl, and $-H$. Q is $(C_1-C_{12})$alkylene, $(C_1-C_{12})$heteroalkylene, $(-CH_2Si(R_Q)_2CH_2-)$, $(-CH_2CH_2Si(R_Q)_2CH_2CH_2-)$, $(-CH_2Ge(R_Q)_2CH_2-)$, or $(-CH_2CH_2Ge(R_Q)_2CH_2CH_2-)$, in which $R_Q$ is $(C_1-C_{20})$hydrocarbyl.

In formula (I), for each individual ring containing groups $z_1$ and $z_2$, each of $z_1$ and $z_2$ is independently selected from the group consisting of sulfur, oxygen, $-N(R^C)-$, and $-C(R^C)-$, provided at least one of $z_1$ and $z_2$ is sulfur. Each $R^{4a}$, $R^{5a}$, $R^{6a}$, and $R^{7a}$ is independently chosen from $(C_1-C_{50})$hydrocarbyl, $(C_1-C_{50})$heterohydrocarbyl, $(C_6-C_{50})$aryl, $(C_4$-50)heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS$ (O)—, —P(O)($R^P$)$_2$, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen, and —H, in which optionally $R^{4a}$ and $R^{5a}$, or $R^{5a}$ and $R^{6a}$, or $R^{6a}$ and $R^{7a}$ may be covalently connected to form an aromatic ring or a non-aromatic ring. Each $R^C$, $R^N$, and $R^P$ in formula (I) is independently selected from the group consisting of ($C_1$-$C_{20}$)hydrocarbyl, ($C_1$-$C_{20}$)heterohydrocarbyl, and —H.

DETAILED DESCRIPTION

Figure 1:
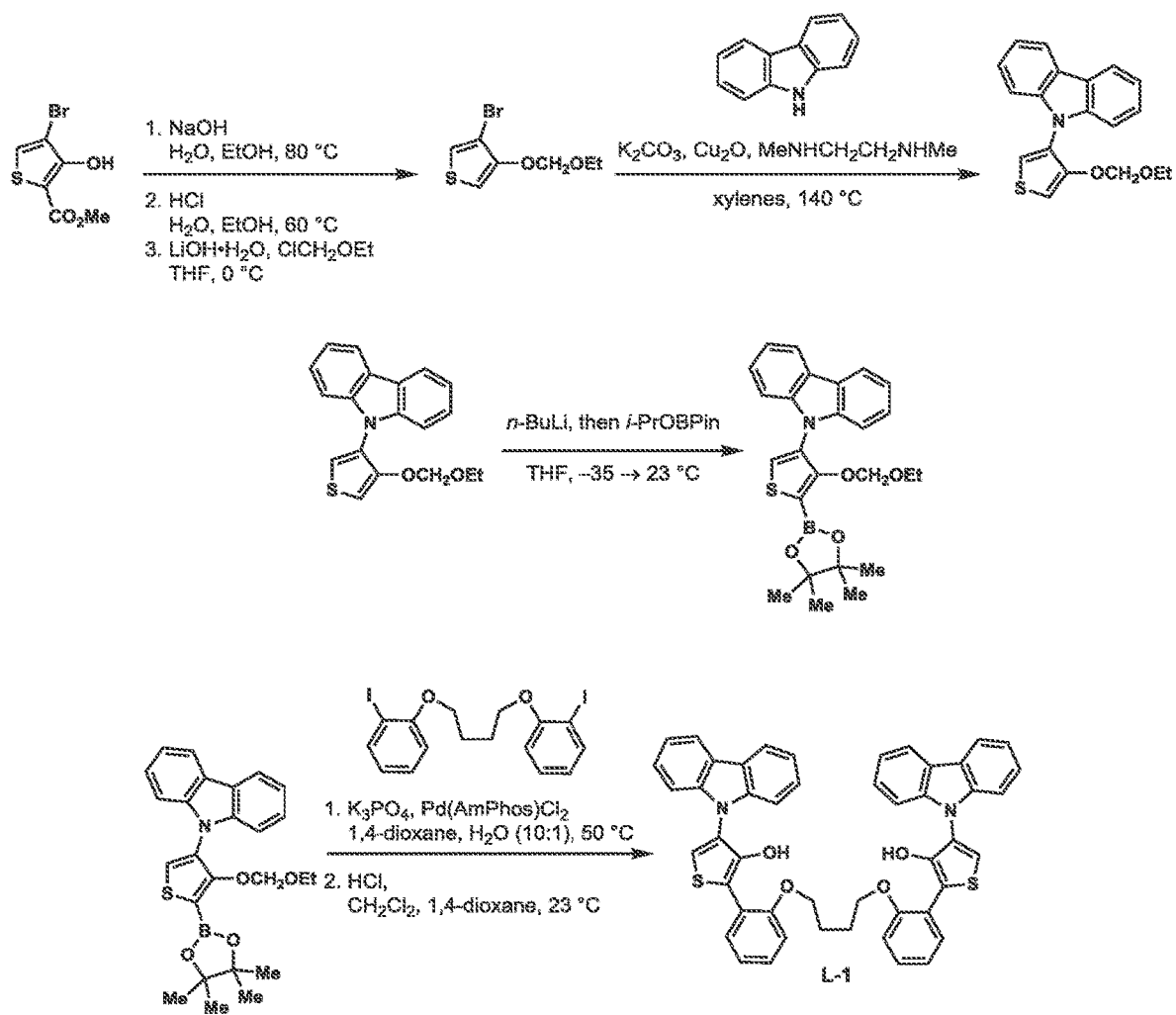
FIG. 1 depicts a four step synthetic scheme to synthesize ligand 1 (L-1).

Specific embodiments of catalyst systems will now be described. It should be understood that the catalyst systems of this disclosure may be embodied in different forms and should not be construed as limited to the specific embodiments set forth in this disclosure.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; CV: column volume (used in column chromatography); EtOAc: ethyl acetate; Pd(dppf)Cl$_2$: [1,1'-Bis(diphenylphosphino)ferrocene]palladium(II) dichloride; PhMe: toluene; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; TLC; thin layered chromatography; rpm: revolution per minute.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.) A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "($C_x$-$C_y$)" means that the unsubstituted form of the chemical group has from x carbon atoms to y carbon atoms, inclusive of x and y. For example, a ($C_1$-$C_{50}$)alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "($C_x$-$C_y$)" parenthetical may contain more than y carbon atoms depending on the identity of any groups $R^S$. For example, a "($C_1$-$C_{50}$)alkyl substituted with exactly one group $R^S$, where $R^S$ is phenyl (—$C_6H_5$)" may contain from 7 to 56 carbon atoms. Thus, in general when a chemical group defined using the "($C_x$-$C_y$)" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, hut fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "($C_1$-$C_{50}$)hydrocarbyl" means a hydrocarbon radical of from 1 to 50 carbon atoms and the term "($C_1$-$C_{50}$)hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a ($C_1$-$C_{50}$)hydrocarbyl may be an unsubstituted or substituted ($C_1$-$C_{50}$)alkyl, ($C_3$-$C_{50}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene (such as benzyl (—$CH_2$—$C_6H_5$).

The terms "($C_1$-$C_{50}$)alkyl" and "($C_1$-$C_{18}$)alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted ($C_1$-$C_{50}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl;

1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl. Examples of $(C_1-C_{10})$alkyl include all isomers of butyl, pentyl, hexyl, heptyl, nonyl, and decyl.

The term "$(C_6-C_{50})$aryl." means an unsubstituted or substituted (by one or more $R^S$) monocyclic, bicyclic, or tricyclic aromatic hydrocarbon radical of from 6 to 50 carbon atoms, of which at least from 6 to 24 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis($[C_{20}]$alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —CH$_2$CH$_2$—), propan-1,3-diyl (i.e. —CH$_2$CH$_2$CH$_2$—), 2-methylpropan-1,3-diyl (i.e. —CH$_2$CH(CH$_3$)CH$_2$). Some examples of $(C_6-C_{50})$arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and (CH$_2$)$_4$C*(H)(CH$_3$), in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$ (i.e., a 6,6-dimethyl substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "$(C_3-C_{50})$cycloalkyl" means a cyclic diradical (i.e., the radicals are on ring atoms) of from 3 to 50 carbon atoms that either is unsubstituted or is substituted by one or more $R^S$.

The term "heteroatom," refers to an atom other than hydrogen or carbon. Examples of groups containing one or more than one heteroatom include O, S, S(O), S(O)$_2$, Si(R$^C$)$_2$, P(R$^P$), N(R$^N$), N=C(R$^C$)$_2$, —Ge(R$^C$)$_2$—, or —Si(R$^C$)—, where each R$^C$ and each R$^P$ is unsubstituted $(C_1-C_{18})$hydrocarbyl or —H, and where each R$^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-S(O)$_2$—, $(C_1-C_{50})$hydrocarbyl-Si(R$^C$)$_2$, $(C_1-C_{50})$hydrocarbyl-N(R$^N$)—, $(C_1-C_{50})$hydrocarbyl-P(R$^P$)—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocyclalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic, hydrocarbon radical is present, at least one of the rings in the radical is heteroaromatic. The other ring or rings of the heteroaromatic radical may be independently fused or non-fused and aromatic or non-aromatic. Other heteroaryl groups (e.g., ($C_x$-$C_y$)heteroaryl generally, such as ($C_4$-$C_{12}$)heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring monocyclic heteroaromatic hydrocarbon radical has 5 minus h carbon atoms, where h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,34-oxadiazol-2-yl; 1,3,4-thiadiazol-2-yl; tetrazol-1-yl; tetrazol-2-yl; and tetrazol-5-yl. The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "($C_1$-$C_{50}$)heteroalkyl" means a saturated straight or branched chain radical containing one to fifty carbon atoms and one or more heteroatom. The term "($C_1$-$C_{50}$)heteroalkylene" means a saturated straight or branched chain diradical containing from 1 to 50 carbon atoms and one or more than one heteroatoms. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted ($C_2$-$C_{40}$)heterocycloalkyl include unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

Embodiments of this disclosure includes a catalyst system includes a metal-ligand complex according to formula (I) and a chain shuttling (or chain transfer) agent. The a metal-ligand complex according to formula (I):

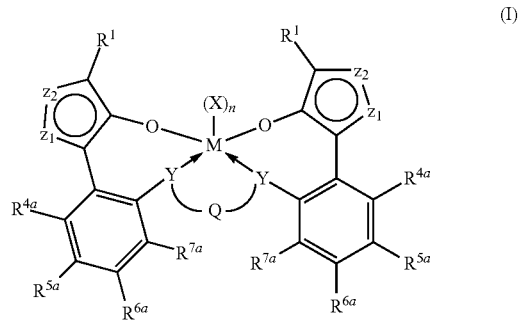

(I)

In formula (I), M is a metal chosen from titanium, zirconium, or hafnium, the metal having a formal oxidation state of +2, +3, or +4. Each X is a monodentate or bidentate ligand independently chosen from unsaturated ($C_2$-$C_{20}$)hydrocarbon, unsaturated ($C_2$-$C_{50}$)heterohydrocarbon, ($C_1$-$C_{50}$)hydrocarbyl, ($C_6$-$C_{50}$)aryl, ($C_6$-$C_{50}$)heteroaryl, cyclopentadienyl, substituted cyclopentadienyl, ($C_4$-$C_{12}$)diene, halogen, —$OR^C$, —$N(R^N)_2$, and —$NCOR^C$; and subscript n is 1 or 2. Each Y is oxygen, sulfur, or $NR^N$.

In formula (I), each $R^1$ is chosen from ($C_1$-$C_{50}$)hydrocarbyl, ($C_1$-$C_{50}$)heterohydrocarbyl, ($C_6$-$C_{50}$)aryl, ($C_4$-$C_{50}$)heteroaryl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, —$P(O)(R^P)_2$, $R^CS(O)_2$—, $(R^C)_2C=N$—, $R^CC(O)O$—, $R^COC(O)$—, $R^CC(O)N(R)$—, $(R^C)_2NC(O)$—, halogen, and —H. Each $R^N$, $R^C$, and $R^P$ is independently selected from the group consisting of ($C_1$-$C_{20}$)hydrocarbyl, ($C_1$-$C_{20}$)heterohydrocarbyl, and —H.

In some embodiments of formula (I), Q is ($C_1$-$C_{12}$)alkylene, ($C_1$-$C_{12}$)heteroalkylene, (—$CH_2Si(R_Q)_2CH_2$—), (—$CH_2CH_2Si(R_Q)_2CH_2CH_2$—), (—$CH_2Ge(R_Q)_2CH_2$—), or (—$CH_2CH_2Ge(R_Q)_2CH_2CH_2$—), in which $R_Q$ is ($C_1$-$C_{20}$)hydrocarbyl. In one or more embodiments, each $R_Q$ is chosen from branched, linear, or cyclic ($C_1$-$C_{20}$)alkyl. In various embodiments, each $R_Q$ is chosen from methyl, ethyl, 2-propyl (also called iso-propyl), tert-butyl, 1-butyl, 2-butyl, 2-methylpropyl (also called iso-butyl), pentyl, hexyl, cyclohexyl, heptyl, octyl, n-octyl, tert-octyl, or nonyl.

In formula (I), for each individual ring containing groups $z_1$ and $z_2$, each of $z_1$ and $z_2$ is independently selected from the group consisting of sulfur, oxygen, —$N(R^C)$—, and —$C(R^C)$—, provided at least one of $z_1$ and $z_2$ is sulfur. Each $R^{4a}$, $R^{5a}$, $R^{6a}$, and $R^{7a}$ is independently chosen from ($C_1$-$C_{50}$)hydrocarbyl, ($C_1$-$C_{50}$)heterohydrocarbyl, ($C_6$-$C_{50}$)aryl, ($C_4$-$C_{50}$)heteroaryl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, —$P(O)(R^P)_2$, $R^CS(O)_2$—, $(R^C)_2C=N$—, $R^CC(O)O$—, $R^COC(O)$—, $R^CC(O)N(R)$—, $(R^C)_2NC(O)$—, halogen, and —H, in which optionally $R^{4a}$ and $R^{5a}$, or $R^{5a}$ and $R^{6a}$, or $R^{6a}$ and $R^{7a}$ may be covalently connected to form an aromatic ring or a non-aromatic ring. Each $R^C$, $R^N$, and $R^P$ in formula (I) is independently selected from the group consisting of $(C_1-C_{20})$hydrocarbyl, $(C_1-C_{20})$heterohydrocarbyl, and —H. Each Y is oxygen, sulfur, or $NR^N$.

In some embodiments of the polymerization process of this disclosure may include a second catalyst. The second catalyst may have a structure according to formula (I).

In some embodiments, each $R^1$ may be chosen from carbazol, carbazol-9-yl substituted with $R^S$ or more than one $R^S$; phenyl, phenyl substituted with $R^S$ or more than one $R^S$; anthracenyl, or anthracene-9-yl substituted with $R^S$ or more than one $R^S$, in which $R^S$ may be a $(C_1-C_{30})$hydrocarbyl. In other embodiments, each $R^1$ may be chosen from carbazol-9-yl; 3,6-di-tert-butylcarbazol-9-yl; 2,7-di-tert-butylcarbazol-9-yl; 3,6-bis-(2,4,6-trimethylphenyl)carbazol-9-yl; 3,6-bis-(2,4,6-triisopropylphenyl)carbazol-9-yl; 3,6-bis-(3,5-di-tert-butylphenyl) carbazoly-9-yl; anthracene-9-yl; 3,5-di-tert-butylphenyl; 1,1':3',1''-terphenyl-5'-yl; 3,3'',5,5''-tetra-tert-butyl-1,1':3',1''-terphenyl-5'-yl; 3,5-diphenylphenyl; 2,4,6-trimethylphenyl; 2,4,6-tri(iso-propyl)phenyl; or 3,5-di-tert-butylphenyl. In some embodiments, each $R^S$ is independently chosen from methyl, ethyl, propyl, 2-propyl, n-butyl, tert-butyl, n-octyl, or tert-octyl.

In one or more embodiments of the catalyst system according to metal-ligand complex of formula (I), $R^1$ may be chosen from radicals having formula (II), radicals having formula (III), or radicals having formula (IV):

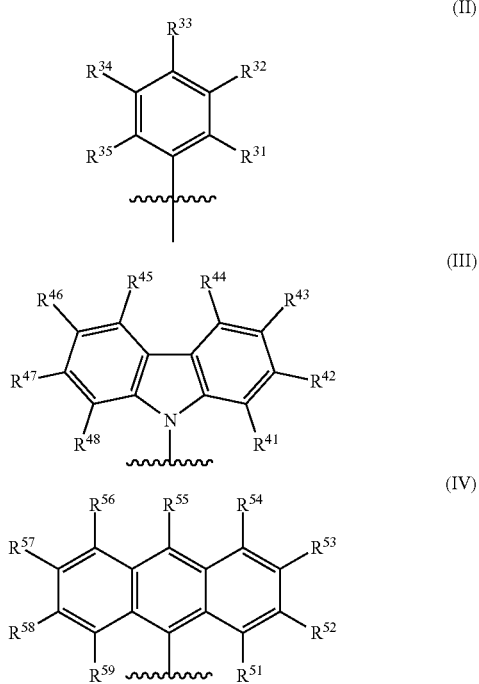

When present in the metal-ligand complex of formula (I) as part of a radical having formula (II), formula (III), or formula (IV), the groups $R^{31-35}$, $R^{41-48}$, and $R^{51-59}$ of the metal-ligand complex of formulas (I) are each independently chosen from $(C_1-C_{40})$hydrocarbyl, $(C_1-C_{40})$heterohydrocarbyl, $Si(R^C)_3$, $P(R^P)_2$, $N(R^N)_2$, $OR^C$, $SR^C$, $NO_2$, $CN$, $CF_3$, $R^CS(O)—$, $R^CS(O)_2—$, $(R^C)_2C=N—$, $R^CC(O)O—$, $R^COC(O)—$, $R^CC(O)N(R^N)—$, $(R^N)_2NC(O)—$, halogen, hydrogen (H), or combinations thereof. Independently each $R^C$, $R^P$, and $R^N$ are unsubstituted $(C_1-C_{18})$hydrocarbyl $(C_1-C_{30})$heterohydrocarbyl, or —H.

When present in the metal ligand complex of formula (I) as part of a radical having formula (II), formula (III), or formula (IV), the groups $R^{31-35}$, $R^{41-48}$, and $R^{51-59}$ of the metal ligand complex of formula (I) are each independently chosen from methyl, ethyl propyl, 2-propyl (also called iso-propyl), tert-butyl, tert-octyl, n-octyl, phenyl, 3,5-di-tert-butyl-phenyl, 2,4,6-tri-tert-butyl-phenyl, In some embodiments, any or all the chemical groups (e.g., X, $R^1$, $R^{31-59}$, z, A, and Y) of the metal ligand complex of formula (f) may be unsubstituted. In other embodiments, none, any, or all of the chemical groups X, $R^1$, $R^{31-59}$, z, A, and Y of the metal-ligand complex of formula (I) may be substituted with one or more than one $R^S$. When two or more than two $R^S$ are bonded to a same chemical group of the metal ligand complex of formula (I), the individual $R^S$ of the chemical group may be bonded to the same carbon atom or heteroatom or to different carbon atoms or heteroatoms. In some embodiments, none, any, or all of the chemical groups X, $R^1$, $R^{31-59}$, and Z may be persubstituted with $R^S$. In the chemical groups that are persubstituted with $R^S$, the individual $R^S$ may all be the same or may be independently chosen.

Each $R^1$ in the metal ligand complex of formula (I) are chosen independently of one another. For example, one group $R^1$ may be chosen from a radical having formula (II), (III), or (IV) and the other group $R^1$ may be a $(C_1-C_{40})$ hydrocarbyl; or one group $R^1$ may be chosen from a radical having formula (II), (III), or (IV) and the other group $R^1$ may be chosen from a radical having formula (II), (III), or (IV) the same as or different from that of $R^1$. Both group $R^1$ may be radicals of formula (II), for which the groups $R^{31-35}$ are the same or different in each $R^1$. In other examples, both groups $R^1$ may be radicals of formula (III), for which the groups $R^{41-48}$ are the same or different in each $R^1$; or both groups $R^1$ may be radicals of formula (IV), for which the groups $R^{51-59}$ are the same or different in each $R^1$.

In one or more embodiments of formula (I), each $R^1$ may be chosen from carbazol, carbazol-9-yl substituted with $R^S$ or more than one $R^S$, phenyl, phenyl substituted with $R^S$ or more than one $R^S$, anthracenyl, anthracene-9-yl substituted with $R^S$ or more than one $R^S$, naphthyl, or naphthyl substituted $R^S$ or more than one $R^S$, in which $R^S$ may be a $(C_1-C_{30})$hydrocarbyl, wherein $R^S$ may be chosen from $(C_1-C_{12})$alkyl, $(C_6-C_{15})$aryl, or $(C_3-C_{12})$cycloalkyl.

In some embodiments of formulas (I), each $R^1$ is a radical having formula (II) and at least one of $R^{41-48}$ is substituted with $(C_1-C_{40})$hydrocarbyl, $(C_1-C_{40})$heterohydrocarbyl, $—Si(R^C)_3$, $—OR^C$, $—SR^C$, $—NO_2$, $—CN$, $—CF_3$, or halogen.

In one or more embodiments of formulas (I), each $R^1$ is a radical having formula (II); and (1) $R^{42}$ and $R^{47}$ is substituted with $(C_1-C_{20})$alkyl, $—Si(R^C)_3$, $—CF_3$, or halogen and $R^{43}$ and $R^{46}$ are —H; or (2) $R^{43}$ and $R^{46}$ is substituted with $(C_1-C_{20})$alkyl, $—Si(R^C)_3$, $—CF_3$, or halogen and $R^{42}$ and $R^{47}$ are —H.

In various embodiments of formulas (I), each $R^1$ is a radical having formula (III); and $R^{51-59}$ are —H. In other embodiments of (I), each $R^1$ is a radical having formula (III); and at least one of $R^{51-59}$ is substituted with $(C_1-C_{40})$hydrocarbyl, $(C_1-C_{40})$heterohydrocarbyl, $—Si(R^C)_3$, $—OR^C$, $—SR^C$, $—NO_2$, $—CN$, $—CF_3$, or halogen.

In some embodiment of the metal-ligand catalyst according to formulas (I), $R^1$ is chosen from 3,5-di-tert-butylphenyl; 2,4,6-trimethylphenyl; 2,4,6-triisopropylphenyl group; 3,5-di-isopropylphenyl; carbazolyl; carbazol-9-yl, 1,2,3,4-tetrahydrocarbazolyl; 1,2,3,4,5,6,7,8-octahydrocarbazolyl; 2,7-di(tertiary-butyl)-carbazol-9-yl; 2,7-di(tertiary-octyl)-carbazol-9-yl; 2,7-diphenylcarbazol-9-yl; 2,7-bis(2,4,6- trimethylphenyl)-carbazol-9-yl anthracenyl; 1,2,3,4-tetrahydroanthracenyl; 1,2,3,4,5,6,7,8-octahydroanthracenyl; phenanthrenyl; 1,2,3,4,5,6,7,8-octahydrophenanthrenyl; 1,2,3,4-tetrahydronaphthyl; 2,6-dimethylphenyl; 2,6-diisopropylphenyl; 3,5-diphenylphenyl; 1-naphthyl; 2-methyl-1-naphthyl; 2-naphthyl; 1,2,3,4-tetra-hydronaphth-5-yl; 1,2,3,4-tetrahydronaphth-6-yl; anthracen-9-yl; 1,2,3,4-tetrahydroanthracen-9-yl; 1,2,3,4,5,6,7,8-octahydroanthracen-9-yl; 1,2,3,4,5,6,7,8-octahydrophenanthren-9-yl; indolyl; indolinyl; quinolinyl; 1,2,3,4-tetrahydroquinolinyl; isoquinolinyl; 1,2,3,4-tetrahydroisoquinolinyl.

In various embodiments of formula (I), $z_1$ is sulfur. In other embodiments of formula (I), $z_2$ is sulfur. In some embodiments, Y is oxygen. In one or more embodiments, Y is oxygen and $z_1$ is sulfur.

In some embodiments of formula (I), each $R^{4a}$, $R^{5a}$, $R^{6a}$, and $R^{7a}$ is independently a $(C_1-C_{20})$hydrocarbyl, $(C_1-C_{10})$alkyl, $(C_6-C_{20})$aryl, or $(C_1-C_5)$alkyl substituted $(C_6-C_{20})$aryl. In one or more embodiments, each $R^{4a}$, $R^{5a}$, $R^{6a}$, and $R^{7a}$ is chosen from methyl, ethyl, propyl, 2-propyl, 2-methylpropyl, n-butyl, tert-butyl (also called 1,1-dimethylethyl), pentyl, hexyl, 1-cyclohexyl, heptyl, tert-octyl (also called 1,1,3,3-tetramethylbutyl), n-octyl, nonyl, chlorine, fluorine, methoxy, or —H.

In some embodiments of formula (I), the catalyst system may include a metal-ligand complex according to formula (I), in which for each individual ring containing groups $z_1$ and $z_2$, each of $z_1$ and $z_2$ is independently selected from the group consisting of sulfur, oxygen, —N($R^R$)—, or —C($R^R$)—, and at least one of $z_1$ or $z_2$ is —C($R^R$)—. Any two $R^R$ groups bonded to neighboring atoms are optionally linked. In some embodiment, for each individual ring containing groups $z_1$ and $z_2$, one of $z_1$ and $z_2$ is a sulfur atom, and the other of $z_1$ and $z_2$ is —C(H)—.

The M in the metal-ligand complex of formula (I) may be a transition metal such as titanium (Ti), zirconium (Zr), or hafnium (Hf), and the transition metal may have a formal oxidation state of +2, +3, or +4. The subscript n of $(X)_n$, referring to a number of ligands X bonded to or associated with the metal M, is an integer of from 1, 2, or 3.

The metal M in the metal-ligand complex of formula (I) may be derived from a metal precursor that is subsequently subjected to a single-step or multi-step synthesis to prepare the metal-ligand complex. Suitable metal precursors may be monomeric (one metal center), dimeric (two metal centers), or may have a plurality of metal centers greater than two, such as 3, 4, 5, or more than 5 metal centers. Specific examples of suitable hafnium and zirconium precursors, for example, include, but are not limited to $HfCl_4$, $HIMe_4$, $Hf(CH_2Ph)_4$, $Hf(CH_2Ph-p-SiMe_3)_4$, $Hf(CH_2CMe_3)_4$, $Hf(CH_2SiMe_3)_4$, $Hf(CH_2Ph)_3Cl$, $Hf(CH_2Ph-p-SiMe_3)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, and $Hf(N(SiMe_3)_2)_2Cl_2$; $ZrCl_4$, $ZrMe_4$, $Zr(CH_2Ph)_4$, $Zr(CH_2Ph-p-SiMe_3)$, $Zr(CH_2Ph-p-SiMe_3)_4$, $Zr(CH_2CMe_3)_4$, $Zr(CH_2SiMe_3)_4$, $Zr(CH_2Ph)_3Cl$, $Zr(CH_2Ph-p-SiMe_3)_3Cl$, $Zr(CH_2CMe_3)_3Cl$, $Zr(CH_2SiMe_3)_3Cl$, $Zr(CH_2Ph)_2Cl_2$, $Zr(CH_2CMe_3)_2Cl_2$, $Zr(CH_2SiMe_3)_2Cl_2$, $Zr(NMe_2)_4$, $Zr(NEt_2)_4$, $Zr(NMe_2)_2Cl_2$, $Zr(NEt_2)_2Cl_2$, $Zr(N(SiMe_3)_2)_2Cl_2$, $TiBn_4$, $TiCl_4$ and $Ti(CH_2Ph)_4$. Lewis base adducts of these examples are also suitable as metal precursors, for example, ethers, amines, thioethers, and phosphines are suitable as Lewis bases. Specific examples include $HfCl_4(THF)_2$, $HfCl_4(SMe_2)_2$ and $Hf(CH_2Ph)_2Cl_2(OEt_2)$. Activated metal precursors may be ionic or zwitterionic compounds, such as $(M(CH_2Ph)_3^+)(B(C_6F_5)_4^-)$ or $(M(CH_2Ph)_3^+)$ $(PhCH_2B(C_6F_5)_3^-)$ where M is defined above as being Hf or Zr.

In the metal-ligand complex according to formula (I), each X bonds with M through a covalent bond, a dative bond, or an ionic bond. When n is 1, X may be a monodentate ligand or a bidentate ligand; when n is 2, each X is an independently chosen monodentate ligand and may be the same as or different from other groups X. In general, the metal-ligand complex according to formula (I) is overall charge-neutral. In some embodiments, the monodentate ligand may be a monoanionic ligand. Monoanionic ligands have a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, $HC(O)O^-$, $HC(O)N(H)^-$, $(C_1-C_{40})$hydrocarbylC(O)O$^-$, $(C_1-C_{40})$hydrocarbylC(O)N$((C_1-C_{20})$hydrocarbyl$)^-$, $(C_1-C_{40})$hydrocarbylC(O)N(H)$^-$, $R^KR^LB^-$, $R^KR^LN^-$, $R^KS^-$, $R^KR^LP^-$, or $R^MR^KR^LSi^-$, where each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In other embodiments, at least one monodentate ligand X, independently from any other ligands X, may be a neutral ligand. In specific embodiments, the neutral ligand is a neutral Lewis base group such as $R^XNR^KR^L$, $R^KOR^L$, $R^KSR^L$, or $R^XPR^KR^L$, where each $R^X$ independently is hydrogen, $(C_1-C_{10})$hydrocarbyl-Si$[(C_1-C_{10})$hydrocarbyl$]_3$ (i.e. —$CH_2Si(Me)_3$), $(C_1-C_{40})$hydrocarbyl, $[(C_1-C_{10})$hydrocarbyl$]_3$Si—, or $(C_1-C_{40})$heterohydrocarbyl and each $R^K$ and $R^L$ independently is as defined above.

Additionally, each X can be a monodentate ligand that, independently from any other ligands X, is a halogen, unsubstituted $(C_1-C_{20})$hydrocarbyl, unsubstituted $(C_1-C_{20})$hydrocarbylC(O)O—, or $R^KR^LN$—, wherein each of $R^K$ and $R^L$ independently is an unsubstituted$(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^KR^LN$—, wherein each of $R^K$ and $R^L$ independently is an unsubstituted $(C_1-C_{10})$hydrocarbyl.

In some embodiments, X is benzyl, phenyl, or chloro. In further embodiments in which n is 2 or 3, such that there are at least two groups X, any two groups X may be joined to form a bidentate ligand. In illustrative embodiments including a bidentate ligand, the bidentate ligand may be a neutral bidentate ligand. In one embodiment, the neutral bidentate ligand is a diene of formula $(R^D)_2C$=$C(R^D)$—$C(R^D)$=$C(R^D)_2$, wherein each $R^D$ independently is H, unsubstituted $(C_1-C_6)$alkyl, phenyl, or naphthyl. In some embodiments the bidentate ligand is a monoanionic-mono (Lewis base) ligand. In some embodiments, the bidentate ligand is a dianionic ligand. The dianionic ligand has a net formal oxidation state of −2. In one embodiment, each dianionic ligand independently is carbonate, oxalate (i.e., $^-O_2CC(O)$ $O^-$), $(C_2-C_{40})$hydrocarbylene dicarbanion, $(C_1-C_{40})$heterohydrocarbylene dicarbanion, phosphate, or sulfite.

In further embodiments, X is selected from methyl; ethyl; 1-propyl; 2-propyl; 1-butyl; 2,2,-dimethylpropyl; trimethylsilylmethyl; phenyl; benzyl; or chloro. In some embodiments n is 2 and each X is the same. In some instances, at least two X are different from each other. In other embodiments n is 2 and each X is a different one of methyl; ethyl; 1-propyl; 2-propyl; 1-butyl; 2,2,-dimethylpropyl; trimethylsilylmethyl; phenyl; benzyl; and chloro. In one embodiment, n is 2 and at least two X independently are monoanionic monodentate ligands. In a specific embodiment, n is 2 and the two X groups join to form a bidentate ligand. In further embodiments, the bidentate ligand is 2,2-dimethyl-2-silapropane-1,3-diyl or 1,3-butadiene.

In the metal-ligand complex of formula (I), each Y independently is O, S, N(C$_1$-C$_{40}$)hydrocarbyl, or P(C$_1$-C$_{40}$)hydrocarbyl. In some embodiments, each Y is different. For example, one Y is O and the other Y is NCH$_3$. In some embodiments, one Y is O and one Y is S. In another embodiment, one Y is S and one Y is N(C$_1$-C$_{40}$)hydrocarbyl, (for example, NCH$_3$). In a further embodiment, each Y is the same. In yet another embodiment, each Y is O. In another embodiment, each Y is S.

In specific embodiments of catalyst systems, the metal-ligand complex according to formula (I) may include, without limitation, a complex having the structure of any of Procatalysts 1-52:

Procatalyst 1
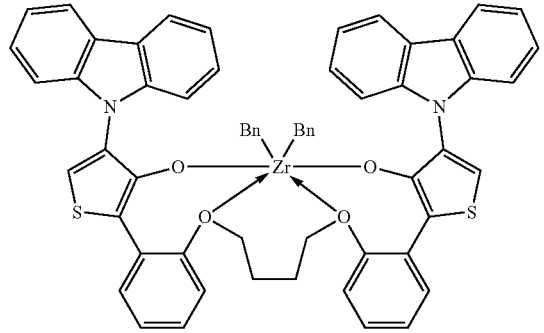

Procatalyst 2
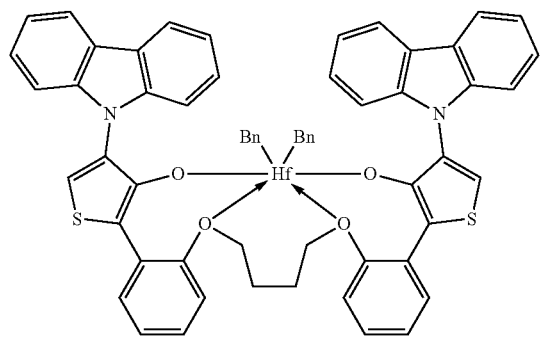

Procatalyst 3
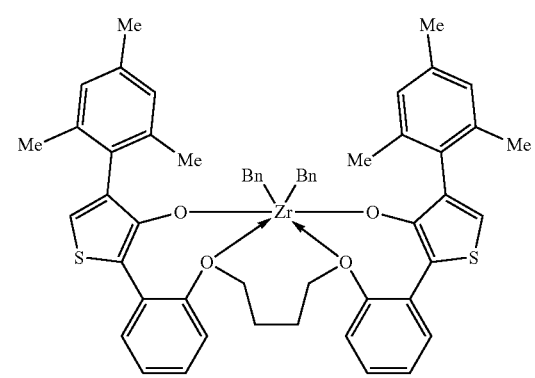

Procatalyst 4
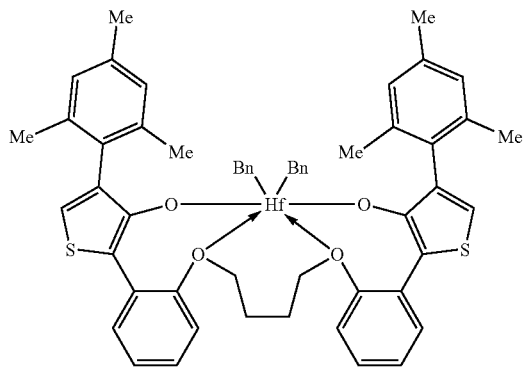

Procatalyst 5
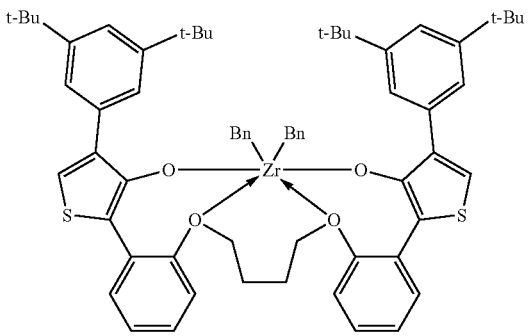

Procatalyst 6
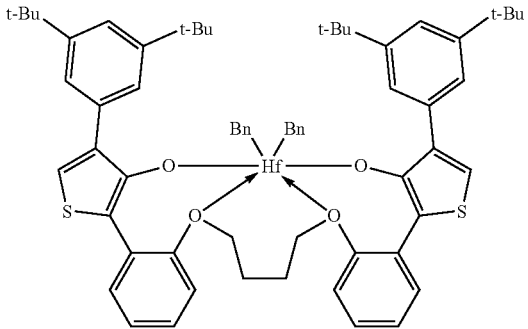

Procatalyst 7
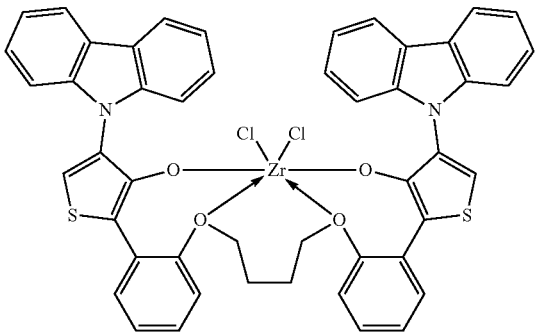

Procatalyst 8
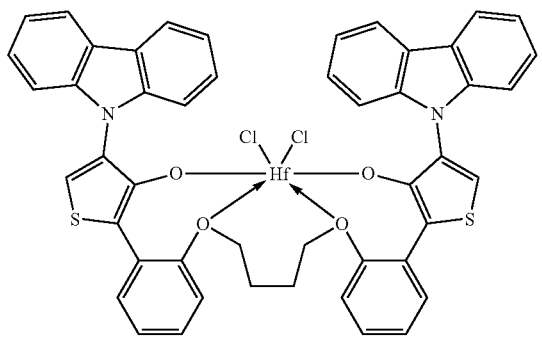
Procatalyst 9
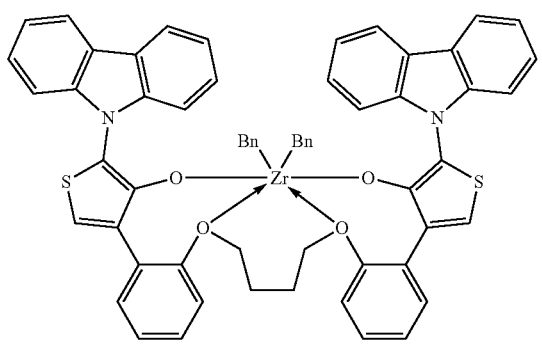
Procatalyst 10
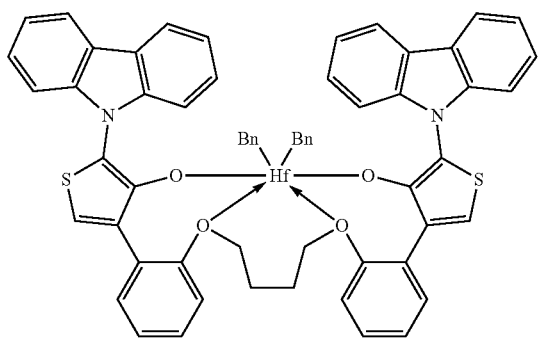
Procatalyst 11
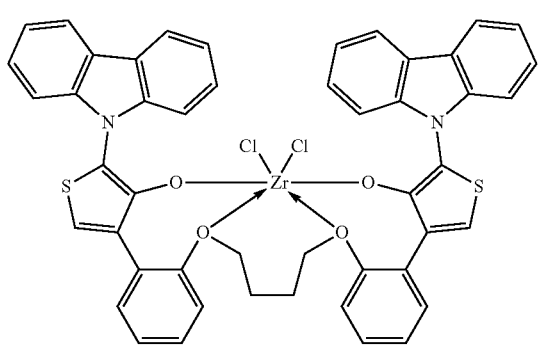
Procatalyst 12
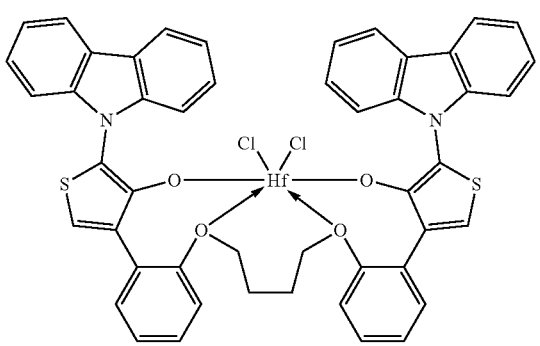
Procatalyst 13
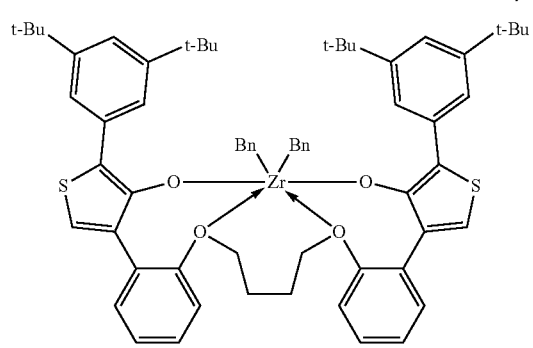
Procatalyst 14
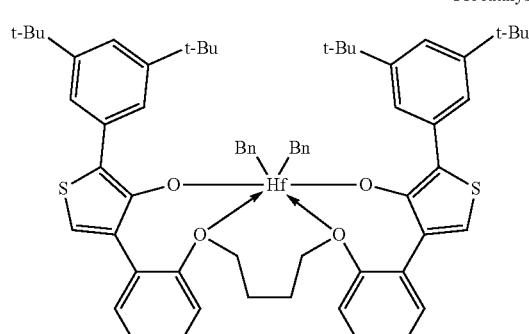
Procatalyst 15
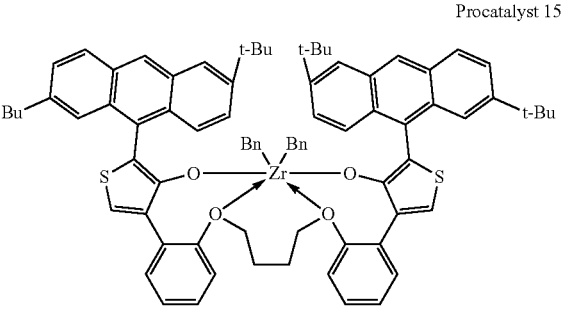

Procatalyst 16
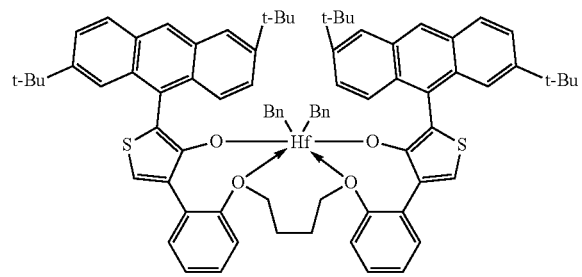
Procatalyst 17
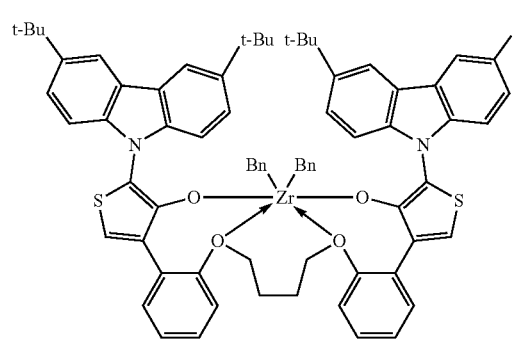
Procatalyst 18
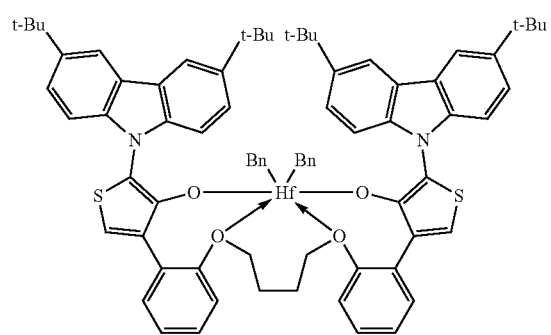
Procatalyst 19
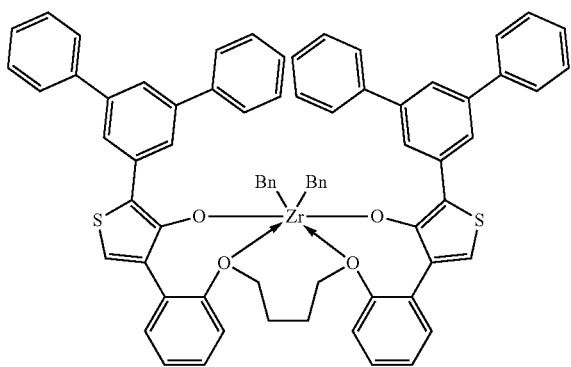
Procatalyst 20
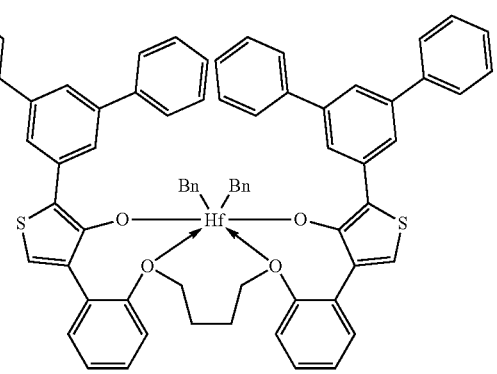
Procatalyst 21
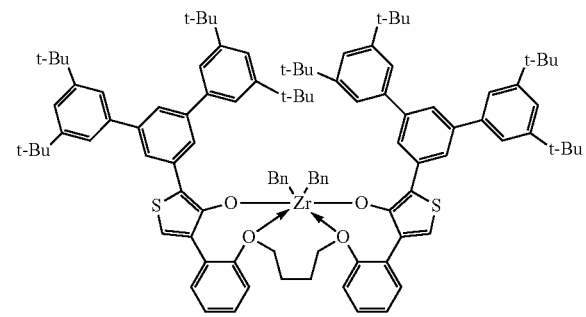
Procatalyst 22
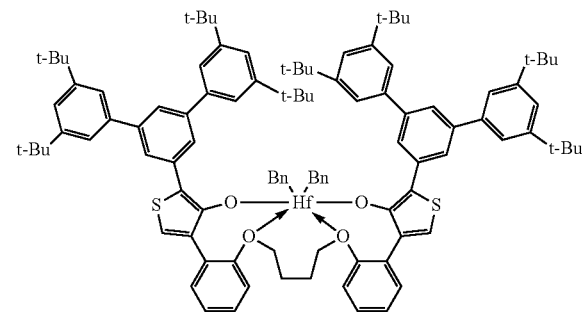
Procatalyst 23
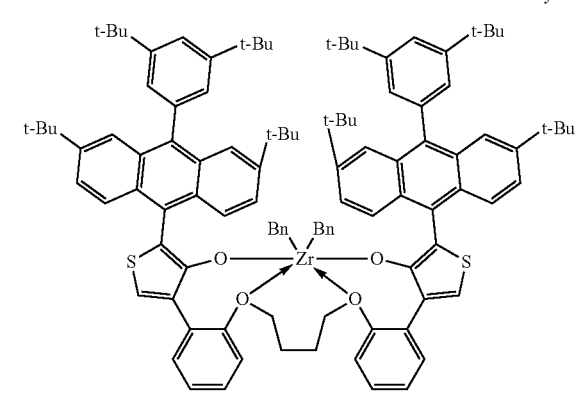

-continued
Procatalyst 24
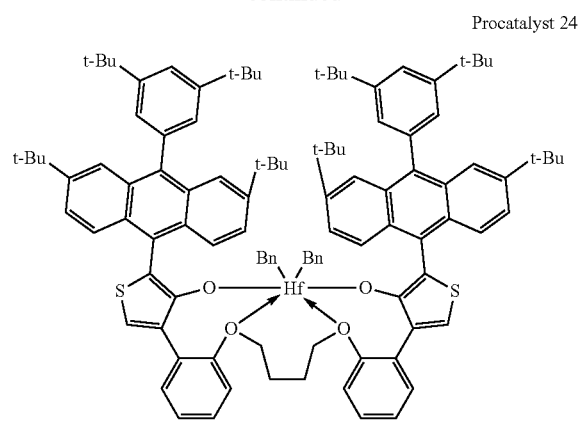
Procatalyst 25
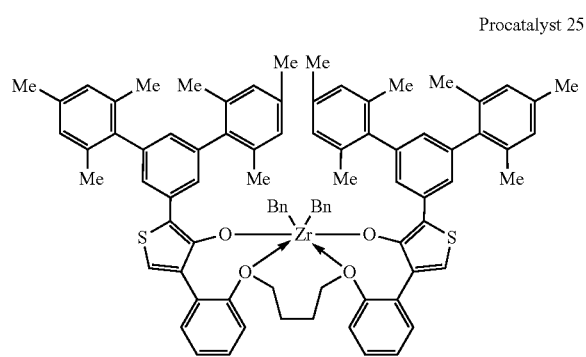
Procatalyst 26
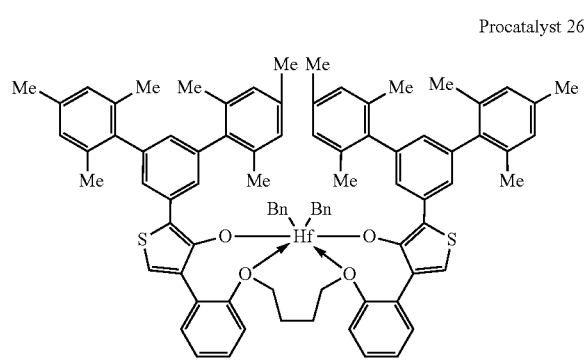
Procatalyst 27
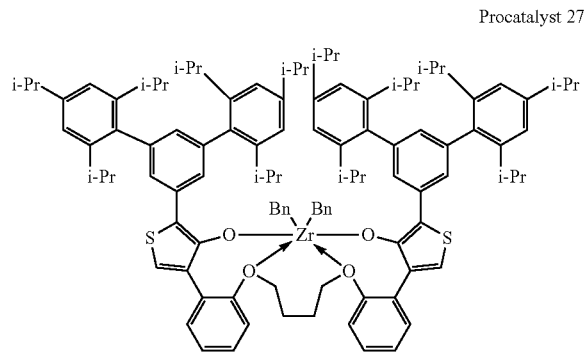
-continued
Procatalyst 28
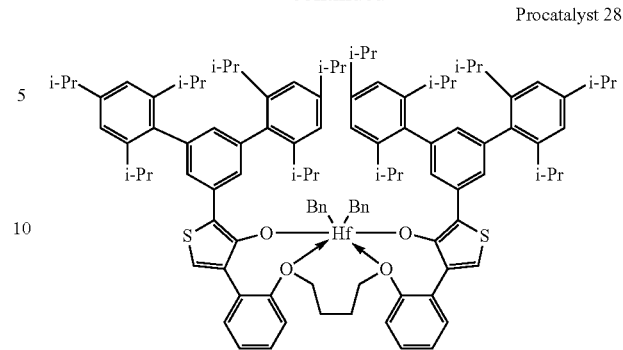
Procatalyst 29
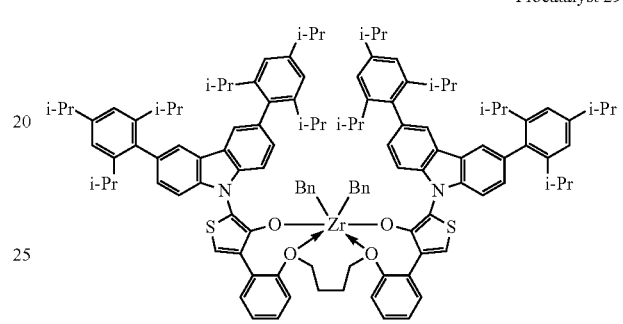
Procatalyst 30
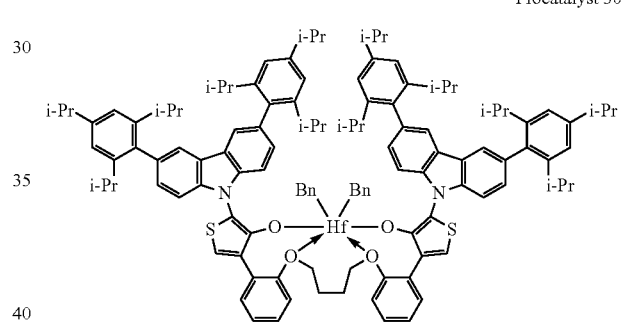
Procatalyst 31
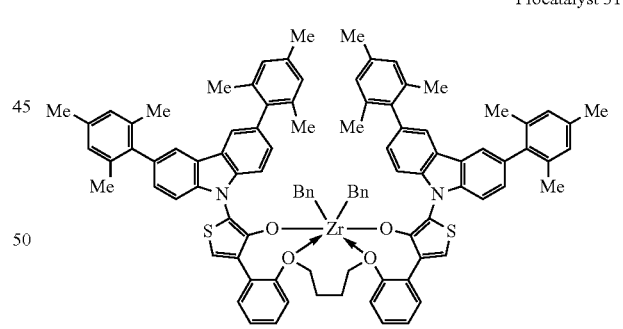
Procatalyst 32
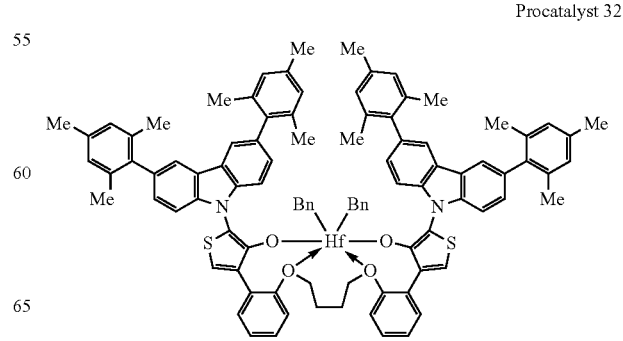

-continued
Procatalyst 33
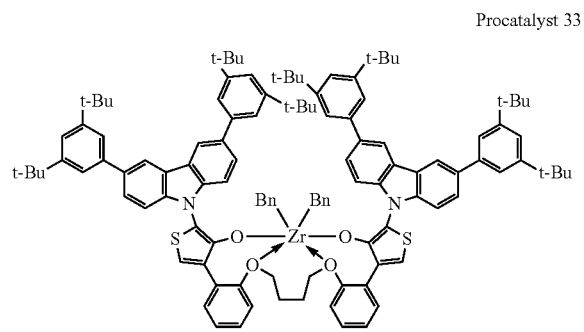
Procatalyst 34
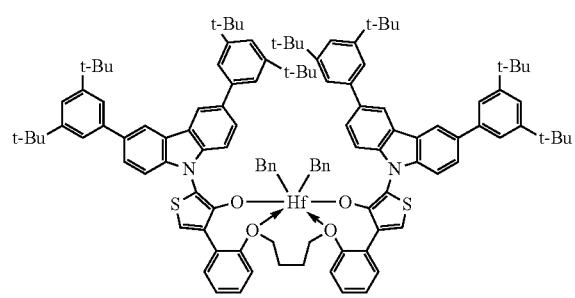
Procatalyst 35
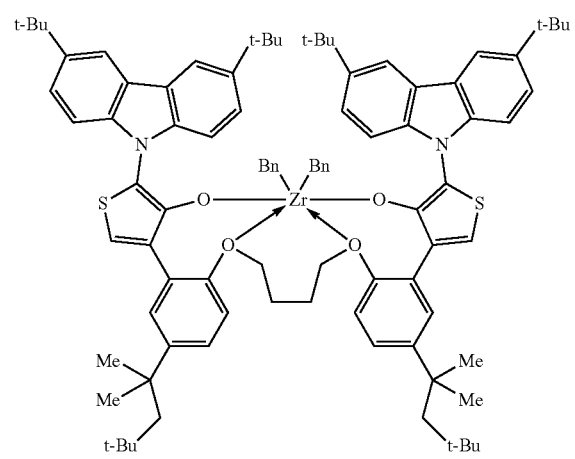
Procatalyst 36
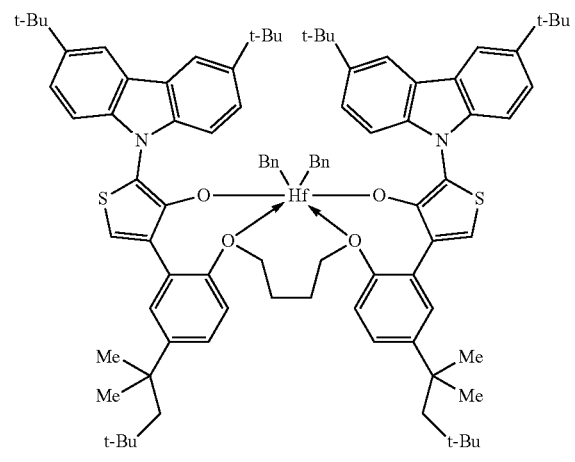
-continued
Procatalyst 37
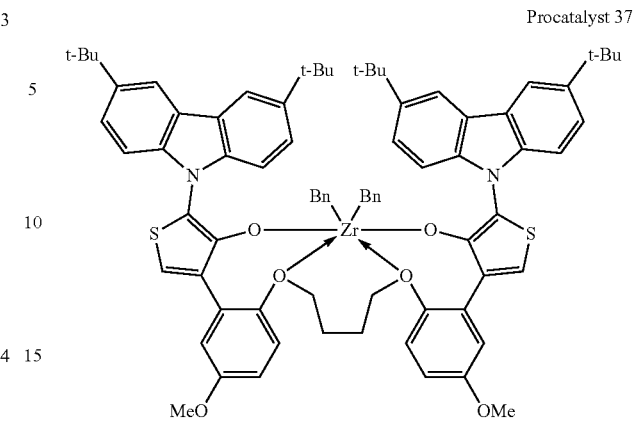
Procatalyst 38
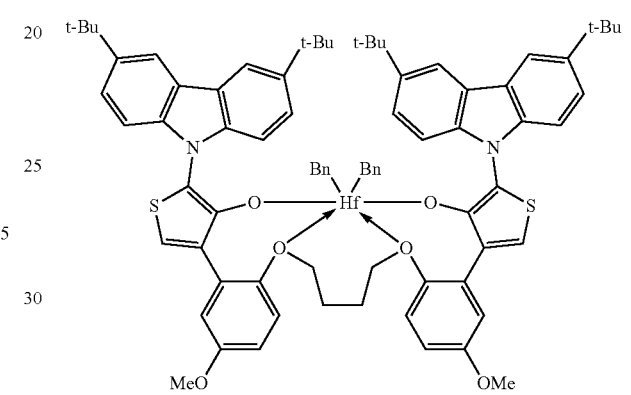
Procatalyst 39
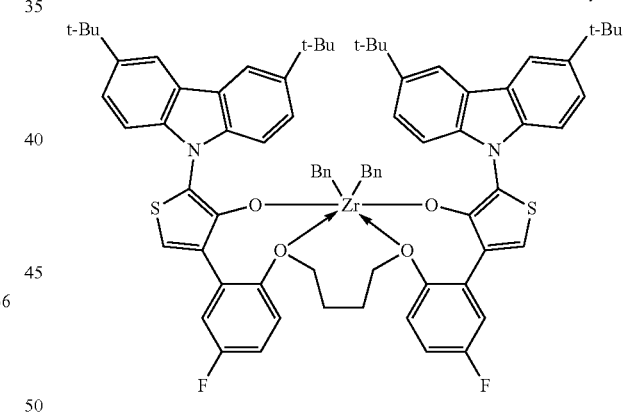
Procatalyst 40
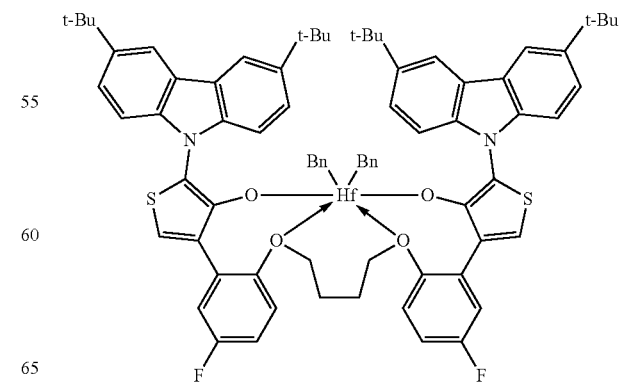

Procatalyst 41
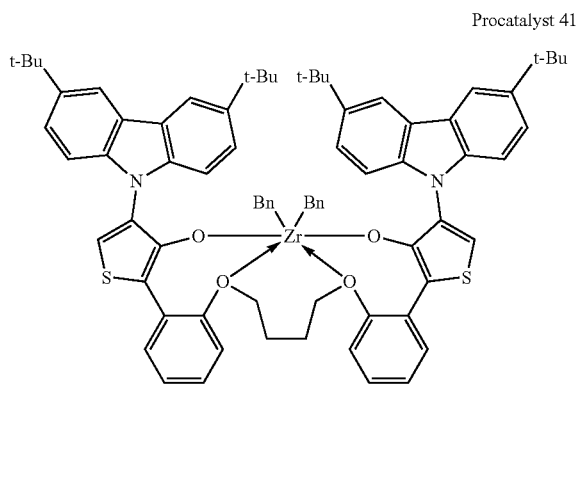
Procatalyst 42
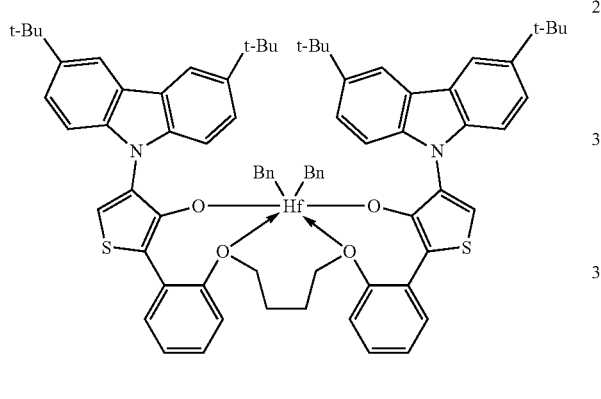
Procatalyst 43
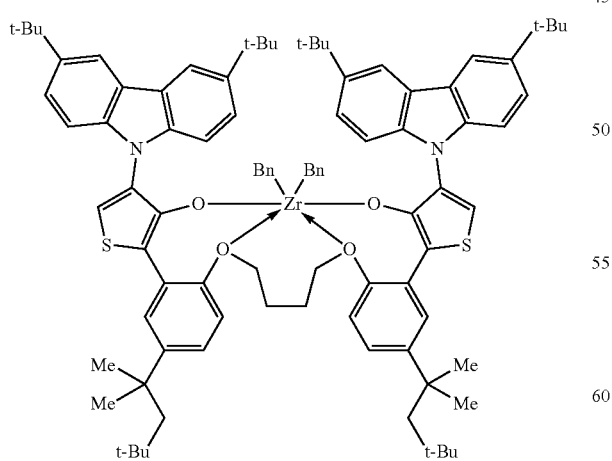
Procatalyst 44
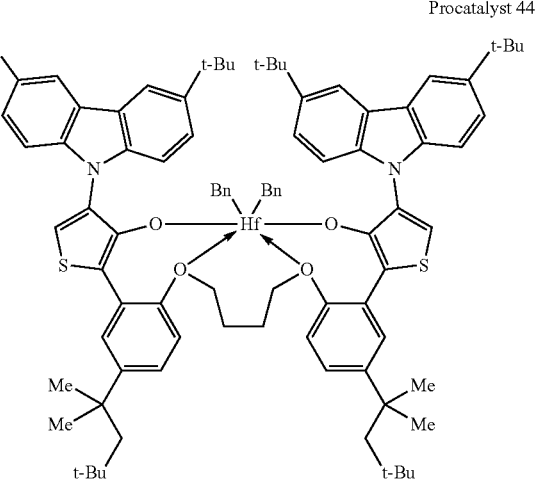
Procatalyst 45
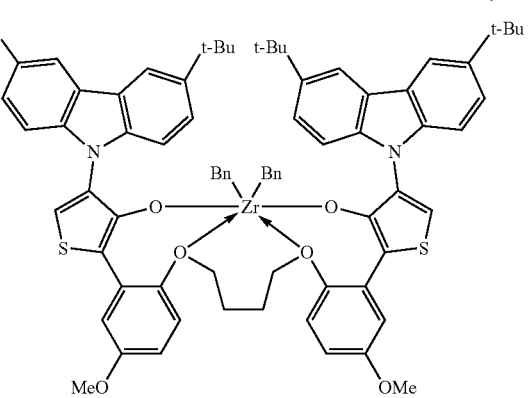
Procatalyst 46
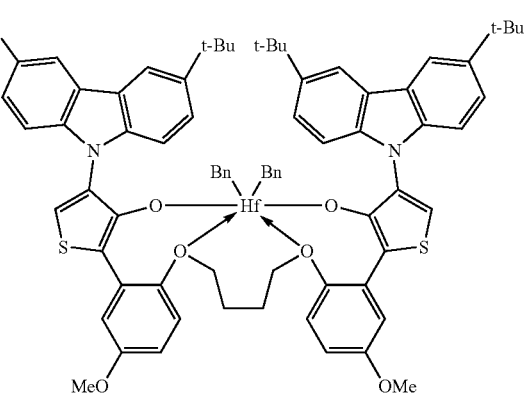

Procatalyst 47
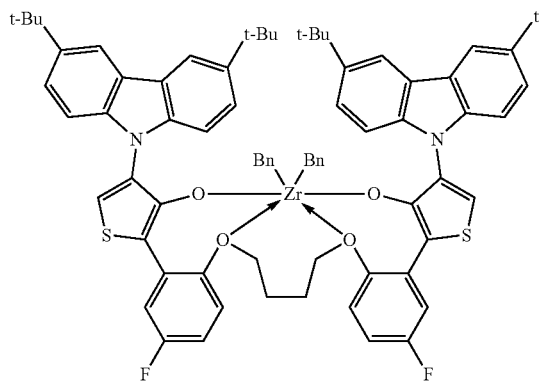

Procatalyst 48
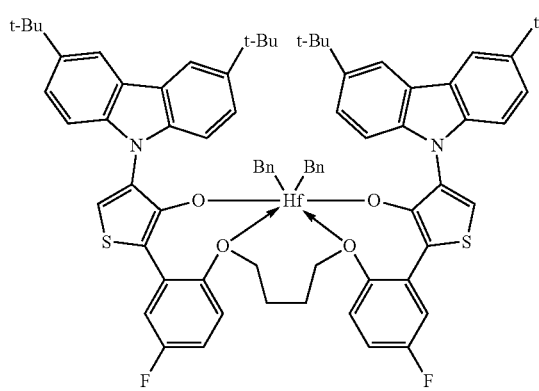

Procatalyst 49
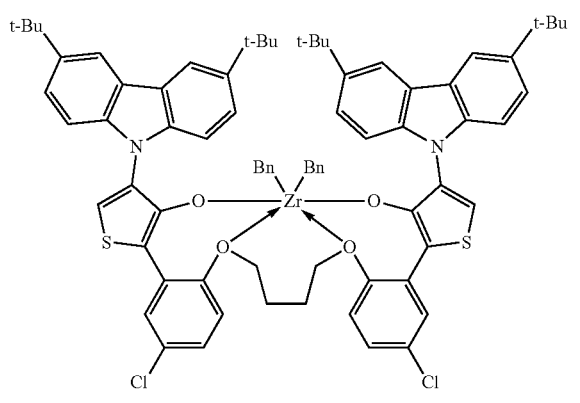

Procatalyst 50
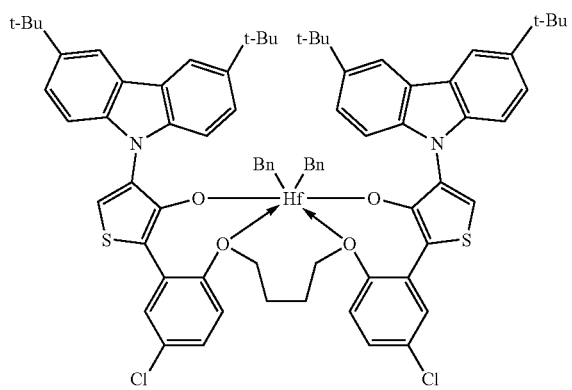

Procatalyst 51
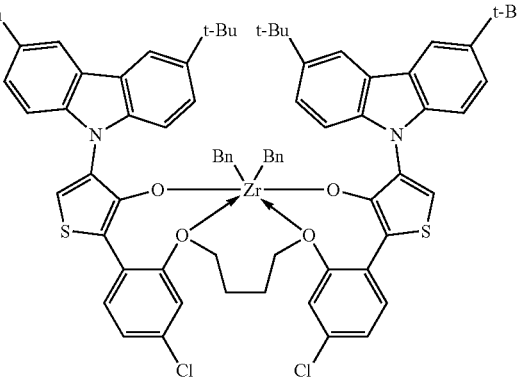

Procatalyst 52
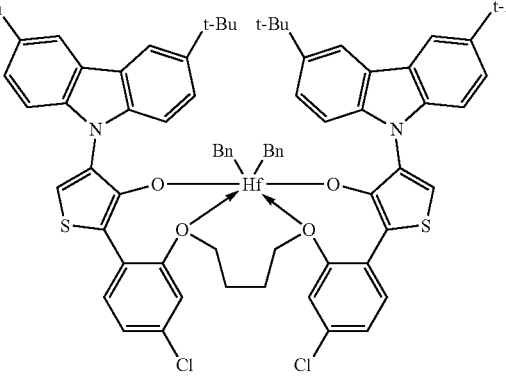

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula. (I) includes both a procatalyst form, which is neutral, and a catalytic form, which may be positively charged due to the loss of a monoanionic ligand, such a benzyl or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaiuminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing $(C_1-C_{20})$hydrocarbyl substituents as described herein. In some embodiments, Group 13 metal compounds are tri$((C_1-C_{20})$hydrocarbyl)-substituted-aluminum or tri$((C_1-C_{20})$hydrocarbyl)-boron compounds. In other embodiments, Group 13 metal compounds are tri(hydrocarbyl)-substituted-aluminum, tri((C$_1$-C$_{20}$)hydrocarbyl)-boron compounds, tri((C$_1$-C$_{10}$)alkyl)aluminum, tri((C$_6$-C$_{18}$)aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris((C$_1$-C$_{20}$)hydrocarbyl borate (e.g. trityl tetrafluoroborate) or a tri((C$_1$-C$_{20}$)hydrocarbyl)ammonium tetra((C$_1$-C$_{20}$)hydrocarbyl)borate (e.g., bis(octadecyl)methylammonium tetrakis(pentafluorophenyl)borate). As used herein, the term "ammonium" means a nitrogen cation that is a ((C$_1$-C$_{20}$)hydrocarbyl)$_4$N$^+$ a ((C$_1$-C$_{20}$)hydrocarbyl)$_3$N(H)$^+$, a ((C$_1$-C$_{20}$)hydrocarbyl)$_2$N(H)$_2^+$, (C$_1$-C$_{20}$)hydrocarbylN(H)$_3^+$, or N(H)$_4^+$, wherein each (C$_1$-C$_{20}$)hydrocarbyl, when two or more are present, may be the same or different.

Combinations of neutral Lewis acid activating co-catalysts include mixtures comprising a combination of a tri ((C$_1$-C$_4$)alkyl)aluminum and a halogenated tri((C$_6$-C$_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1−) amine, and combinations thereof.

In some embodiments, more than one of the foregoing activating co-catalysts may be used in combination with each other. A specific example of a co-catalyst combination is a mixture of a tri((C$_1$-C$_4$)hydrocarbyl)aluminum, tri((C$_1$-C$_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane, alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Chain Shuttling Agents

The term, "shuttling agent" refers to a compound or mixture of compounds employed in the composition of the present disclosure that is capable of causing polymeryl exchange between at least two active catalyst sites of the catalysts included in the composition under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. In some embodiments, the shuttling agent has an activity ratio RA-B/RB-A of from 0.01 and 100, from 0.1 to 10, from 0.5 to 2.0, or from 0.8 to 1.2. The activity ratio RA-B is the rate of polymeryl transfer from catalyst A active site to catalyst B active site via the shuttling agent, and RB-A is the rate of reverse polymeryl transfer which is the rate of exchange starting from the catalyst B active site to catalyst A active site via the shuttling agent. The intermediate formed between the shuttling agent and the polymeryl chain is sufficiently stable that chain termination is relatively rare. In one or more embodiments, less than 90 percent, less than 75 percent, less than 50 percent, or than 10 percent of shuttle-polymeryl products are terminated prior to attaining 3 distinguishable polymer segments or blocks. The rate of chain shuttling (defined by the time required to transfer a polymer chain from a catalyst site to the chain shuttling agent and then back to a catalyst site) is equivalent to or faster than the rate of polymer termination, even up to 10 or even 100 times faster than the rate of polymer termination. This permits polymer block formation on the same time scale as polymer propagation.

Polymer products having segments of different tacticity or regio-error, different block lengths, or different numbers of such segments or blocks in each copolymer may be prepared by selecting different combinations of catalysts and various shuttling agents. The catalysts may be selected from metal-ligand complexes of formula (I) having differing polymerization ability and paired various shuttling agents or mixtures of agents with these catalyst combinations. For example, if the activity of the shuttling agent is low relative to the catalyst polymer chain propagation rate of one or more of the catalysts, longer block length multi-block copolymers and polymer blends may be obtained. In contrast, if shuttling is very fast relative to polymer chain propagation, a copolymer having a more random chain structure and shorter block lengths is obtained. An extremely fast shuttling agent may produce a multi-block copolymer having substantially random copolymer properties. By proper selection of both catalyst mixture and shuttling agent, relatively pure block copolymers, copolymers containing relatively large polymer segments or blocks, and/or blends of the foregoing with various homopolymers and/or copolymers can be obtained.

A suitable composition comprising catalyst A, catalyst B, and a chain shuttling agent may be obtained by the following multi-step procedure specially adapted for block differentiation based on tacticity or regio-error content:

I. One or more addition polymerizable C3-30 α-olefin monomers are polymerized using a mixture comprising a potential catalyst and a potential chain shuttling agent. This polymerization test is performed using a batch or semi-batch reactor (that is, without resupply of catalyst or shuttling agent), preferably with relatively constant monomer concentration, operating under solution polymerization conditions, typically using a molar ratio of catalyst to chain shuttling agent from 1:5 to 1:500. After forming a suitable quantity of polymer, the reaction is terminated by addition of a catalyst poison and the polymer's properties (tacticity and optionally regio-error content) are measured.

II. The foregoing polymerization and polymer testing are repeated for several different reaction times, providing a series of polymers having a range of yields and PDI values.

III. Catalyst/shuttling agent pairs demonstrating significant polymer transfer both to and from the shuttling agent are characterized by a polymer series wherein the minimum PDI is less than 2.0, more preferably less than 1.5, and most preferably less than 1.3. Furthermore, if chain shuttling is occurring, the Mn of the polymer will increase linearly as conversion is increased. Catalyst and shuttling agent pairs are those giving polymer Mn as a function of conversion (or polymer yield) fitting a line with a statistical precision (R2) of greater than 0.95, preferably greater than 0.99.

Steps I-III are then carried out for one or more additional pairings of potential catalysts and/or putative shuttling agents.

In one or more embodiments, the polymer composition comprising catalyst A, catalyst B, and one or more chain shuttling agents according to the invention is then selected such that the two catalysts each undergo chain shuttling with one or more of the chain shuttling agents, and catalyst A has a greater capacity of selectively forming stereospecific polymer compared to catalyst B under the reaction conditions chosen. At least one of the chain shuttling agents undergoes polymer transfer in both the forward and reverse directions (as identified in the foregoing test) with both catalyst A and catalyst B. In addition, it is preferable that the chain shuttling agent does not reduce the catalyst efficiency (measured in weight of polymer produced per weight of catalyst per unit time) of either catalyst (compared to activity in the absence of a shuttling agent) by more than 60 percent, more preferably such catalyst efficiency is not reduced by more than 20 percent, and most preferably catalyst efficiency of at least one of the catalysts is increased compared to the catalyst efficiency in the absence of a shuttling agent.

Alternatively, it is also possible to detect catalyst and shuttling agent pairs by performing a series of polymerizations under standard batch reaction conditions and measuring the resulting polymer properties. Suitable shuttling agents are characterized by lowering of the resultant Mn without significant broadening of PDI or loss of activity (reduction in yield or rate) with increasing shuttling agent loading.

The foregoing tests are readily adapted to rapid throughput screening techniques using automated reactors and analytic probes and to formation of polymer blocks having different distinguishing properties (syndiotacticity, isotacticity, and optionally regio-error content). For example, a number of potential shuttling agent candidates can be pre-identified or synthesized in situ by combination of various organometal compounds with various proton sources and the compound or reaction product added to a polymerization reaction employing an olefin polymerization catalyst composition. Several polymerizations are conducted at varying molar ratios of shuttling agent to catalyst. As a minimum requirement, suitable shuttling agents are those that produce a minimum PDI of less than 5.0 in variable yield experiments as described above, while not significantly adversely affecting catalyst activity, catalyst efficiency, and preferably improving catalyst activity and efficiency, as above described.

Regardless of the method for identifying, a priori, a shuttling agent, the term is meant to refer to a compound that is capable of preparing the presently identified multi-block copolymers or usefully employed under the polymerization conditions herein disclosed. Highly desirably, multi-block copolymers having an average number of blocks or segments per average chain (as defined as the average number of blocks of different composition divided by the Mn of the polymer) greater than 3.0 more preferably greater than 3.5, even more preferably greater than 4.0, and less than 25, preferably less than 15, more preferably less than 10.0, most preferably less than 8.0 are formed according to the invention.

Suitable shuttling agents for use herein include Group 1, 2, 12 or 13 metal compounds or complexes containing at least one C1-20 hydrocarbyl group, preferably hydrocarbyl substituted aluminum, gallium or zinc compounds containing from 1 to 12 carbons in each hydrocarbyl group, and reaction products thereof with a proton source. Hydrocarbyl groups are alkyl groups, linear or branched, C2-8 alkyl groups. In one or more embodiments of the disclosure, the shuttling agents may be added to the polymerization process. The chain transfer agents may include trialkyl aluminum and dialkyl zinc compounds, especially triethylaluminum, tri(i-propyl)aluminum, tri(i-butyl)aluminum, tri(n-hexyl)aluminum, tri(n-octyl)aluminum, triethylgallium, or diethylzinc. Additional suitable shuttling agents include the reaction product or mixture formed by combining the foregoing organometal compound, preferably a tri($C_1$-8)alkyl aluminum or di($C_1$-8)alkyl zinc compound, especially triethylaluminum, tri(i-propyl)aluminum, tri(i-butyl)aluminum, tri(n-hexyl)aluminum, tri(n-octyl)aluminum, or diethylzinc, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl)amine, 2,6-di(t-butyl)phenol, ethyl(1-naphthyl)amine, bis(2,3,6,7-dibenzo-1-azacycloheptaneamine), or 2,6-diphenylphenol. In some embodiments, the shuttling agent may be chosen from amine or hydroxyl reagent such that one hydrocarbyl group remains per metal atom. The primary reaction products of the foregoing combinations for use in the present disclosure as shuttling agents are n-octylaluminum di(bis(trimethylsilyl)amide), i-propylaluminum bis(dimethyl(t-butyl)siloxide), and n-octylaluminum di(pyridinyl-2-methoxide), i-butylaluminum bis(dimethyl(t-butyl)siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc(2,6-diphenylphenoxide), and ethylzinc (t-butoxide).

It will be appreciated by the skilled artisan that a suitable shuttling agent for one catalyst or catalyst combination may not necessarily be as good or even satisfactory for use with a different catalyst or catalyst combination. Some potential shuttling agents may adversely affect the performance of one or more catalysts, and may be excluded for use in the polymerization process of this disclosure. Accordingly, the activity of the chain shuttling agent should be balanced with the catalytic activity of the catalysts to achieve the polymer having a hard segment and a soft segment.

Generally however, shuttling agents possess the highest rates of polymer transfer as well as the highest transfer efficiencies (reduced incidences of chain termination). Such shuttling agents may be used in reduced concentrations and still achieve a degree of shuttling. In addition, such shuttling agents result in production of the shortest possible polymer block lengths. Chain shuttling agents with a single exchange site are employed due to the fact that the effective molecular weight of the polymer in the reactor is lowered.

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

In some embodiments, the ethylene based polymers may comprise at least 50 percent by moles of units derived from ethylene. All individual values and subranges from at least 60 mole percent are included herein and disclosed herein as separate embodiments. For example, the ethylene based polymers may comprise at least 63 percent by moles of units derived from ethylene; at least 86 percent by moles of units; at least 90 percent by moles of units derived from ethylene; or in the alternative, from 70 to 100 percent by moles of units derived from ethylene; from 70 to 89.5 percent by moles of units derived from ethylene; or from 69 to 85.5 percent by moles of units derived from ethylene.

In some embodiments of the ethylene based polymer, the amount of additional α-olefin is less than 50 mol %; other embodiments include at least 1 mole percent (mol %) to 40 mol %; and in further embodiments the amount of additional α-olefin includes at least 10 mol % to 20 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may compromise from about 0 to about 10 percent by the combined weight of such additives, based on the weight of the ethylene based polymers and the one or more additives. The ethylene-based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal ligand complex of formula (I) may have a density according to ASTM D792 (incorporated herein by reference in its entirety) from 0.850 g/cm³ to 0.950 g/cm³, from 0.880 g/cm³ to 0.920 g/cm³, from 0.880 g/cm³ to 0.910 g/cm³, or from 0.880 g/cm³ to 0.900 g/cm³, for example.

In another embodiment, the polymer resulting from the catalyst system that includes the metal-ligand complex of formulas (I) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formulas (I) has a polydispersity index (PDI) from 1 to 25, where PDI is defined as $M_w/M_n$ with $M_w$ being a weight-average molecular weight and $M_n$ being a number-average molecular weight. In other embodiments, the polymers resulting from the catalyst system have a PDI from 1 to 6. Another embodiment includes a PDI from 1 to 3; and other embodiments include PDI from 1.5 to 2.5.

Embodiments of the catalyst systems described in this disclosure yield unique polymer properties as a result of the high molecular weights of the polymers formed and the amount of the co-monomers incorporated into the polymers.

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 µm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 µm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening is performed in a high throughput parallel polymerization reactor (PPR) system. The PPR system is composed of an array of 48 single-cell (6×8 matrix) reactors in an inert-atmosphere glovebox. Each cell is equipped with a glass insert with an internal working liquid volume of approximately 5 mL. Each cell has independent controls for pressure, and the liquid in the cell is continuously stirred at 800 rpm. Catalyst solutions, unless otherwise noted, are prepared by dissolving an appropriate amount of a procatalyst in toluene. All liquids (for example, solvent, 1-octene, chain shuttling agent solutions as appropriate to the experiment, and catalyst solutions) are added to the single-cell reactors via robotic syringes. Gaseous reagents (i.e. ethylene, $H_2$) are added to the single-cell reactors via a gas injection port. Prior to each run, the reactors are heated to 80° C., purged with ethylene, and vented.

A portion of Isopar-E is added to the reactors. The reactors are heated to the run temperature and pressured to the appropriate psig with ethylene. Toluene solutions of reagents are added in the following order: (1) 1-octene with 500 nmol of scavenger MMAO-3A; (2) activator (cocatalyst-1, cocatalyst-2, etc); and (3) catalyst.

Each liquid addition is chased with a small amount of Isopar-E so that after the final addition, a total reaction volume of 5 mL is reached. Upon addition of the catalyst, the PPR software begins monitoring the pressure of each cell. The pressure (within approximately 2-6 psig) is maintained by the supplemental addition of ethylene gas by opening the valve at the set point minus 1 psi and closing it when the pressure reached 2 psi higher. All drops in pressure are cumulatively recorded as "Uptake" or "Conversion" of the ethylene for the duration of the run or until the uptake or conversion requested value is reached, whichever occurs first. Each reaction is quenched with the addition of 10% carbon monoxide in argon for 4 minutes at 40-50 psi higher than the reactor pressure. A shorter "Quench Time" means that the catalyst is more active. In order to prevent the formation of too much polymer in any given cell, the reaction is quenched upon reaching a predetermined uptake level (50 psig for 120° C. runs, 75 psig for 150° C. runs).

After all the reactions are quenched, the reactors are allowed to cool to 70° C. The reactors are vented, purged for 5 minutes with nitrogen to remove carbon monoxide, and the tubes are removed. The polymer samples are dried in a centrifugal evaporator at 70° C. for 12 hours, weighed to determine polymer yield, and submitted for IR (1-octene incorporation) and GPC (molecular weight) analysis.

SymRAD HT-Compositional GPC Analysis

The molecular weight data of samples generated from the PPR experiments are determined by analysis on a hybrid Symyx/Dow built Robot-Assisted Dilution High-Temperature Gel Permeation Chromatographer (Sym-RAD-GPC). The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250λ aliquot of the sample. The GPC is equipped with two Polymer Labs PLgel 10 µm MIXED-B columns (300×10 mm) at a flow rate of 2.0 mL/minute at 160° C. Sample detection is performed using a PolymerChar IR5 detector in concentration mode. A conventional calibration of narrow polystyrene (PS) standards is utilized with apparent units adjusted to homo-polyethylene (PE) using known Mark-Houwink coefficients for PS and PE in TCB at this temperature. Octene incorporation was determined by use of a linear calibration developed by analyzing co-polymers at known compositions with the PolymerChar IR 5 detector.

1-Octene Incorporation IR Analysis

The running of samples for the HT-GPC analysis precedes the IR analysis. In some cases the octene incorporation was determined from the compositional GPC analysis, and in other cases this separate IR analysis was conducted. For the IR analysis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670 E.S.P. FT-IR.

Batch Reactor Polymerization Procedure

The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4 Å molecular sieves, the second containing Q5 reactant. The $N_2$, used for transfers, is passed through a single column containing A204 alumina, 4 Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter. For some experiments, the standard conditions at 120° C. are 46 g ethylene and 303 g 1-octene in 611 g of IsoparE, and the standard conditions at 150° C. are 43 g ethylene and 303 g 1-octene in 547 g of IsoparE.

The procatalyst and activators are mixed with the appropriate amount of purified toluene to achieve a molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

PolymerChar HT-Compositional GPC Analysis

Polymer samples generated from the Batch Polymerization Process were analyzed by high temperature GPC analysis using a PolymerChar GPC with infrared detector (IRS) and Agilent PLgel MIXED-A columns. Decane (10 μL) was added to each sample for use as an internal flow marker. Samples were first diluted in 1,2,4-trichlorobenzene (TCB) stabilized with 300 ppm butylated hydroxyl toluene (BHT) to a concentration of 10 mg/mL and dissolved by stirring at 160° C. for 120 minutes. Prior to injection samples were further diluted with TCB stabilized with BHT to a concentration of 2 mg/mL. Samples (200 μL) were eluted through one PLgel 20 μm (50×7.5 mm) guard column followed by four PLgel 20 μm (300×7.5 mm) MIXED-A columns maintained at 160° C. with TCB stabilized with BHT at a flowrate of 1.0 mL/min. The total run time was 40 minutes. To calibrate for molecular weight (MW) Agilent EasiCal polystyrene standards (PS-1 and PS-2) were diluted with 1.5 mL TCB stabilized with BHT and dissolved by stirring at 160° C. for 15 minutes. The PS standards were injected into the system without further dilution to create a 3rd order MW calibration curve with apparent units adjusted to homopolyethylene (PE) using known Mark-Houwink coefficients for PS and PE ($\alpha_{sty}$=0.722, log $K_{sty}$=−3.993, $\alpha_{eth}$=0.725, log $K_{eth}$=−3.391). Octene incorporation was determined by use of a linear calibration developed by analyzing co-polymers at known compositions.

Chain Shuttling Activity

Beyond catalyst efficiency, or $M_w$, comonomer incorporation, and PDI of the corresponding polymer produced from a specific catalyst, understanding the chain transfer capability of a new catalyst is one critical aspect for development of new polyolefin catalyst families at Dow. A catalyst's chain transfer ability is initially evaluated by running a campaign in which the level of chain transfer or shuttling agent (CSA) is varied to observe the depression in molecular weight and narrowing of the PDI expected for a shuttling catalyst. The molecular weight of the polymer generated by catalysts with potential to be good chain transfer agents will be more sensitive to the addition of CSA than the polymer molecular weight generated by poorer shuttling catalysts. The Mayo equation (Equation 1) describes how a chain transfer agent decreases the number average chain length ($\overline{X_n}$) from the native number average chain length ($\overline{X_{n0}}$) where no chain transfer agent is present. Equation 2 defines a chain transfer or chain shuttling constant, Ca, as the ratio of chain transfer and propagation rate constants. By assuming that the vast majority of chain propagation occurs through ethylene insertion and not comonomer incorporation, Equation 3 describes the expected $M_n$ of a polymerization. $M_{no}$ is the native molecular weight of the catalyst in the absence of chain shuttling agent and $M_n$ is the molecular weight that is observed with chain shuttling agent ($M_n$=$M_{no}$ with no chain shuttling agent).

$$\frac{1}{\overline{X}_n} = \frac{1}{\overline{X}_{n_0}} + \frac{k_{tr}[\text{chain transfer agent}]}{k_p[\text{monomer}]} \quad \text{Equation 1}$$

$$Ca = \frac{k_{tr}}{k_p} \quad \text{Equation 2}$$

$$\frac{1}{Mn} = \frac{1}{Mn_0} + Ca\frac{[CSA]}{[\text{monomer}] \times 28} \quad \text{Equation 3}$$

$$[\text{Monomer}] = \quad \text{Equation 4}$$
$$(\text{Mol \% } C2) \times [\text{ethylene}] + (\text{Mol \% } C8) \times [\text{octene}]$$

Figure 5:
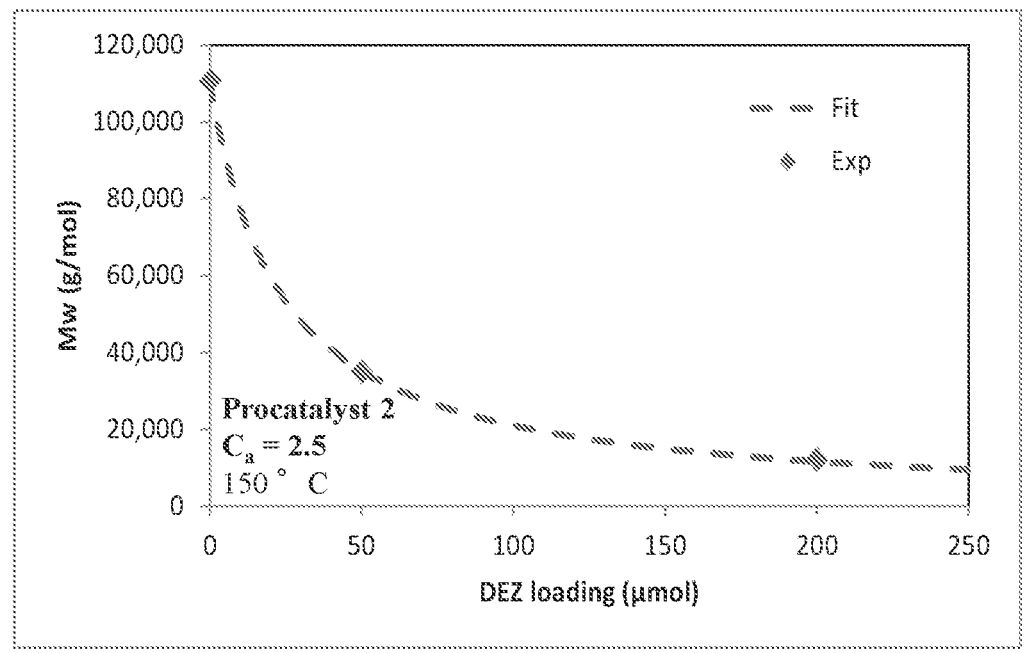
FIG. 5 is a graph of the change of molecular weight of a polymer as a function of the amount of chain shuttling agents for procatalyst 2.
Figure 6:
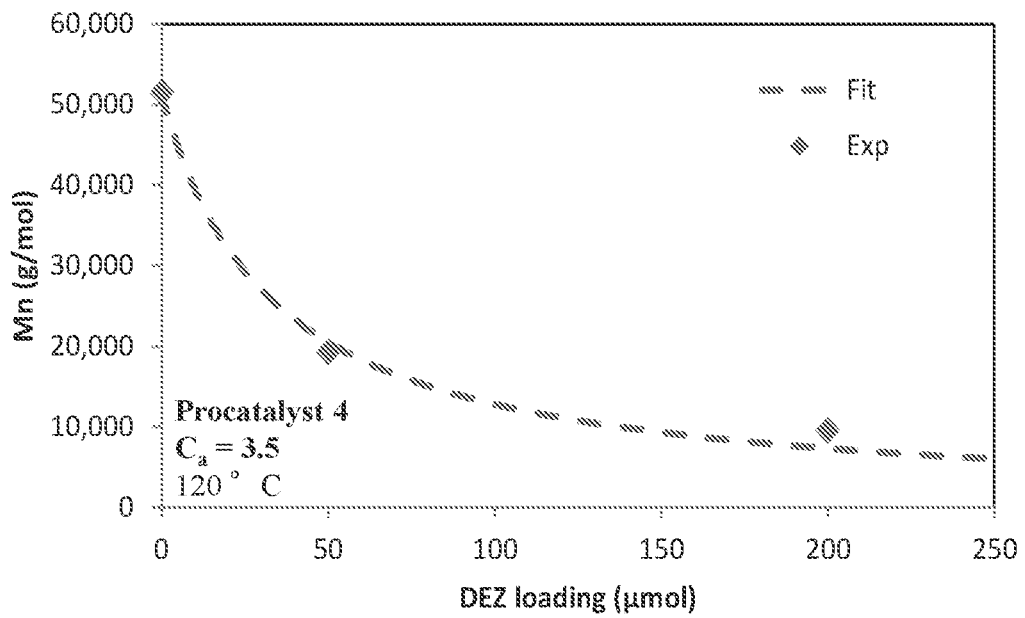
FIG. 6 is a graph of the change of molecular weight of a polymer as a function of the amount of chain shuttling agents for procatalyst 4.
Figure 7:
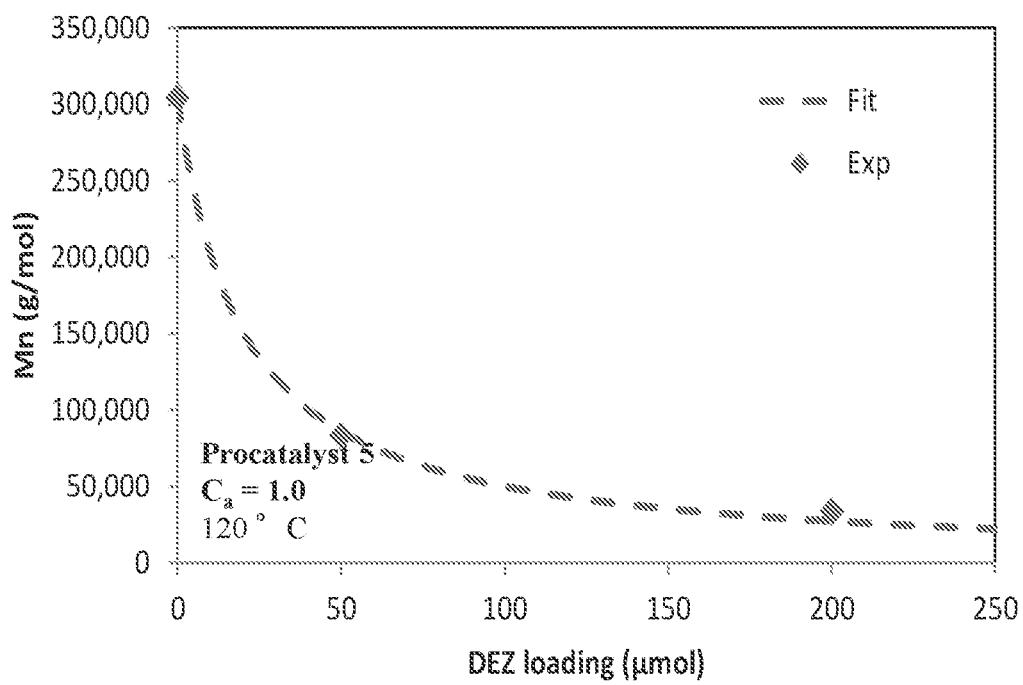
FIG. 7 is a graph of the change of molecular weight of a polymer as a function of the amount of chain shuttling agents for procatalyst 5.
Figure 8:
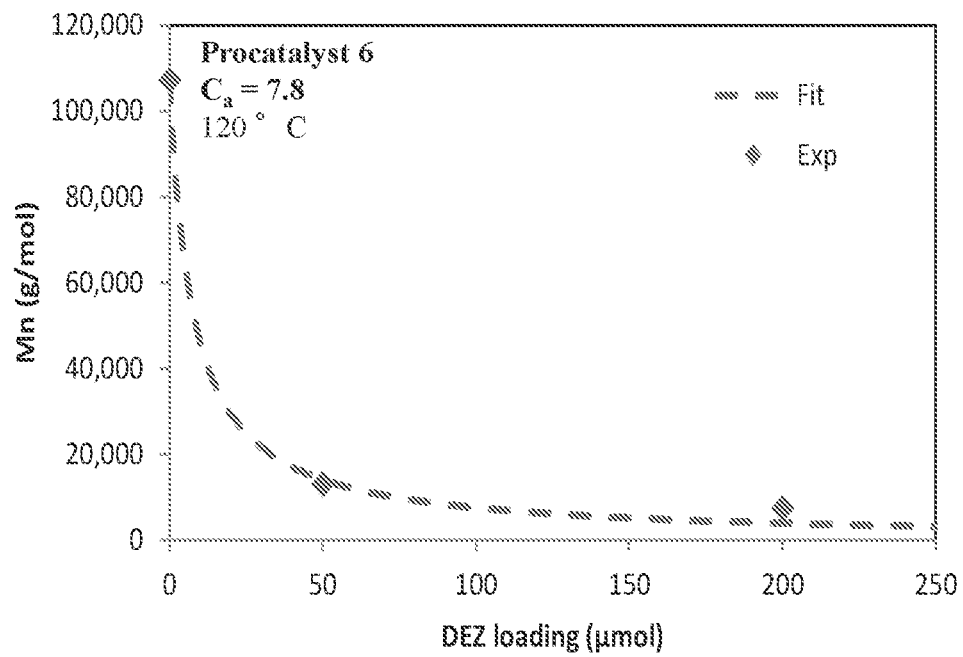
FIG. 8 is a graph of the change of molecular weight of a polymer as a function of the amount of chain shuttling agents for procatalyst 6.
Figure 9:
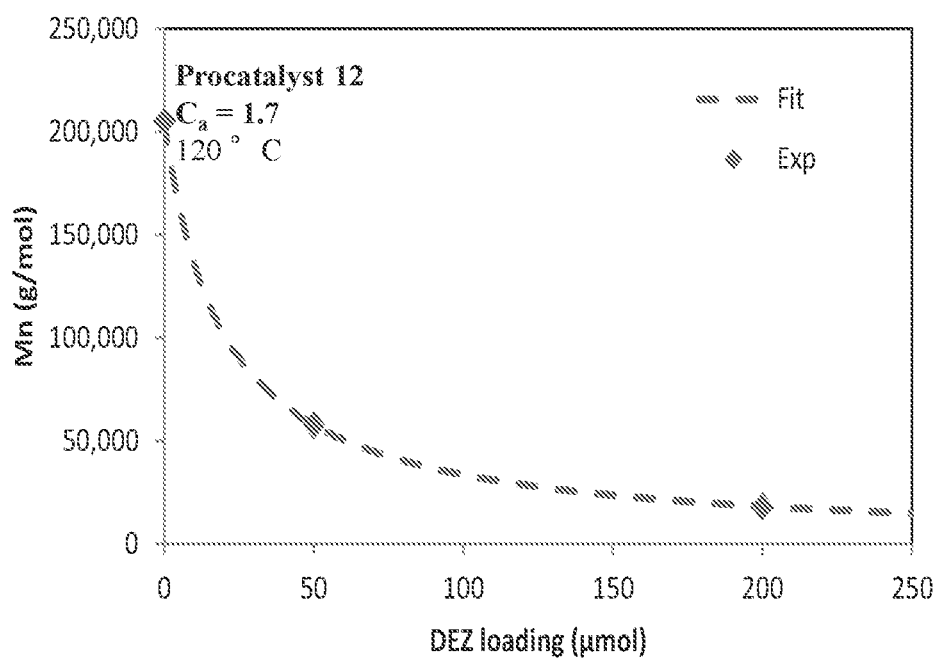
FIG. 9 is a graph of the change of molecular weight of a polymer as a function of the amount of chain shuttling agents for procatalyst 12.

To determine the chain transfer rate for procatalysts 1-7 and 9-52, a semi-batch campaign was conducted using varying amounts of the chain transfer agent, Et$_2$Zn (0, 50, and 200 μmoles). All reactions employed 1.2 equivalents of [HNMe(C$_{18}$H$_{37}$)$_2$][B(C$_6$F$_5$)$_4$] as the activator at 120 or 150° C., and procatalysts 7, 8, 11, and 12 were premixed in a 0.005 M solution with excess MMAO-3A (10.0 eq) for 10 mins prior to subjection to the polymerization experiment. The batch campaign was conducted at 120° C. and 150° C. with 11.1 or 12.1 g of ethylene under a pressure of 76-136 psi, 56 g or 57 g of 1-octene, and 528 g or 555 g of IsoparE. The catalyst efficiency as well as the $M_w$, PDI and comonomer incorporation of the corresponding produced polymers is presented in Table 2. The $M_n$ for each run was calculated using Equation 3 with the values of Ca and $M_{n0}$ fit using the Microsoft Excel Solver to minimize the squared deviations between the fitted and experimental molecular weight data for all the runs with a particular catalyst. Plots of $M_n$ versus [CSA] for procatalysts 1-52 are shown in FIG. 5 including a line showing the expected dependence of $M_n$ on [CSA] from the best fit value for Ca, and the calculated Ca values are presented in Table 3.

EXAMPLES

Figure 2:
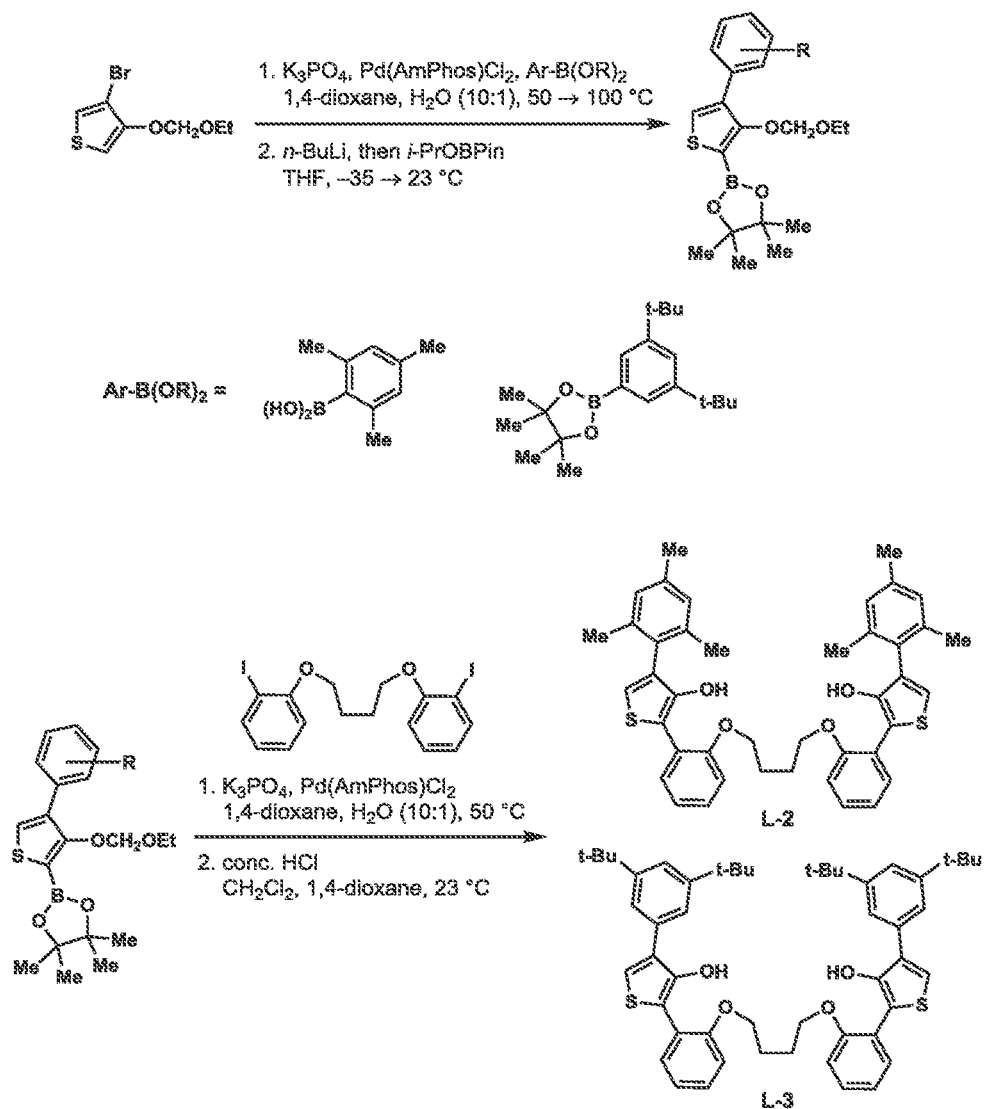
FIG. 2 depicts a two step synthetic scheme to synthesize ligands 2-3 (L-2 to L-3), in which the reagent in the first step is altered depending on the ligand.
Figure 3:
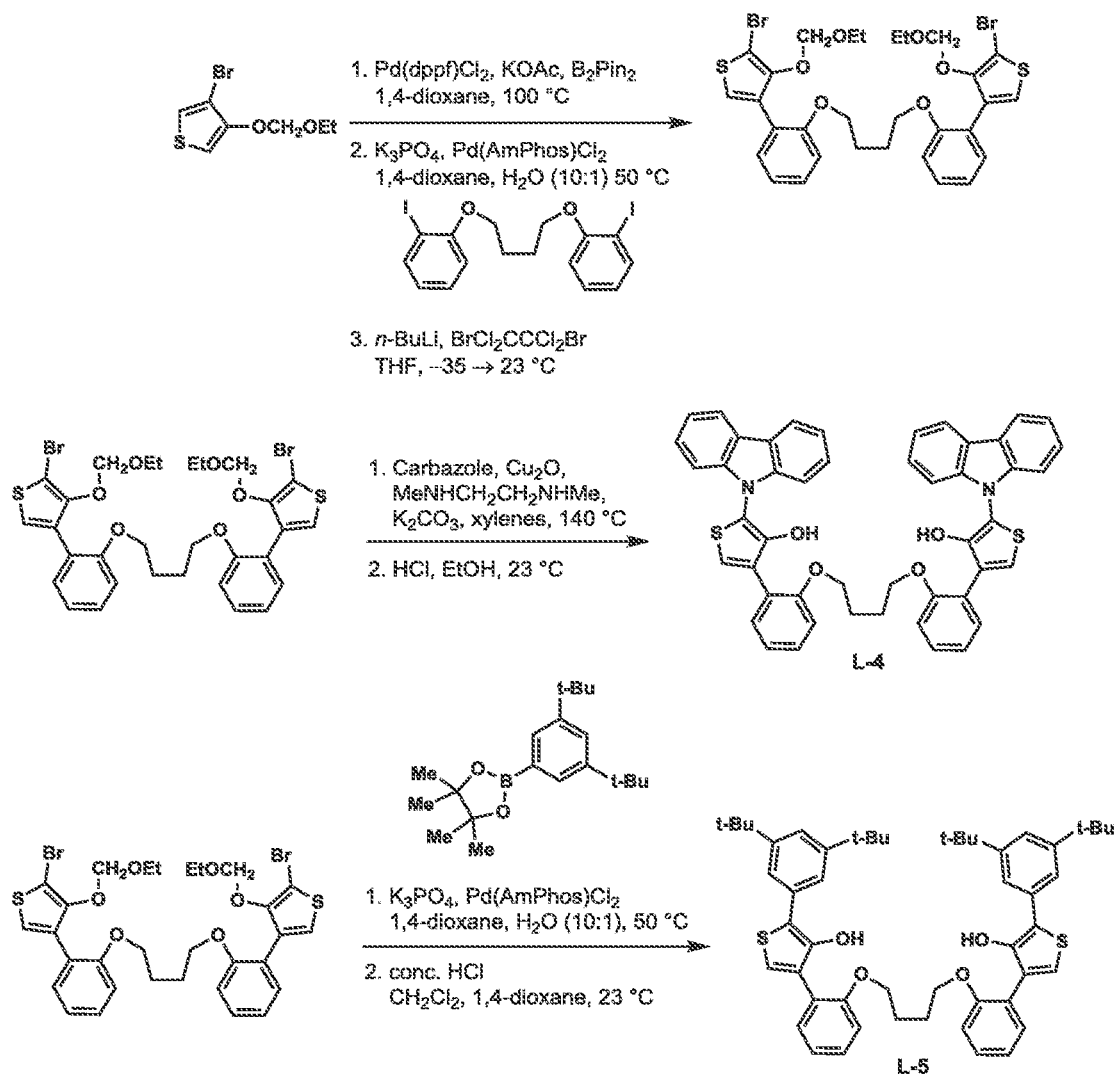
FIG. 3 depicts a three step synthetic scheme to synthesize ligand 5 (L-5).
Figure 4:
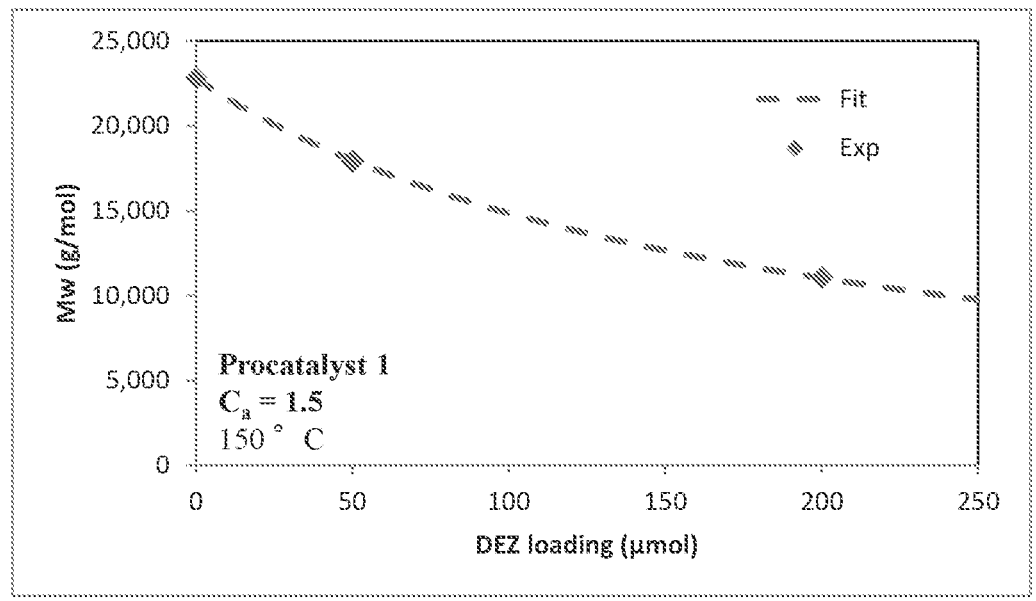
FIG. 4 is a graph of the change of molecular weight of a polymer as a function of the amount of chain shuttling agents for procatalyst 1.

Examples 1 to 111 are synthetic procedure for intermediates of the ligands, ligands, and the isolated procatalysts, and refer to FIGS. 1-3. One or more features of the present disclosure are illustrated in view of the examples as follows:

Example 1: Synthesis of Hydroxy-Thiophene Intermediate—Steps 1 & 2 in FIGS. 2-3

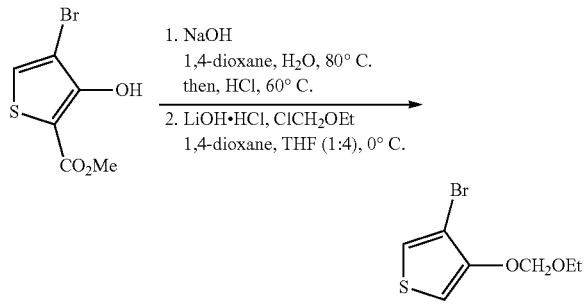

To a suspension of the hydroxythiophene (10.020 grams, 42.267 mmol, 1.00 eq) in 1,4-dioxane (100 mL) and $H_2O$ (450 mL) under nitrogen was added NaOH (50.000 g, 1.250 mol, 29.6 eq) all at once. The now pale yellow mixture was equipped with a reflux condenser and placed in a mantle heated to 80° C. After stirring (500 rpm) for 2.5 hrs TLC of the now golden yellow solution indicated complete conversion of the starting thiophene to a lower $R_f$ spot. The mixture was removed the mantle, allowed to gradually cool to 23° C., placed in an ice water bath for 60 mins, and concentrated HCl (125 mL, 37%) was added over 10 mins. The now white heterogeneous mixture was removed from the ice water bath, placed in a mantle heated to 60° C., stirred vigorously (1000 rpm) for 5 hrs, the now pale golden yellow solution was removed from the mantle, allowed to cool gradually to 23° C., diluted with $Et_2O$ (100 mL), stirred vigorously for 2 mins, poured into a separatory funnel, partitioned, organics were washed with aqueous HCl (2×100 mL, 1 N), residual organics were extracted from the aqueous layer using $Et_2O$ (2×50 mL), dried over solid $Na_2SO_4$, decanted, and the $Et_2O$ was removed via rotary evaporation to afford the crude bromo-hydroxythiophene as a solution in 1,4-dioxane (100 mL). An aliquot was removed, fully concentrated in vacuo, and NMR indicated pure product which exists as a mixture of tautomers. The material is used in the subsequent experiment without concentration or purification.

The clear pale yellow solution of the hydroxythiophene in 1,4-dioxane (100 mL, from above) was diluted with non-anhydrous, non-deoxygenated THF (400 mL), $H_2O$ (6 mL) was added, the solution was placed in an ice water bath, sparged with nitrogen for 1 hr, placed under a positive flow of nitrogen upon which solid lithium hydroxide-monohydrate (3.544 g, 84.453 mmol, 2.00 eq) was added. The mixture changed to a dark red-brown solution, stirred vigorously (1000 rpm) for 1 hr upon which neat chloromethylethyl ether (11.8 mL, 126.80 mmol, 3.00 eq) was added via syringe in a quick dropwise manner. After stirring for 2 hrs at 0° C. the dark brown solution was diluted aqueous NaOH (200 mL, 1 N), stirred for 2 mins, THF was removed in vacuo, the biphasic mixture was diluted with $CH_2Cl_2$ (100 mL), suction filtered over a pad of celite, rinsed with $CH_2Cl_2$ (4×50 mL), the dark brown filtrate mixture was poured into a separatory funnel, partitioned, organics were washed with aqueous NaOH (2×100 mL, 1 N), residual organics were extracted from the aqueous using $CH_2Cl_2$ (2×50 mL), combined, dried over solid $Na_2SO_4$, decanted, and carefully concentrated to afford a golden brown oil which was diluted with $CH_2Cl_2$ (25 mL), suction filtered over a pad of silica gel, rinsed with $CH_2Cl_2$ (4×50 mL), and the filtrate was concentrated to afford the thiophene-ether as a golden yellow oil (9.534 g, 40.209 mmol, 95% two steps). NMR indicated product.

Hydroxythiophene Product Exists as a Mixture of Keto-Enol Tautomers: (*)

Ketone Tautomer $^1$H NMR (400 MHz, Chloroform-d) δ (8.34 (s, 1H)*), 7.12 (d, J=3.7 Hz, 1H), 6.43 (d, J=3.7 Hz, 1H), 5.49 (s, 1H), (3.72 (s, 2H)*). $^{13}$C NMR (101 MHz, Chloroform-d) δ (210.23*), 195.46, 160.19, (149.69*), 121.43, (111.65*), (103.07*), 100.24, (37.05*).

Characterization of the Protected Hydroxythiophene:

$^1$H NMR (400 MHz, Chloroform-d) δ 7.15 (d, J=3.6 Hz, 1H), 6.61 (d, J=3.5 Hz, 1H), 5.19 (s, 2H), 3.73 (q, J=7.1 Hz, 2H), 1.22 (t, J=7.1 Hz, 3H). $^{13}$C NMR (101 MHz, Chloroform-d) δ 151.51, 121.50, 103.84, 101.55, 95.07, 64.53, 15.05.

Example 2: Synthesis of a Carbazoyl Thiopene—Step 4 in FIG. 2

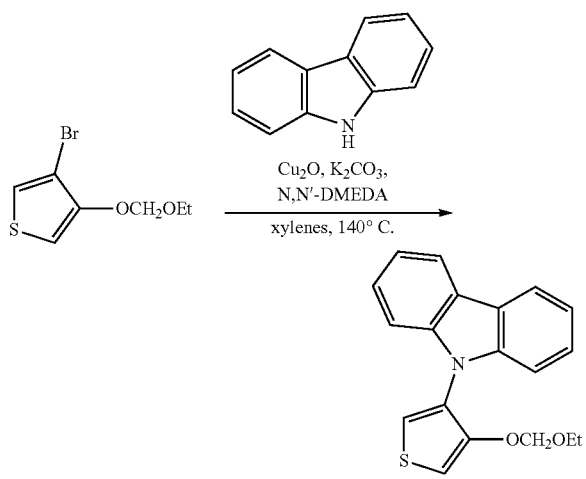

A mixture of the bromothiophene (1.034 g, 4.361 mmol, 1.00 eq), carbazole (1.604 g, 9.594 mmol, 2.20 eq), $Cu_2O$ (1.248 g, 8.722 mmol, 2.00 eq), and $K_2CO_3$ (6.027 g, 43.610 mmol, 10.00 eq) was evacuated, back-filled with $N_2$, this process was repeated 4× more, deoxygenated anhydrous xylenes (22 mL) was added via syringe followed by N,N'-DMEDA (1.90 mL, 17.440 mmol, 4.00 eq) via syringe, the mixture placed in a mantle heated to 140° C., stirred (500 rpm) for 72 hrs, removed from the mantle, the now deep red-black mixture was allowed to cool gradually to 23° C., silica gel was added, the mixture was suction filtered over a pad of silica gel, washed with $CH_2Cl_2$ (4×30 mL), and the golden brown filtrate was concentrated onto celite, and purified several times via silica gel chromatography using an ISCO chromatography purification system; 15% $CH_2Cl_2$ in hexanes to afford the thiophene-carbazole product as a white crystalline solid (1.006 g, 3.110 mmol, 71%). Mixed fractions were collected and re-purified using the same method.

$^1$H NMR (500 MHz, Chloroform-d) δ 8.12 (dt, J=7.7, 1.0 Hz, 2H), 7.43-7.38 (m, 3H), 7.31-7.26 (m, 4H), 6.90 (d, J=3.6 Hz, 1H), 5.04 (s, 2H), 3.53 (q, J=7.1 Hz, 2H), 1.14 (t, J=7.0 Hz, 3H). $^{13}$C NMR (126 MHz, Chloroform-d) δ 150.82, 141.23, 127.05, 125.77, 123.17, 120.78, 120.14, 119.80, 110.17, 102.44, 94.75, 64.42, 14.99.

Example 3: Synthesis of the Thiophene Boropinacolate Ester—Step 5 FIG. 2

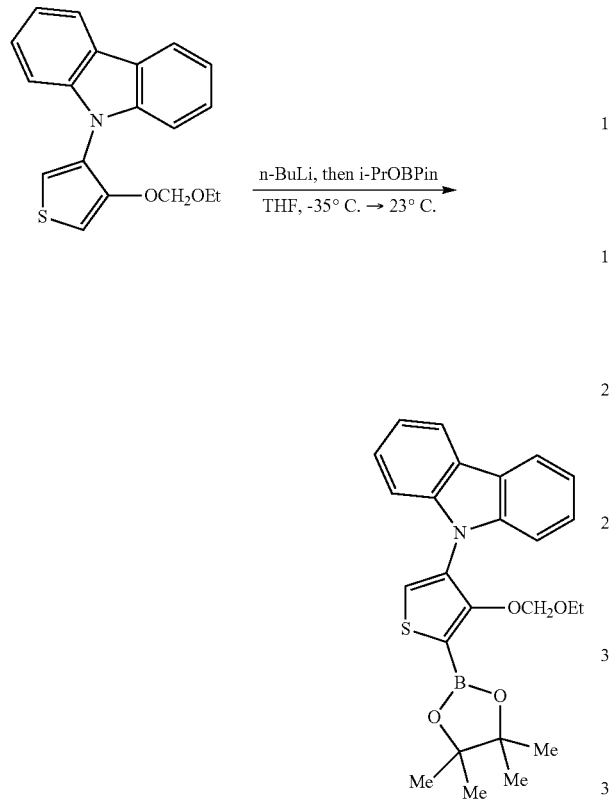

A clear pale yellow solution of the thiophene (0.410 g, 1.268 mmol, 1.00 eq) in anhydrous deoxygenated THF (30 mL) in a nitrogen filled glovebox was placed in the freezer cooled to −35° C. for 12 hrs upon which pre-cooled n-BuLi (0.73 mL, 1.902 mmol, 1.50 eq, titrated 2.61 M in hexanes) was added in a quick dropwise manner. After 3 hrs in the freezer isopropoxy-boronpinacolate (0.52 mL, 2.536 mmol, 2.00 eq) was added neat via syringe in a quick dropwise manner. The pale yellow solution changed to a slightly pale yellow mixture which was removed from the freezer, and after stirring for 2 hrs at 23° C. the white heterogeneous mixture was removed from the glovebox, neutralized with an aqueous phosphate buffer (50 mL, pH=8, 0.05 M), concentrated to remove THF, diluted with $CH_2Cl_2$ (20 mL), poured into a separatory funnel, partitioned, organics were washed with an aqueous phosphate (2×50 mL, pH=8, 0.05 M), residual organics were extracted from the aqueous using $CH_2Cl_2$ (2×20 mL), combined, dried over solid $Na_2SO_4$, decanted, and concentrated. The crude yellow mixture was dissolved in $CH_2Cl_2$ (10 mL), suction filtered through a pad of silica gel, rinsed with $CH_2Cl_2$ (4×20 mL), and concentrated to afford the thiophene boro-pinacolate as an amorphous white foam (0.560 g, 1.246 mmol, 98%). NMR indicated product which contains trace impurities including the undesired isomer and starting i-PrO-BPin. The slightly impure product was used in the subsequent reaction without further purification.

$^1$H NMR (400 MHz, Chloroform-d) δ 8.08 (dt, J=7.8, 1.0 Hz, 2H), 7.65 (s, 1H), 7.38 (ddd, J=8.2, 7.0, 1.2 Hz, 2H), 7.31 (dt, J=8.2, 1.0 Hz, 2H), 7.28-7.22 (m, 2H), 4.88 (s, 2H), 2.80 (q, J=7.1 Hz, 2H), 1.36 (s, 12H), 0.48 (t, J=7.1 Hz, 3H). $^{13}$C NMR (126 MHz, Chloroform-d) δ 159.02, 141.07, 130.52, 127.88, 125.96, 123.07, 119.99, 119.91, 110.45, 98.40, 84.27, 64.43, 24.81, 14.07.

Example 4: Synthesis of Ligand 1—Step 6 in FIG. 2

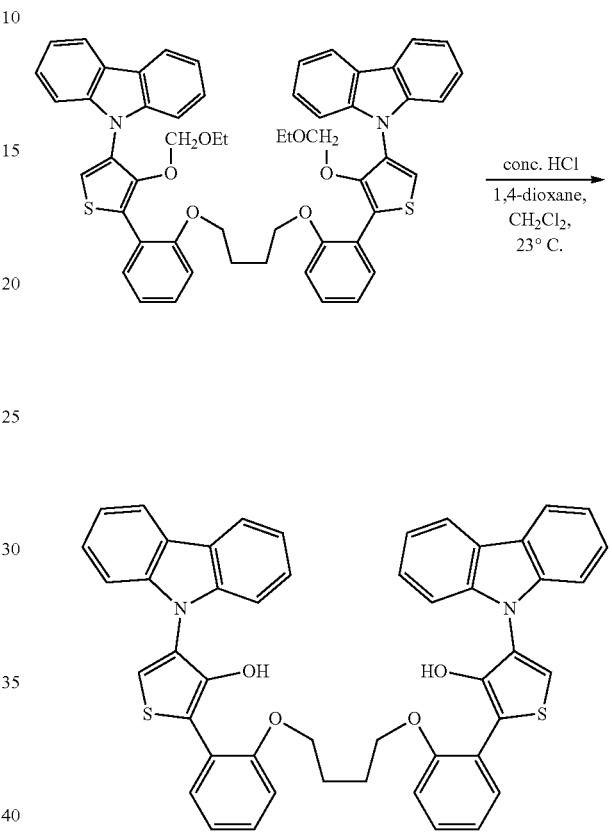

To a solution of the bis-protected thiophene (55.0 mg, 0.0642 mmol, 1.00 eq) in 1,4-dioxane/$CH_2Cl_2$ (6 mL, 1:2) under nitrogen was added concentrated HCl (4 mL). The golden brown biphasic solution was stirred vigorously (1000 rpm) for 24 hrs, diluted with aqueous HCl (10 mL, 1 N), diluted with $CH_2Cl_2$ (10 mL), poured into a separatory funnel, partitioned, organics were washed with aqueous HCl (2×10 mL, 1 N), residual organics were extracted from the aqueous layer using $CH_2Cl_2$ (2×10 mL), combined, dried over solid $Na_2SO_4$, decanted, concentrated, residual dioxane was azeotropically removed using PhMe (4×5 mL), the resultant dark brown amorphous foam was dissolved in $CH_2Cl_2$ (5 mL), suction filtered over a pad of silica gel, rinsed with $CH_2Cl_2$ (4×20 mL), and the resultant golden yellow filtrate solution was concentrated to afford the diol as an amorphous golden brown foam (44.5 mg, 0.0601 mmol, 94%). NMR indicated pure product.

$^1$H NMR (500 MHz, Chloroform-d) δ 8.12 (d, J=7.8 Hz, 4H), 7.61 (dd, J=7.6, 1.7 Hz, 2H), 7.40-7.12 (m, 16H), 6.99 (s, 2H), 6.87 (d, J=8.3 Hz, 2H), 4.02 (d, J=5.1 Hz, 4H), 1.87 (q, J=2.9 Hz, 4H). $^{13}$C NMR (126 MHz, Chloroform-d) δ 153.65, 146.41, 141.19, 130.45, 129.02, 128.82, 128.22, 127.08, 125.77, 125.51, 123.22, 123.03, 120.73, 120.20, 119.85, 114.10, 110.19, 69.86, 30.32. HRMS (ESI): calc'd [M+Na]$^+$ as 791.2008; found 791.2012.

Example 5: Synthesis of Procatalyst 1

Example 6: Synthesis of Procatalyst 2

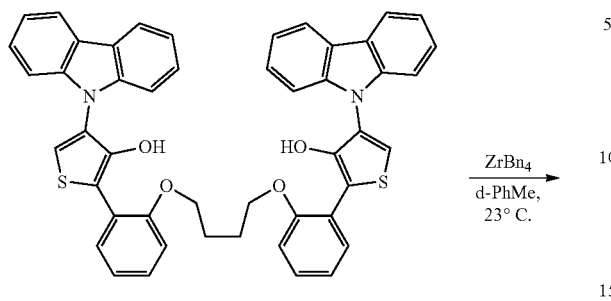

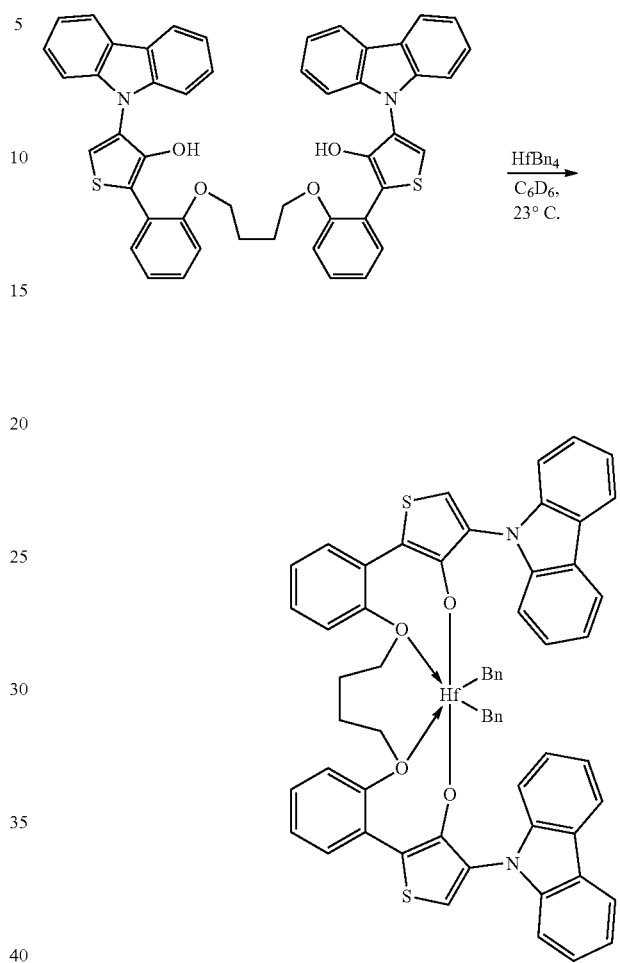

The thiophene ligand was azeotropically dried using PhMe (4×10 mL) prior to use. To a suspension of the thiophene, L-1, (6.5 mg, 0.00850 mmol, 1.00 eq) in d-PhMe (1.50 mL) in a nitrogen filled glovebox at 23° C. was added a solution of ZrBn$_4$ (3.9 mg, 0.00850 mmol, 1.00 eq) in d-PhMe (0.16 mL) in a dropwise manner. After stirring (500 rpm) for 1 hr the golden yellow solution was filtered using a 0.20 μm PTFE submicron filter to afford the zirconium complex as a 0.005 M solution in d-PhMe. NMR indicated product.

$^1$H NMR (400 MHz, Toluene-d$_8$) δ 8.17-8.10 (m, 2H), 7.83 (dt, J=7.7, 1.0 Hz, 2H), 7.34-7.20 (m, 12H), 7.14-6.95 (m, 2H), 6.93 (ddd, J=9.2, 7.5, 1.8 Hz, 4H), 6.81 (s, 2H), 6.80-6.68 (m, 6H), 6.06-5.99 (m, 4H), 4.93 (dd, J=8.2, 1.3 Hz, 2H), 3.92 (t, J=10.7 Hz, 2H), 3.24 (dd, J=12.0, 4.7 Hz, 2H), 0.91 (d, J=12.3 Hz, 2H), 0.81 (t, J=9.4 Hz, 2H), 0.64 (t, J=11.4 Hz, 2H), 0.43 (d, J=12.3 Hz, 2H). $^{13}$C NMR (101 MHz, Toluene-d$_8$) δ 155.86, 152.25, 146.57, 140.83, 140.75, 130.80, 128.87, 126.96, 126.42, 125.81, 124.54, 123.40, 122.35, 120.69, 120.38, 120.31, 119.79, 119.63, 117.78, 117.02, 112.53, 109.07, 80.70, 74.68, 25.86.

To a suspension of the ligand, L-1, (8.1 mg, 10.53 μmol, 1.00 eq) in anhydrous C$_6$D$_6$ (1.0 mL) in a nitrogen filled glovebox at 23° C. was added a solution of HfBn$_4$ (5.7 mg, 10.53 μmmol, 1.00 eq) in C$_6$D$_6$ (0.30 mL) in a slow dropwise manner. Upon completion of the addition the initial mixture transitioned to a clear pale yellow solution. After stirring (500 rpm) at 23° C. for 20 mins NMR indicated complete consumption of the starting ligand. The pale yellow solution was filtered through a 0.20 μm PTFE filter, rinsed with anhydrous deoxygenated PhMe (3×3 mL), and the filtrate was concentrated to afford the hafnium complex as an off-white powder (11.1 mg, 9.840 μmol, 93%). NMR indicated pure product.

$^1$H NMR (400 MHz, Benzene-d$_6$) δ 8.16-8.07 (m, 2H), 7.82 (dt, J=7.7, 1.0 Hz, 2H), 7.33-7.27 (m, 2H), 7.27-7.20 (m, 6H), 7.20-7.15 (m, 4H), 7.02 (ddd, J=7.9, 7.1, 1.0 Hz, 2H), 7.00-6.93 (m, 4H), 6.74 (s, 2H), 6.73-6.65 (m, 6H), 6.13-6.06 (m, 4H), 4.95-4.89 (m, 2H), 3.93-3.84 (m, 2H), 3.20 (dd, J=11.9, 4.7 Hz, 2H), 0.84 (d, J=13.3 Hz, 2H), 0.71-0.62 (m, 2H), 0.39 (d, J=12.0 Hz, 2H), 0.19 (d, J=13.3 Hz, 2H). $^{13}$C NMR (101 MHz, Benzene-d$_6$) δ 155.54, 152.27, 147.45, 140.79, 140.66, 130.77, 129.59, 128.03, 127.13, 127.07, 126.67, 126.10, 124.95, 124.53, 123.67, 122.27, 120.79, 120.46, 120.35, 119.80, 119.70, 117.92, 116.45, 112.57, 109.14, 81.71, 78.29, 25.98.

Example 7: Synthesis of Procatalyst 7

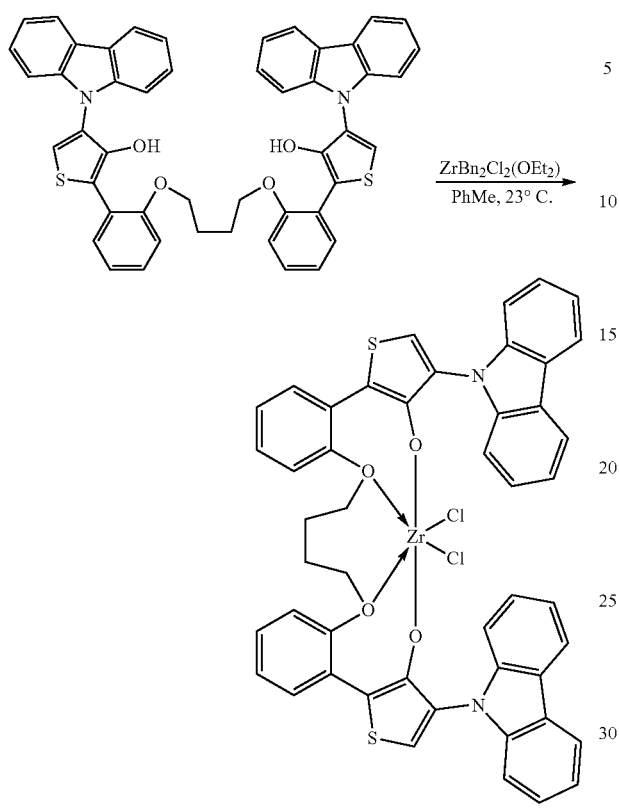

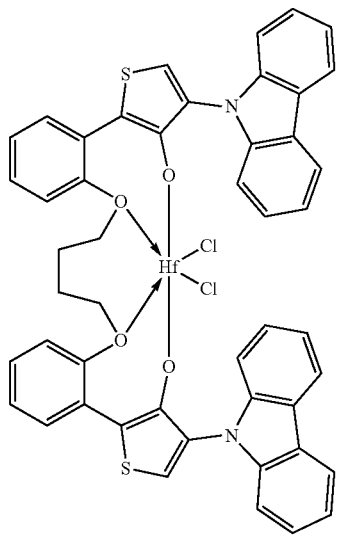

The thiophene ligand was azeotropically dried using PhMe (4×10 mL) prior to use. To a suspension of the thiophene (13.0 mg, 0.0169 mmol, 1.00 eq) in anhydrous deoxygenated PhMe (3.0 mL) in a nitrogen filled glovebox at 23° C. was added a solution of ZrBn₂Cl₂(OEt₂) (7.8 mg, 0.0186 mmol, 1.10 eq) in PhMe (0.34 mL) in a dropwise manner. After stirring (500 rpm) for 45 mins the now golden yellow solution was filtered using a 0.20 μm PTFE submicron filter to afford the zirconium complex as a 0.005 M solution in PhMe which was used directly in the polymerization experiments. The complex solution can be concentrated to afford the solid dichloride complex (15.0 mg, 0.0167 mmol, 99%) free of Et₂O.

¹H NMR (500 MHz, Benzene-d₆) δ 8.18-8.11 (m, 2H), 8.04 (dt, J=7.7, 1.0 Hz, 2H), 7.28-7.13 (m, 8H), 7.11-7.07 (m, 4H), 7.03-6.87 (m, 4H), 6.74 (s, 2H), 6.70-6.62 (m, 4H), 5.31-5.24 (m, 2H), 4.04 (s, 2H), 3.11-3.01 (m, 2H), 0.72-0.64 (m, 2H), 0.48 (d, J=11.9 Hz, 2H).

The thiophene ligand, L-1, was azeotropically dried using PhMe (4×10 mL) prior to use. To a white suspension of the thiophene (8.9 mg, 0.01157 mmol, 1.00 eq) in anhydrous C₆D₆ (2.07 mL) in a nitrogen filled glovebox at 23° C. was added a solution of HfBn₂Cl₂ (OEt₂) (5.9 mg, 0.01157 mmol, 1.00 eq) in C₆D₆ (0.24 mL) in a dropwise manner. After stirring (500 rpm) for 1 hr the pale golden yellow solution was filtered using a 0.20 μm PTFE submicron filter to afford the hafnium complex as a 0.005 M solution in C₆D₆. NMR indicated product which contains Et₂O (1.00 eq). The same procedure can be used with PhMe to prepare the procatalyst solution, which is used directly after filtration for the polymerization experiments.

¹H NMR (500 MHz, Benzene-d₆) δ 8.15-8.13 (m, 2H), 8.04 (ddd, J=7.7, 1.3, 0.8 Hz, 2H), 7.27-7.23 (m, 3H), 7.23-7.19 (m, 5H), 7.19-7.14 (m, 4H), 6.77 (s, 2H), 6.68-6.62 (m, 4H), 5.27 (dd, J=7.6, 2.0 Hz, 2H), 4.14 (t, J=10.8 Hz, 2H), 3.17-3.09 (m, 2H), 0.69 (t, J=9.7 Hz, 2H), 0.44 (d, J=12.1 Hz, 2H). ¹³C NMR (126 MHz, Benzene-d₆) δ 152.08, 140.91, 140.71, 129.90, 129.52, 128.27, 126.74, 126.11, 124.82, 124.65, 124.21, 124.18, 122.11, 120.76, 120.23, 119.88, 119.38, 118.29, 117.09, 112.64, 112.54, 108.96, 84.28, 31.95.

Example 8: Synthesis of Procatalyst 8

Example 9: Synthesis of Precursor to Ligand 2

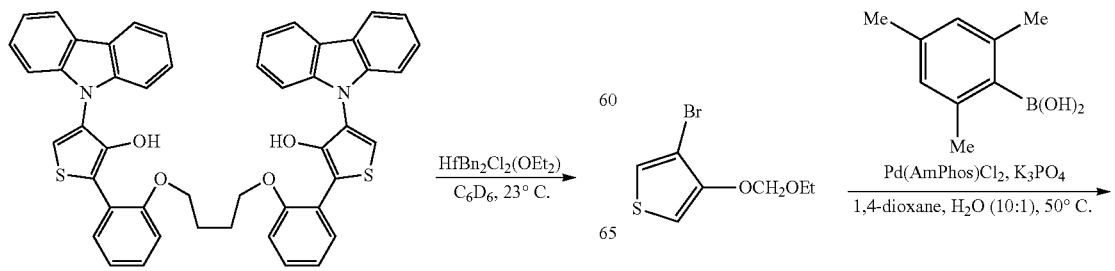

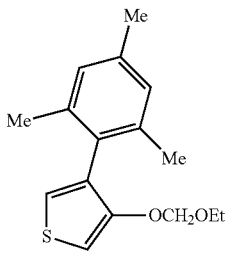

A mixture of Pd(AmPhos)₂Cl₂ (60.0 mg, 0.0844 mmol, 0.10 eq), thiophene bromide (200.0 mg, 0.8436 mmol, 1.00 eq), the boronic acid (208.0 mg, 1.265 mmol, 1.50 eq), and K₃PO₄ (804.0 mg, 3.796 mmol, 4.50 eq) in a vial equipped with a stirbar was evacuated, then back-filled with nitrogen, this evacuation/back-fill process was conducted 4× more, then freshly deoxygenated 1,4-dioxane (10.0 mL) and freshly deoxygenated water (1.0 mL) were added sequentially, the vial was capped under a positive flow of N₂, placed in a mantle heated to 50° C., the magenta solution was stirred (500 rpm) for 24 hrs, removed from the mantle, the now dark purple solution was allowed to cool to 23° C., diluted with CH₂Cl₂ (10 mL), suction filtered over a pad of silica gel, rinsed with CH₂Cl₂ (4×20 mL), and the resultant filtrate was concentrated, residual 1,4-dioxane was azeotropically removed using PhMe (4×5 mL), the resultant dark purple foam was dissolved in CH₂Cl₂ (10 mL), concentrated onto celite, and purified via silica gel chromatography; 5%-25% CH₂Cl₂ in hexanes to afford the mesityl-thiophene as a clear colorless oil (155.0 mg, 0.5608 mmol, 66%). NMR indicated pure product.

¹H NMR (500 MHz, Chloroform-d) δ 6.95 (s, 2H), 6.91 (d, J=3.4 Hz, 1H), 6.74 (d, J=3.4 Hz, 1H), 5.11 (s, 2H), 3.63 (q, J=7.1 Hz, 2H), 2.33 (s, 3H), 2.09 (s, 6H), 1.21 (t, J=7.1 Hz, 3H). ¹³C NMR (126 MHz, Chloroform-d) δ 153.05, 137.51, 137.14, 132.90, 131.48, 127.93, 121.39, 101.08, 94.52, 64.03, 21.14, 20.40, 20.39, 15.13.

Example 10: Synthesis of Precursor to Ligand 2

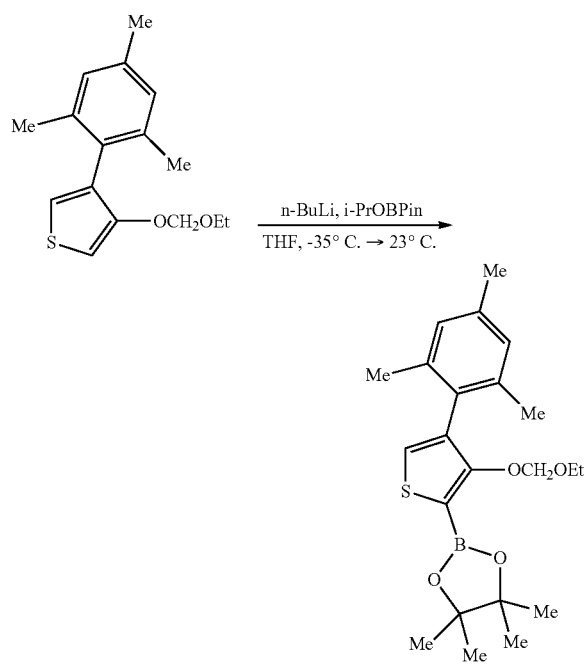

A clear pale yellow solution of the thiophene (0.410 g, 1.268 mmol, 1.00 eq) in anhydrous deoxygenated THF (30 mL) in a nitrogen filled glovebox was placed in the freezer cooled to −35° C. for 12 hrs upon which pre-cooled n-BuLi (0.73 mL, 1.902 mmol, 1.50 eq, titrated 2.61 M in hexanes) was added in a quick dropwise manner. After 3 hrs in the freezer isopropoxy-boronpinacolate (0.52 mL, 2.536 mmol, 2.00 eq) was added neat via syringe in a quick dropwise manner. The pale yellow solution changed to a slightly pale yellow mixture which was removed from the freezer, and after stirring for 2 hrs at 23° C. the white heterogeneous mixture was removed from the glovebox, neutralized with an aqueous phosphate buffer (50 mL, pH=8, 0.05 M), concentrated to remove THF, diluted with CH₂Cl₂ (20 mL), poured into a separatory funnel, partitioned, organics were washed with an aqueous phosphate (2×50 mL, pH=8, 0.05 M), residual organics were extracted from the aqueous using CH₂Cl₂ (2×20 mL), combined, dried over solid Na₂SO₄, decanted, and concentrated. The crude yellow mixture was dissolved in CH₂Cl₂ (10 mL), suction filtered through a pad of silica gel, rinsed with CH₂C₁₂ (4×20 mL), and concentrated to afford the thiophene boro-pinacolate as an amorphous white foam (0.560 g, 1.246 mmol, 98%). NMR indicated product which contains trace impurities including the undesired isomer and starting i-PrO-BPin. The slightly impure product was used in the subsequent reaction without further purification.

¹H NMR (500 MHz, Chloroform-d) δ 7.21 (s, 1H), 6.92-6.89 (m, 2H), 4.98 (s, 2H), 3.22 (q, J=7.1 Hz, 2H), 2.31 (s, 3H), 2.09 (s, 6H), 1.36 (s, 12H), 0.96 (t, J=7.1 Hz, 3H). ¹³C NMR (126 MHz, Chloroform-d) δ 161.36, 137.50, 136.96, 136.42, 131.63, 129.13, 127.82, 98.05, 83.84, 64.26, 24.80, 21.04, 20.59, 14.76.

Example 11: Synthesis of Ligand 2

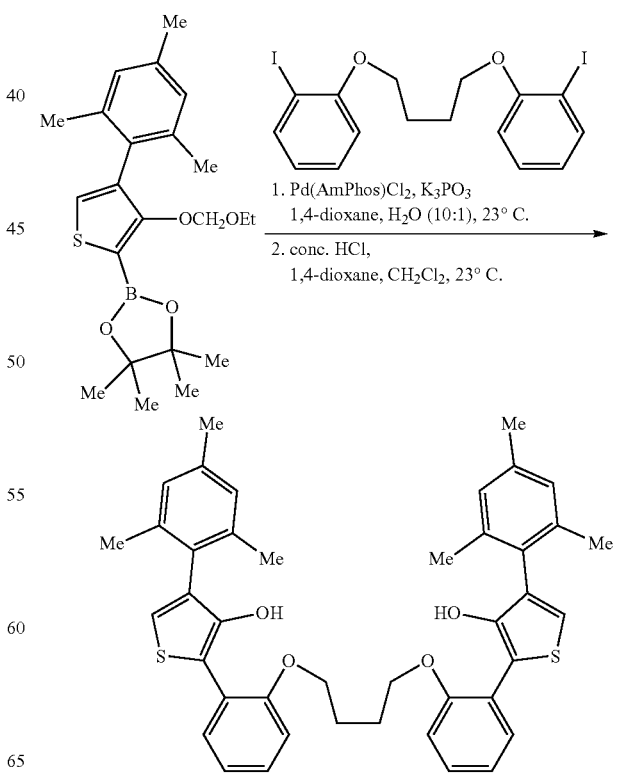

To vial equipped with a stirbar was added the mesityl boropinacolate (0.293 g, 0.7281 mmol, 2.50 eq), K$_3$PO$_4$ (0.464 g, 2.184 mmol, 7.50 eq), Pd(AmPhos)Cl$_2$ (41.0 mg, 0.0583 mmol, 0.20 eq), and the bisphenyliodide (0.144 g, 0.2913 mmol, 1.00 eq). The mixture was evacuated, then back-filled with nitrogen, this process was repeated 3× more, then deoxygenated 1,4-dioxane (14 mL) and water (1.4 mL) was added sequentially via syringe. The vial was sealed with a PTFE cap under a purging flow of nitrogen, and then placed in a mantle heated to 50° C. After stirring (1000 rpm) for 36 hrs the purple-black mixture was removed from the mantle, allowed to cool gradually to 23° C., suction filtered over a pad of silica gel, washed with CH$_2$Cl$_2$ (4×20 mL), the clear purple filtrate was concentrated onto celite, and purified via silica gel chromatography using the ISCO; 10%-100% CH$_2$Cl$_2$ in hexanes to afford the impure product which was purified a second time via silica gel chromatography using the ISCO; 25%-80% CH$_2$Cl$_2$ in hexanes to afford the protected coupled mesitylthiophene as a light brown foam (0.218 g, 0.2756 mmol, 95%). NMR indicated product which contained minor impurities, and the mixture was used in the subsequent reaction without further purification.

To a solution of the impure protected bisthiophene in CH$_2$Cl$_2$ (5 mL) and 1,4-dioxane (5 mL) was added conc. HCl (5 mL). The dark golden brown solution was vigorously stirred (1000 rpm) at 23° C. for 24 hrs under nitrogen, then diluted with aqueous HCl (25 mL, 1 N) and CH$_2$Cl$_2$ (20 mL), the biphasic mixture was poured into a separatory funnel, partitioned, organics were washed with aqueous HCl (2×20 mL, 1 N), the residual organics were extracted from the aqueous layer using CH$_2$Cl$_2$ (2×10 mL), combined, dried over solid Na$_2$SO$_4$, decanted, concentrated onto celite, and purified via silica gel chromatography using the ISCO; 25%-100% CH$_2$Cl$_2$ in hexanes to afford the bishydroxythiophene ligand as a white foam (0.150 g, 0.2223 mmol, 81%, 77% two steps). NMR indicated pure product.

$^1$H NMR (500 MHz, Chloroform-d) δ 7.57 (dd, J=7.7, 1.7 Hz, 2H), 7.25 (d, J=6.9 Hz, 2H), 7.23 (s, 2H), 7.13-7.08 (m, 2H), 6.97 (d, J=8.2 Hz, 2H), 6.93 (d, J=6.0 Hz, 4H), 6.93 (s, 2H), 4.10 (d, J=5.2 Hz, 4H), 2.31 (s, 6H), 2.10 (s, 12H), 1.91 (q, J=2.9 Hz, 4H). $^{13}$C NMR (126 MHz, Chloroform-d) δ 153.58, 148.41, 137.42, 137.26, 133.66, 131.68, 130.95, 128.12, 128.03, 123.79, 122.98, 121.46, 114.49, 114.34, 69.81, 25.66, 21.11, 20.37.

Characterization of the Protected Ligand:

$^1$H NMR (500 MHz, Chloroform-d) δ 7.78 (dd, J=7.6, 1.8 Hz, 2H), 7.28-7.23 (m, 2H), 6.99 (td, J=7.5, 1.1 Hz, 2H), 6.95 (dd, J=8.3, 1.1 Hz, 2H), 6.92 (d, J=6.7 Hz, 6H), 4.55 (s, 4H), 4.08 (q, J=2.9 Hz, 4H), 3.02 (q, J=7.0 Hz, 4H), 2.31 (s, 6H), 2.18 (s, 12H), 2.07-2.01 (m, 4H), 0.81 (t, J=7.1 Hz, 6H). $^{13}$C NMR (126 MHz, Chloroform-d) δ 155.90, 149.49, 137.43, 136.89, 134.68, 132.21, 131.23, 128.62, 127.90, 123.24, 122.22, 120.76, 120.40, 112.13, 96.64, 68.13, 64.31, 26.06, 21.05, 20.61, 14.64.

Example 12: Synthesis of Procatalyst 3

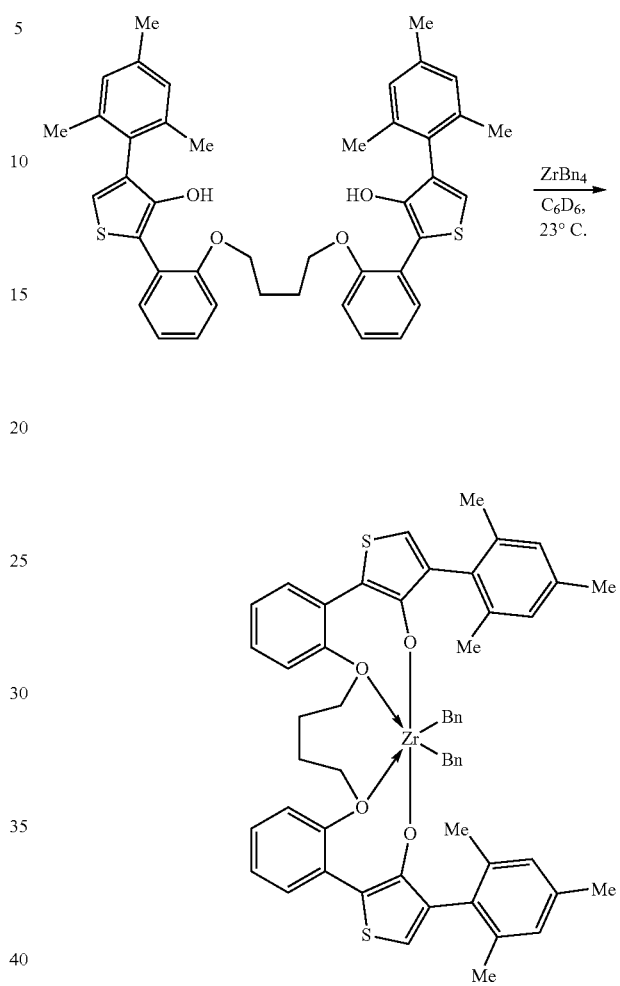

To a suspension of the ligand (9.9 mg, 0.0147 mmol, 1.00 eq) in anhydrous deoxygenated C$_6$D$_6$ (2.66 mL) in a nitrogen filled glovebox at 23° C. was added a solution of ZrBn$_4$ (6.7 mg, 0.0147 mmol, 1.00 eq) in C$_6$D$_6$ (0.27 mL) in a slow dropwise manner. Upon completion of the addition the initial mixture transitioned to a clear pale yellow solution. After stirring (500 rpm) at 23° C. for 20 mins NMR indicated complete consumption of the starting ligand. The golden yellow solution was filtered through a 0.20 µm PTFE filter to afford the zirconium complex as a 0.005 M golden yellow solution which can be used directly in the polymerization experiments. NMR indicated product. The same experiment can also be conducted using PhMe to afford a catalyst solution suitable to for use directly in polymerization experiments.

$^1$H NMR (500 MHz, Benzene-d$_6$) δ 7.44-7.41 (m, 2H), 6.99-6.95 (m, 2H), 6.94 (s, 2H), 6.92-6.80 (m, 10H), 6.65 (s, 2H), 6.40-6.37 (m, 2H), 6.28-6.24 (m, 4H), 4.18 (t, J=10.2 Hz, 2H), 3.51 (d, J=11.3 Hz, 2H), 2.26 (s, 6H), 2.18 (s, 6H), 2.16 (s, 6H), 1.99 (d, J=11.4 Hz, 2H), 1.59 (d, J=11.4 Hz, 2H), 0.92 (m, 2H), 0.81 (m, 2H). $^{13}$C NMR (126 MHz, Benzene-d$_6$) δ 155.63, 155.47, 146.30, 139.56, 136.81, 134.04, 132.07, 131.70, 129.00, 128.55, 128.31, 128.09, 126.69, 125.84, 122.92, 121.02, 120.70, 116.78, 79.36, 72.04, 25.68, 20.75, 20.63.

Example 13: Synthesis of Procatalyst 4

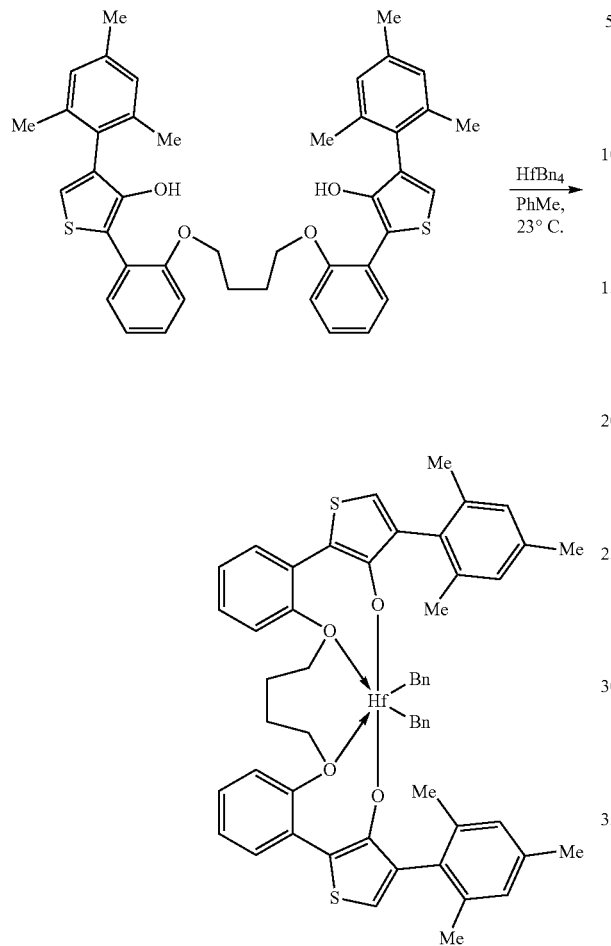

To a suspension of the ligand (11.6 mg, 0.0172 mmol, 1.00 eq) in anhydrous de-oxygenated PhMe (2.0 mL) in a nitrogen filled glovebox at 23° C. was added a solution of HfBn$_4$ (9.8 mg, 0.0181 mmol, 1.05 eq) in PhMe (0.39 mL) in a slow dropwise manner. Upon completion of the addition the initial mixture transitioned to a clear pale yellow solution. After stirring (500 rpm) at 23° C. for 20 mins NMR indicated complete consumption of the starting ligand. The pale yellow solution was filtered through a 0.45 μm PTFE filter, rinsed with anhydrous de-oxygenated PhMe (3×3 mL), and the filtrate was concentrated to afford the hafnium complex as an off-white powder (17.5 mg, 0.0169 mmol, 98%). NMR indicated product which contains residual PhMe and HfBn$_4$.

$^1$H NMR (500 MHz, Benzene-d$_6$) δ 7.47-7.43 (m, 2H), 6.97 (td, J=7.7, 1.7 Hz, 4H), 6.94 (s, 2H), 6.88-6.84 (m, 6H), 6.70 (ddt, J=8.7, 7.3, 1.4 Hz, 2H), 6.66 (s, 2H), 6.51-6.48 (m, 1H), 6.43 (d, J=8.0 Hz, 1H), 6.35 (dt, J=8.3, 1.6 Hz, 2H), 6.32-6.29 (m, 2H), 4.20 (t, J=10.7 Hz, 2H), 3.59-3.52 (m, 2H), 2.22 (s, 6H), 2.18 (s, 6H), 2.10 (s, 6H), 2.07 (d, J=12.9 Hz, 2H), 1.33 (d, J=12.9 Hz, 2H), 0.88 (d, J=9.9 Hz, 2H), 0.66 (d, J=13.1 Hz, 2H). $^{13}$C NMR (126 MHz, Benzene-d$_6$) δ 155.71, 155.28, 147.75, 139.93, 136.72, 135.11, 134.20, 131.70, 131.46, 129.87, 129.11, 128.61, 128.56, 128.50, 128.17, 127.30, 126.73, 126.32, 124.02, 121.08, 120.84, 116.20, 81.21, 78.13, 26.10, 21.04, 20.76, 20.33.

Example 14: Synthesis of Precursor to Ligand 3

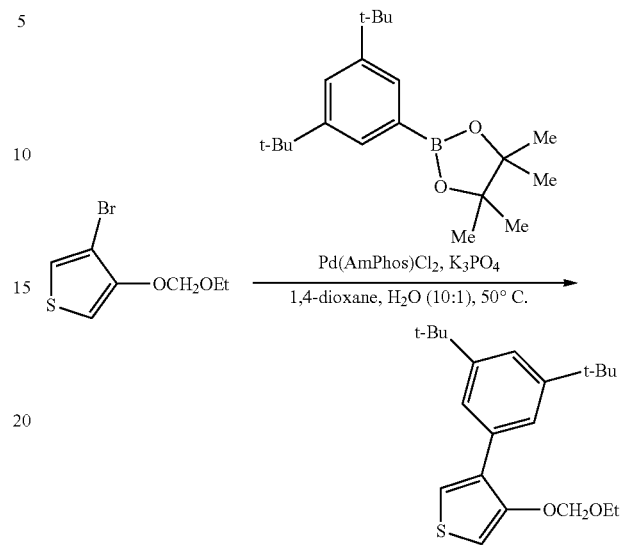

A solid mixture of the thiophene (200.0 mg, 0.8436 mmol, 1.00 eq produce of Example 1), boronic ester (400.0 mg, 1.265 mmol, 1.50 eq, product of Example 27, infra), K$_3$PO$_4$ (804.0 mg, 3.796 mmol, 4.50 eq), and Pd(AmPhos)Cl$_2$ (60.0 mg, 0.0844 mmol, 0.10 eq) in a vial equipped with a stirbar was evacuated, then back-filled with nitrogen, this process was repeated 4× more, upon which deoxygenated 1,4-dioxane (10.0 mL) and deoxygenated water (1.0 mL) were added sequentially via syringe. The vial was sealed with a PTFE cap under a purging flow of nitrogen and placed in a mantle heated to 50° C. After stirring vigorously (1000 rpm) for 24 hrs, the dark red-black mixture was removed from the mantle, allowed to cool gradually to 23° C., diluted with CH$_2$Cl$_2$ (20 mL), suction filtered over silica gel using CH$_2$Cl$_2$ as the eluent, the golden orange filtrate was concentrated onto celite, and purified via silica gel chromatography using an ISCO chromatography purification system; 10%-25% CH$_2$Cl$_2$ in hexanes to afford the 3,5-di-tert-butylphenyl thiophene as an off white foam (217.0 mg, 0.6262 mmol, 74%). NMR indicated pure product.

$^1$H NMR (500 MHz, Chloroform-d) δ 7.53 (d, J=2.0 Hz, 2H), 7.48 (d, J=1.9 Hz, 1H), 7.30 (d, J=3.5 Hz, 1H), 6.75 (d, J=3.4 Hz, 1H), 5.27 (s, 2H), 3.82 (q, J=7.1 Hz, 2H), 1.44 (s, 18H), 1.31 (t, J=7.1 Hz, 3H). $^{13}$C NMR (126 MHz, Chloroform-d) δ 152.66, 150.49, 135.02, 133.94, 122.58, 121.30, 121.10, 101.68, 94.88, 64.41, 34.95, 31.58, 15.16.

Example 15: Synthesis of Precursor to Ligand 3

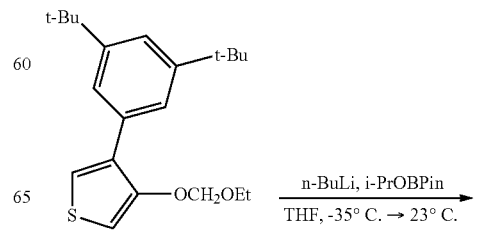

-continued

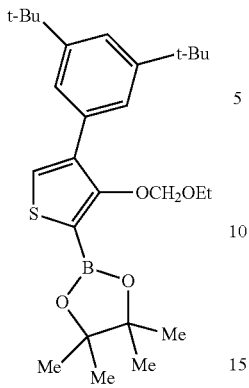

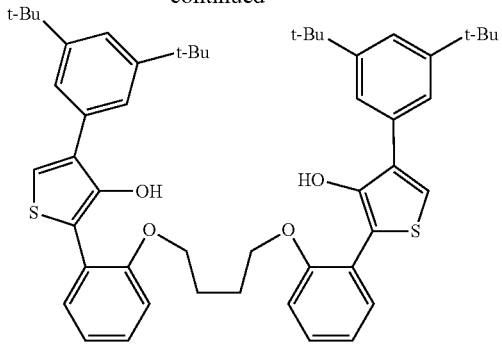

The thiophene was azeotropically dried using PhMe (4×10 mL) prior to use. A solution of the thiophene (188.0 mg, 0.6262 mmol, 1.00 eq) in de-oxygenated anhydrous THF (10 mL) in a nitrogen filled glovebox was placed in a freezer cooled to −35° C. for 12 hrs upon which a precooled solution of n-BuLi (0.38 mL, 0.9393 mmol, 1.50 eq, titrated 2.5 M in hexanes) was added via syringe in a dropwise manner. The now golden yellow-orange solution was allowed to sit in the freezer for 3 hrs upon which it was removed and while stirring (500 rpm) neat i-PrOBPin (0.22 mL, 1.065 mmol, 1.70 eq) was added in a quick dropwise manner. After stirring for 2 hrs at 23° C. the now pale yellow heterogeneous mixture was removed from the glovebox, neutralized with aqueous $NaHCO_3$ (20 mL), diluted with $CH_2Cl_2$ (20 mL) and brine (20 mL), poured into a separatory funnel, partitioned, organics were washed with a saturated aqueous mixture of $NaHCO_3$ and brine (2×30 mL, 1:1), residual organics were extracted from the aqueous layer using $CH_2Cl_2$ (2×10 mL), combined, dried over solid $Na_2SO_4$, decanted, concentrated, diluted with $CH_2Cl_2$, the golden yellow mixture was suction filtered over silica gel, washed with $CH_2Cl_2$ (4×25 mL), and concentrated to afford the thiophene boronic ester as an off-white solid (0.246 g, 0.5206 mmol, 83%). NMR indicated product.

$^1$H NMR (500 MHz, Chloroform-d) δ 7.53 (d, J=1.1 Hz, 1H), 7.45 (d, J=1.8 Hz, 2H), 7.40 (q, J=1.5 Hz, 1H), 5.11 (d, J=1.0 Hz, 2H), 3.39 (qd, J=7.1, 0.9 Hz, 2H), 1.38 (s, 12H), 1.37 (s, 18H), 0.83 (td, J=7.1, 1.0 Hz, 3H). $^{13}$C NMR (126 MHz, Chloroform-d) δ 161.11, 150.55, 138.93, 134.08, 128.93, 122.87, 122.51, 121.07, 99.17, 83.94, 64.75, 34.90, 31.51, 24.77, 14.61.

Example 16: Synthesis of Ligand 3

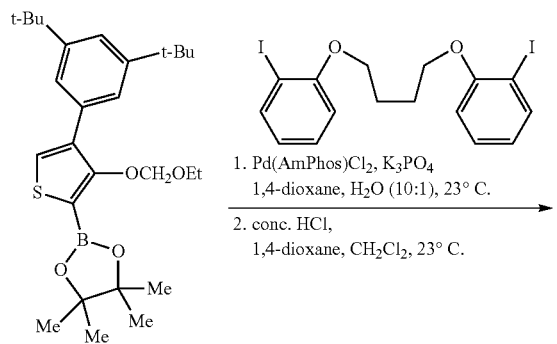

A mixture of Pd(AmPhos)Cl$_2$ (16.4 mg, 0.0231 mmol, 0.20 eq, product of Example 4), thiophene boropinacolate ester (140.0 mg, 0.3116 mmol, 2.70 eq, product of Example 5), the bisiodophenyl ether (54.0 mg, 0.1154 mmol, 1.00 eq), and K$_3$PO$_4$ (198.0 mg, 0.9347 mmol, 8.10 eq) in a vial equipped with a stirbar was evacuated, then back-filled with nitrogen, this evacuation/back-fill process was conducted 4× more, then freshly deoxygenated 1,4-dioxane (5.6 mL) and then freshly deoxygenated water (0.56 mL) were added sequentially, the vial was capped under a positive flow of N$_2$, placed in a mantle heated to 50° C., the magenta solution was stirred (500 rpm) for 12 hrs, removed from the mantle, the now dark purple solution was allowed to cool to 23° C., diluted with CH$_2$Cl$_2$ (10 mL), suction filtered over a pad of silica gel, rinsed with CH$_2$Cl$_2$ (4×20 mL), and the resultant filtrate was concentrated, residual 1,4-dioxane was azeotropically removed using PhMe (4×5 mL), the resultant dark purple foam was dissolved in CH$_2$Cl$_2$ (10 mL), concentrated onto celite, and purified via silica gel chromatography; 20%-100% CH$_2$Cl$_2$ in hexanes and then purified a 2$^{nd}$ time using hexanes—60% CH$_2$Cl$_2$ in hexanes to afford the bis-coupled thiophene as an off-white amorphous foam. The material was used in the subsequent deprotection without further purification. The two-step reaction provided the bishydroxythiophene ligand as a clear pale golden brown amorphous foam (72.0 mg, 0.0883 mmol, 43% two steps).

$^1$H NMR (500 MHz, Chloroform-d) δ 7.54 (tq, J=3.2, 1.7 Hz, 6H), 7.48 (d, J=2.2 Hz, 2H), 7.43 (p, J=1.8, 1.3 Hz, 2H), 7.30-7.16 (m, 4H), 7.10 (t, J=7.5 Hz, 2H), 6.94 (d, J=8.2 Hz, 2H), 4.16 (d, J=5.6 Hz, 4H), 2.02 (p, J=3.6, 3.1 Hz, 4H), 1.38 (s, 36H). $^{13}$C NMR (126 MHz, Chloroform-d) δ 153.67, 150.50, 148.24, 135.49, 134.35, 131.14, 129.04, 128.34, 125.53, 123.64, 122.92, 122.40, 121.29, 120.96, 115.32, 114.37, 69.97, 34.92, 31.53, 25.80.

Characterization of the Protected Ligand:

$^1$H NMR (500 MHz, Chloroform-d) δ 7.82 (dd, J=7.7, 1.8 Hz, 2H), 7.49 (dd, J=1.9, 0.6 Hz, 4H), 7.38 (t, J=1.8 Hz, 2H), 7.27-7.23 (m, 4H), 7.00 (td, J=7.5, 1.0 Hz, 2H), 6.94 (dd, J=8.3, 1.1 Hz, 2H), 4.66 (s, 4H), 4.12 (d, J=5.2 Hz, 4H), 3.16 (q, J=7.0 Hz, 4H), 2.15-2.09 (m, 4H), 1.37 (d, J=0.7 Hz, 36H), 0.76-0.69 (m, 6H). $^{13}$C NMR (126 MHz, Chloroform-d) δ 155.89, 150.55, 149.17, 136.79, 134.62, 131.46, 128.72, 124.29, 122.51, 122.04, 120.94, 120.45, 120.40, 112.10, 97.17, 68.07, 64.68, 34.90, 31.52, 26.04, 14.53.

Example 17: Synthesis of Procatalyst 5

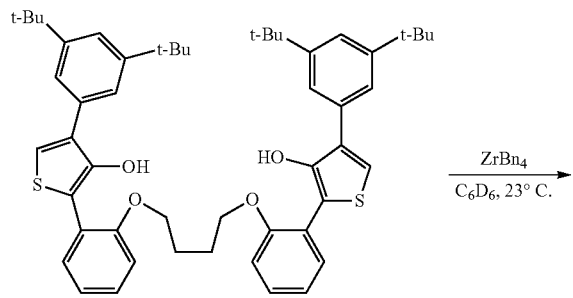

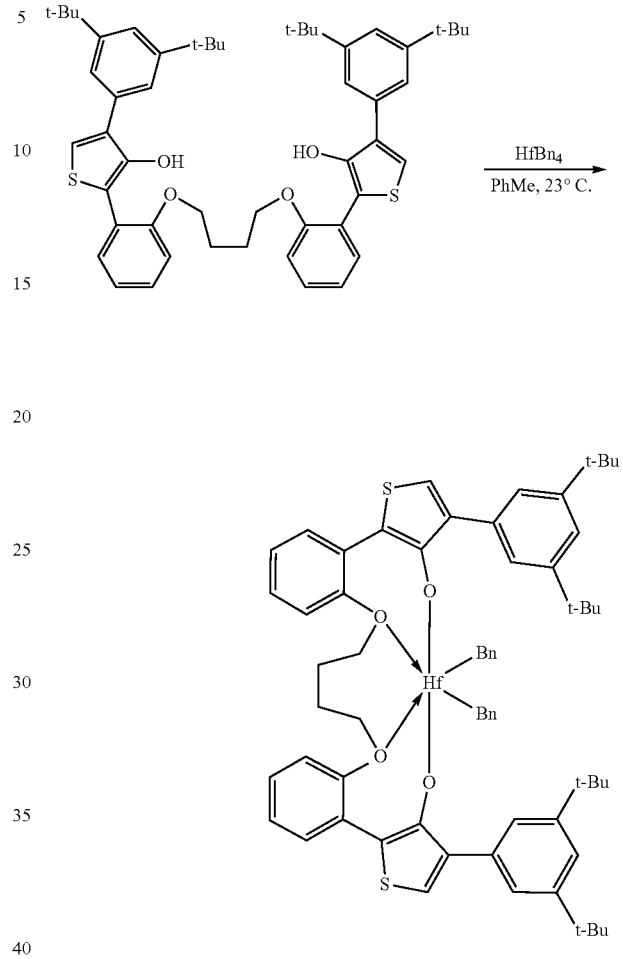

The thiophene ligand was azeotropically dried using PhMe (4×10 mL) prior to use. To a clear colorless solution of the thiophene (7.3 mg, 0.0090 mmol, 1.00 eq) in anhydrous deoxygenated $C_6D_6$ (1.63 mL) in a nitrogen filled glovebox at 23° C. was added a solution of $ZrBn_4$ (4.3 mg, 0.0090 mmol, 1.00 eq) in $C_6D_6$ (0.17 mL) in a dropwise manner. After stirring (500 rpm) for 1 hr an aliquot was removed from the pale golden yellow solution was then filtered using a 0.20 μm PTFE submicron filter, rinsed with PhMe (3×2 mL), and the clear pale golden yellow filtrate was concentrated to afford the zirconium complex as a pale golden yellow foam (9.5 mg, 0.00831 mmol, 92%). NMR indicated product.

$^1$H NMR (500 MHz, Benzene-$d_6$) δ 7.61 (t, J=1.8 Hz, 2H), 7.59 (d, J=1.8 Hz, 4H), 7.40-7.37 (m, 2H), 7.04-7.00 (m, 4H), 6.87 (s, 2H), 6.87-6.80 (m, 4H), 6.74 (tt, J=7.2, 1.2 Hz, 2H), 6.62-6.57 (m, 4H), 5.86-5.83 (m, 2H), 4.18 (dd, J=11.9, 9.9 Hz, 2H), 3.49 (dd, J=12.0, 4.9 Hz, 2H), 2.60 (d, J=12.0 Hz, 2H), 1.67 (d, J=12.0 Hz, 2H), 1.35 (s, 36H), 0.77 (t, J=9.4 Hz, 2H), 0.43 (d, J=11.7 Hz, 2H). $^{13}$C NMR (126 MHz, Benzene-$d_6$) δ 156.38, 155.01, 150.85, 147.58, 137.32, 135.57, 131.38, 129.14, 128.91, 128.47, 128.14, 126.09, 123.64, 123.22, 122.08, 121.03, 119.79, 116.54, 81.38, 76.58, 34.71, 31.40, 26.85.

Example 18: Synthesis of Procatalyst 6

To a suspension of the ligand, L-3, (8.1 mg, 10.53 μmol, 1.00 eq) in anhydrous $C_6D_6$ (1.0 mL) in a nitrogen filled glovebox at 23° C. was added a solution of $HfBn_4$ (5.7 mg, 10.53 μmmol, 1.00 eq) in $C_6D_6$ (0.30 mL) in a slow dropwise manner. Upon completion of the addition the initial mixture transitioned to a clear pale yellow solution. After stirring (500 rpm) at 23° C. for 20 mins NMR indicated complete consumption of the starting ligand. The pale yellow solution was filtered through a 0.20 μm PTFE filter, rinsed with anhydrous deoxygenated PhMe (3×3 mL), and the filtrate was concentrated to afford the hafnium complex as an off-white powder (11.1 mg, 9.840 μmol, 93%). NMR indicated pure product.

$^1$H NMR (500 MHz, Benzene-$d_6$) δ 7.62 (q, J=1.8 Hz, 2H), 7.55 (d, J=1.9 Hz, 4H), 7.38 (dt, J=7.6, 2.0 Hz, 2H), 7.06-7.02 (m, 4H), 6.89-6.80 (m, 4H), 6.87 (s, 2H), 6.72 (ddd, J=8.8, 6.9, 1.5 Hz, 2H), 6.59 (dt, J=8.6, 1.8 Hz, 4H), 5.86 (dd, J=8.0, 1.5 Hz, 2H), 4.28 (t, J=10.7 Hz, 2H), 3.60-3.53 (m, 2H), 2.37 (d, J=12.8 Hz, 2H), 1.45 (d, J=12.7 Hz, 2H), 1.35 (s, 36H), 0.78 (t, J=9.8 Hz, 2H), 0.38 (d, J=12.0 Hz, 2H). $^{13}$C NMR (126 MHz, Benzene-$d_6$) δ 156.20, 154.97, 150.83, 147.85, 137.74, 135.51, 131.37, 129.10, 128.91, 128.50, 128.15, 126.67, 126.38, 125.28, 123.79, 123.25, 122.07, 121.19, 119.84, 116.00, 82.15, 80.04, 34.71, 31.40, 31.25, 27.01.

Example 19: Synthesis of the Precursor to Ligand 4

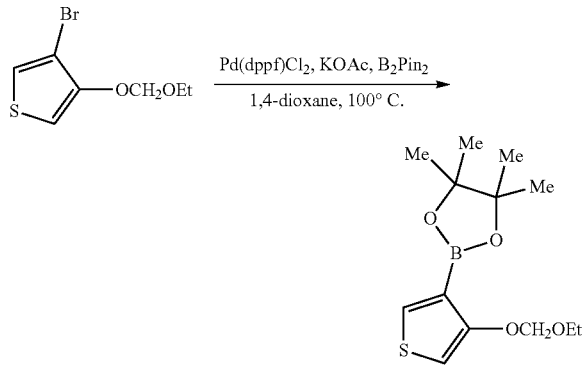

Prior to use, the bromothiophene was azeotropically dried using toluene (4×10 mL). In a nitrogen filled glovebox, to a flask equipped with a stirbar was charged with the bromothiophene (7.411 g, 31.255 mmol, 1.00 eq), KOAc (9.203 g, 93.766 mmol, 3.00 eq), Pd(dppf)Cl$_2$ (1.276 g, 1.563 mmol, 0.05 eq), and B$_2$Pin$_2$ (8.731 g, 34.381 mmol, 1.10 eq), and the solid mixture was then suspended in deoxygenated anhydrous 1,4-dioxane (250 mL). The flask was then placed in a mantle heated to 100° C. After stirring (1000 rpm) for 36 hrs the black mixture was removed from the mantle, allowed to cool gradually to 23° C., suction filtered over a pad of silica gel, washed with CH$_2$Cl$_2$ (4×20 mL), the clear dark grey/black filtrate was concentrated, residual 1,4-dioxane was removed azeotropically using toluene (3×10 mL), the black mixture was then suspended in hexanes (50 mL), stirred vigorously (1000 rpm) for 20 mins, suction filtered over celite, rinsed with hexanes (4×20 mL), the resultant pale red-orange filtrate solution was concentrated, diluted with CH$_2$Cl$_2$ (10 mL), suction filtered over silica gel, washed with CH$_2$Cl$_2$ (4×20 mL), and concentrated to afford the boropinacolate thiophene as a red-orange amorphous oil (8.303 g, 20.745 mmol, 66%, 71% pure by NMR). NMR indicated product with residual B$_2$Pin$_2$ and the protodebrominated byproduct.

$^1$H NMR (400 MHz, Chloroform-d) δ 7.71 (d, J=3.2 Hz, 1H), 6.55 (d, J=3.2 Hz, 1H), 5.17 (s, 2H), 3.74 (q, J=7.1 Hz, 3H), 1.30 (s, 12H), 1.21 (t, J=7.1 Hz, 3H). $^{13}$C NMR (126 MHz, Chloroform-d) δ 159.17, 135.96, 102.29, 94.95, 83.34, 64.16, 24.77, 15.14.

Example 20: Synthesis of the Precursor to Ligand 4

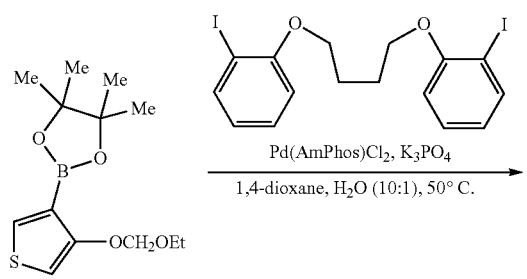

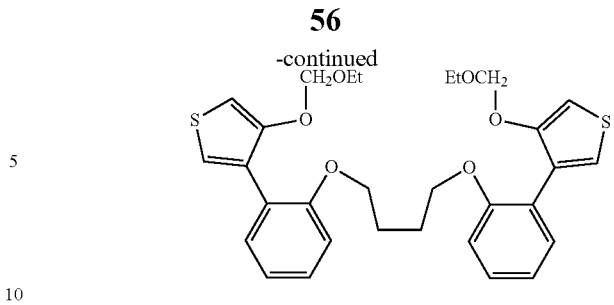

A mixture of the thiophene (4.000 g, 9.431 mmol, 3.00 eq, 67% pure), K$_3$PO$_4$ (6.006 g, 28.296 mmol, 9.00 eq), Pd(AmPhos)Cl$_2$ (0.445 g, 0.6288 mmol, 0.20 eq), and the bisphenyliodide (1.553 g, 3.144 mmol, 1.00 eq). The mixture was evacuated, then back-filled with nitrogen, this process was repeated 3× more, then deoxygenated 1,4-dioxane (50.0 mL) and deoxygenated water (5.0 mL) were added sequentially via syringe. The mixture was then placed in a mantle heated to 50° C. After stirring (1000 rpm) for 36 hrs, the black mixture was removed from the mantle, allowed to cool gradually to 23° C., suction filtered over a pad of silica gel, washed with CH$_2$Cl$_2$ (4×20 mL), the clear black filtrate was concentrated, residual 1,4-dioxane was azeotropically removed using toluene (2×10 mL) via rotary evaporation, the black mixture was then suspended in CH$_2$Cl$_2$ (20 mL), suction filtered over a pad of silica gel, rinsed with CH$_2$Cl$_2$ (4×20 mL), the black filtrate was then concentrated onto celite, and purified via silica gel chromatography via an ISCO chromatography purification system; 25%-100% CH$_2$Cl$_2$ in hexanes to afford the bisthiophene as a dark purple-black viscous oil (1.376 g, 2.481 mmol, 79%). NMR indicated product with trace impurities.

$^1$H NMR (500 MHz, Chloroform-d) δ 7.42 (dd, J=7.5, 1.8 Hz, 2H), 7.27-7.25 (m, 4H), 6.98 (td, J=7.5, 1.1 Hz, 2H), 6.90 (dd, J=8.3, 1.1 Hz, 2H), 6.66 (d, J=3.5 Hz, 2H), 5.11 (s, 4H), 3.96-3.91 (m, 4H), 3.67 (q, J=7.1 Hz, 4H), 1.82-1.77 (m, 4H), 1.20 (t, J=7.1 Hz, 6H). $^{13}$C NMR (126 MHz, Chloroform-d) δ 156.34, 153.36, 131.07, 129.85, 128.54, 123.97, 123.12, 120.29, 112.42, 100.80, 94.89, 68.02, 64.11, 26.01, 15.10.

Example 21: Synthesis of the Precursor to Ligand 4

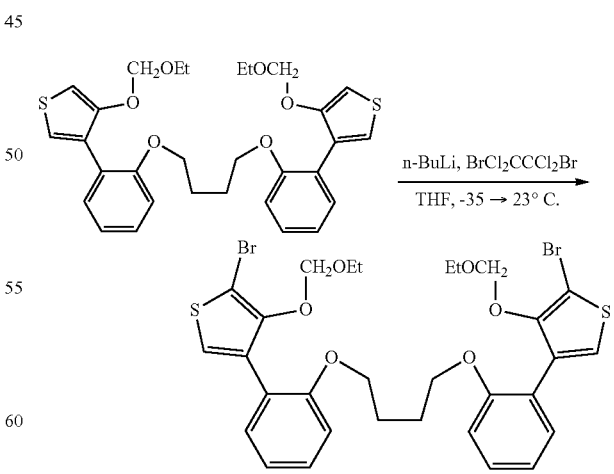

The bisthiophene was azeotropically dried using PhMe (4×10 mL) prior to use. A clear pale purple solution of the thiophene (1.376 g, 2.481 mmol, 1.00 eq) in deoxygenated anhydrous THF (50 mL) in a nitrogen filled glovebox was placed in a freezer cooled to −35° C. for 20 hrs upon which a precooled solution of n-BuLi (2.5 mL, 6.203 mmol, 2.50 eq, titrated 2.50 M in hexanes) was added via syringe in a dropwise manner. The now golden purple-brown solution was allowed to sit in the freezer for 3 hrs upon which it was removed and while stirring (500 rpm) solid 1,2-dibromotetrachloroethane (2.424 g, 7.443 mmol, 3.00 eq) was added in a quick dropwise manner. After stirring for 2.5 hrs at 23° C. the now clear golden yellow solution was removed from the glovebox, neutralized with brine (50 mL), diluted with $CH_2Cl_2$ (20 mL) and water (20 mL), poured into a separatory funnel, partitioned, residual organics were extracted from the aqueous layer using $CH_2Cl_2$ (2×20 mL), combined, dried over solid $Na_2SO_4$, decanted, concentrated onto celite, and purified via silica gel chromatography; hexanes −80% $CH_2Cl_2$ in hexanes to afford the dibromothiophene as a golden yellow amorphous oil (1.688 g, 2.369 mmol, 95%). NMR indicated product with trace impurities.

$^1$H NMR (500 MHz, Chloroform-d) δ 7.37 (dd, J=7.5, 1.7 Hz, 2H), 7.28 (ddd, J=8.3, 7.4, 1.8 Hz, 2H), 7.22 (s, 2H), 6.97 (td, J=7.5, 1.1 Hz, 2H), 6.90 (dd, J=8.3, 1.1 Hz, 2H), 4.82 (s, 4H), 3.97-3.93 (m, 4H), 3.48 (q, J=7.1 Hz, 4H), 1.84-1.80 (m, 4H), 1.00 (t, J=7.1 Hz, 6H). $^{13}$C NMR (126 MHz, Chloroform-d) δ 156.31, 151.30, 132.47, 130.83, 129.15, 123.67, 122.86, 120.45, 112.30, 98.73, 97.05, 67.98, 65.09, 25.84, 14.81.

Example 22: Synthesis of Ligand 4

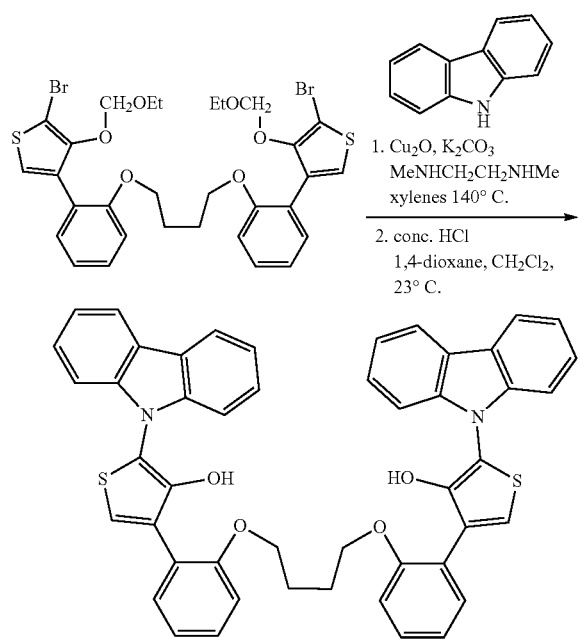

The dibromide was azeotropically dried using toluene (4×10 mL) prior to use. A solid mixture of the dibromide (0.697 g, 0.7826 mmol, 1.00 eq), carbazole (0.654 g, 3.913 mmol, 5.00 eq), $Cu_2O$ (0.560 g, 3.913 mmol, 5.00 eq), and $K_2CO_3$ (2.163 g, 15.652 mmol, 20.0 eq) in an oven-dried vial equipped with a stirbar was evacuated, then back-filled with nitrogen, this process was repeated 4× more, upon which deoxygenated anhydrous xylenes (10.0 mL) was added followed by neat N,N'-dimethylethylenediamine (0.84 mL, 7.826 mmol, 10.00 eq) added via syringe. The vial was sealed with a PTFE cap under a purging flow of nitrogen and placed in a mantle heated to 140° C. After stirring vigorously (1000 rpm) for 72 hrs, the dark red mixture was removed from the mantle, allowed to cool gradually to 23° C., diluted with $CH_2Cl_2$ (20 mL), suction filtered over silica gel using $CH_2Cl_2$ as the eluent, the golden orange filtrate was concentrated onto celite, and purified via silica gel chromatography; 25%-100% $CH_2Cl_2$ in hexanes and then purified two more times using 25%-65% $CH_2Cl_2$ in hexanes to afford the biscarbazoyl-thiophene as an off white solid (0.155 g, 0.2153 mmol, 28%). NMR indicated product which contained trace impurities. The product was used in the subsequent reaction without further purification.

To a solution of the protected hydroxythiophene (0.148 g, 0.1672 mmol, 1.00 eq) in $CH_2Cl_2$ (5 mL) and 1,4-dioxane (5 mL) was added concentrated HCl (5 mL) under nitrogen at 23° C. After stirring vigorously (1000 rpm) for 20 hrs the pale golden brown solution was diluted with aqueous HCl (20 mL, 1 N) and $CH_2Cl_2$ (20 mL), poured into a separatory funnel, partitioned, organics were washed with aqueous HCl (2×20 mL), residual organics were extracted from the aqueous layer using $CH_2Cl_2$ (2×20 mL), combined, dried over solid $Na_2SO_4$, decanted, concentrated onto celite, and purified via silica gel chromatography; 25%-75% $CH_2Cl_2$ in hexanes to afford the hydroxythiophene as a white solid (88.1 mg, 0.1146 mmol, 69%, 14% two steps). NMR indicated pure product.

$^1$H NMR (500 MHz, Chloroform-d) δ 8.10 (dt, J=7.6, 1.0 Hz, 4H), 7.53 (dd, J=7.6, 1.7 Hz, 2H), 7.37-7.30 (m, 10H), 7.28-7.22 (m, 4H), 7.20 (s, 2H), 7.15 (td, J=7.5, 1.1 Hz, 2H), 6.89 (dd, J=8.2, 1.0 Hz, 2H), 6.78 (s, 2H), 4.01 (d, J=4.8 Hz, 4H), 1.88 (p, J=2.5 Hz, 4H). $^{13}$C NMR (126 MHz, Chloroform-d) δ 154.19, 148.02, 141.96, 131.33, 130.74, 129.59, 125.98, 124.39, 123.56, 122.78, 120.30, 120.22, 119.54, 114.97, 113.55, 110.29, 69.41, 25.92.

Characterization of the Protected Coupled Product:

$^1$H NMR (500 MHz, Chloroform-d) δ 8.11 (dd, J=7.7, 2.6 Hz, 4H), 7.61-7.26 (m, 18H), 7.10-6.98 (m, 4H), 4.49 (d, J=3.3 Hz, 4H), 4.14 (s, 4H), 2.85-2.74 (m, 4H), 2.17-2.04 (m, 4H), 0.52 (td, J=7.1, 3.1 Hz, 6H). $^{13}$C NMR (126 MHz, Chloroform-d) δ 156.56, 149.17, 141.91, 132.25, 131.00, 129.19, 126.20, 124.19, 123.52, 121.71, 120.60, 120.56, 120.51, 120.13, 112.21, 110.67, 96.67, 68.07, 64.40, 26.25, 14.15.

Example 23: Synthesis of Procatalyst 9

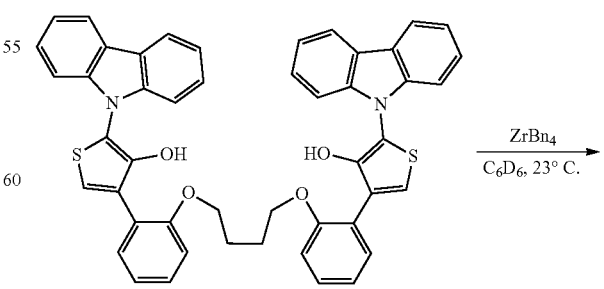

-continued

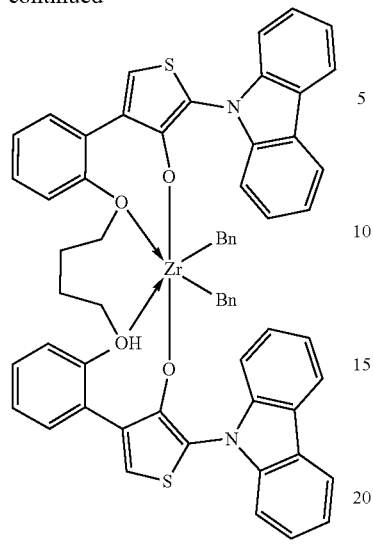

The thiophene ligand was azeotropically dried using toluene (4×10 mL) prior to use. To a white suspension of the thiophene (5.3 mg, 0.00689 mmol, 1.00 eq) in anhydrous deoxygenated C₆D₆ (1.26 mL) in a nitrogen filled glovebox at 23° C. was added a solution of ZrBn₄ (3.1 mg, 0.00689 mmol, 1.00 eq) in C₆D₆ (0.12 mL) in a dropwise manner. After stirring (500 rpm) for 1 hr the pale golden yellow solution was filtered using a 0.20 μm PTFE submicron filter to afford the zirconium complex as a 0.005 M solution in C₆D₆. NMR indicated product. The same procedure can be used with toluene to prepare the procatalyst solution which is used directly after filtration for the polymerization experiments.

¹H NMR (500 MHz, Benzene-d₆) δ 8.11-8.03 (m, 2H), 7.82 (dt, J=7.8, 1.0 Hz, 2H), 7.63-7.57 (m, 2H), 7.33-7.30 (m, 4H), 7.30-7.23 (m, 6H), 7.10-7.06 (m, 4H), 7.04 (ddd, J=7.9, 5.2, 2.8 Hz, 2H), 6.91-6.87 (m, 4H), 6.76-6.66 (m, 6H), 6.61 (s, 2H), 6.02-5.96 (m, 4H), 5.05 (dd, J=8.2, 1.3 Hz, 2H), 4.04-3.95 (m, 2H), 3.29 (dd, J=12.2, 4.5 Hz, 2H), 0.97 (d, J=12.0 Hz, 2H), 0.74 (dd, J=17.9, 8.8 Hz, 2H), 0.65-0.56 (m, 2H), 0.51 (d, J=12.1 Hz, 2H). ¹³C NMR (126 MHz, Benzene-d₆) δ 155.56, 152.34, 146.27, 141.69, 141.30, 133.02, 131.26, 130.55, 130.13, 128.57, 128.32, 127.12, 126.66, 125.78, 125.18, 124.83, 123.10, 122.79, 120.90, 120.71, 120.51, 120.10, 119.99, 117.18, 115.08, 112.42, 109.69, 80.40, 73.80, 25.72.

Example 24: Synthesis of Procatalyst 10

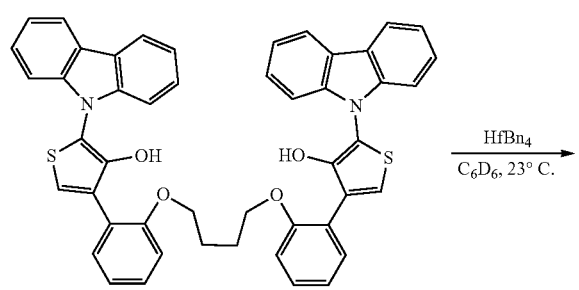

-continued

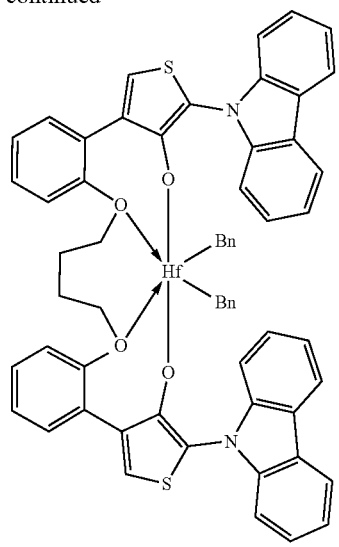

The thiophene ligand was azeotropically dried using toluene (4×10 mL) prior to use. To a white suspension of the thiophene (5.0 mg, 0.00650 mmol, 1.00 eq) in anhydrous deoxygenated C₆D₆ (1.16 mL) in a nitrogen filled glovebox at 23° C. was added a solution of HfBn₄ (3.5 mg, 0.00650 mmol, 1.00 eq) in C₆D₆ (0.14 mL) in a dropwise manner. After stirring (500 rpm) for 1 hr the pale golden yellow solution was filtered using a 0.20 μm PTFE submicron filter to afford the hafnium complex as a 0.005 M solution in C₆D₆. NMR indicated product. The same procedure can be used with toluene to prepare the procatalyst solution which is used directly after filtration for the polymerization experiments.

¹H NMR (500 MHz, Benzene-d₆) δ 8.13-8.07 (m, 2H), 7.83 (dt, J=7.6, 1.0 Hz, 2H), 7.61-7.54 (m, 2H), 7.34-7.28 (m, 2H), 7.28-7.21 (m, 4H), 7.10-7.05 (m, 4H), 7.05-7.02 (m, 2H), 6.98-6.93 (m, 2H), 6.93-6.88 (m, 2H), 6.77-6.66 (m, 6H), 6.60 (s, 2H), 6.07-6.04 (m, 4H), 5.01 (dd, J=8.2, 1.3 Hz, 2H), 4.00 (dd, J=11.9, 9.9 Hz, 2H), 3.32 (dd, J=12.2, 4.6 Hz, 2H), 0.90 (d, J=13.3 Hz, 3H), 0.73-0.64 (m, 2H), 0.53-0.46 (m, 2H), 0.24 (d, J=11.5 Hz, 4H). ¹³C NMR (126 MHz, Benzene-d₆) δ 155.37, 152.31, 147.39, 141.57, 141.23, 138.51, 132.65, 131.30, 130.20, 128.67, 126.07, 125.09, 124.90, 124.33, 123.56, 122.69, 120.80, 120.75, 120.45, 120.11, 119.91, 117.01, 115.58, 112.53, 109.69, 83.00, 81.57, 25.95.

Example 25: Synthesis of Procatalyst 11

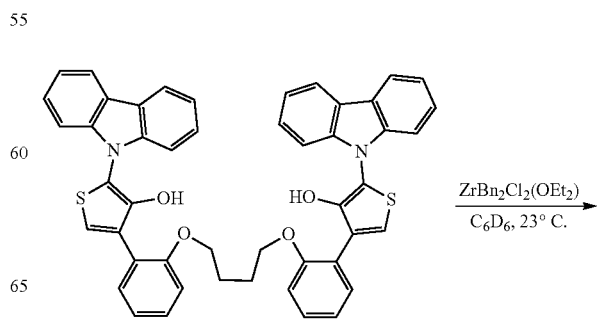

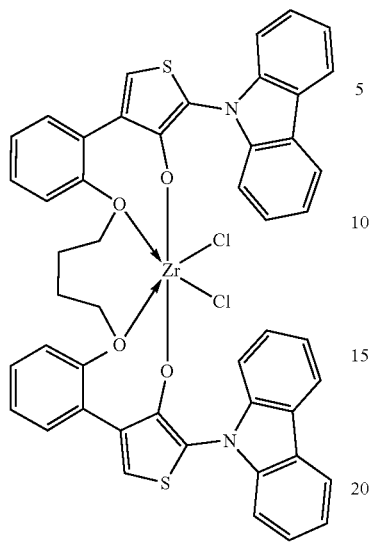

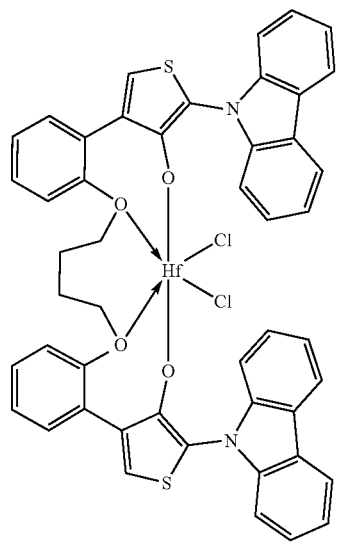

The thiophene ligand was azeotropically dried using toluene (4×10 mL) prior to use. To a white suspension of the thiophene (4.7 mg, 0.00611 mmol, 1.00 eq) in anhydrous deoxygenated $C_6D_6$ (1.10 mL) in a nitrogen filled glovebox at 23° C. was added a solution of $ZrBn_2Cl_2(OEt_2)$ (2.6 mg, 0.00822 mmol, 1.00 eq) in $C_6D_6$ (0.11 mL) in a dropwise manner. After stirring (500 rpm) for 1 hr the golden yellow solution was filtered using a 0.20 μm PTFE submicron filter to afford the zirconium complex as a 0.005 M solution in $C_6D_6$. NMR indicated product of which contains $Et_2O$ (1.00 eq). The same procedure can be used with toluene to prepare the procatalyst solution which is used directly after filtration for the polymerization experiments.

$^1H$ NMR (500 MHz, Benzene-$d_6$) δ 8.15-8.08 (m, 2H), 8.00 (ddd, J=7.6, 1.3, 0.7 Hz, 2H), 7.49-7.43 (m, 2H), 7.28 (dt, J=8.2, 1.0 Hz, 2H), 7.23-7.20 (m, 4H), 7.20-7.17 (m, 2H), 7.14 (dd, J=7.6, 1.1 Hz, 2H), 6.95-6.91 (m, 2H), 6.69-6.60 (m, 4H), 6.58 (s, 2H), 5.34 (dd, J=7.9, 1.6 Hz, 2H), 4.26 (q, J=11.5, 11.0 Hz, 2H), 3.28-3.24 (m, 2H), 0.78-0.69 (m, 2H), 0.63-0.55 (m, 2H). $^{13}C$ NMR (126 MHz, Benzene-$d_6$) δ 156.58, 151.50, 141.52, 141.42, 132.52, 130.50, 130.19, 126.64, 125.04, 124.92, 123.97, 122.48, 121.04, 120.34, 120.33, 119.55, 117.21, 116.18, 112.36, 109.58, 83.54, 26.76.

Example 26: Synthesis of Procatalyst 12

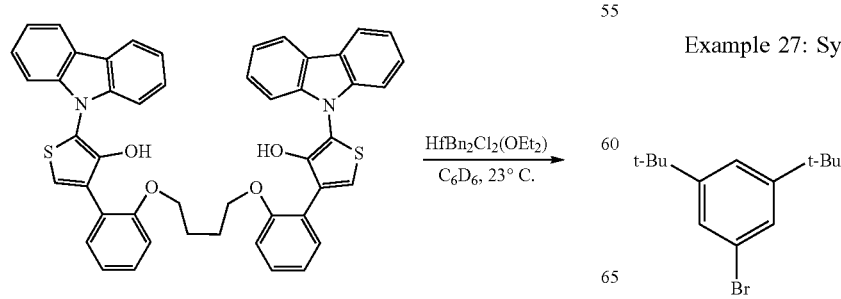

The thiophene ligand, L-4, was azeotropically dried using toluene (4×10 mL) prior to use. To a white suspension of the thiophene (5.2 mg, 0.00676 mmol, 1.00 eq) in $C_6D_6$ (1.23 mL) in a nitrogen filled glovebox at 23° C. was added a solution of $HfBn_2Cl_2(OEt_2)$ (3.4 mg, 0.00676 mmol, 1.00 eq) in $C_6D_6$ (0.12 mL) in a dropwise manner. After stirring (500 rpm) for 1 hr the pale golden yellow solution was filtered using a 0.20 μm PTFE submicron filter to afford the hafnium complex as a 0.005 M solution in $C_6D_6$. NMR indicated product which contains $Et_2O$ (1.00 eq). The same procedure can be used with toluene to prepare the procatalyst solution which is used directly after filtration for the polymerization experiments.

$^1H$ NMR (400 MHz, Benzene-$d_6$) δ 8.13-8.05 (m, 2H), 7.98 (ddd, J=7.4, 1.5, 0.7 Hz, 2H), 7.46-7.41 (m, 2H), 7.26 (dt, J=8.3, 0.9 Hz, 2H), 7.23-7.17 (m, 4H), 7.17-7.11 (m, 4H), 6.93-6.89 (m, 2H), 6.67-6.59 (m, 4H), 6.58 (s, 2H), 5.36-5.30 (m, 2H), 4.36 (t, J=10.9 Hz, 2H), 3.30 (d, J=12.7 Hz, 2H), 0.72 (t, J=9.7 Hz, 2H), 0.52 (d, J=12.2 Hz, 2H). $^{13}C$ NMR (101 MHz, Benzene-$d_6$) δ 156.46, 151.77, 142.29, 141.54, 141.46, 132.30, 130.50, 130.09, 126.68, 126.00, 124.99, 124.88, 124.07, 122.45, 120.98, 120.35, 120.31, 120.27, 120.24, 119.51, 117.14, 116.57, 112.41, 110.46, 109.56, 84.24, 26.86.

Example 27: Synthesis of Precursor to Ligand 5

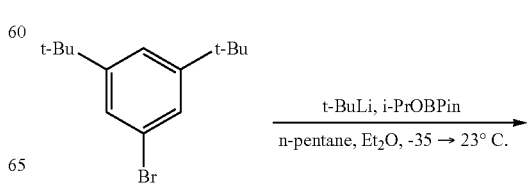

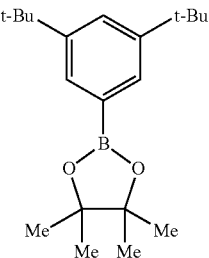

A clear colorless solution of t-BuLi (6.60 mL, 11.143 mmol, 3.00 eq, non-titrated 1.70 M in pentane) in anhydrous pentane (30 mL) in a nitrogen filled glovebox was placed in the freezer (−35° C.) for 14 hrs upon which the solid 3,5-di-tert-butylphenyl bromide (1.000 g, 3.714 mmol, 1.00 eq) was added followed by the dropwise addition of pre-cooled anhydrous deoxygenated Et$_2$O (5 mL). The now clear pale yellow heterogeneous mixture was allowed to sit in the freezer for 3 hrs upon which the mixture was removed from the freezer and neat i-PrOBPin (1.50 mL, 7.428 mmol, 2.00 eq) was added via syringe in a quick dropwise manner. The pale yellow mixture was stirred (500 rpm) at 23° C. for 2 hrs, removed from the glovebox, neutralized with an aqueous phosphate buffer (50 mL, pH=8, 0.05 M), the white hetero-geneous mixture was suction filtered over a pad of celite, rinsed with CH$_2$Cl$_2$ (4×20 mL), the pale yellow biphasic mixture was poured into a separatory funnel, partitioned, organics were washed with an aqueous phosphate buffer (2×25 mL, pH=8, 0.05 M), residual organics were extracted from the aqueous layer using CH$_2$Cl$_2$ (2×25 mL), combined, dried over solid Na$_2$SO$_4$, decanted, concentrated to afford a pale yellow amorphous viscous oil which was dissolved in CH$_2$Cl$_2$ (10 mL), suction filtered over a pad of silica gel, rinsed with CH$_2$Cl$_2$ (4×20 mL), and the pale yellow filtrate solution was concentrated to afford the 3,5-di-tert-butylphe-nyl boropinacolate ester as a white foam (1.021 g, 3.229 mmol, 87%). NMR indicated product with trace impurities.

$^1$H NMR (500 MHz, Chloroform-d) δ 7.71 (d, J=2.0 Hz, 2H), 7.58 (t, J=2.0 Hz, 1H), 1.38 (s, 18H), 1.38 (s, 12H). $^{13}$C NMR (126 MHz, Chloroform-d) δ 149.81, 128.79, 125.55, 83.53, 34.82, 31.53, 24.89.

Example 28: Synthesis of Ligand 5

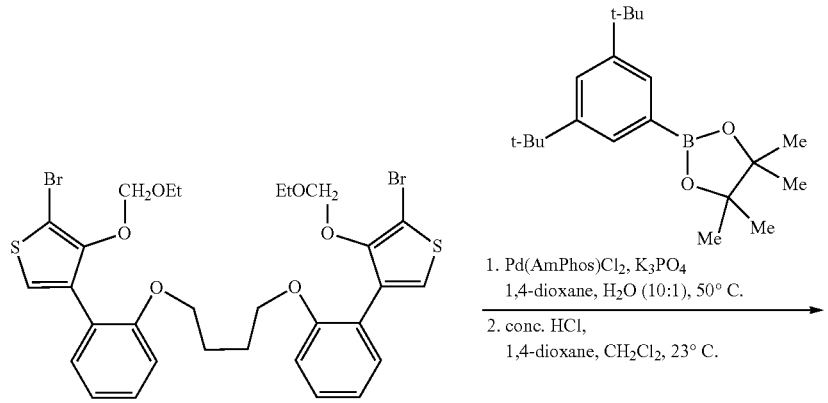

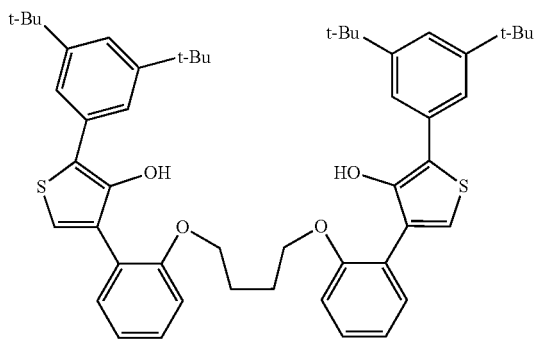

To vial equipped with a stirbar was added the dibromide (0.200 g, 0.2807 mmol, 1.00 eq), K$_3$PO$_4$ (0.715 g, 3.369 mmol, 12.0 eq), Pd(AmPhos)Cl$_2$ (40.0 mg, 0.0561 mmol, 0.20 eq), and the 3,5-di-tert-butylphenylboropinacolate (0.355 g, 1.123 mmol, 4.00 eq). The mixture was evacuated, then back-filled with nitrogen, this process was repeated 3× more, then deoxygenated 1,4-dioxane (6.0 mL) and water (0.6 mL) were added sequentially via syringe. The vial was sealed with a PTFE cap under a purging flow of nitrogen, and then placed in a mantle heated to 50° C. After stirring (1000 rpm) for 36 hrs the purple-black mixture was removed from the mantle, allowed to cool gradually to 23° C., suction filtered over a pad of silica gel, washed with CH$_2$Cl$_2$ (4×20 mL), the clear purple filtrate was concentrated onto celite, and purified via silica gel chromatography using an ISCO chromatography purification system; 25%-100% CH$_2$Cl$_2$ in hexanes to afford the bisprotected coupled 3,5-di-tert-butylphenylthiophene as a white foam (0.223 g, 0.2394 mmol, 85%). NMR indicated pure product.

To a solution of the protected bisthiophene in CH$_2$Cl$_2$ (5 mL) and 1,4-dioxane (5 mL) was added conc. HCl (5 mL). The dark golden brown solution was vigorously stirred (1000 rpm) at 23° C. for 24 hrs under nitrogen, then diluted with aqueous HCl (25 mL, 1 N) and CH$_2$Cl$_2$ (20 mL), the biphasic mixture was poured into a separatory funnel, partitioned, organics were washed with aqueous HCl (2×20 mL, 1 N), the residual organics were extracted from the aqueous layer using CH$_2$Cl$_2$ (2×10 mL), combined, dried over solid Na$_2$SO$_4$, decanted, concentrated onto celite, and purified via silica gel chromatography using an ISCO chromatography purification system; 25%-100% CH$_2$Cl$_2$ in hexanes to afford the bishydroxythiophene ligand as a white amorphous foam (98.5 mg, 0.1208 mmol, 51%, 43% two steps). NMR indicated pure product.

$^1$H NMR (500 MHz, Chloroform-d) δ 7.68 (d, J=1.7 Hz, 4H), 7.43 (dd, J=7.6, 1.7 Hz, 2H), 7.34 (t, J=1.8 Hz, 2H), 7.28 (ddd, J=8.2, 7.4, 1.7 Hz, 2H), 7.10-7.06 (m, 2H), 7.06 (s, 2H), 6.96 (s, 2H), 6.89 (dd, J=8.3, 1.2 Hz, 2H), 4.07-4.03 (m, 4H), 1.93-1.87 (m, 4H), 1.37 (s, 36H). $^{13}$C NMR (126 MHz, Chloroform-d) δ 154.10, 150.76, 147.57, 132.94, 132.75, 131.67, 129.30, 125.03, 122.75, 121.50, 120.75, 120.66, 119.41, 114.00, 69.64, 34.92, 31.48, 25.75.

Characterization of the Protected Ligand:
$^1$H NMR (500 MHz, Chloroform-d) δ 7.61 (d, J=1.8 Hz, 4H), 7.53 (dd, J=7.5, 1.8 Hz, 2H), 7.38 (t, J=1.8 Hz, 2H), 7.30-7.24 (m, 2H), 7.22 (s, 2H), 7.01 (td, J=7.4, 1.1 Hz, 2H), 6.94 (dd, J=8.3, 1.1 Hz, 2H), 4.66 (s, 4H), 4.05 (d, J=5.2 Hz, 4H), 3.16 (q, J=7.0 Hz, 4H), 1.99 (q, J=2.9 Hz, 4H), 1.39 (s, 36H), 0.72 (t, J=7.1 Hz, 6H). $^{13}$C NMR (126 MHz, Chloroform-d) δ 156.47, 150.82, 148.54, 133.49, 132.53, 131.07, 128.90, 128.73, 124.67, 122.47, 121.15, 120.86, 120.46, 112.51, 109.65, 97.06, 67.90, 64.69, 34.93, 31.50, 25.88, 14.55.

Example 29: Synthesis of Procatalyst 13

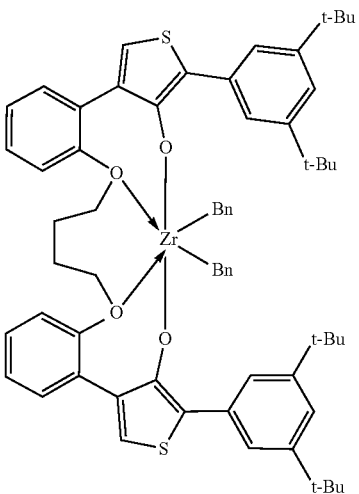

The thiophene ligand was azeotropically dried using toluene (4×10 mL) prior to use. To a solution of the thiophene (5.8 mg, 0.00711 mmol, 1.00 eq) in anhydrous C$_6$D$_6$ (1.28 mL) in a nitrogen filled glovebox at 23° C. was added a solution of ZrBn$_4$ (3.3 mg, 0.00711 mmol, 1.00 eq) in C$_6$D$_6$ (0.14 mL) in a dropwise manner. After stirring (500 rpm) for 45 mins the golden yellow solution was filtered using a 0.20 μm PTFE submicron filter to afford the zirconium complex as a 0.005 M solution in C$_6$D$_6$. The same procedure can be used with toluene to prepare the procatalyst solution which is used directly after filtration for the polymerization experiments.

$^1$H NMR (500 MHz, Benzene-d$_6$) δ 7.78 (d, J=1.8 Hz, 4H), 7.56 (t, J=1.8 Hz, 2H), 7.20-7.17 (m, 2H), 7.12-7.11 (m, 2H), 6.99-6.95 (m, 2H), 6.90-6.82 (m, 4H), 6.76 (tt, J=7.4, 1.2 Hz, 2H), 6.69 (s, 2H), 6.63-6.58 (m, 4H), 5.92-5.87 (m, 2H), 4.17 (dd, J=11.9, 10.1 Hz, 2H), 3.51 (dd, J=11.8, 4.8 Hz, 2H), 1.33 (s, 36H), 1.32 (s, 4H), 0.77 (t, J=9.4 Hz, 2H), 0.46 (d, J=12.1 Hz, 2H). $^{13}$C NMR (126 MHz, Benzene-d$_6$) δ 155.93, 153.46, 151.24, 147.65, 134.39, 133.79, 131.53, 130.07, 128.15, 126.24, 123.51, 123.41, 121.75, 121.03, 120.83, 119.16, 80.99, 76.61, 34.72, 31.31, 26.86.

Example 30: Synthesis of Procatalyst 14

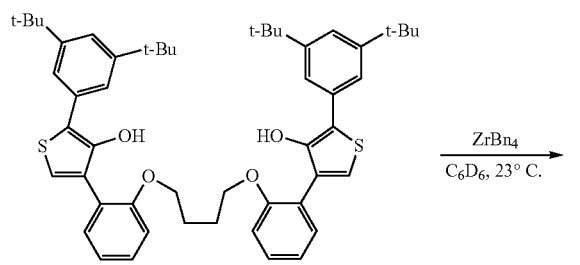

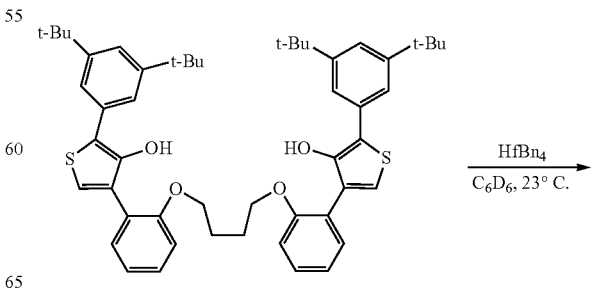

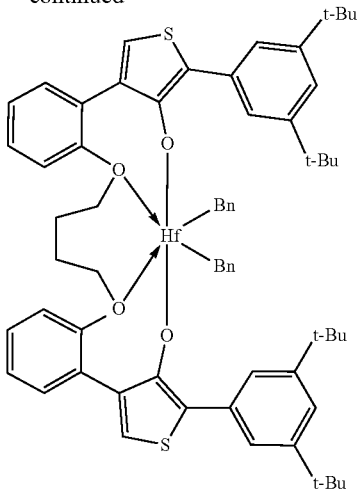

The thiophene ligand was azeotropically dried using toluene (4×10 mL) prior to use. To a solution of the thiophene (6.7 mg, 0.00822 mmol, 1.00 eq) in anhydrous C₆D₆ (1.48 mL) in a nitrogen filled glovebox at 23° C. was added a solution of HfBn₄ (4.5 mg, 0.00822 mmol, 1.00 eq) in C₆D₆ (0.18 mL) in a dropwise manner. After stirring (500 rpm) for 45 mins the golden yellow solution was filtered using a 0.20 μm PTFE submicron filter to afford the hafnium complex as a 0.005 M solution in C₆D₆. The same procedure can be used with toluene to prepare the procatalyst solution which is used directly after filtration for the polymerization experiments.

$^1$H NMR (500 MHz, Benzene-$d_6$) δ 7.75 (d, J=1.9 Hz, 4H), 7.56 (t, J=1.8 Hz, 2H), 7.20-7.15 (m, 2H), 7.12 (td, J=1.7, 1.3, 0.7 Hz, 4H), 6.92-6.83 (m, 4H), 6.74 (tt, J=7.3, 1.3 Hz, 2H), 6.69 (s, 2H), 6.62-6.57 (m, 4H), 5.92 (dd, J=8.0, 1.4 Hz, 2H), 4.30-4.23 (m, 2H), 3.58 (dd, J=12.5, 4.9 Hz, 2H), 2.42 (d, J=12.7 Hz, 2H), 1.45 (d, J=12.8 Hz, 2H), 1.33 (s, 36H), 0.78 (t, J=9.6 Hz, 2H), 0.41 (d, J=11.4 Hz, 2H). $^{13}$C NMR (126 MHz, Benzene-$d_6$) δ 155.90, 153.51, 151.23, 147.91, 134.12, 133.72, 131.54, 130.05, 128.91, 126.83, 126.35, 123.60, 123.55, 121.72, 121.25, 121.21, 119.10, 81.77, 80.32, 34.71, 31.32, 27.04.

Example 31: Synthesis of Ligand 6

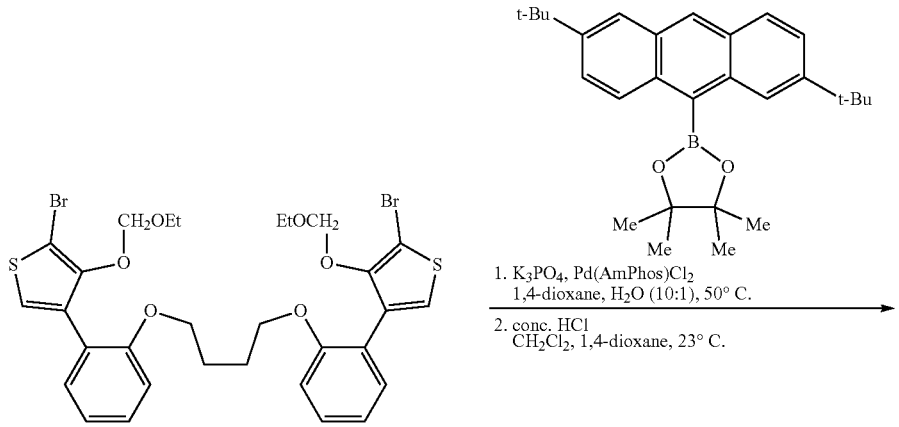

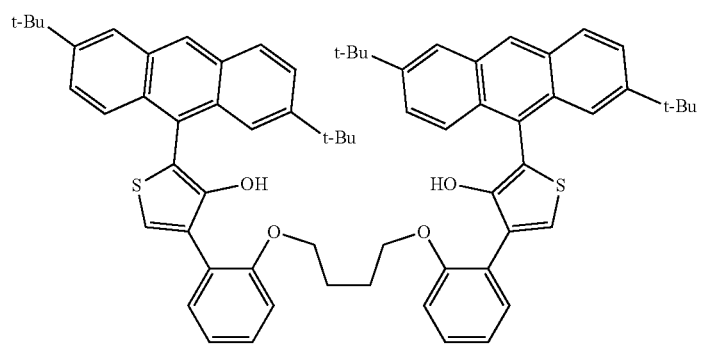

A mixture of the dibromide (200.0 mg, 0.2807 mmol, 1.00 eq), Pd(AmPhos)Cl$_2$ (40.0 mg, 0.0564 mmol, 0.20 eq), K$_3$PO$_4$ (536.0 mg, 2.526 mmol, 9.00 eq), and the boropinacolate ester (351.0 mg, 0.8421 mmol, 3.00 eq) was evacuated, back-filled with nitrogen, this process was repeated 4× more, then freshly sparged deoxygenated 1,4-dioxane (3.0 mL) and H$_2$O (0.3 mL) were added sequentially. The canary yellow mixture was then placed in a mantle heated to 50° C., stirred vigorously (1000 rpm) for 24 hrs, the dark grey mixture was removed from the mantle, allowed to cool to ambient temperature, diluted with CH$_2$Cl$_2$ (20 mL), suction filtered over a pad of silica gel, rinsed with CH$_2$Cl$_2$ (4×20 mL), the resultant filtrate was concentrated onto celite, and purified via silica gel chromatography; 10% CH$_2$Cl$_2$—50% CH$_2$Cl$_2$ in hexanes and then purified again via silica gel chromatography; 35% CH$_2$Cl$_2$ in hexanes to afford the protected coupled product as an off-white foam (101.0 mg, 0.0893 mmol, 32%). NMR indicated pure product.

To a solution of the protected coupled bisthiophene (101.0 mg, 0.0893 mmol, 1.00 eq) in CH$_2$Cl$_2$ (5 mL) and 1,4-dioxane (5 mL) under nitrogen was added concentrated HCl (3 mL, 37% aqueous) via syringe. The golden yellow solution was stirred (500 rpm) for 16 hrs, diluted with aqueous HCl (10 mL, 1 N) and CH$_2$Cl$_2$ (10 mL), poured into a separatory funnel, partitioned, organics were washed with aqueous HCl (1×10 mL, 1 N), residual organics were extracted from the aqueous using CH$_2$Cl$_2$ (2×20 mL), combined, dried over solid Na$_2$SO$_4$, decanted, concentrated onto celite, and purified via silica gel chromatography; 10%-35% CH$_2$Cl$_2$ in hexanes to afford the bis-hydroxythiophene as a white foam (90.4 mg, 0.0890 mmol, 99%, 32% over two steps). NMR indicated pure product.

$^1$H NMR (500 MHz, Chloroform-d) δ 8.45 (s, 2H), 7.98 (d, J=8.9 Hz, 2H), 7.95-7.90 (m, 4H), 7.90-7.87 (m, 2H), 7.65-7.53 (m, 4H), 7.49 (ddd, J=9.2, 7.1, 2.0 Hz, 2H), 7.44 (d, J=3.6 Hz, 2H), 7.30-7.23 (m, 2H), 7.12 (t, J=7.5 Hz, 2H), 6.76 (d, J=8.2 Hz, 2H), 6.47 (d, J=6.4 Hz, 2H), 3.97-3.86 (m, 4H), 1.90-1.80 (m, 4H), 1.42 (s, 9H), 1.41 (s, 9H), 1.33 (s, 18H). $^{13}$C NMR (126 MHz, Chloroform-d) δ 154.35, 149.39, 147.73, 147.04, 131.88, 131.50, 131.35, 130.92, 130.67, 130.33, 129.08, 128.05, 127.32, 126.21, 125.47, 125.29, 124.90, 124.56, 122.81, 122.42, 122.41, 122.39, 120.76, 114.67, 114.65, 113.57, 113.53, 69.12, 69.08, 35.06, 30.97, 30.95, 30.91, 25.87, 25.83.

Characterization of the Protected Coupled Product:

$^1$H NMR (500 MHz, Chloroform-d) δ 8.44 (s, 2H), 8.04-7.96 (m, 4H), 7.97-7.88 (m, 4H), 7.64 (dd, J=7.6, 1.8 Hz, 2H), 7.59 (s, 2H), 7.57 (ddd, J=8.9, 6.4, 2.1 Hz, 4H), 7.30 (td, J=7.8, 1.8 Hz, 2H), 7.04 (td, J=7.4, 1.0 Hz, 2H), 7.01 (d, J=8.3 Hz, 2H), 4.42 (q, J=5.9 Hz, 4H), 4.14 (d, J=5.1 Hz, 4H), 2.64 (q, J=7.1 Hz, 4H), 2.13-2.05 (m, 4H), 1.44 (s, 18H), 1.39 (s, 18H), 0.42 (t, J=7.0 Hz, 6H). $^{13}$C NMR (126 MHz, Chloroform-d) δ 156.55, 151.02, 147.67, 147.12, 132.01, 132.00, 131.66, 131.28, 131.17, 130.66, 130.09, 128.68, 127.83, 127.19, 126.45, 125.91, 125.48, 124.74, 124.74, 124.55, 123.58, 122.52, 121.78, 121.21, 120.49, 112.51, 96.57, 68.04, 64.08, 35.10, 34.81, 30.97, 30.93, 29.72, 26.18, 14.17.

Example 32: Synthesis of Ligand 7

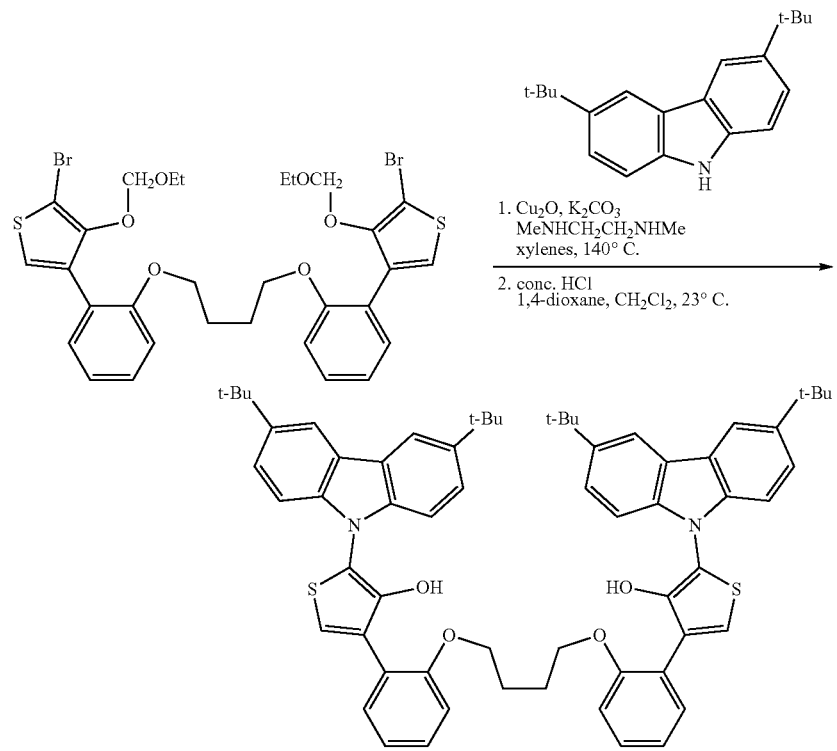

The dibromide was azeotropically dried using toluene (4×10 mL) prior to use. A solid mixture of the dibromide (0.850 g, 1.193 mmol, 1.00 eq), carbazole (1.667 g, 5.965 mmol, 5.00 eq), Cu$_2$O (0.854 g, 5.965 mmol, 5.00 eq), and K$_2$CO$_3$ (3.300 g, 23.860 mmol, 20.0 eq) in an oven-dried flask equipped with a stirbar and reflux condenser was evacuated, then back-filled with nitrogen, this process was repeated 4× more, upon which deoxygenated anhydrous xylenes (20.0 mL) was added followed by neat N,N'-dimethylethylenediamine (1.30 mL, 11.930 mmol, 10.00 eq) added via syringe. After stirring vigorously (1000 rpm) for 72 hrs, the dark red heterogeneous mixture was removed from the mantle, allowed to cool gradually to 23° C., diluted with $CH_2Cl_2$ (30 mL), stirred vigorously (1000 rpm) for 2 mins, suction filtered over silica gel using $CH_2Cl_2$ as the eluent, rinsed with $CH_2Cl_2$ (4×25 mL) the golden orange filtrate was concentrated onto celite, and purified via silica gel chromatography; 45% $CH_2Cl_2$ in hexanes to afford the biscarbazoyl-thiophene as a golden yellow foam (0.317 g, 0.2857 mmol, 24%). NMR indicated product which contained trace impurities. The product was used in the subsequent reaction without further purification.

To a solution of the protected hydroxythiophene (0.317 g, 0.2857 mmol, 1.00 eq) in $CH_2Cl_2$ (5 mL) and 1,4-dioxane (5 mL) was added concentrated HCl (5 mL) under nitrogen at 23° C. After stirring vigorously (1000 rpm) for 16 hrs the pale golden brown solution was diluted with aqueous HCl (20 mL, 1 N) and $CH_2Cl_2$ (20 mL), poured into a separatory funnel, partitioned, organics were washed with aqueous HCl (2×20 mL), residual organics were extracted from the aqueous layer using $CH_2Cl_2$ (2×20 mL), combined, dried over solid $Na_2SO_4$, decanted, concentrated onto celite, and purified via silica gel chromatography; 10%-30% $CH_2Cl_2$ in hexanes to afford the hydroxythiophene as a golden yellow foam (0.252 g, 0.2537 mmol, 89%, 21% two steps). NMR indicated pure product.

$^1$H NMR (500 MHz, Chloroform-d) δ 8.10 (d, J=1.8 Hz, 4H), 7.53 (dd, J=7.6, 1.7 Hz, 2H), 7.39 (dd, J=8.6, 1.9 Hz, 4H), 7.32 (td, J=7.8, 1.7 Hz, 2H), 7.23 (d, J=8.5 Hz, 4H), 7.18 (s, 2H), 7.12 (td, J=7.5, 1.1 Hz, 2H), 6.91 (dd, J=8.3, 1.1 Hz, 2H), 6.66 (s, 2H), 4.07-4.03 (m, 4H), 1.91-1.87 (m, 4H), 1.43 (s, 36H). $^{13}$C NMR (126 MHz, Chloroform-d) δ 154.34, 147.72, 143.16, 140.41, 131.33, 130.56, 129.51, 124.52, 123.60, 123.51, 122.66, 119.31, 116.25, 115.50, 113.48, 109.66, 69.47, 34.70, 32.01, 26.03.

Characterization of the Protected Ligand:

$^1$H NMR (500 MHz, Chloroform-d) δ 8.10 (d, J=2.0 Hz, 4H), 7.55 (dd, J=7.5, 1.8 Hz, 2H), 7.45 (dd, J=8.6, 1.9 Hz, 4H), 7.36 (d, J=8.6 Hz, 4H), 7.34-7.30 (m, 2H), 7.29 (s, 2H), 7.07-6.98 (m, 4H), 4.50 (s, 4H), 4.18-4.11 (m, 4H), 2.83 (q, J=7.0 Hz, 4H), 2.13-2.03 (m, 4H), 1.45 (s, 36H), 0.55 (t, J=7.0 Hz, 6H). $^{13}$C NMR (126 MHz, Chloroform-d) δ 156.62, 148.96, 143.32, 140.40, 132.13, 131.05, 129.11, 124.38, 123.83, 123.44, 122.05, 120.51, 120.38, 116.06, 112.16, 110.00, 96.74, 68.17, 64.44, 34.73, 32.01, 26.37, 14.19.

Example 33: Synthesis of Procatalyst 17

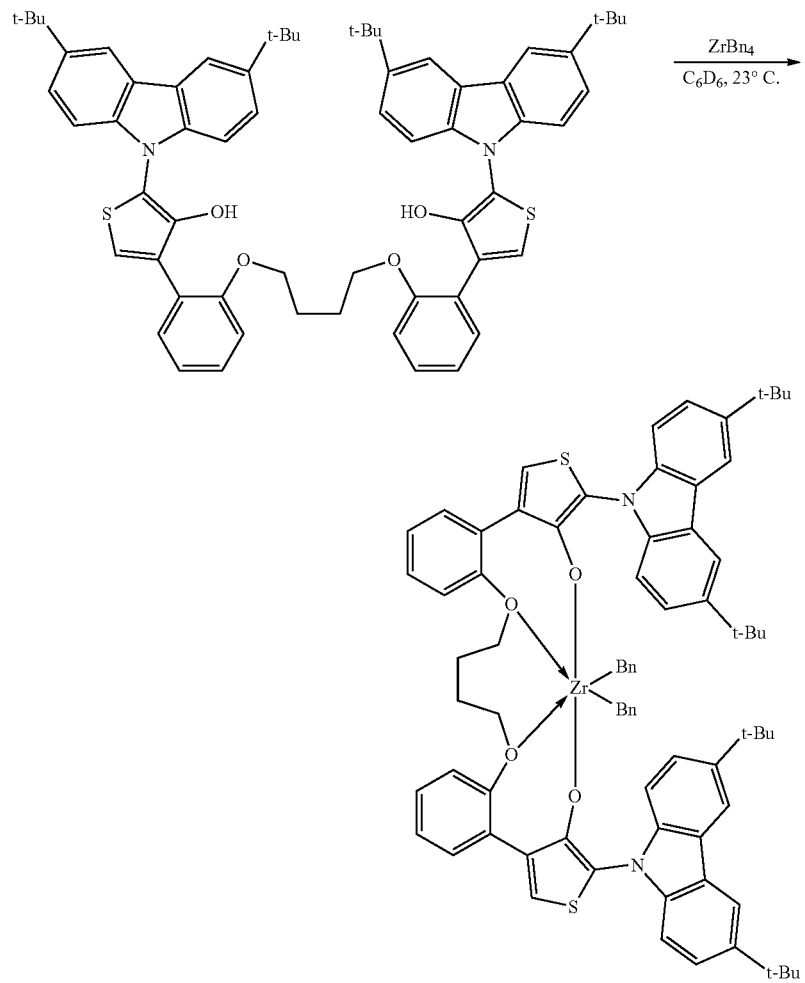

The thiophene ligand was azeotropically dried using toluene (4×10 mL) prior to use. To a clear colorless solution of the thiophene (15.6 mg, 0.0157 mmol, 1.00 eq) in anhydrous $C_6D_6$ (1.25 mL) in a nitrogen filled glovebox at 23° C. was added a solution of $ZrBn_4$ (7.2 mg, 0.0157 mmol, 1.00 eq) in $C_6D_6$ (0.30 mL) in a dropwise manner. After stirring (500 rpm) for 1 hr the pale golden yellow solution was filtered using a 0.20 μm PTFE submicron filter to afford the zirconium complex as a 0.01 M solution in $C_6D_6$. NMR indicated product. The same procedure can be used with toluene as the solvent to prepare the procatalyst solution (0.005 M) which is used directly after filtration for the polymerization experiments.

$^1$H NMR (400 MHz, Benzene-$d_6$) δ 8.42 (d, J=1.8 Hz, 2H), 8.19 (d, J=1.9 Hz, 2H), 7.64 (d, J=8.5 Hz, 2H), 7.46 (ddd, J=8.7, 5.8, 1.9 Hz, 4H), 7.28 (d, J=8.7 Hz, 2H), 7.10-7.00 (m, 2H), 6.97-6.93 (m, 2H), 6.80-6.67 (m, 6H), 6.62 (s, 2H), 6.35-6.29 (m, 2H), 6.14-6.06 (m, 4H), 5.18 (dd, J=7.9, 1.4 Hz, 2H), 4.04 (t, J=10.5 Hz, 2H), 3.35 (dd, J=11.8, 4.5 Hz, 2H), 1.45 (s, 18H), 1.26 (s, 18H), 0.99 (d, J=12.1 Hz, 2H), 0.76 (t, J=9.1 Hz, 2H), 0.61 (t, J=12.8 Hz, 2H), 0.46 (d, J=12.2 Hz, 2H). $^{13}$C NMR (101 MHz, Benzene-$d_6$) δ 155.80, 151.78, 146.61, 143.34, 143.08, 139.98, 139.59, 133.04, 131.33, 130.53, 130.21, 128.88, 128.30, 126.71, 125.79, 125.26, 124.87, 123.21, 122.80, 122.74, 120.78, 116.56, 116.38, 115.83, 115.71, 112.39, 109.35, 80.63, 74.21, 34.55, 34.39, 31.94, 31.68, 25.88.

Example 34: Synthesis of Procatalyst 18

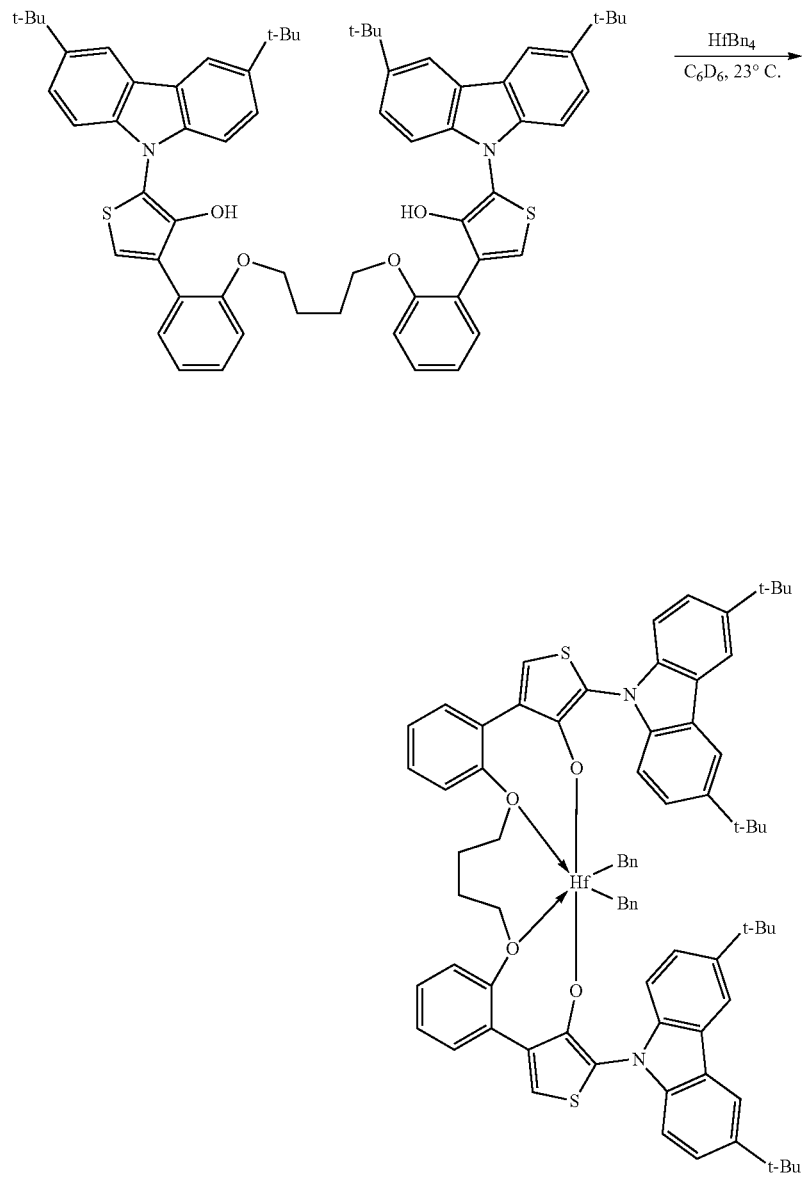

The thiophene ligand was azeotropically dried using toluene (4×10 mL) prior to use. To a clear colorless solution of the thiophene (13.3 mg, 0.01339 mmol, 1.00 eq) in anhydrous $C_6D_6$ (1.00 mL) in a nitrogen filled glovebox at 23° C. was added a solution of $HfBn_4$ (7.3 mg, 0.01339 mmol, 1.00 eq) in $C_6D_6$ (0.31 mL) in a dropwise manner. After stirring (500 rpm) for 1 hr the pale golden yellow solution was filtered using a 0.20 μm PTFE submicron filter to afford the hafnium complex as a 0.01 M solution in $C_6D_6$. The same procedure can be used with toluene as the solvent to prepare the procatalyst solution (0.005 M) which is used directly after filtration for the polymerization experiments.

$^1$H NMR (400 MHz, Benzene-$d_6$) δ 8.44 (d, J=1.8 Hz, 2H), 8.19 (d, J=1.8 Hz, 2H), 7.65-7.60 (m, 2H), 7.45 (ddd, J=10.7, 8.6, 1.9 Hz, 4H), 7.19 (dd, J=8.6, 0.6 Hz, 2H), 7.10-7.03 (m, 2H), 6.95 (ddq, J=7.3, 1.4, 0.7 Hz, 2H), 6.78-6.73 (m, 4H), 6.74-6.68 (m, 4H), 6.61 (s, 2H), 6.16-6.10 (m, 4H), 5.18 (dd, J=8.1, 1.3 Hz, 2H), 4.07 (t, J=10.8 Hz, 2H), 3.43-3.34 (m, 2H), 1.46 (s, 18H), 1.26 (s, 18H), 0.87 (d, J=13.2 Hz, 2H), 0.79-0.68 (m, 2H), 0.57-0.47 (m, 2H), 0.19 (d, J=13.2 Hz, 2H). $^{13}$C NMR (126 MHz, Benzene-$d_6$) δ 155.63, 151.81, 147.60, 143.41, 143.11, 139.92, 139.58, 132.72, 131.40, 130.30, 128.96, 128.15, 127.99, 127.28, 126.99, 126.91, 126.04, 125.29, 124.96, 123.58, 122.73, 122.67, 120.76, 116.45, 116.38, 116.29, 115.64, 112.53, 109.37, 81.66, 78.32, 34.57, 34.41, 31.97, 31.70, 26.09.

Example 35: Synthesis of Ligand 8

A mixture of the dibromide (361.5 mg, 0.5074 mmol, 1.00 eq), Pd(AmPhos)$Cl_2$ (72.0 mg, 0.1015 mmol, 0.20 eq), $K_3PO_4$ (969.0 mg, 4.566 mmol, 9.00 eq), and the m-terphenyl boropinacolate ester (542.0 mg, 1.522 mmol, 3.00 eq) was evacuated, back-filled with nitrogen, this process was repeated 4× more, then freshly sparged deoxygenated 1,4-dioxane (6.0 mL) and $H_2O$ (0.8 mL) were added sequentially. The canary yellow mixture was then placed in a mantle heated to 50° C., stirred vigorously (1000 rpm) for 48 hrs, the dark grey mixture was removed from the mantle, allowed to cool to ambient temperature, diluted with $CH_2Cl_2$ (20 mL), suction filtered over a pad of silica gel, rinsed with $CH_2Cl_2$ (4×20 mL), the resultant filtrate was concentrated onto celite, and purified via silica gel chromatography; 10% $CH_2Cl_2$-65% $CH_2Cl_2$ in hexanes to afford the protected coupled product as a white foam (393.0 mg, 0.3886 mmol, 77%). NMR indicated product with trace impurities.

To a solution of the protected coupled bisthiophene (393.0 mg, 0.3886 mmol, 1.00 eq) in $CH_2Cl_2$ (5 mL) and 1,4-dioxane (5 mL) under nitrogen was added concentrated HCl (5 mL, 37% aqueous) via syringe. The golden yellow solution was stirred (500 rpm) for 20 hrs, diluted with aqueous HCl (10 mL, 1 N) and $CH_2Cl_2$ (10 mL), poured into a separatory funnel, partitioned, organics were washed with aqueous HCl (1×10 mL, 1 N), residual organics were extracted from the aqueous using $CH_2Cl_2$ (2×20 mL), combined, dried over solid $Na_2SO_4$, decanted, concentrated onto celite, and purified via silica gel chromatography; 25%-55% $CH_2Cl_2$ in hexanes to afford the bis-hydroxythiophene as a

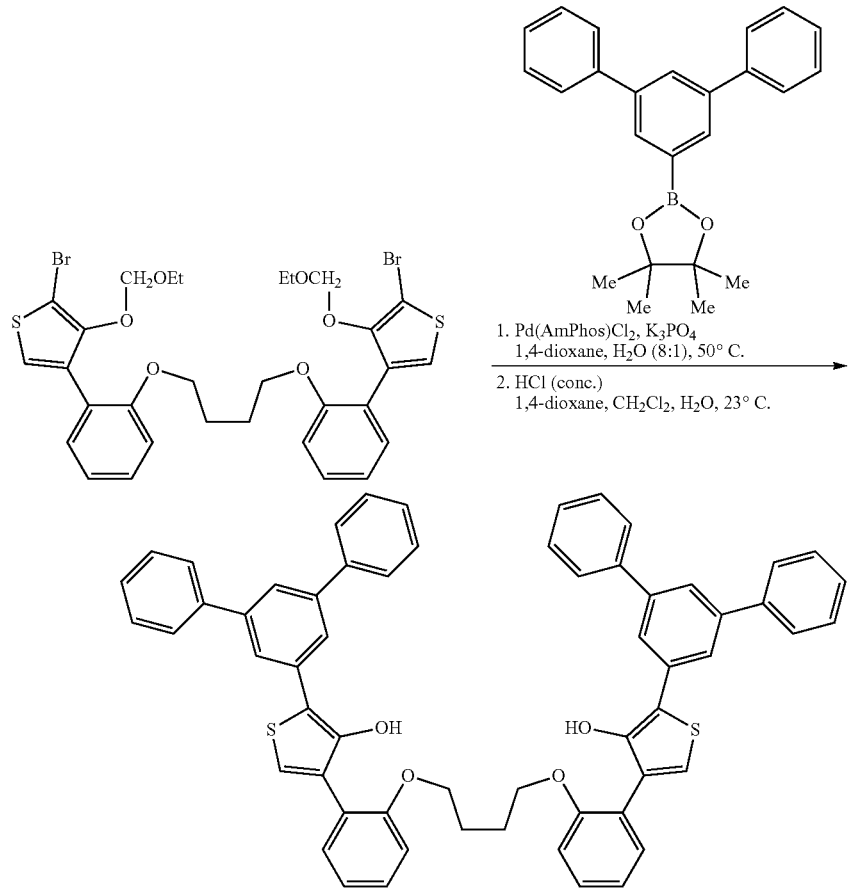

white foam (213.0 mg, 0.2380 mmol, 61%, 47% two steps). NMR indicated pure product.

$^1$H NMR (500 MHz, Chloroform-d) δ 8.15 (d, J=1.7 Hz, 4H), 7.79 (d, J=1.4 Hz, 4H), 7.77 (q, J=1.3 Hz, 6H), 7.57-7.50 (m, 8H), 7.47-7.42 (m, 6H), 7.31-7.25 (m, 2H), 7.12 (s, 2H), 7.10 (td, J=7.5, 1.1 Hz, 2H), 6.88 (dd, J=8.3, 1.0 Hz, 2H), 4.11-3.99 (m, 4H), 1.98-1.88 (m, 4H). $^{13}$C NMR (126 MHz, Chloroform-d) δ 154.04, 148.57, 142.10, 141.35, 135.00, 133.04, 131.71, 129.55, 128.90, 127.55, 127.42, 124.75, 124.74, 124.24, 122.93, 120.27, 119.49, 114.03, 69.85, 25.93.

Characterization of the Protected Ligand:

$^1$H NMR (500 MHz, Chloroform-d) δ 7.98 (d, J=1.6 Hz, 4H), 7.74 (d, J=1.9 Hz, 2H), 7.70 (d, J=7.4 Hz, 8H), 7.54-7.43 (m, 10H), 7.43-7.35 (m, 4H), 7.29-7.21 (m, 4H), 6.99 (t, J=7.4 Hz, 2H), 6.87 (d, J=8.2 Hz, 2H), 4.71 (s, 4H), 4.00 (d, J=5.3 Hz, 4H), 3.19 (q, J=7.0 Hz, 4H), 2.04-1.89 (m, 4H), 0.73 (t, J=7.0 Hz, 6H). $^{13}$C NMR (126 MHz, Chloroform-d) δ 156.42, 149.33, 142.07, 140.99, 134.37, 133.67, 130.96, 128.89, 128.83, 127.54, 127.52, 127.26, 125.64, 124.80, 124.42, 121.59, 120.50, 112.52, 97.35, 68.03, 64.97, 26.05, 14.57.

Example 36: Synthesis of Procatalyst 19

The thiophene ligand was azeotropically dried using toluene (4×10 mL) prior to use. To a clear colorless solution of the thiophene (9.3 mg, 0.0104 mmol, 1.00 eq) in anhydrous C$_6$D$_6$ (1.05 mL) in a nitrogen filled glovebox at 23° C. was added a solution of ZrBn$_4$ (4.7 mg, 0.0104 mmol, 1.00 eq) in C$_6$D$_6$ (0.19 mL) in a dropwise manner. After stirring (500 rpm) for 1 hr the pale golden yellow solution was filtered using a 0.20 µm PTFE submicron filter to afford the zirconium complex as a 0.01 M solution in C$_6$D$_6$. The same procedure can be used with toluene as the solvent to prepare the procatalyst solution (0.005 M) which is used directly after filtration for the polymerization experiments.

$^1$H NMR (400 MHz, Benzene-d$_6$) δ 8.38 (d, J=1.7 Hz, 4H), 7.73 (t, J=1.7 Hz, 2H), 7.61-7.55 (m, 8H), 7.17-7.12 (m, 8H), 7.11-6.92 (m, 12H), 6.77 (td, J=7.4, 1.3 Hz, 2H), 6.71 (ddt, J=9.2, 7.5, 1.6 Hz, 4H), 6.67 (s, 2H), 6.35-6.30 (m, 4H), 6.19 (dd, J=8.1, 1.3 Hz, 2H), 4.14 (dd, J=11.9, 9.9 Hz, 2H), 3.47 (dd, J=12.0, 4.6 Hz, 2H), 2.28 (d, J=12.1 Hz, 2H), 1.53 (d, J=12.0 Hz, 2H), 0.84-0.73 (m, 2H), 0.47 (d, J=12.0 Hz, 2H). $^{13}$C NMR (101 MHz, Benzene-d$_6$) δ 155.21, 154.56, 147.21, 142.96, 141.03, 135.65, 135.24, 131.66, 130.03, 129.45, 128.73, 128.15, 126.62, 126.12, 125.38, 124.70, 123.11, 121.04, 119.70, 119.02, 80.45, 76.42, 26.58.

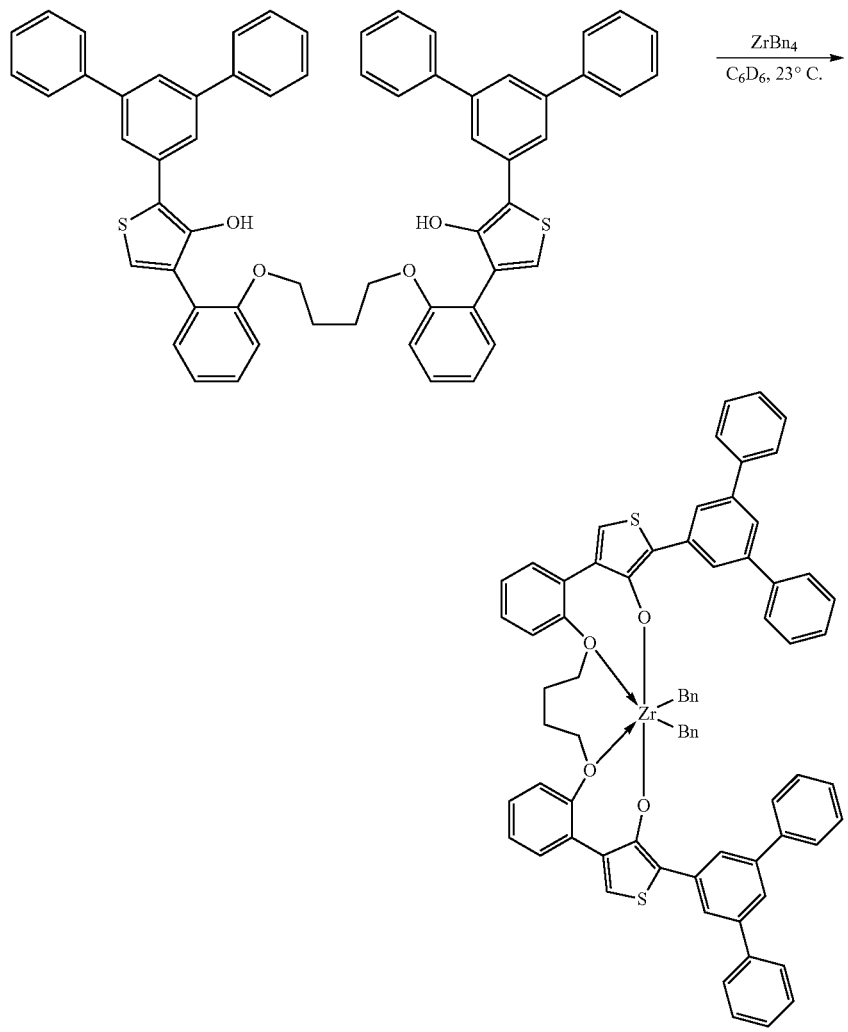

Example 37: Synthesis of Procatalyst 20

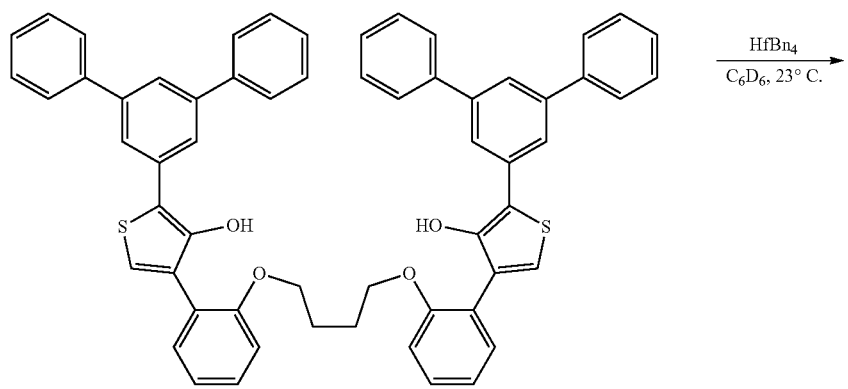

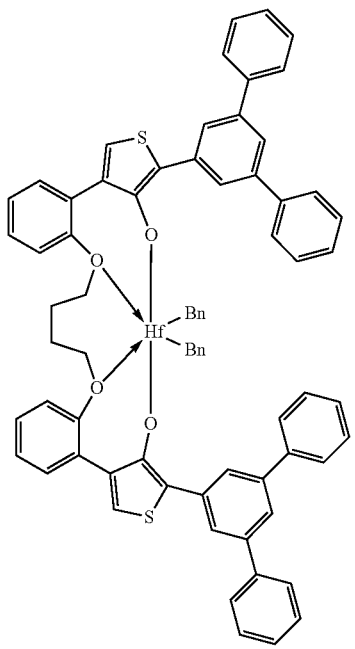

The thiophene ligand was azeotropically dried using toluene (4×10 mL) prior to use. To a clear colorless solution of the thiophene (10.3 mg, 0.0115 mmol, 1.00 eq) in anhydrous $C_6D_6$ (1.00 mL) in a nitrogen filled glovebox at 23° C. was added a solution of $HfBn_4$ (6.3 mg, 0.0115 mmol, 1.00 eq) in $C_6D_6$ (0.27 mL) in a dropwise manner. After stirring (500 rpm) for 1 hr the pale golden yellow solution was filtered using a 0.20 μm PTFE submicron filter to afford the hafnium complex as a 0.01 M solution in $C_6D_6$. The same procedure can be used with toluene as the solvent to prepare the procatalyst solution (0.005 M) which is used directly after filtration for the polymerization experiments.

$^1$H NMR (400 MHz, Benzene-$d_6$) δ 8.36 (d, J=1.7 Hz, 4H), 7.74 (t, J=1.7 Hz, 2H), 7.62-7.56 (m, 8H), 7.19-7.12 (m, 8H), 7.12-6.93 (m, 10H), 6.81-6.67 (m, 6H), 6.66 (s, 2H), 6.37-6.32 (m, 4H), 6.21 (dd, J=8.0, 1.4 Hz, 2H), 4.28-4.17 (m, 2H), 3.52 (dd, J=12.2, 4.7 Hz, 2H), 2.11 (d, J=13.0 Hz, 2H), 1.33 (d, J=13.0 Hz, 2H), 0.80 (dd, J=14.1, 6.2 Hz, 2H), 0.47-0.35 (m, 2H). $^{13}$C NMR (101 MHz, Benzene-$d_6$) δ 155.13, 154.62, 147.58, 142.94, 141.03, 137.46, 135.60, 134.98, 131.65, 130.05, 129.42, 128.73, 128.15, 127.19, 127.17, 126.28, 125.28, 124.65, 123.28, 121.18, 119.65, 119.48, 81.28, 80.66, 26.74.

Example 38: Synthesis of Boropinacolate Intermediate for Ligand 8

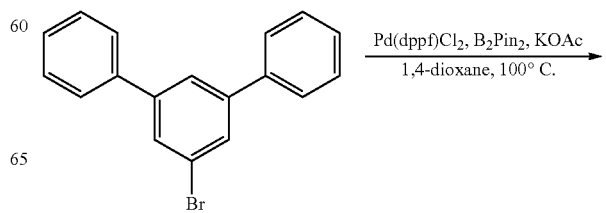

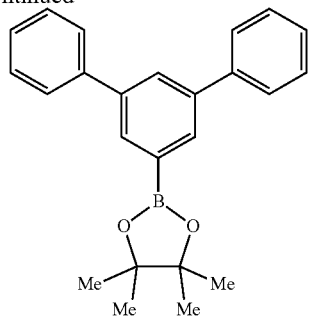

In a nitrogen filled glovebox a mixture of the bromo-m-terphenyl (3.350 g, 10.834 mmol, 1.00 eq), Pd(dppf)Cl₂ (0.442 g, 0.5417 mmol, 0.05 eq), B₂Pin₂ (4.127 g, 16.251 mmol, 1.50 eq), and KOAc (3.190 g, 32.502 mmol, 3.00 eq) in anhydrous deoxygenated 1,4-dioxane (100 mL) was placed in a mantle heated to 100° C., stirred vigorously (1000 rpm) for 24 hrs, removed from the heating mantle, allowed to cool gradually to 23° C., suction filtered through a pad of silica gel, rinsed with CH₂Cl₂ (4×25 mL), the resulting filtrate solution was concentrated onto celite, and purified via silica gel chromatography; 10% CH₂Cl₂-100% CH₂Cl₂ in hexanes to afford the boropinacolate ester as a white solid (3.446 g, 9.672 mmol, 89%). NMR indicated pure product.

$^1$H NMR (500 MHz, Chloroform-d) δ 8.08 (dt, J=2.7, 1.7 Hz, 2H), 7.95 (p, J=2.0 Hz, 1H), 7.73 (dq, J=7.9, 1.5 Hz, 4H), 7.48 (tt, J=8.0, 1.5 Hz, 4H), 7.39 (ddt, J=8.3, 6.9, 1.3 Hz, 2H), 1.42 (s, 6H), 1.41 (s, 6H). $^{13}$C NMR (126 MHz, Chloroform-d) δ 141.15, 141.09, 132.49, 128.91, 128.68, 127.36, 127.31, 83.95, 24.90.

Example 39: Synthesis of Ligand 9

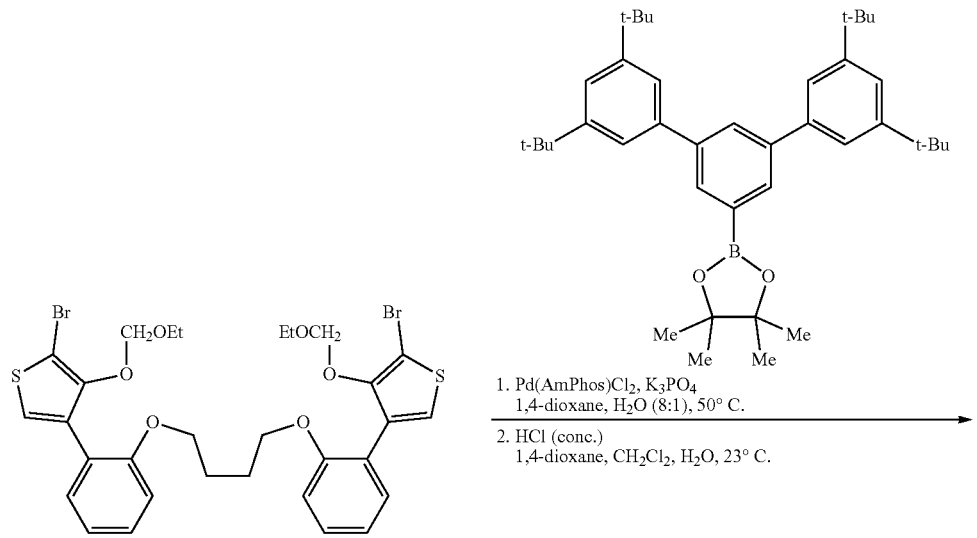

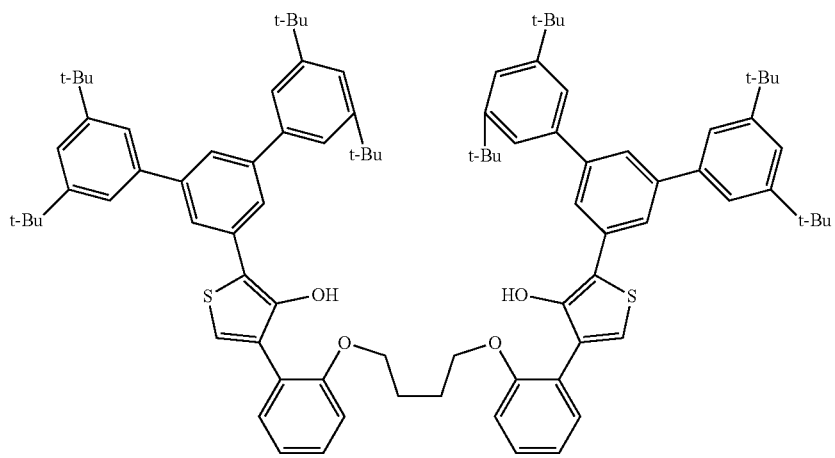

A mixture of the dibromide (268.7 mg, 0.3771 mmol, 1.00 eq), Pd(AmPhos)Cl$_2$ (53.0 mg, 0.0754 mmol, 0.20 eq), K$_3$PO$_4$ (720.0 mg, 3.394 mmol, 9.00 eq), and the m-bis(3,5-di-t-butylphenyl)terphenyl boropinacolate ester (689.0 mg, 1.186 mmol, 3.15 eq) was evacuated, back-filled with nitrogen, this process was repeated 4× more, then freshly sparged deoxygenated 1,4-dioxane (7.5 mL) and H$_2$O (1.0 mL) were added sequentially. The canary yellow mixture was then placed in a mantle heated to 50° C., stirred vigorously (1000 rpm) for 48 hrs, the dark grey mixture was removed from the mantle, allowed to cool to ambient temperature, diluted with CH$_2$Cl$_2$ (20 mL), suction filtered over a pad of silica gel, rinsed with CH$_2$Cl$_2$ (4×20 mL), the resultant filtrate was concentrated onto celite, and purified via silica gel chromatography; 10% CH$_2$Cl$_2$-50% CH$_2$Cl$_2$ in hexanes to afford the protected coupled product as a white foam (476.0 mg, 0.3260 mmol, 86%). NMR indicated pure product.

To a solution of the protected coupled bisthiophene (476.0 mg, 0.3260 mmol, 1.00 eq) in CH$_2$Cl$_2$ (5 mL) and 1,4-dioxane (5 mL) under nitrogen was added concentrated HCl (5 mL, 37% aqueous) via syringe. The golden yellow solution was stirred (500 rpm) for 24 hrs, diluted with aqueous HCl (10 mL, 1 N) and CH$_2$Cl$_2$ (10 mL), poured into a separatory funnel, partitioned, organics were washed with aqueous HCl (1×10 mL, 1 N), residual organics were extracted from the aqueous using CH$_2$Cl$_2$ (2×20 mL), combined, dried over solid Na$_2$SO$_4$, decanted, concentrated onto celite, and purified via silica gel chromatography; 10%-25% CH$_2$Cl$_2$ in hexanes to afford the bis-hydroxythiophene as a white foam (251.0 mg, 0.1868 mmol, 57%). NMR indicated pure product.

$^1$H NMR (400 MHz, Chloroform-d) δ 8.02 (d, J=1.6 Hz, 4H), 7.65 (t, J=1.7 Hz, 2H), 7.52 (s, 4H), 7.51 (s, 4H), 7.48 (t, J=1.8 Hz, 4H), 7.41 (dd, J=7.6, 1.7 Hz, 2H), 7.24 (td, J=7.7, 1.7 Hz, 2H), 7.08 (d, J=4.9 Hz, 4H), 7.05 (td, J=7.5, 1.0 Hz, 2H), 6.85 (dd, J=8.3, 1.1 Hz, 2H), 4.10-4.01 (m, 4H), 1.95-1.85 (m, 4H), 1.39 (s, 72H). $^{13}$C NMR (101 MHz, Chloroform-d) δ 153.95, 151.14, 148.35, 143.27, 141.04, 134.49, 132.94, 131.67, 129.45, 125.13, 124.87, 124.72, 122.79, 122.01, 121.52, 120.04, 119.60, 113.86, 69.68, 35.01, 31.55, 25.79.

Characterization of the Protected Coupled Product $^1$H NMR (400 MHz, Chloroform-d) δ 7.94 (d, J=1.6 Hz, 4H), 7.70 (d, J=1.8 Hz, 2H), 7.52-7.49 (m, 14H), 7.28-7.18 (m, 4H), 6.97 (t, J=7.4 Hz, 2H), 6.85 (d, J=8.3 Hz, 2H), 4.71 (s, 4H), 3.99 (d, J=5.4 Hz, 4H), 3.19 (q, J=7.0 Hz, 4H), 1.96 (q, J=3.4, 2.9 Hz, 4H), 1.41 (s, 72H), 0.72 (t, J=7.0 Hz, 6H). $^{13}$C NMR (101 MHz, Chloroform-d) δ 156.35, 151.21, 149.18, 143.32, 140.80, 133.99, 133.52, 130.97, 128.81, 127.74, 125.82, 125.79, 124.30, 121.92, 121.64, 121.53, 120.39, 112.33, 97.24, 67.89, 64.98, 35.02, 31.56, 25.99, 14.57.

Example 40: Synthesis of Procatalyst 21

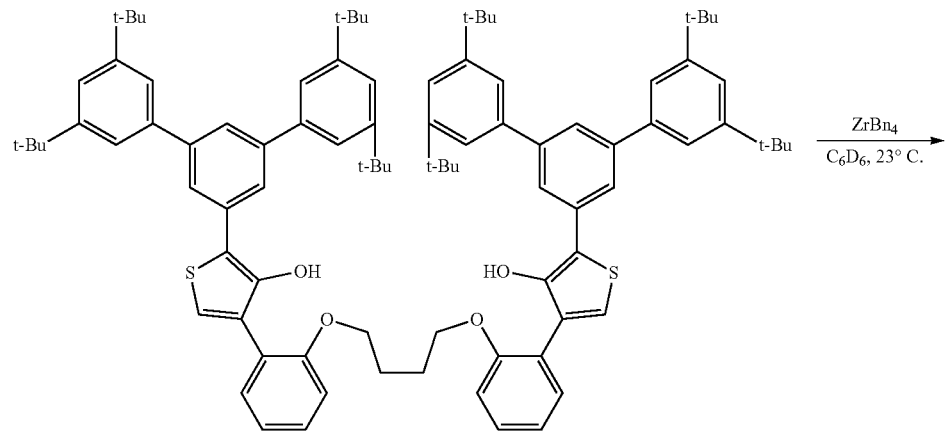

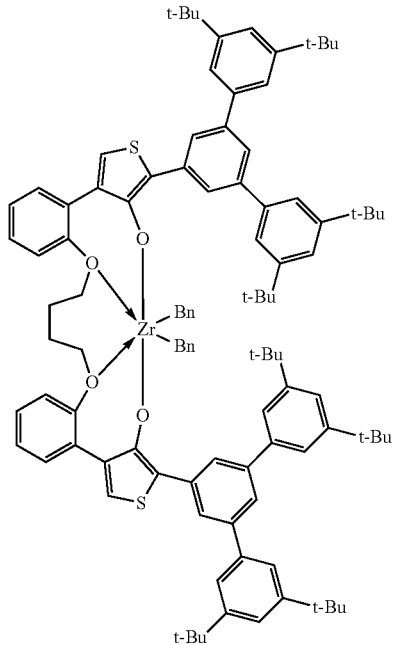

The thiophene ligand was azeotropically dried using toluene (4×10 mL) prior to use. To a clear colorless solution of the thiophene (17.5 mg, 0.01302 mmol, 1.00 eq) in anhydrous $C_6D_6$ (1.00 mL) in a nitrogen filled glovebox at 23° C. was added a solution of $ZrBn_4$ (5.9 mg, 0.01302 mmol, 1.00 eq) in $C_6D_6$ (0.24 mL) in a dropwise manner. After stirring (500 rpm) for 1 hr the pale golden yellow solution was filtered using a 0.20 μm PTFE submicron filter to afford the zirconium complex as a 0.01 M solution in $C_6D_6$. The same procedure can be used with toluene to prepare the procatalyst solution (0.005 M) which is used directly after filtration for the polymerization experiments.

$^1$H NMR (400 MHz, Benzene-$d_6$) δ 8.44 (d, J=1.6 Hz, 4H), 8.04 (t, J=1.7 Hz, 2H), 7.68 (d, J=1.8 Hz, 8H), 7.45 (t, J=1.8 Hz, 4H), 7.12-7.00 (m, 2H), 6.99-6.93 (m, 2H), 6.91-6.83 (m, 6H), 6.70-6.64 (m, 2H), 6.61 (s, 2H), 6.21 (dd, J=8.3, 1.1 Hz, 2H), 6.15-6.10 (m, 4H), 4.15 (t, J=10.7 Hz, 2H), 3.50 (dd, J=12.0, 3.5 Hz, 2H), 2.15 (d, J=12.3 Hz, 2H), 1.55 (d, J=12.3 Hz, 2H), 1.23 (s, 72H), 0.75-0.65 (t, J=9.3 Hz, 2H), 0.43-0.30 (m, 2H). $^{13}$C NMR (101 MHz, Benzene-$d_6$) δ 155.73, 154.60, 151.09, 147.57, 144.73, 141.38, 135.46, 134.94, 131.48, 130.10, 129.57, 128.15, 127.17, 126.18, 126.02, 125.88, 125.55, 123.19, 122.10, 121.60, 120.67, 119.56, 119.22, 80.64, 77.44, 34.62, 31.24, 26.57.

Example 41: Synthesis of Procatalyst 22

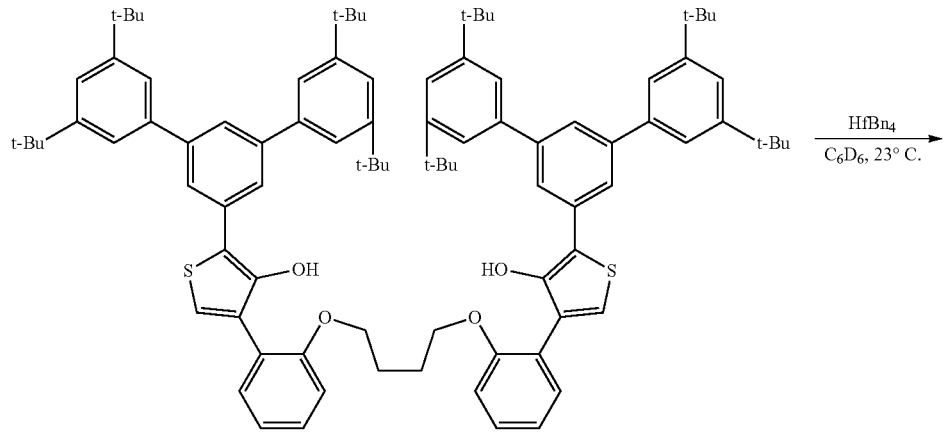

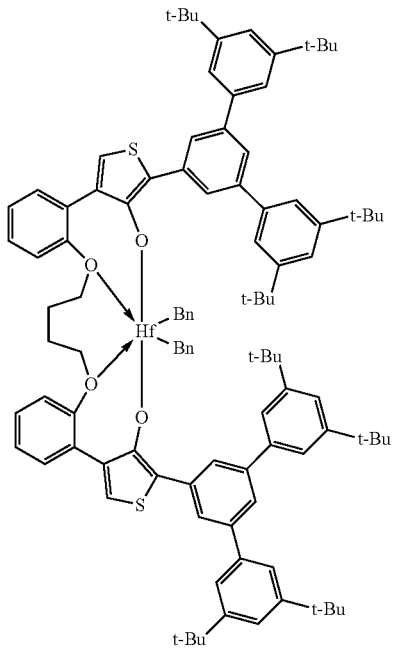

The thiophene ligand was azeotropically dried using toluene (4×10 mL) prior to use. To a clear colorless solution of the thiophene (18.2 mg, 0.01354 mmol, 1.00 eq) in anhydrous $C_6D_6$ (1.05 mL) in a nitrogen filled glovebox at 23° C. was added a solution of $HfBn_4$ (7.4 mg, 0.01354 mmol, 1.00 eq) in $C_6D_6$ (0.30 mL) in a dropwise manner. After stirring (500 rpm) for 1 hr the pale golden yellow solution was filtered using a 0.20 μm PTFE submicron filter to afford the hafnium complex as a 0.01 M solution in $C_6D_6$. The same procedure can be used with toluene as a solvent to prepare the procatalyst solution (0.005 M) which is used directly after filtration for the polymerization experiments.

$^1$H NMR (400 MHz, Benzene-$d_6$) δ 8.42 (d, J=1.6 Hz, 4H), 8.05 (t, J=1.7 Hz, 2H), 7.70 (d, J=1.8 Hz, 8H), 7.45 (t, J=1.8 Hz, 4H), 7.12-7.05 (m, 4H), 7.01-6.83 (m, 6H), 6.69-6.63 (m, 2H), 6.60 (s, 2H), 6.25 (dd, J=8.7, 1.1 Hz, 2H), 6.17-6.11 (m, 4H), 4.24 (t, J=10.9 Hz, 2H), 3.56 (d, J=11.9 Hz, 2H), 1.97 (d, J=13.2 Hz, 2H), 1.33 (d, J=13.3 Hz, 2H), 1.24 (s, 72H), 0.69 (t, J=9.7 Hz, 2H), 0.34-0.24 (m, 2H). $^{13}$C NMR (126 MHz, Benzene-$d_6$) δ 155.67, 154.67, 151.12, 147.89, 144.71, 141.38, 135.43, 134.72, 131.49, 130.16, 129.55, 128.17, 128.13, 127.99, 127.29, 126.94, 126.86, 126.03, 125.92, 125.49, 123.40, 122.11, 121.64, 120.88, 119.67, 119.53, 81.49, 81.31, 34.65, 31.26, 26.78.

Example 42: Synthesis Boropinacolate Ester Intermediate to Ligand 9

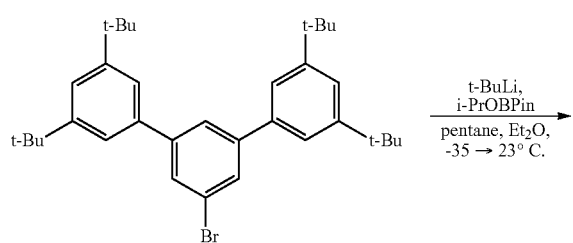

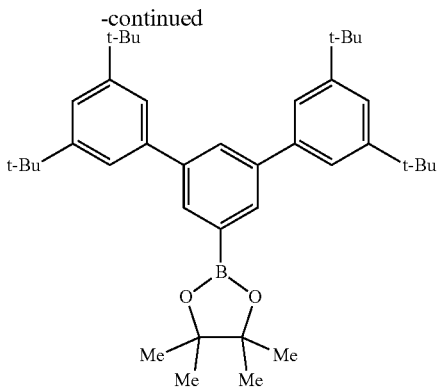

To a precooled solution of t-BuLi (3.6 mL, 6.122 mmol, 3.30 eq, 1.7 M in pentane) in anhydrous deoxygenated pentane (20 mL) in a nitrogen filled glovebox at −35° C. (precooled for 16 hrs) was added a precooled solution of the 3,5-bis-(3,5-di-t-Buphenyl)-m-terphenyl bromide (0.990 g, 1.855 mmol, 1.00 eq) in pentane/$Et_2O$ (20 mL, 1:1) in a dropwise manner over 10 mins. The now golden yellow mixture was allowed to sit in the freezer (−35° C.) for 4 hrs upon which neat i-PrOBPin (1.25 mL, 6.122 mmol, 3.30 eq) was added via syringe. The now pale yellow heterogeneous mixture was allowed to stir at 23° C. for 3 hrs, i-PrOH (3 mL) was added to neutralize any residual t-BuLi, the mixture was removed from the glovebox, water (20 mL) and $Et_2O$ (30 mL) was added, the biphasic mixture was stirred for 2 mins, poured into a separatory funnel, partitioned, organics were washed with water (2×25 mL), residual organics were extracted with $Et_2O$ (2×25 mL), combined, dried over solid $Na_2SO_4$, decanted, concentrated onto celite, and purified via silica gel chromatography on the ISCO; hexanes—50% $CH_2Cl_2$ in hexanes to afford the mesityl-m-terphenyl boropinacolate ester as a white foam (0.689 g, 1.187 mmol, 64%). NMR indicated pure product.

$^1$H NMR (400 MHz, Chloroform-$d_6$) δ 8.07 (s, 2H), 7.95 (s, 1H), 7.60 7.50 (m, 6H), 1.48 (s, 36H), 1.46 (s, 12H). $^{13}$C NMR (101 MHz, Chloroform-d) δ 151.11, 142.63, 141.07, 132.62, 130.23, 122.12, 121.46, 83.93, 35.08, 31.67, 24.95.

Example 43: Synthesis of Bromide Intermediated to Ligand 9

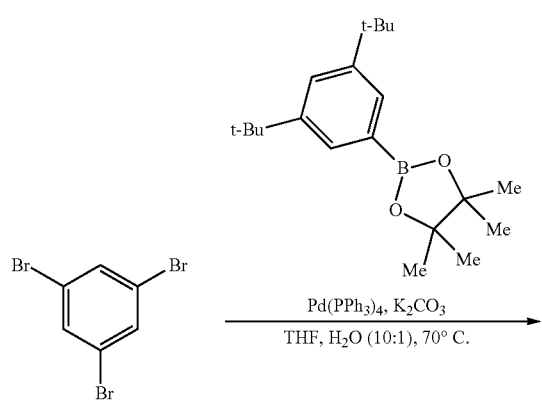

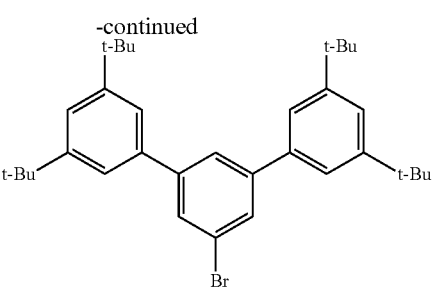

A mixture of the tribromobenzene (2.299 g, 7.303 mmol, 1.00 eq), 3,5-di-t-butylphenyl boropinacolate ester (6.237 g, 19.719 mmol, 2.70 eq), Pd(PPh$_3$)$_4$ (0.844 g, 0.7303 mmol, 0.10 eq), and K$_2$CO$_3$ (8.176 g, 59.154 mmol, 8.10 eq) equipped with a reflux condenser was evacuated, then back-filled with nitrogen, this evacuation/re-fill process was repeated 3× more, freshly deoxygenated THF (50 mL) and H$_2$O (5.0 mL) were added simultaneously via syringes, the golden yellow mixture was placed in a mantle heated to 70° C., stirred vigorously (1000 rpm) for 24 hrs, removed from the mantle, allowed to cool gradually to 23° C., the golden yellow suspension was suction filtered through silica gel, rinsed with CH$_2$Cl$_2$ (4×20 mL), the yellow filtrate solution was concentrated onto celite, and purified via silica gel chromatography; hexanes to afford the 3,5-bis-(3,5-di-t-Buphenyl)phenyl bromide as a white solid (0.990 g, 1.855 mmol, 25%). NMR indicated pure product.

$^1$H NMR (500 MHz, Chloroform-d) δ 7.72 7.69 (m, 3H), 7.52 (t, J=1.8 Hz, 2H), 7.44 (d, J=1.8 Hz, 4H), 1.42 (s, 36H). $^{13}$C NMR (126 MHz, Chloroform-d) δ 151.45, 144.95, 139.54, 128.98, 125.69, 122.87, 122.12, 121.81, 35.05, 31.54.

Example 44: Synthesis of Ligand 10

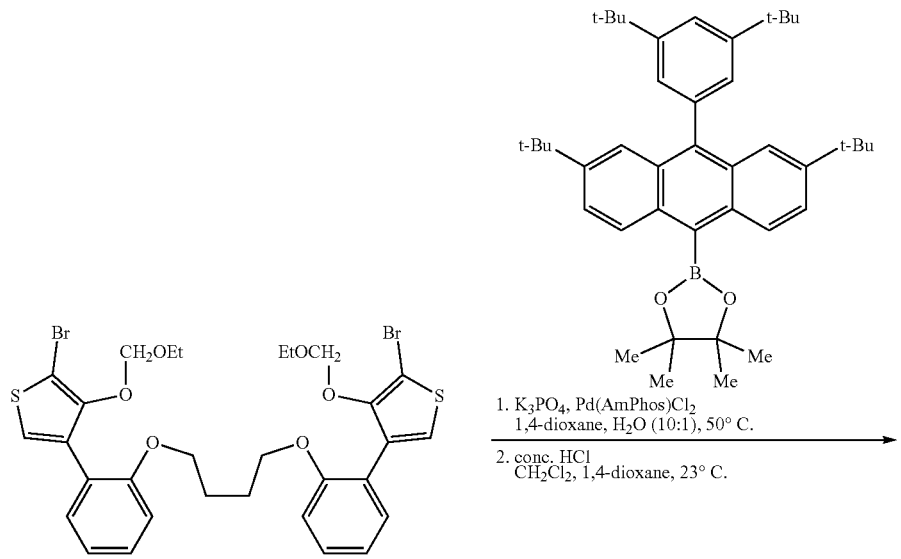

-continued

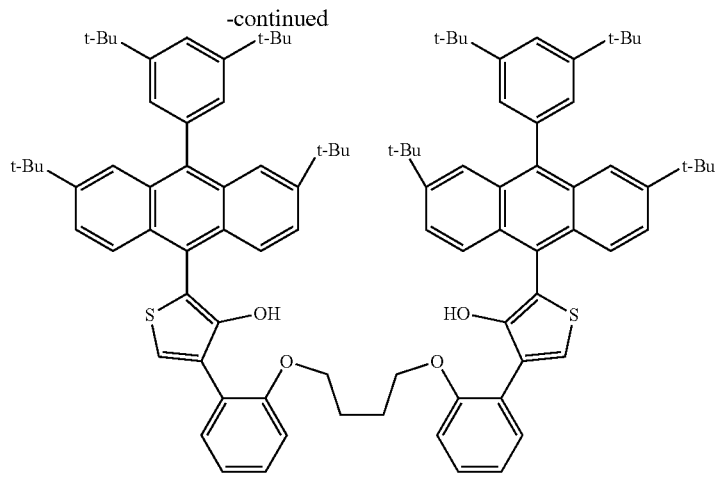

To vial equipped with a stirbar was added the dibromide (0.407 g, 0.5712 mmol, 1.00 eq), $K_3PO_4$ (1.091 g, 5.141 mmol, 9.0 eq), $Pd(AmPhos)Cl_2$ (81.0 mg, 0.1142 mmol, 0.20 eq), and the anthracenylboropinacol ester (0.960 g, 1.588 mmol, 2.78 eq). The mixture was evacuated, then back-filled with nitrogen, this process was repeated 3× more, then deoxygenated 1,4-dioxane (6.0 mL) and water (0.6 mL) were added sequentially via syringe. The vial was sealed with a PTFE cap under a purging flow of nitrogen, and then placed in a mantle heated to 50° C. After stirring (1000 rpm) for 36 hrs the purple-black mixture was removed from the mantle, allowed to cool gradually to 23° C., suction filtered over a pad of silica gel, washed with $CH_2Cl_2$ (4×20 mL), the clear purple filtrate was concentrated, residual 1,4-dioxane was remove azeotropically on the rotovap with toluene (3×10 mL), the resultant black mixture was suspended in $CH_2Cl_2$ (10 mL), suction filtered through silica gel to remove residual insoluble impurities, washed with $CH_2Cl_2$ (4×20 mL), the purple filtrate was concentrated onto celite, and purified via silica gel chromatography using an ISCO chromatography purification system; 25% 65% $CH_2Cl_2$ in hexanes to afford the bisprotected coupled thiophene as a golden yellow foam (0.588 g, 0.3899 mmol, 68%). NMR indicated pure product.

To a solution of the protected bisthiophene in $CH_2Cl_2$ (5 mL) and 1,4-dioxane (5 mL) was added conc. HCl (5 mL). The dark golden brown solution was vigorously stirred (1000 rpm) at 23° C. for 24 hrs under nitrogen, then diluted with aqueous HCl (25 mL, 1 N) and $CH_2Cl_2$ (20 mL), the biphasic mixture was poured into a separatory funnel, partitioned, organics were washed with aqueous HCl (2×20 mL, 1 N), the residual organics were extracted from the aqueous layer using $CH_2Cl_2$ (2×10 mL), combined, dried over solid $Na_2SO_4$, decanted, concentrated onto celite, and purified via silica gel chromatography using an ISCO chromatography purification system; 25%-80% $CH_2Cl_2$ in hexanes to afford the bishydroxythiophene ligand as a golden yellow amorphous foam (0.373 g, 0.2680 mmol, 69%, 47% two steps). NMR indicated pure product.

$^1$H NMR (500 MHz, Chloroform-d) δ 8.02 (d, J=9.2 Hz, 4H), 7.78 (d, J=2.0 Hz, 4H), 7.65 (dd, J=7.6, 1.7 Hz, 2H), 7.60 (t, J=1.9 Hz, 2H), 7.52 (dd, J=9.2, 2.0 Hz, 4H), 7.48 (s, 2H), 7.40 (dt, J=8.1, 1.7 Hz, 4H), 7.29 (td, J=7.8, 1.8 Hz, 2H), 7.15 (td, J=7.5, 1.1 Hz, 2H), 6.85-6.78 (m, 2H), 6.64 (s, 2H), 4.01 (d, J=4.7 Hz, 4H), 1.95 (q, J=2.9, 2.2 Hz, 4H), 1.47 (s, 18H), 1.46 (s, 18H), 1.29 (s, 36H). $^{13}$C NMR (126 MHz, Chloroform-d) δ 154.37, 150.32, 150.29, 149.60, 146.76, 139.56, 137.84, 131.58, 131.22, 130.21, 129.20, 126.28, 125.97, 124.96, 124.93, 124.61, 122.54, 122.23, 121.97, 120.49, 115.31, 113.56, 69.40, 35.07, 34.92, 31.71, 31.69, 30.92, 26.06.

Characterization of the Protected Ligand:

$^1$H NMR (400 MHz, Chloroform-d) δ 8.02 (d, J=9.3 Hz, 4H), 7.67 (d, J=1.9 Hz, 4H), 7.60 (dd, J=7.5, 1.8 Hz, 2H), 7.52 (t, J=1.8 Hz, 2H), 7.51 (d, J=0.9 Hz, 3H), 7.48 (d, J=2.0 Hz, 2H), 7.29 (dt, J=11.3, 1.6 Hz, 4H), 7.26 7.23 (m, 2H), 7.00 (td, J=7.5, 1.0 Hz, 2H), 6.97 (dd, J=8.3, 1.0 Hz, 2H), 4.45 (s, 4H), 4.14 (m, 4H), 2.68 (q, J=7.0 Hz, 4H), 2.10 (m, 4H), 1.39 (s, 18H), 1.38 (s, 18H), 1.24 (s, 36H), 0.44 (t, J=7.0 Hz, 6H). $^{13}$C NMR (101 MHz, Chloroform-d) δ 156.67, 151.30, 150.27, 150.18, 146.73, 139.47, 137.70, 132.60, 131.26, 130.00, 129.93, 128.73, 126.44, 125.94, 125.78, 125.16, 124.84, 124.71, 123.17, 122.24, 121.62, 120.48, 120.37, 112.28, 96.86, 68.12, 64.20, 34.98, 34.96, 34.87, 31.61, 31.59, 30.83, 26.25, 14.17.

Example 45: Synthesis of Procatalyst 23

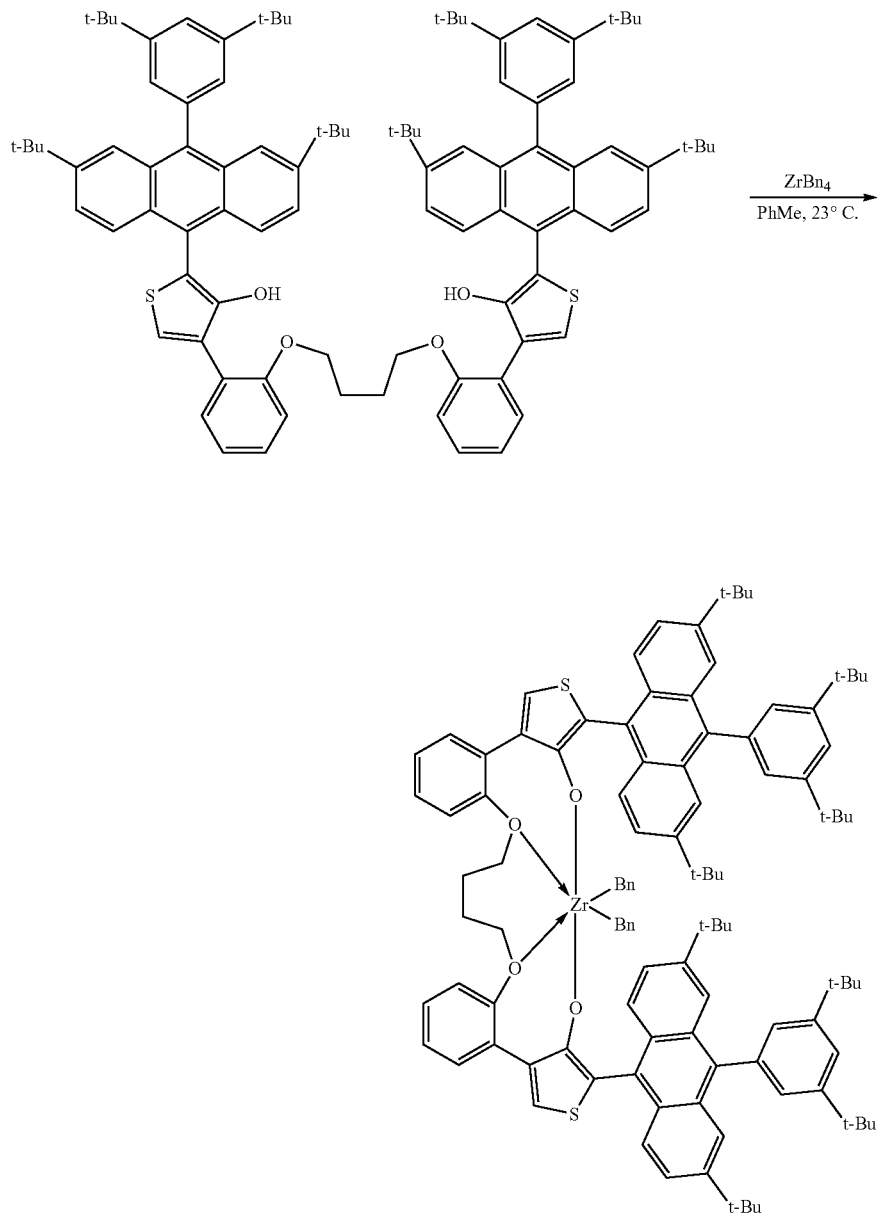

The thiophene ligand was azeotropically dried using toluene (4×10 mL) prior to use. To a clear golden yellow solution of the thiophene (21.8 mg, 0.0157 mmol, 1.00 eq) in anhydrous toluene (2.80 mL) in a nitrogen filled glovebox at 23° C. was added a solution of $ZrBn_4$ (7.1 mg, 0.0157 mmol, 1.00 eq) in toluene (0.29 mL) in a dropwise manner. After stirring (500 rpm) for 30 mins the pale golden yellow solution was concentrated, the resultant golden yellow solid was suspended in hexanes (3 mL), concentrated, this suspension/concentration process was repeated 2× more, the resultant complex was suspended in hexanes (3 mL), stirred vigorously (1000 rpm) for 2 mins, filtered through a 0.20 μm PTFE filter, rinsed with hexanes (3×3 mL), and the hexanes filtrate was concentrated to afford the zirconium complex as a golden yellow solid (25.7 mg, 0.0154 mmol, 98%). NMR indicated product which exists as a rotomeric mixture.

Only Chemical Shifts of the Major Isomer are Listed:
$^1$H NMR (400 MHz, Benzene-$d_6$) δ 8.72-8.67 (m, 2H), 8.24 (dt, J=2.4, 1.2 Hz, 2H), 8.11-8.04 (m, 2H), 7.81 (dd, J=2.0, 0.6 Hz, 2H), 7.66 (t, J=1.9 Hz, 2H), 7.60 (t, J=1.6 Hz, 2H), 7.45-7.24 (m, 8H), 7.05 (s, 2H), 7.04-6.79 (m, 10H), 6.74 (td, J=7.2, 1.3 Hz, 2H), 5.85-5.81 (m, 4H), 5.00 (dd, J=8.0, 1.4 Hz, 2H), 4.19-4.10 (m, 2H), 3.34 (d, J=11.8 Hz, 2H), 1.36 (s, 18H), 1.25 (s, 18H), 1.24 (s, 18H), 1.24-1.15 (m, 2H), 1.10 (s, 18H), 0.95-0.91 (m, 2H), 0.61 (d, J=11.9 Hz, 2H), 0.20 (d, J=11.9 Hz, 2H). $^{13}$C NMR (126 MHz, Benzene-$d_6$) δ 156.02, 155.85, 150.85, 150.68, 150.40, 147.60, 146.78, 146.28, 139.19, 138.76, 133.45, 131.64, 131.30, 130.64, 130.55, 130.20, 129.62, 129.31, 128.17, 126.10, 125.82, 125.41, 123.61, 123.17, 121.99, 121.58, 120.34, 120.29, 114.84, 109.99, 72.76, 72.01, 34.81, 34.74, 34.67, 34.63, 31.42, 31.29, 30.75, 30.60, 25.72.

Example 46: Synthesis of Procatalyst 24

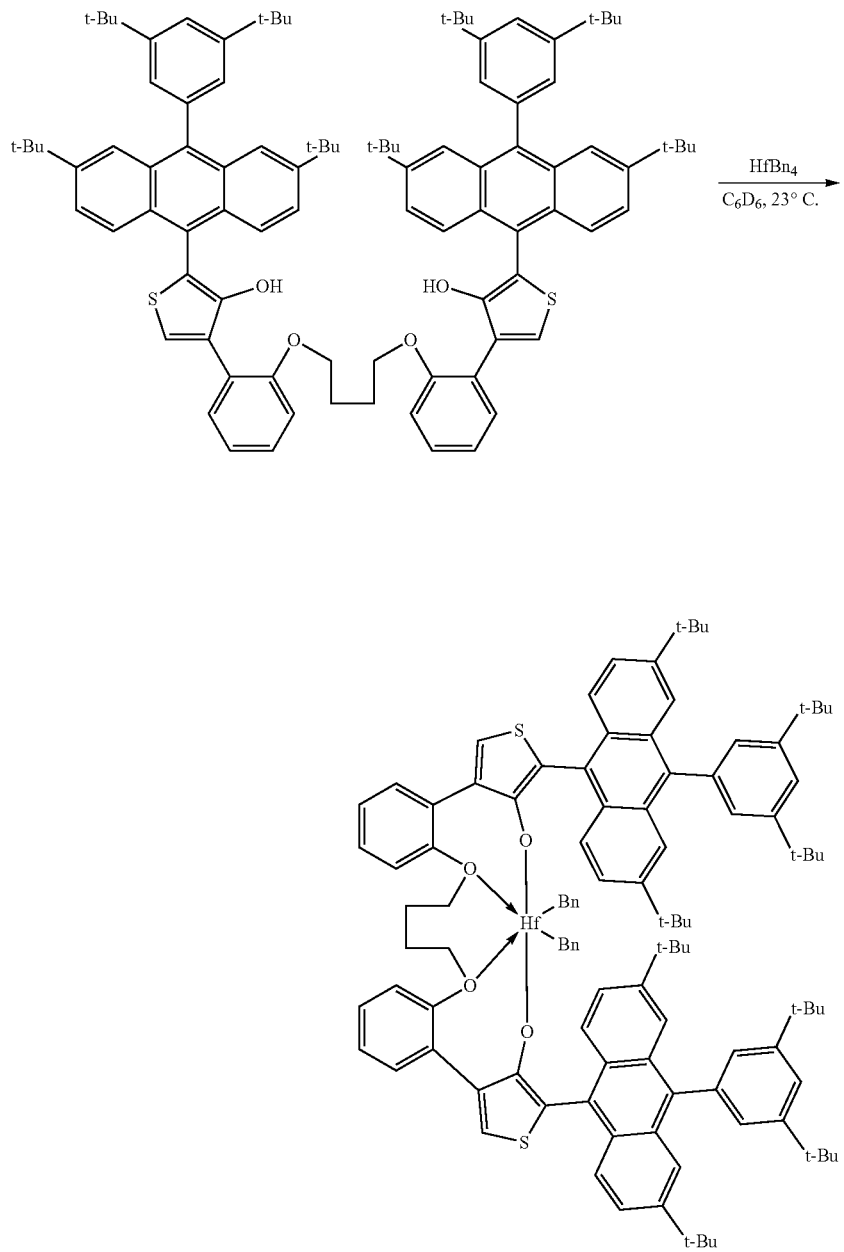

The thiophene ligand was azeotropically dried using toluene (4×10 mL) prior to use. To a clear golden yellow solution of the thiophene (15.6 mg, 0.0112 mmol, 1.00 eq) in anhydrous $C_6D_6$ (1.00 mL) in a nitrogen filled glovebox at 23° C. was added a solution of $HfBn_4$ (6.1 mg, 0.0112 mmol, 1.00 eq) in $C_6D_6$ (0.25 mL) in a dropwise manner. After stirring (500 rpm) for 20 mins the pale golden yellow solution was filtered using a 0.20 µm PTFE submicron filter to afford the hafnium complex as a 0.009 M solution in $C_6D_6$. NMR indicated product. The same procedure can be used with toluene to prepare the procatalyst solution (0.005 M) which is used directly after filtration for the polymerization experiments.

$^1$H NMR (400 MHz, Benzene-$d_6$) δ 8.68 (d, J=9.2 Hz, 2H), 8.25 (d, J=2.0 Hz, 2H), 8.01 (d, J=9.4 Hz, 2H), 7.81 (d, J=1.9 Hz, 2H), 7.67 (t, J=1.8 Hz, 2H), 7.61 (t, J=1.6 Hz, 2H), 7.39-7.35 (m, 4H), 7.31-7.26 (m, 4H), 7.05 (s, 2H), 7.09-6.85 (m, 10H), 6.76-6.70 (m, 2H), 5.93-5.86 (m, 4H), 4.95 (dd, J=7.9, 1.5 Hz, 2H), 4.14 (d, J=11.5 Hz, 2H), 3.33 (d, J=11.7 Hz, 2H), 1.36 (s, 18H), 1.34-1.31 (m, 2H), 1.25 (s, 18H), 1.24 (s, 18H), 1.11 (s, 18H), 0.91-0.84 (m, 2H), 0.50 (d, J=13.1 Hz, 2H), −0.09 (d, J=13.1 Hz, 2H). $^{13}$C NMR (101 MHz, Benzene-$d_6$) δ 156.08, 155.66, 150.85, 150.41, 147.82, 147.64, 146.26, 139.12, 138.79, 133.13, 131.61, 131.32, 130.62, 130.13, 129.42, 129.39, 128.89, 128.13, 127.97, 127.03, 127.00, 126.91, 126.79, 126.31, 126.25, 125.81, 125.66, 125.59, 125.26, 115.09, 80.70, 77.66, 34.79, 34.73, 34.64, 34.62, 31.40, 31.29, 30.73, 30.59, 25.84.

Example 47: Synthesis of Boropinacolate Ester Intermediate to Ligand 10

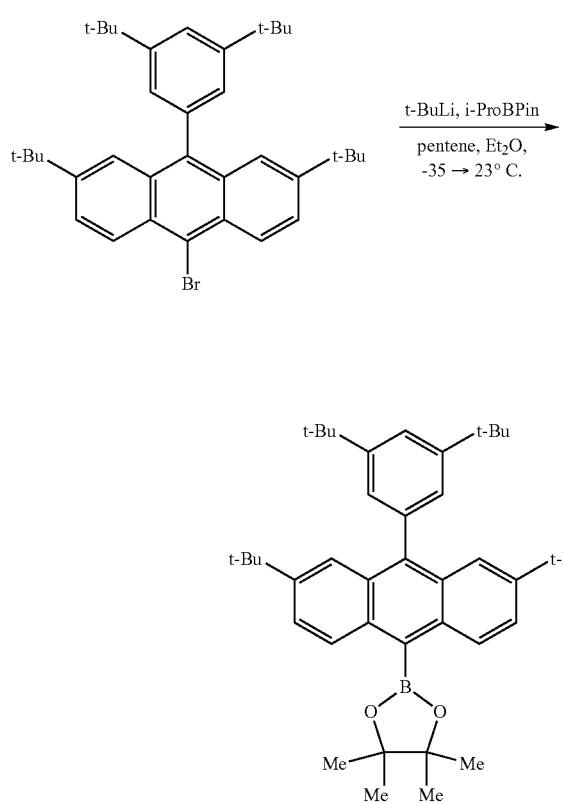

To a precooled solution of t-BuLi (3.2 mL, 5.397 mmol, 3.30 eq, 1.7 M in pentane) in anhydrous deoxygenated pentane (25 mL) in a nitrogen filled glovebox at −35° C. (precooled for 16 hrs) was added the solid anthracenylbromide (0.912 g, 1.635 mmol, 1.00 eq). Then, a precooled solution of pentane/Et$_2$O (30 mL, 1:1) was added in a quick dropwise manner while stirring vigorously (1000 rpm). The now golden yellow mixture was allowed to sit in the freezer (−35° C.) for 4 hrs upon which neat i-PrOBPin (1.25 mL, 6.122 mmol, 3.30 eq) was added via syringe to the now red-brown mixture. The now pale yellow heterogeneous mixture was allowed to stir at 23° C. for 3 hrs, i-PrOH (3 mL) was added to neutralize any residual t-BuLi, the mixture was removed from the glovebox, water (20 mL) and Et$_2$O (30 mL) was added, the biphasic mixture was stirred for 2 mins, poured into a separatory funnel, partitioned, organics were washed with water (2×25 mL), residual organics were extracted with Et$_2$O (2×25 mL), combined, dried over solid Na$_2$SO$_4$, decanted, concentrated, the resultant pale yellow mixture was suspended in CH$_2$Cl$_2$ (20 mL), suction filtered through silica gel, rinsed with CH$_2$Cl$_2$ (4×25 mL), and the resulting filtrate solution was concentrated to afford the anthracenyl boropinacolate ester as a pale yellow foam (0.960 g, 1.588 mmol, 97%). NMR indicated product.

$^1$H NMR (500 MHz, Chloroform-d) δ 8.49 (dd, J=9.1, 0.6 Hz, 2H), 7.70 (dd, J=2.1, 0.7 Hz, 2H), 7.61 (dd, J=9.2, 2.1 Hz, 2H), 7.56 (t, J=1.9 Hz, 1H), 7.31 (d, J=1.8 Hz, 2H), 1.62 (s, 12H), 1.43 (s, 18H), 1.32 (s, 18H). $^{13}$C NMR (126 MHz, Chloroform-d) δ 150.88, 150.20, 146.33, 140.60, 138.05, 134.05, 129.79, 128.08, 125.82, 124.53, 122.14, 121.98, 121.11, 120.40, 84.15, 35.00, 34.89, 31.66, 30.89, 25.22.

Example 48: Synthesis of Bromide Intermediate to Ligand 10

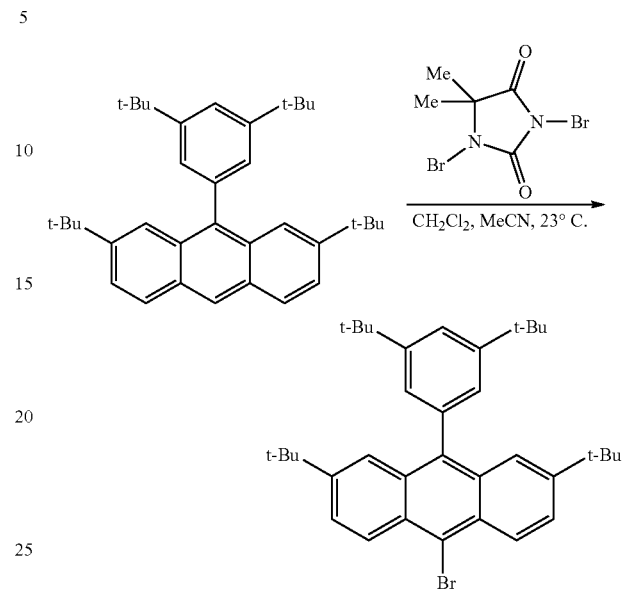

To a pale yellow solution of the di-t-butylanthracene (0.791 g, 1.653 mmol, 1.00 eq) in CH$_2$Cl$_2$/MeCN (40 mL, 1:1) at 23° C. was added solid dibromo-dimethylhydantoin (0.250 g, 0.8761 mmol, 0.53 eq) all at once. The golden yellow suspension was stirred (500 rpm) for 4 hrs upon which TLC indicated full conversion of the starting anthracene. The solution was concentrated onto celite, and purified via silica gel chromatography; hexanes to afford the bromoanthracene as a white foam (0.912 g, 1.635 mmol, 99%). NMR indicated pure product.

$^1$H NMR (400 MHz, Chloroform-d) δ 8.58 (d, J=9.3 Hz, 2H), 7.75 (d, J=1.8 Hz, 2H), 7.72 (dd, J=9.2, 2.0 Hz, 2H), 7.62 (t, J=1.8 Hz, 1H), 7.36 (d, J=1.8 Hz, 2H), 1.47 (s, 18H), 1.36 (s, 18H). $^{13}$C NMR (101 MHz, Chloroform-d) δ 150.47, 147.34, 138.56, 137.38, 131.17, 128.66, 127.50, 125.96, 125.88, 122.17, 122.02, 120.74, 35.06, 34.95, 31.68, 30.88.

Example 49: Synthesis of Anthracenyl Intermediate to Ligand 10

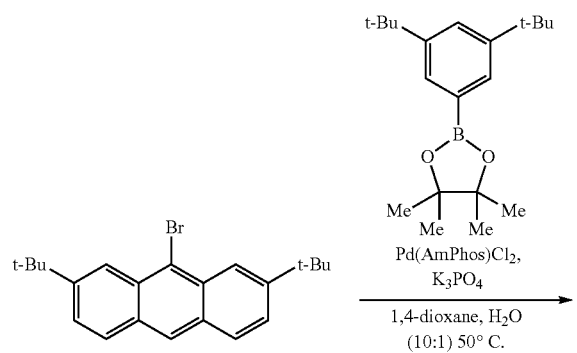

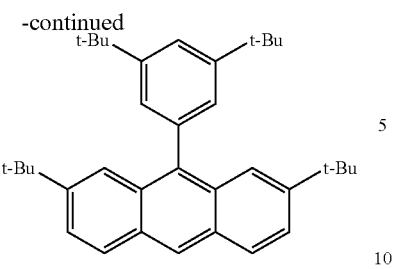

A mixture of the bromoanthracene (0.623 g, 1.687 mmol, 1.00 eq), Pd(AmPhos)Cl$_2$ (0.119 g, 0.1687 mmol, 0.10 eq), K$_3$PO$_4$ (1.611 g, 7.590 mmol, 4.50 eq), and the boropinacolate ester (0.800 g, 2.530 mmol, 1.50 eq) was evacuated, then back-filled with nitrogen, this was repeated 4× more, then freshly sparged deoxygenated 1,4-dioxane (15 mL) and water (1.5 mL) was added, the canary yellow mixture was placed in a mantle heated to 50° C., after stirring for 6 hrs TLC indicated complete consumption of the starting bromoanthracene, the now purple-black mixture was diluted with CH$_2$Cl$_2$ (20 mL), suction filtered through a pad of silica gel, rinsed with CH$_2$Cl$_2$ (4×20 mL), the filtrate was concentrated onto celite, and purified via silica gel chromatography; hexanes to afford the 3,5-di-t-butylphenyl-bis-t-butylanthracene as a white foam (0.791 g, 1.653 mmol, 98%). NMR indicated pure product.

$^1$H NMR (400 MHz, Chloroform-d) δ 8.40 (s, 1H), 8.00 (dd, J=8.9, 0.6 Hz, 2H), 7.77 (dt, J=1.8, 0.8 Hz, 2H), 7.60-7.56 (m, 3H), 7.38 (d, J=1.8 Hz, 2H), 1.46 (s, 18H), 1.36 (s, 18H). $^{13}$C NMR (101 MHz, Chloroform-d) δ 150.24, 147.03, 137.89, 137.64, 130.23, 129.88, 128.00, 126.02, 125.01, 124.13, 122.16, 121.44, 120.43, 35.09, 35.04, 31.69, 30.98.

Example 50: Synthesis of Bromoanthracene Intermediate for Ligand 10

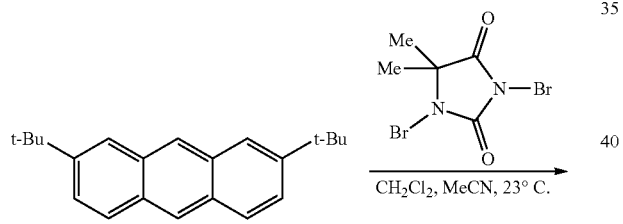

To a pale yellow slight suspension of the di-t-butylanthracene (1.035 g, 3.563 mmol, 1.00 eq) in CH$_2$Cl$_2$/MeCN (50 mL, 1:1) at 23° C. was added solid dibromo-dimethylhydantoin (0.510 g, 1.782 mmol, 0.50 eq) all at once. The now dark golden yellow suspension was stirred (500 rpm) for 90 mins upon which the mixture was concentrated, suspended in MeOH (30 mL), placed in a mantle heated to 70° C., stirred vigorously (1000 rpm) for 30 mins, the golden yellow mixture was then allowed to slowly, gradually cool to 23° C., suction filtered, the resultant solid was washed with MeOH (4×10 mL), and dried in vacuo to afford the bromo-di-t-butylanthracene as an off-white powder (0.623 g, 1.687 mmol, 47%). NMR indicated pure product.

$^1$H NMR (400 MHz, Chloroform-d) δ 8.40 (dt, J=1.6, 0.7 Hz, 2H), 8.31 (s, 1H), 7.90 (dt, J=8.9, 0.6 Hz, 2H), 7.56 (dd, J=8.8, 1.8 Hz, 2H), 1.47 (s, 18H). $^{13}$C NMR (101 MHz, Chloroform-d) δ 149.61, 130.53, 130.51, 128.26, 125.81, 124.83, 122.25, 121.90, 35.41, 30.93.

Example 51: Synthesis of Ligand 11

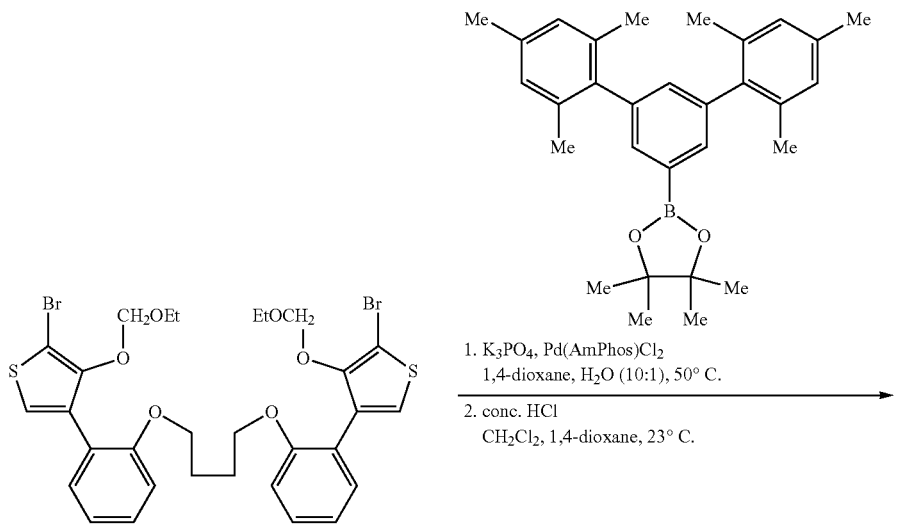

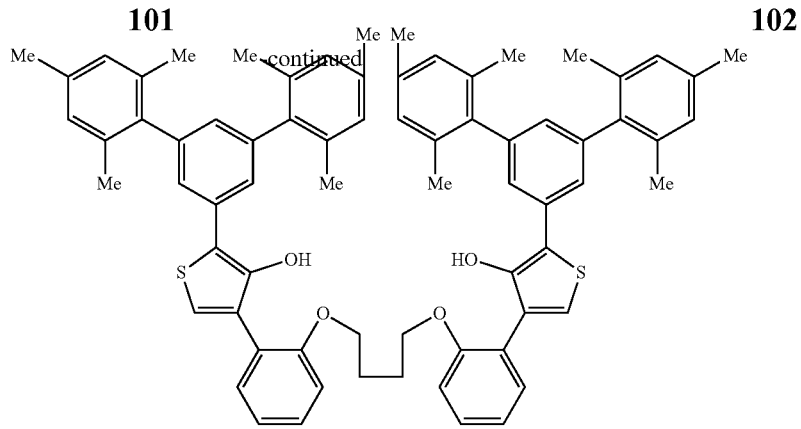

To vial equipped with a stirbar was added the dibromide (0.386 g, 0.5418 mmol, 1.00 eq), $K_3PO_4$ (1.035 g, 4.876 mmol, 9.0 eq), Pd(AmPhos)$Cl_2$ (78.0 mg, 0.1084 mmol, 0.20 eq), and the mesityl terphenyl boropinacol ester (0.716 g, 1.625 mmol, 3.00 eq). The mixture was evacuated, then back-filled with nitrogen, this process was repeated 3× more, then deoxygenated 1,4-dioxane (6.0 mL) and water (0.6 mL) were added sequentially via syringe. The vial was sealed with a PTFE cap under a purging flow of nitrogen, and then placed in a mantle heated to 50° C. After stirring (1000 rpm) for 36 hrs the purple-black mixture was removed from the mantle, allowed to cool gradually to 23° C., suction filtered over a pad of silica gel, washed with $CH_2Cl_2$ (4×20 mL), the clear purple filtrate was concentrated, residual 1,4-dioxane was remove azeotropically on the rotovap with toluene (3×10 mL), the resultant black mixture was suspended in $CH_2Cl_2$ (10 mL), suction filtered through silica gel to remove residual insoluble impurities, washed with $CH_2Cl_2$ (4×20 mL), the purple filtrate was concentrated onto celite, and purified via silica gel chromatography using an ISCO chromatography purification system; 25%-65% $CH_2Cl_2$ in hexanes to afford the bisprotected coupled thiophene as a white foam (0.519 g, 0.4400 mmol, 81%). NMR indicated pure product.

To a solution of the protected bisthiophene in $CH_2Cl_2$ (5 mL) and 1,4-dioxane (5 mL) was added conc. HCl (5 mL). The dark golden brown solution was vigorously stirred (1000 rpm) at 23° C. for 24 hrs under nitrogen, then diluted with aqueous HCl (25 mL, 1 N) and $CH_2Cl_2$ (20 mL), the biphasic mixture was poured into a separatory funnel, partitioned, organics were washed with aqueous HCl (2×20 mL, 1 N), the residual organics were extracted from the aqueous layer using $CH_2Cl_2$ (2×10 mL), combined, dried over solid $Na_2SO_4$, decanted, concentrated onto celite, and purified via silica gel chromatography using an ISCO chromatography purification system; 25%-80% $CH_2Cl_2$ in hexanes to afford the bishydroxythiophene ligand as a white foam (0.324 g, 0.3047 mmol, 69%, 56% two steps). NMR indicated pure product.

$^1$H NMR (500 MHz, Chloroform-d) δ 7.65 (d, J=1.5 Hz, 4H), 7.38 (dd, J=7.6, 1.7 Hz, 2H), 7.29 (ddd, J=8.2, 7.4, 1.7 Hz, 2H), 7.07 (td, J=7.5, 1.1 Hz, 2H), 7.03 (s, 4H), 6.97-6.93 (m, 8H), 6.87 (dd, J=8.4, 1.1 Hz, 2H), 6.79 (t, J=1.5 Hz, 2H), 4.05 3.97 (m, 4H), 2.33 (s, 12H), 2.10 (s, 24H), 1.92 1.84 (m, 4H). $^{13}$C NMR (126 MHz, Chloroform-d) δ 153.96, 148.35, 141.20, 139.03, 136.44, 135.95, 134.06, 133.00, 131.64, 129.39, 128.20, 128.05, 125.48, 124.72, 122.78, 119.86, 119.56, 113.87, 69.54, 25.82, 21.04, 20.85.

Characterization of the Protected Ligand:

$^1$H NMR (400 MHz, Chloroform-d) δ 7.51 (d, J=1.6 Hz, 4H), 7.41 (dd, J=7.6, 1.8 Hz, 2H), 7.24-7.18 (m, 2H), 7.16 (s, 2H), 6.97-6.90 (m, 10H), 6.84 (t, J=1.6 Hz, 2H), 6.79 (dd, J=8.3, 1.1 Hz, 2H), 4.65 (s, 4H), 3.87 (m, 4H), 3.11 (q, J=7.0 Hz, 4H), 2.31 (s, 12H), 2.08 (s, 24H), 1.86 (q, J=3.2, 2.7 Hz, 4H), 0.76 (t, J=7.0 Hz, 6H). $^{13}$C NMR (101 MHz, Chloroform-d) δ 156.30, 148.94, 141.53, 138.68, 136.52, 135.74, 133.80, 133.60, 130.90, 129.03, 128.76, 128.06, 127.40, 126.74, 124.47, 121.26, 120.38, 112.31, 96.92, 67.82, 64.79, 25.95, 21.02, 20.78, 14.63.

Example 52: Synthesis of Procatalyst 25

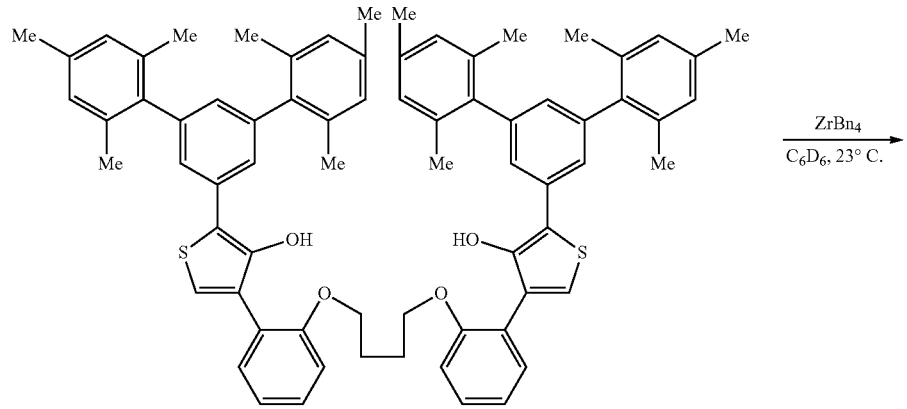

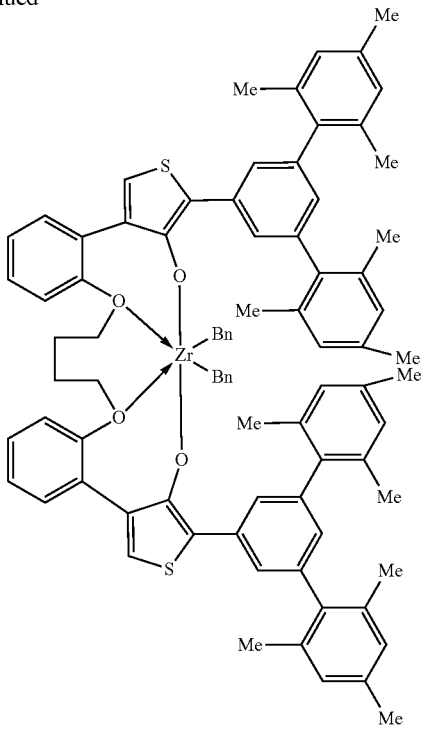

The thiophene ligand was azeotropically dried using toluene (4×10 mL) prior to use. To a white suspension of the thiophene (18.2 mg, 0.0171 mmol, 1.00 eq) in anhydrous $C_6D_6$ (1.48 mL) in a nitrogen filled glovebox at 23° C. was added a solution of $ZrBn_4$ (7.8 mg, 0.0171 mmol, 1.00 eq) in $C_6D_6$ (0.32 mL) in a dropwise manner. After stirring (500 rpm) for 1 hr the pale golden yellow solution was filtered using a 0.20 μm PTFE submicron filter to afford the zirconium complex as a 0.01 M solution in $C_6D_6$. NMR indicated product, and the same procedure can be used with toluene to prepare the procatalyst solution in 0.005 M which is used directly after filtration for the polymerization experiments.

$^1$H NMR (400 MHz, Benzene-$d_6$) δ 8.17 (d, J=1.5 Hz, 4H), 7.01-6.93 (m, 2H), 6.90 (td, J=7.4, 7.0, 1.1 Hz, 2H), 6.87-6.80 (m, 6H), 6.79-6.75 (m, 8H), 6.74 (t, J=1.5 Hz, 2H), 6.70-6.64 (m, 4H), 6.60 (s, 2H), 6.18-6.12 (m, 4H), 4.38-4.26 (m, 2H), 3.68 (d, J=11.5 Hz, 2H), 2.20 (s, 12H), 2.14 (s, 12H), 2.12 (s, 12H), 1.99 (d, J=12.0 Hz, 2H), 1.41 (d, J=12.0 Hz, 2H), 0.94-0.81 (m, 2H), 0.47-0.32 (m, 2H). $^{13}$C NMR (101 MHz, Benzene-$d_6$) δ 155.62, 154.42, 147.07, 142.28, 138.70, 136.20, 135.63, 135.47, 135.17, 134.89, 132.27, 130.01, 129.73, 128.89, 128.32, 128.29, 128.13, 127.24, 126.61, 125.44, 125.25, 123.16, 120.79, 119.58, 119.05, 81.18, 74.98, 26.65, 20.98, 20.84, 20.70.

Example 53: Synthesis of Procatalyst 26

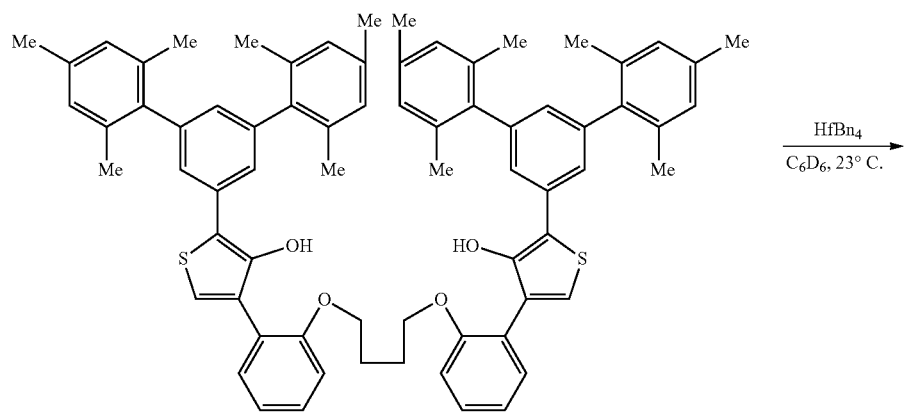

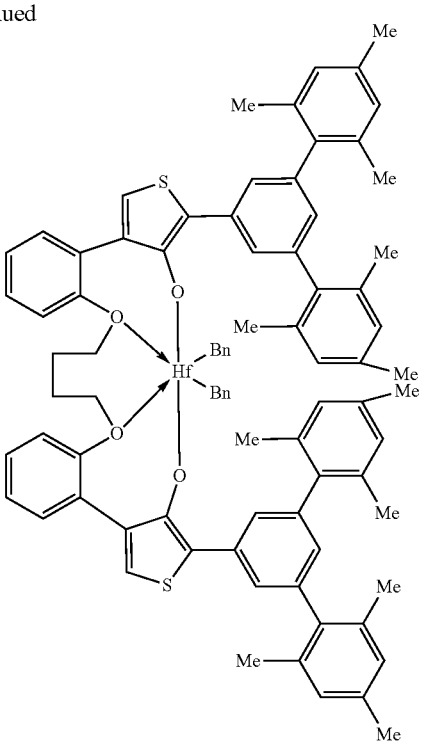

The thiophene ligand was azeotropically dried using toluene (4×10 mL) prior to use. To a white suspension of the thiophene (18.5 mg, 0.0174 mmol, 1.00 eq) in anhydrous $C_6D_6$ (1.31 mL) in a nitrogen filled glovebox at 23° C. was added a solution of $HfBn_4$ (9.5 mg, 0.0174 mmol, 1.00 eq) in $C_6D_6$ (0.39 mL) in a dropwise manner. After stirring (500 rpm) for 1 hr the pale golden yellow solution was filtered using a 0.20 µm PTFE submicron filter to afford the hafnium complex as a 0.01 M solution in $C_6D_6$. NMR indicated product, and the same procedure can be used with toluene to prepare the procatalyst solution in 0.005 M which is used directly after filtration for the polymerization experiments.

$^1$H NMR (400 MHz, Benzene-$d_6$) δ 8.14 (d, J=1.5 Hz, 4H), 7.12-7.03 (m, 2H), 6.97-6.93 (m, 2H), 6.93-6.83 (m, 6H), 6.77 (dd, J=8.6, 1.6 Hz, 8H), 6.74 (t, J=1.5 Hz, 2H), 6.72-6.68 (m, 2H), 6.67-6.62 (m, 2H), 6.60 (s, 2H), 6.19-6.13 (m, 4H), 4.43-4.33 (m, 2H), 3.73 (dd, J=12.7, 4.5 Hz, 2H), 2.19 (s, 12H), 2.14 (s, 12H), 2.12 (s, 12H), 1.82 (d, J=12.9 Hz, 2H), 1.19 (d, J=12.9 Hz, 2H), 0.89 (t, J=10.2 Hz, 2H), 0.36 (d, J=11.3 Hz, 2H). $^{13}$C NMR (101 MHz, Benzene-$d_6$) δ 155.44, 154.44, 147.58, 142.26, 138.70, 136.20, 135.48, 135.31, 135.15, 134.78, 132.30, 130.04, 129.75, 128.80, 128.34, 128.28, 128.15, 127.05, 126.95, 126.15, 125.39, 123.35, 120.84, 119.52, 119.50, 81.95, 79.19, 26.70, 20.98, 20.86, 20.70.

Example 54: Synthesis of Mesityl m-Terphenyl Bromide Intermediate for Ligand 11

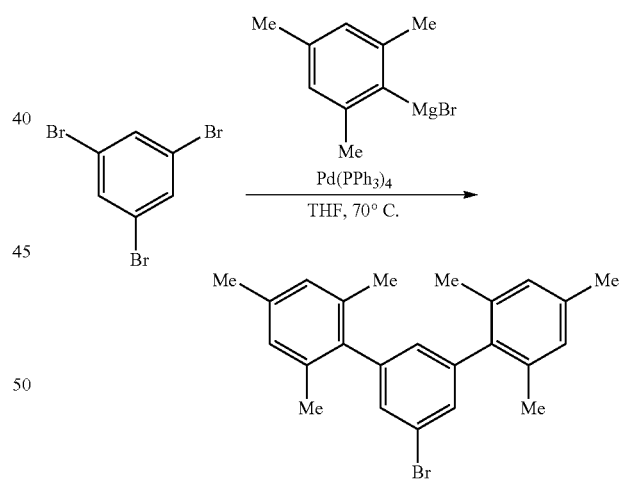

To a solution of the tribromobenzene (1.000 g, 3.177 mmol, 1.00 eq) and $Pd(PPh_3)_4$ (0.367 g, 0.3177 mmol, 0.10 eq) in anhydrous deoxygenated THF (30 mL) in a nitrogen filled glovebox at 23° C. was added a solution of 2,4,6-trimethylphenylmagnesium bromide (8.0 mL, 7.943 mmol, 2.50 eq, 1.0 M in THF) in a quick dropwise manner. The resultant red-black solution was placed in a mantle heated to 70° C., stirred vigorously (1000 rpm) for 18 hrs, removed from the mantle, allowed to cool gradually to 23° C., neutralized with i-PrOH (5 mL), removed from the glovebox, concentrated, the resultant dark red-black mixture was suspended in $CH_2Cl_2$ (25 mL), suction filtered over a pad of silica gel, rinsed with CH$_2$Cl$_2$ (4×25 mL), the resultant golden brown solution was concentrated onto celite, and purified via silica gel chromatography; hexanes to afford the 3,5-bis-(2,4,6-trimethylphenyl)-phenybromide as a white solid (0.428 g, 1.088 mmol, 34%). NMR indicated pure product.

$^1$H NMR (400 MHz, Chloroform-d) δ 7.28 (d, J=1.5 Hz, 2H), 6.93 (s, 4H), 6.87 (d, J=1.6 Hz, 1H), 2.32 (s, 6H), 2.05 (s, 12H). $^{13}$C NMR (101 MHz, Chloroform-d) δ 143.21, 137.47, 136.96, 135.63, 130.43, 129.27, 128.13, 122.41, 21.01, 20.71.

Example 55: Synthesis of the Boropinacolate Intermediate to Ligand 11

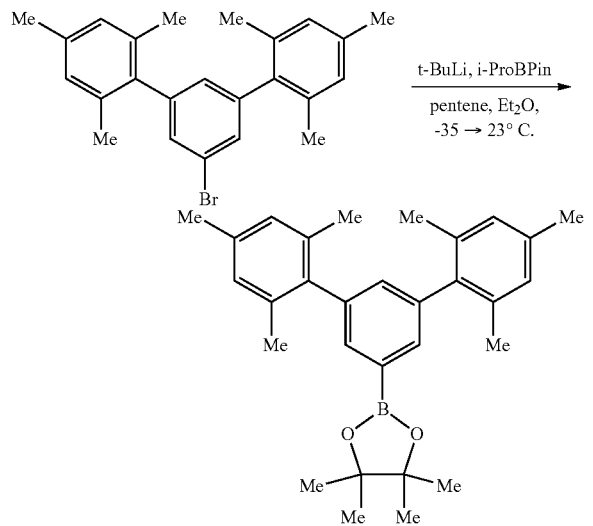

To a precooled solution of t-BuLi (10.0 mL, 16.938 mmol, 3.30 eq, 1.7 M in pentane) in anhydrous deoxygenated pentane (45 mL) in a nitrogen filled glovebox at −35° C. (precooled for 16 hrs) was added a precooled suspension of the mesityl-m-terphenyl bromide (2.019 g, 5.133 mmol, 1.00 eq) in pentane/Et$_2$O (30 mL, 1:1) in a dropwise manner over 10 mins. The now golden yellow mixture was allowed to sit in the freezer (−35° C.) for 4 hrs upon which neat i-PrOBPin (3.50 mL, 16.938 mmol, 3.30 eq) was added via syringe. The now pale yellow heterogeneous mixture was allowed to stir at 23° C. for 3 hrs, i-PrOH (3 mL) was added to neutralize any residual t-BuLi, the mixture was removed from the glovebox, water (20 mL) and Et$_2$O (30 mL) was added, the biphasic mixture was stirred for 2 mins, poured into a separatory funnel, partitioned, organics were washed with water (2×25 mL), residual organics were extracted with Et$_2$O (2×25 mL), combined, dried over solid Na$_2$SO$_4$, decanted, concentrated onto celite, and purified via silica gel chromatography on the ISCO; hexanes 50% CH$_2$Cl$_2$ in hexanes to afford the mesityl-m-terphenyl boropinacolate ester as a white foam (2.095 g, 4.757 mmol, 93%). NMR indicated pure product.

$^1$H NMR (500 MHz, Chloroform-d) δ 7.58 (dt, J=2.9, 1.7 Hz, 2H), 7.07 (p, J=1.8 Hz, 1H), 6.94 (d, J=2.0 Hz, 4H), 2.34 (s, 6H), 2.07 (s, 12H), 1.37 (s, 12H). $^{13}$C NMR (126 MHz, Chloroform-d) δ 140.52, 138.93, 136.27, 135.80, 133.84, 133.10, 127.95, 83.70, 24.98, 21.04, 20.90.

Example 56: Synthesis of Ligand 12

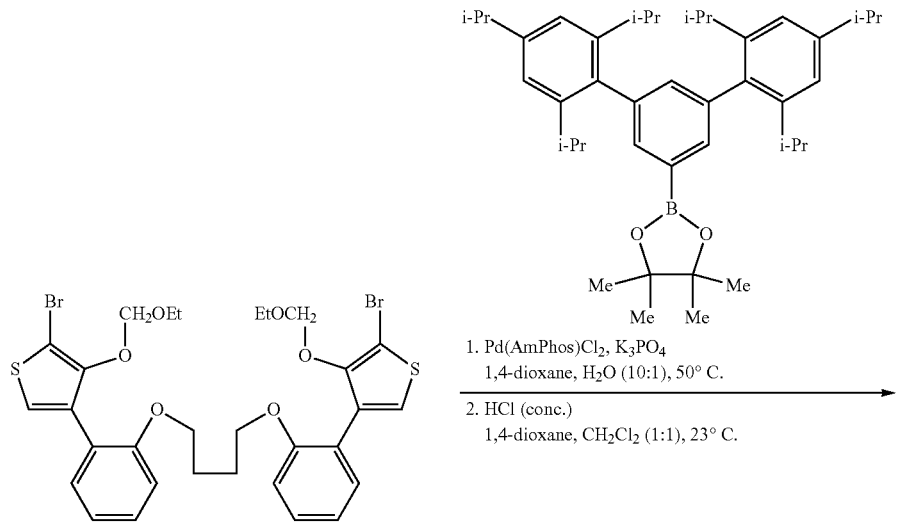

-continued

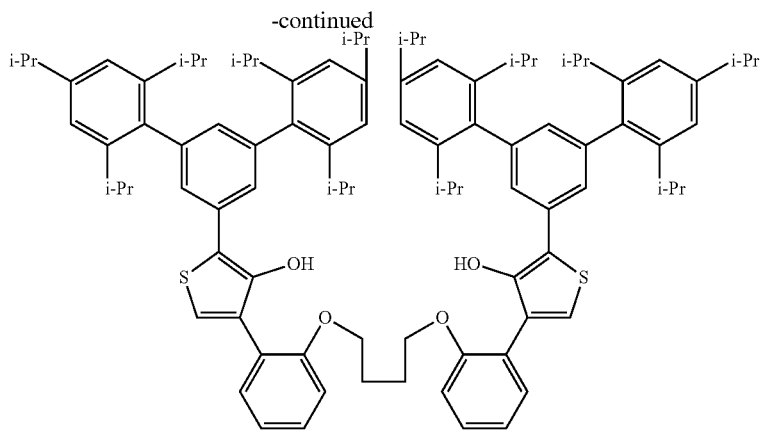

To vial equipped with a stirbar was added the dibromide (0.390 g, 0.5476 mmol, 1.00 eq), $K_3PO_4$ (1.046 g, 4.928 mmol, 9.00 eq), Pd(AmPhos)$Cl_2$ (78.0 mg, 0.1095 mmol, 0.20 eq), and the TRIP-m-terphenylboropinacol ester (1.000 g, 1.643 mmol, 3.00 eq). The mixture was evacuated, then back-filled with nitrogen, this process was repeated 3× more, then deoxygenated 1,4-dioxane (10.0 mL) and water (1.0 mL) were added sequentially via syringe. The mixture was placed under a purging flow of nitrogen, and then placed in a mantle heated to 50° C. After stirring (1000 rpm) for 48 hrs the purple-black mixture was removed from the mantle, allowed to cool gradually to 23° C., diluted with $CH_2Cl_2$ (20 mL), suction filtered over a pad of silica gel, washed with $CH_2Cl_2$ (4×20 mL), the clear purple filtrate was concentrated, residual 1,4-dioxane was removed azeotropically on the rotovap with toluene (3×10 mL), the resultant black mixture was suspended in $CH_2Cl_2$ (10 mL), suction filtered through silica gel to remove residual insoluble impurities, washed with $CH_2Cl_2$ (4×20 mL), the purple filtrate was concentrated onto celite, and purified via silica gel chromatography using an ISCO chromatography purification system; 10% 60% $CH_2Cl_2$ in hexanes to afford the bisprotected coupled thiophene as a golden yellow foam (0.748 g, 0.4928 mmol, 90%). NMR indicated pure product.

To a solution of the protected bisthiophene in $CH_2Cl_2$ (10 mL) and 1,4-dioxane (10 mL) was added conc. HCl (10 mL). The dark golden brown solution was vigorously stirred (1000 rpm) at 23° C. for 24 hrs under nitrogen, then diluted with aqueous HCl (25 mL, 1 N) and $CH_2Cl_2$ (20 mL), the biphasic mixture was poured into a separatory funnel, partitioned, organics were washed with aqueous HCl (1×20 mL, 1 N), the residual organics were extracted from the aqueous layer using $CH_2Cl_2$ (2×10 mL), combined, dried over solid $Na_2SO_4$, decanted, concentrated onto celite, and purified via silica gel chromatography using an ISCO chromatography purification system; 10%-60% $CH_2Cl_2$ in hexanes to afford the bishydroxythiophene ligand as a golden yellow amorphous foam (0.610 g, 0.4357 mmol, 88%, 80% two steps). NMR indicated pure product.

$^1$H NMR (400 MHz, Chloroform-d) δ 7.76 (t, J=1.5 Hz, 4H), 7.37 (dt, J=7.6, 1.5 Hz, 2H), 7.28-7.22 (m, 2H), 7.08-7.01 (m, 14H), 6.86 (dd, J=4.9, 3.3 Hz, 4H), 4.00 (d, J=5.8 Hz, 4H), 2.94 (hept, J=6.9 Hz, 4H), 2.88-2.76 (m, 8H), 1.88 (d, J=5.3 Hz, 4H), 1.31 (d, J=6.9 Hz, 24H), 1.15 (d, J=6.9 Hz, 24H), 1.06 (d, J=6.9 Hz, 24H). $^{13}$C NMR (101 MHz, Chloroform-d) δ 153.91, 148.57, 147.69, 146.53, 140.55, 137.04, 133.17, 133.14, 131.69, 129.42, 129.30, 125.49, 124.52, 122.69, 120.44, 119.85, 119.57, 113.59, 69.39, 34.25, 30.41, 25.73, 24.26, 24.24, 24.08.

Characterization of the Protected Ligand:

$^1$H NMR (400 MHz, Chloroform-d) δ 7.61 (d, J=1.5 Hz, 4H), 7.42 (dd, J=7.6, 1.8 Hz, 2H), 7.22-7.17 (m, 2H), 7.18 (s, 2H), 7.06 (s, 8H), 6.93 (dd, J=15.0, 1.0 Hz, 2H), 6.93 (d, J=1.3 Hz, 2H), 6.81 (dd, J=8.3, 1.0 Hz, 2H), 4.68 (s, 4H), 3.91 (d, J=5.4 Hz, 4H), 3.12 (q, J=7.0 Hz, 4H), 2.94 (p, J=6.9 Hz, 4H), 2.81 (p, J=6.8 Hz, 8H), 1.85 (q, J=3.1 Hz, 4H), 1.30 (d, J=7.0 Hz, 24H), 1.16 (d, J=6.8 Hz, 24H), 1.07 (d, J=6.8 Hz, 24H), 0.75 (t, J=7.0 Hz, 6H). $^{13}$C NMR (101 MHz, Chloroform-d) δ 156.28, 148.90, 147.86, 146.43, 140.87, 136.63, 133.81, 132.81, 130.94, 130.18, 128.72, 127.69, 126.85, 124.42, 121.39, 120.46, 120.36, 112.34, 96.83, 67.85, 64.73, 34.27, 30.41, 25.84, 24.42, 24.11, 24.07, 14.55.

Example 57: Synthesis of Procatalyst 27

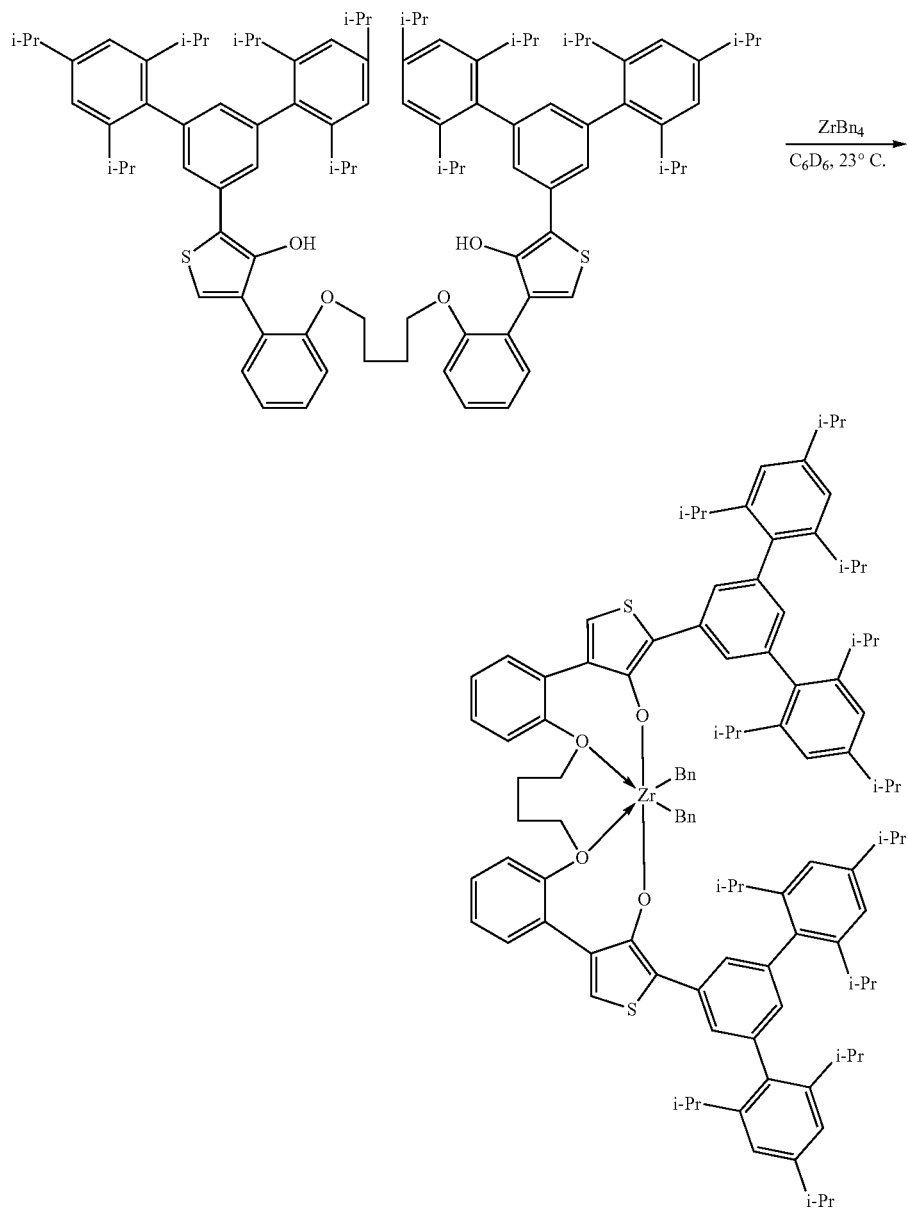

The thiophene ligand was azeotropically dried using toluene (4×10 mL) prior to use. To a white suspension of the thiophene (9.4 mg, 0.00671 mmol, 1.00 eq) in anhydrous $C_6D_6$ (1.10 mL) in a nitrogen filled glovebox at 23° C. was added a solution of $ZrBn_4$ (3.1 mg, 0.00671 mmol, 1.00 eq) in $C_6D_6$ (0.13 mL) in a dropwise manner. After stirring (500 rpm) for 1 hr the pale golden yellow solution was filtered using a 0.20 μm PTFE submicron filter to afford the zirconium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1$H NMR (400 MHz, Benzene-$d_6$) δ 8.28 (d, J=1.5 Hz, 4H), 7.91 (d, J=1.5 Hz, 2H), 7.21-7.11 (m, 6H), 6.99-6.93 (m, 4H), 6.90 (td, J=7.5, 1.2 Hz, 2H), 6.81-6.67 (m, 6H), 6.63-6.57 (m, 2H), 6.60 (s, 2H), 6.53 (t, J=7.0 Hz, 2H), 6.08-6.02 (m, 4H), 4.34 (t, J=10.9 Hz, 2H), 3.80-3.71 (m, 2H), 3.21 (p, J=6.8 Hz, 4H), 3.10 (hept, J=6.9 Hz, 4H), 2.98 (p, J=6.8 Hz, 2H), 2.92-2.76 (m, 6H), 1.96 (d, J=11.7 Hz, 2H), 1.61 (d, J=11.8 Hz, 2H), 1.28 (d, J=6.9 Hz, 6H), 1.24 (dd, J=6.9, 1.7 Hz, 24H), 1.19 (ddd, J=9.6, 6.7, 3.5 Hz, 24H), 1.15 (d, J=7.1 Hz, 12H), 1.09 (d, J=6.8 Hz, 6H), 0.79 (t, J=10.1 Hz, 2H), 0.30-0.22 (m, 2H). $^{13}$C NMR (101 MHz, Benzene-$d_6$) δ 155.34, 154.46, 148.27, 148.07, 146.75, 146.59, 146.30, 141.51, 141.39, 137.09, 136.96, 135.89, 134.42, 132.14, 130.57, 130.10, 129.77, 129.25, 128.82, 128.15, 126.78, 126.01, 125.95, 123.22, 122.88, 120.81, 120.69, 120.63, 120.60, 120.33, 119.32, 81.43, 74.81, 34.54, 34.46, 34.43, 30.65, 30.60, 30.51, 26.80, 25.47, 24.37, 24.16, 24.11, 24.02, 23.97, 23.81.

Example 58: Synthesis of Procatalyst 28

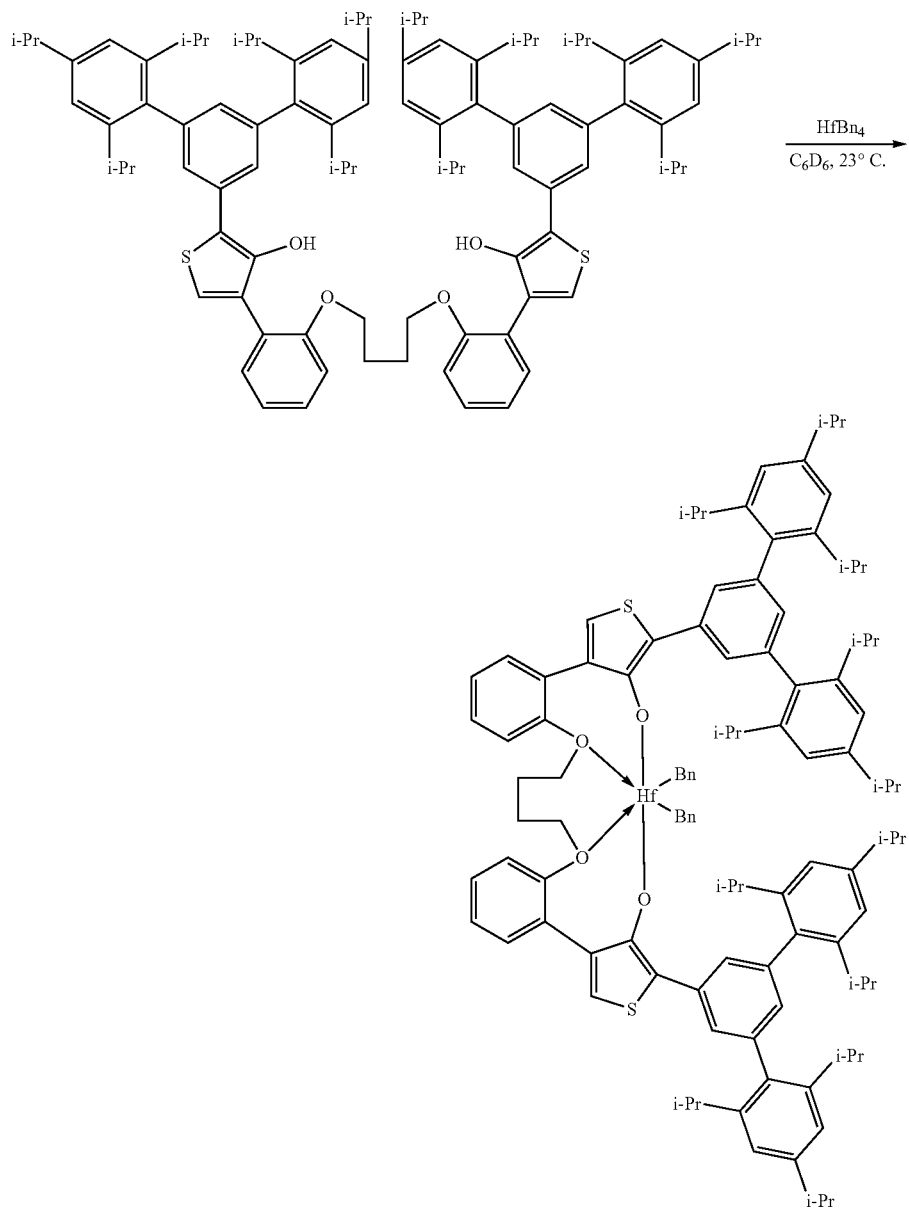

The thiophene ligand was azeotropically dried using toluene (4×10 mL) prior to use. To a white suspension of the thiophene (18.0 mg, 0.0129 mmol, 1.00 eq) in anhydrous C₆D₆ (1.0 mL) in a nitrogen filled glovebox at 23° C. was added a solution of HfBn₄ (7.0 mg, 0.0129 mmol, 1.00 eq) in C₆D₆ (0.28 mL) in a dropwise manner. After stirring (500 rpm) for 1 hr the pale golden yellow solution was filtered using a 0.20 μm PTFE submicron filter to afford the hafnium complex as a 0.01 M solution in C₆D₆. NMR indicated product. The same procedure can be used with toluene as the solvent to prepare the procatalyst solution (0.005 M) which is used directly after filtration for the polymerization experiments.

$^1$H NMR (400 MHz, Benzene-d₆) δ 8.25 (d, J=1.5 Hz, 4H), 8.08 (d, J=1.5 Hz, 2H), 7.23-7.11 (m, 6H), 7.08-7.04 (m, 2H), 7.04-6.70 (m, 10H), 6.60 (s, 2H), 6.60-6.52 (m, 2H), 6.51-6.41 (m, 2H), 6.11-6.05 (m, 2H), 5.89 (d, J=7.6 Hz, 2H), 4.47-4.34 (m, 2H), 3.80 (d, J=12.7 Hz, 2H), 3.20 (p, J=6.9 Hz, 2H), 3.16-2.92 (m, 6H), 2.82 (dtt, J=13.7, 10.0, 6.9 Hz, 4H), 1.78 (t, J=12.2 Hz, 2H), 1.35 (d, J=12.7 Hz, 2H), 1.32-1.12 (m, 54H), 1.10 (d, J=6.8 Hz, 6H), 0.99 (d, J=6.8 Hz, 6H), 0.89 (d, J=6.8 Hz, 6H), 0.78 (t, J=10.2 Hz, 2H), 0.22 (q, J=11.7 Hz, 2H). $^{13}$C NMR (101 MHz, Benzene-d₆) δ 155.12, 154.44, 153.79, 152.36, 148.13, 148.06, 146.87, 146.71, 146.60, 146.38, 146.28, 146.07, 145.10, 141.51, 136.97, 136.57, 135.56, 134.62, 134.32, 133.63, 132.16, 130.18, 129.79, 128.93, 128.59, 128.15, 126.98, 126.41, 126.20, 125.91, 123.40, 120.92, 120.83, 120.69, 120.64, 120.25, 120.12, 119.82, 82.23, 79.41, 34.47, 34.43, 30.82, 30.66, 30.60, 30.54, 25.70, 25.47, 24.54, 24.36, 24.15, 24.03, 23.97, 23.95, 23.83, 23.64.

Example 59: Synthesis of Intermediate to Ligand 12

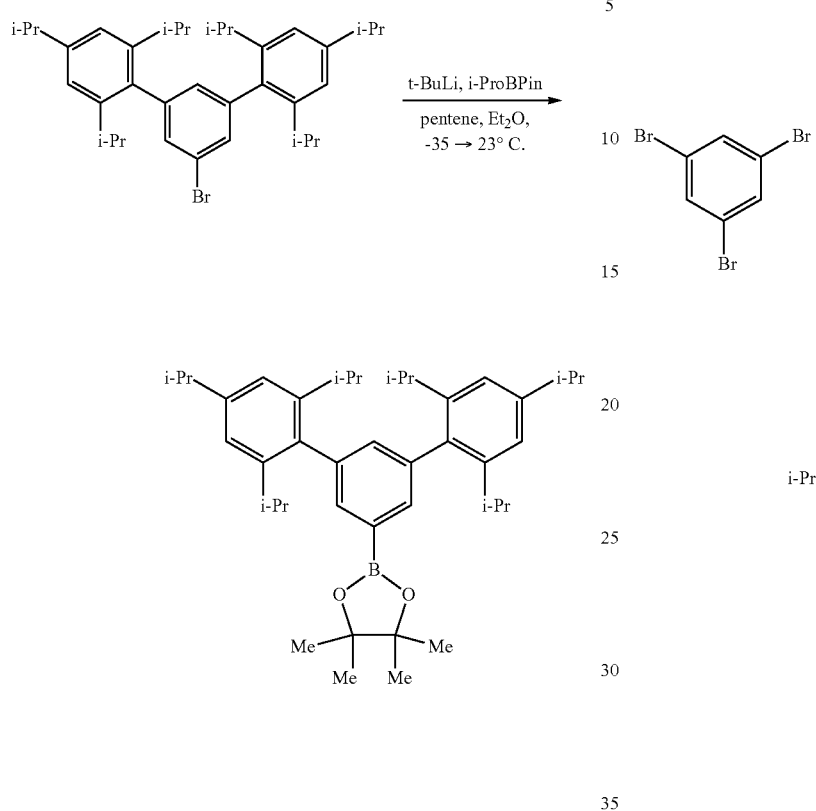

To a precooled solution of t-BuLi (10.0 mL, 16.500 mmol, 3.50 eq, 1.7 M in pentane) in anhydrous deoxygenated pentane (40 mL) in a nitrogen filled glovebox at −35° C. (precooled for 16 hrs) was added a precooled suspension of the TRIP-m-terphenyl bromide (2.648 g, 4.714 mmol, 1.00 eq) in pentane/Et$_2$O (30 mL, 1:1) in a dropwise manner over 10 mins. The now golden yellow mixture was allowed to sit in the freezer (−35° C.) for 4 hrs upon which neat i-PrOBPin (3.40 mL, 16.500 mmol, 3.50 eq) was added via syringe. The now pale yellow heterogeneous mixture was allowed to stir at 23° C. for 3 hrs, i-PrOH (3 mL) was added to neutralize the reaction mixture, the mixture was removed from the glovebox, water (20 mL) and Et$_2$O (30 mL) was added, the biphasic mixture was stirred for 2 mins, poured into a separatory funnel, partitioned, organics were washed with water (2×25 mL), residual organics were extracted with Et$_2$O (2×25 mL), combined, dried over solid Na$_2$SO$_4$, decanted, concentrated onto celite, and purified via silica gel chromatography on the ISCO; hexanes −50% CH$_2$Cl$_2$ in hexanes to afford the TRIP-m-terphenyl boropinacolate ester as a white foam (1.165 g, 1.914 mmol, 41%). NMR indicated pure product.

$^1$H NMR (500 MHz, Chloroform-d) δ 7.61 (d, J=1.7 Hz, 2H), 7.15 (t, J=1.8 Hz, 1H), 7.04 (s, 4H), 2.94 (p, J=6.9 Hz, 2H), 2.73 (p, J=6.8 Hz, 4H), 1.34 (s, 12H), 1.31 (d, J=6.9 Hz, 12H), 1.16 (d, J=6.9 Hz, 12H), 1.05 (d, J=6.9 Hz, 12H). $^{13}$C NMR (126 MHz, Chloroform-d) δ 147.64, 146.47, 139.69, 136.95, 134.16, 133.95, 120.31, 83.60, 34.30, 30.33, 28.85, 25.01, 24.82, 24.48, 24.12, 24.03.

Example 60: Synthesis of Intermediate to Ligand 12

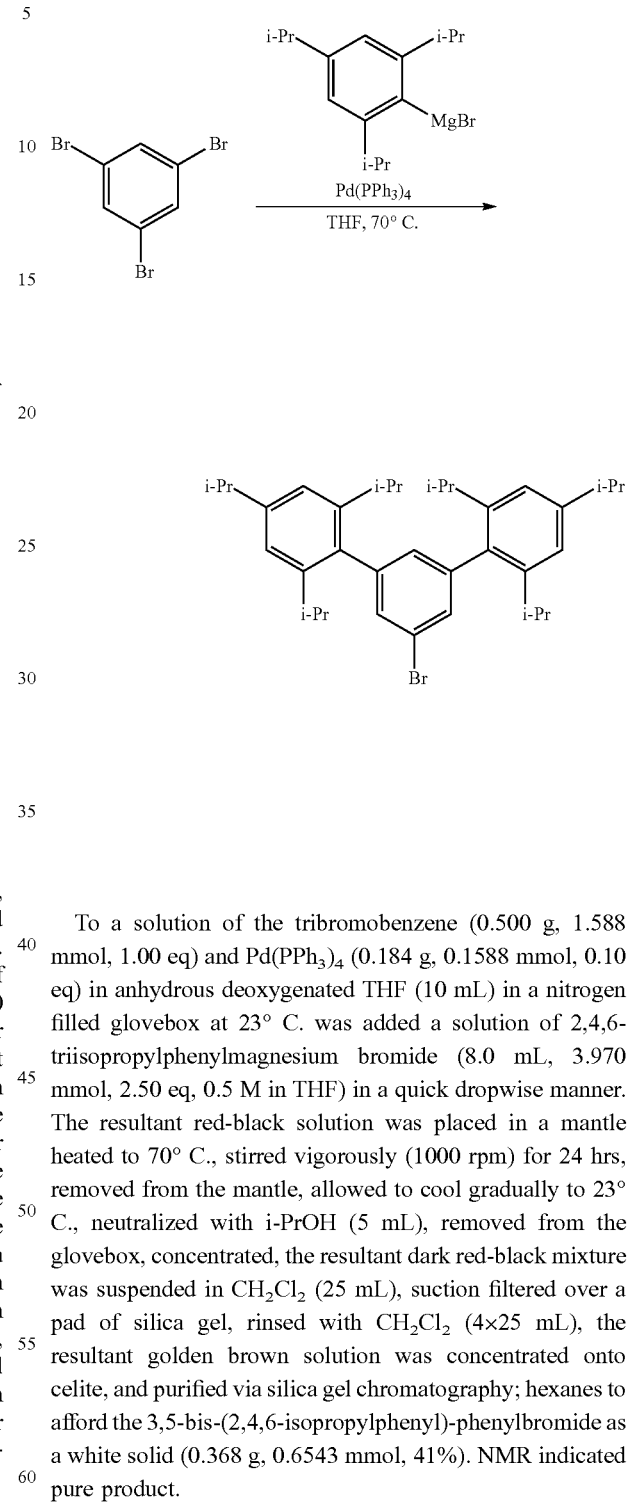

To a solution of the tribromobenzene (0.500 g, 1.588 mmol, 1.00 eq) and Pd(PPh$_3$)$_4$ (0.184 g, 0.1588 mmol, 0.10 eq) in anhydrous deoxygenated THF (10 mL) in a nitrogen filled glovebox at 23° C. was added a solution of 2,4,6-triisopropylphenylmagnesium bromide (8.0 mL, 3.970 mmol, 2.50 eq, 0.5 M in THF) in a quick dropwise manner. The resultant red-black solution was placed in a mantle heated to 70° C., stirred vigorously (1000 rpm) for 24 hrs, removed from the mantle, allowed to cool gradually to 23° C., neutralized with i-PrOH (5 mL), removed from the glovebox, concentrated, the resultant dark red-black mixture was suspended in CH$_2$Cl$_2$ (25 mL), suction filtered over a pad of silica gel, rinsed with CH$_2$Cl$_2$ (4×25 mL), the resultant golden brown solution was concentrated onto celite, and purified via silica gel chromatography; hexanes to afford the 3,5-bis-(2,4,6-isopropylphenyl)-phenylbromide as a white solid (0.368 g, 0.6543 mmol, 41%). NMR indicated pure product.

$^1$H NMR (500 MHz, Chloroform-d) δ 7.33 (d, J=1.4 Hz, 2H), 7.03 (s, 4H), 6.95 (t, J=1.5 Hz, 1H), 2.92 (hept, J=6.9 Hz, 2H), 2.68 (hept, J=6.9 Hz, 4H), 1.28 (d, J=6.9 Hz, 12H), 1.15 (d, J=6.8 Hz, 12H), 1.04 (d, J=6.9 Hz, 12H). $^{13}$C NMR (126 MHz, Chloroform-d) δ 148.32, 146.33, 142.58, 135.39, 130.66, 130.34, 121.88, 120.55, 34.30, 30.44, 24.34, 24.06.

Example 61: Synthesis of Ligand 13

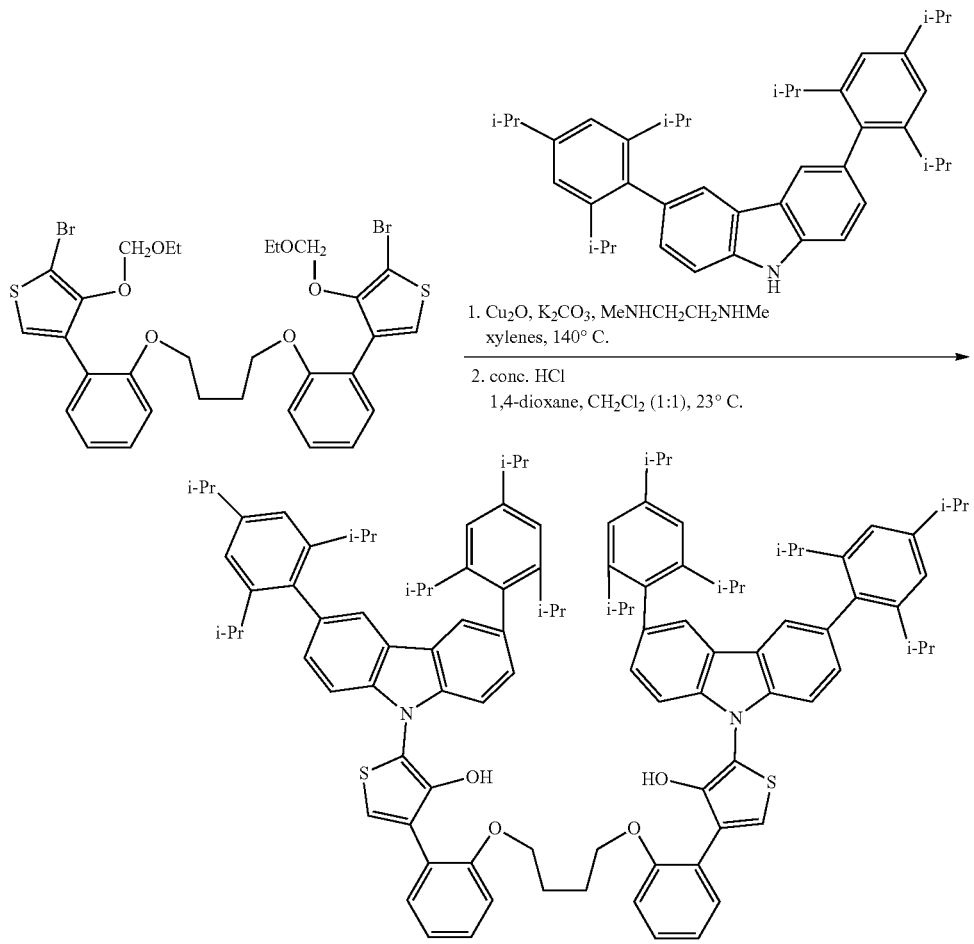

The dibromide was azeotropically dried using toluene (4×10 mL) prior to use. In a nitrogen filled glovebox a solid mixture of the dibromide (0.864 g, 1.213 mmol, 1.00 eq), the carbazole (2.043 g, 3.572 mmol, 2.95 eq), Cu$_2$O (0.868 g, 6.063 mmol, 5.00 eq), and K$_2$CO$_3$ (3.353 g, 24.260 mmol, 20.0 eq) in an oven-dried flask equipped with a stirbar and reflux condenser was suspended in anhydrous deoxygenated xylenes (25.0 mL), neat N,N'-dimethylethylenediamine (1.30 mL, 11.930 mmol, 10.00 eq) was added via syringe, the mixture was then sealed under nitrogen, removed from the glovebox, placed under nitrogen, placed in a mantle heated to 140° C., stirred vigorously (1000 rpm) for 72 hrs, the dark red heterogeneous mixture was removed from the mantle, allowed to cool gradually to 23° C., diluted with CH$_2$Cl$_2$ (30 mL), stirred vigorously (1000 rpm) for 2 mins, suction filtered over silica gel using CH$_2$Cl$_2$ as the eluent, rinsed with CH$_2$Cl$_2$ (4×25 mL), the golden orange filtrate was concentrated onto celite, and purified via silica gel chromatography; 10%-45% CH$_2$Cl$_2$ in hexanes to afford the biscarbazoyl-thiophene as a white foam (0.384 g, 0.2269 mmol, 19%). NMR indicated product which contained trace impurities. The product was used in the subsequent reaction without further purification.

To a solution of the protected hydroxythiophene (0.384 g, 0.2269 mmol, 1.00 eq) in CH$_2$Cl$_2$ (5 mL) and 1,4-dioxane (5 mL) was added concentrated HCl (5 mL) under nitrogen at 23° C. After stirring vigorously (1000 rpm) for 16 hrs the pale golden brown solution was diluted with aqueous HCl (20 mL, 1 N) and CH$_2$Cl$_2$ (20 mL), poured into a separatory funnel, partitioned, organics were washed with aqueous HCl (1×20 mL), residual organics were extracted from the aqueous layer using CH$_2$Cl$_2$ (2×20 mL), combined, dried over solid Na$_2$SO$_4$, decanted, concentrated onto celite, and purified via silica gel chromatography; 10%-50% CH$_2$Cl$_2$ in hexanes to afford the hydroxythiophene as a pale yellow foam (0.306 g, 0.1941 mmol, 86%, 16% two steps). NMR indicated pure product.

$^1$H NMR (400 MHz, Chloroform-d) δ 7.91 (d, J=1.5 Hz, 4H), 7.55 (dd, J=7.6, 1.8 Hz, 2H), 7.46 (d, J=8.3 Hz, 4H), 7.28-7.21 (m, 8H), 7.16-7.09 (m, 10H), 7.00 (s, 2H), 6.95 (dd, J=8.3, 1.1 Hz, 2H), 4.15 (d, J=5.1 Hz, 4H), 3.01 (hept, J=6.9 Hz, 4H), 2.79 (hept, J=7.0 Hz, 8H), 2.03 (h, J=2.7 Hz, 4H), 1.38 (d, J=6.9 Hz, 24H), 1.13 (d, J=5.9 Hz, 36H), 1.06 (d, J=6.8 Hz, 12H). $^{13}$C NMR (101 MHz, Chloroform-d) δ 154.20, 148.01, 147.75, 147.15, 141.02, 137.48, 132.93, 131.44, 130.77, 129.69, 128.24, 124.53, 123.29, 122.98, 121.15, 120.56, 119.59, 115.23, 113.97, 109.84, 69.79, 34.35, 30.27, 26.03, 24.36, 24.18.

Characterization of the Protected Ligand:

$^1$H NMR (400 MHz, Chloroform-d) δ 7.84 (s, 4H), 7.55 (t, J=6.8 Hz, 6H), 7.37 (s, 2H), 7.28 (dd, J=8.3, 1.5 Hz, 4H), 7.26-7.20 (m, 2H), 7.10 (d, J=3.3 Hz, 8H), 7.00 (t, J=7.5 Hz, 2H), 6.95 (d, J=8.3 Hz, 2H), 4.62 (s, 4H), 4.12 (d, J=5.2 Hz, 4H), 2.97 (hept, J=6.9 Hz, 4H), 2.84 (q, J=7.0 Hz, 4H), 2.74 (h, J=6.9 Hz, 8H), 2.07 (d, J=5.0 Hz, 4H), 1.34 (d, J=6.9 Hz, 24H), 1.09 (d, J=6.9 Hz, 48H), 0.54 (t, J=7.0 Hz, 6H). $^{13}$C NMR (101 MHz, Chloroform-d) δ 156.44, 148.84, 147.72, 147.15, 146.97, 140.95, 137.42, 132.92, 132.03, 130.91, 129.16, 128.30, 123.98, 123.21, 122.69, 120.92, 120.58, 120.57, 120.51, 112.36, 110.12, 97.06, 34.29, 30.24, 26.17, 24.38, 24.31, 24.29, 24.12, 14.11.

Example 62: Synthesis of Procatalyst 29

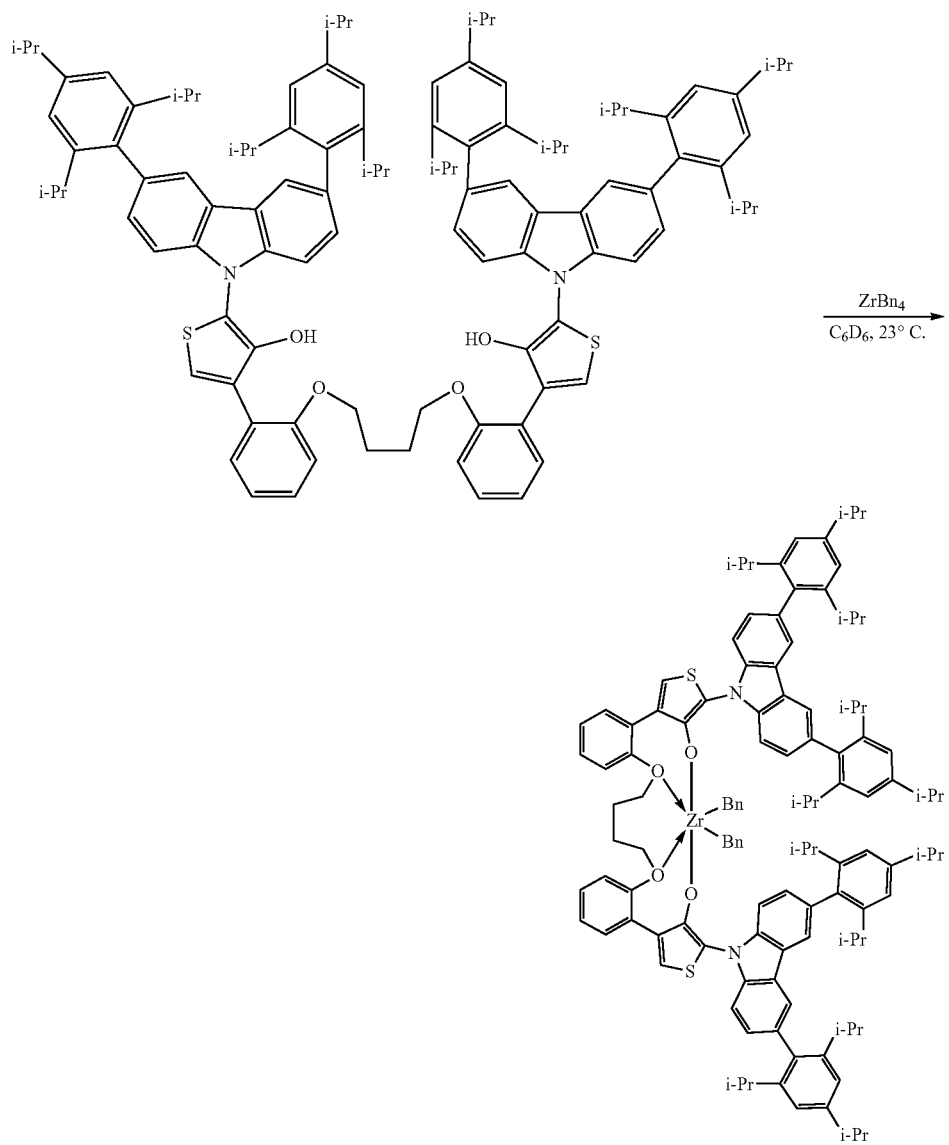

The thiophene ligand was azeotropically dried using toluene (4×10 mL) prior to use. To a clear colorless solution of the thiophene (20.0 mg, 0.0127 mmol, 1.00 eq) in anhydrous $C_6D_6$ (1.0 mL) in a nitrogen filled glovebox at 23° C. was added a solution of ZrBn$_4$ (5.8 mg, 0.0127 mmol, 1.00 eq) in $C_6D_6$ (0.24 mL) in a dropwise manner. After stirring (500 rpm) for 1 hr the pale golden yellow solution was filtered using a 0.20 μm PTFE submicron filter to afford the zirconium complex as a 0.01 M solution in $C_6D_6$. NMR indicated product. The same procedure can be used with toluene as the solvent to prepare the procatalyst solution (0.005 M) which is used directly after filtration for the polymerization experiments.

$^1$H NMR (400 MHz, Benzene-d$_6$) δ 8.09 (d, J=1.5 Hz, 2H), 7.97 (d, J=1.2 Hz, 2H), 7.75 (d, J=8.3 Hz, 2H), 7.41-7.35 (m, 4H), 7.25-7.12 (m, 10H), 6.97-6.94 (m, 4H), 6.85-6.75 (m, 6H), 6.62 (s, 2H), 6.61-6.55 (m, 2H), 6.12-6.05 (m, 4H), 5.89 (dd, J=8.0, 1.4 Hz, 2H), 4.13 (t, J=10.2 Hz, 2H), 3.42 (d, J=11.5 Hz, 2H), 3.09-2.69 (m, 12H), 1.86 (d, J=11.8 Hz, 2H), 1.38-0.97 (m, 62H), 0.97-0.88 (m, 6H), 0.85 (d, J=6.8 Hz, 6H), 0.89-0.80 (m, 2H), 0.76-0.65 (m, 2H). $^{13}$C NMR (101 MHz, Benzene-d$_6$) δ 155.12, 152.04, 148.20, 148.08, 147.83, 147.70, 147.66, 147.09, 146.69, 146.51, 140.61, 140.33, 137.84, 137.67, 133.67, 133.26, 133.00, 128.84, 128.15, 126.38, 124.55, 122.75, 122.54, 121.41, 121.13, 120.79, 120.75, 120.50, 120.44, 120.35, 120.10, 117.19, 115.44, 112.27, 108.98, 79.88, 75.02, 34.57, 34.48, 30.54, 30.49, 30.43, 30.34, 25.91, 24.78, 24.29, 24.27, 24.24, 24.11, 24.08, 24.04, 24.02.

Example 63: Synthesis of Procatalyst 30

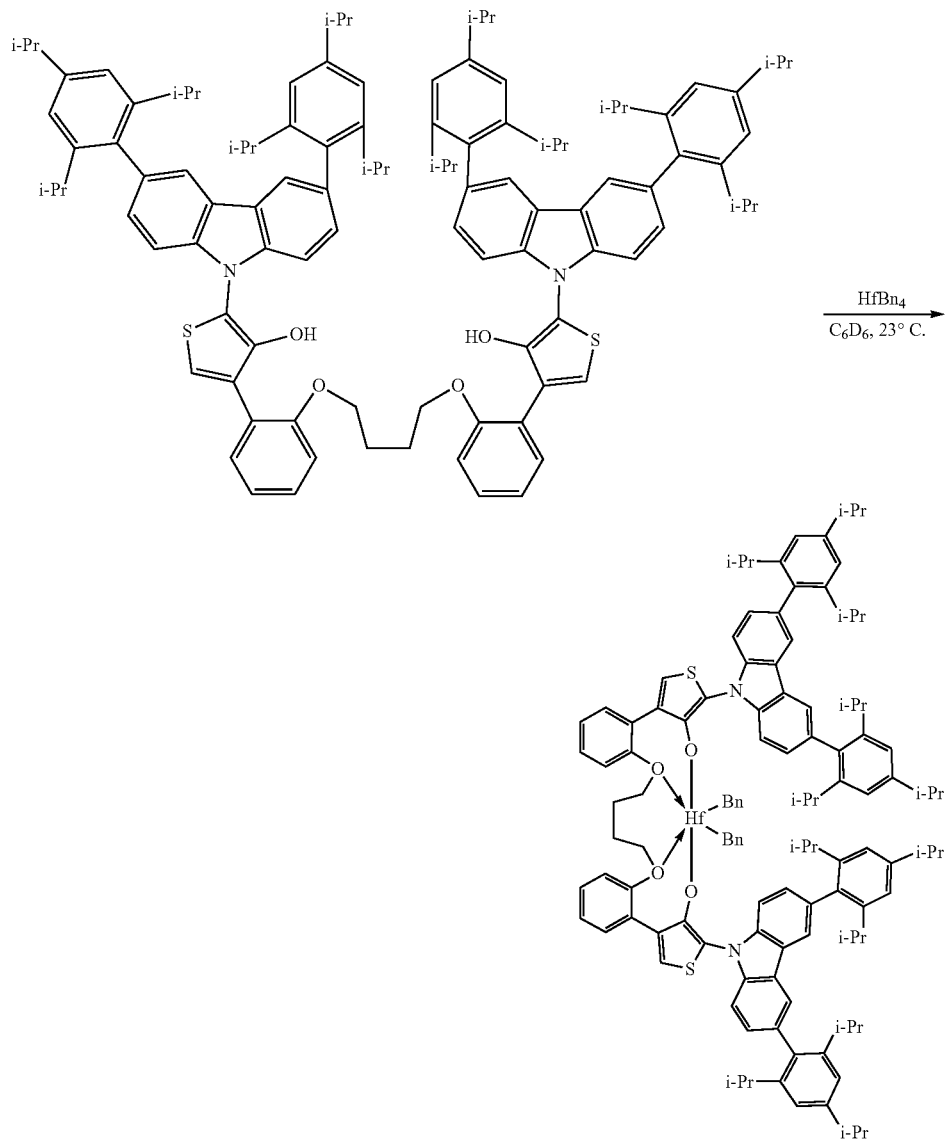

The thiophene ligand was azeotropically dried using toluene (4×10 mL) prior to use. To a clear colorless solution of the thiophene (20.0 mg, 0.0127 mmol, 1.00 eq) in anhydrous $C_6D_6$ (1.0 mL) in a nitrogen filled glovebox at 23° C. was added a solution of $HfBn_4$ (6.9 mg, 0.0127 mmol, 1.00 eq) in $C_6D_6$ (0.28 mL) in a dropwise manner. After stirring (500 rpm) for 1 hr the pale golden yellow solution was filtered using a 0.20 μm PTFE submicron filter to afford the hafnium complex as a 0.01 M solution in $C_6D_6$. NMR indicated product. The same procedure can be used with toluene as the solvent to prepare the procatalyst solution (0.005 M) which is used directly after filtration for the polymerization experiments.

$^1$H NMR (400 MHz, Benzene-$d_6$) δ 8.11 (dd, J=1.7, 0.6 Hz, 2H), 8.01-7.98 (m, 2H), 7.75-7.71 (m, 2H), 7.42-7.32 (m, 6H), 7.26 (s, 4H), 7.16 (dd, J=7.4, 2.0 Hz, 4H), 7.11 (dd, J=5.3, 2.4 Hz, 2H), 6.98-6.93 (m, 2H), 6.91-6.74 (m, 6H), 6.61 (s, 2H), 6.59-6.54 (m, 2H), 6.18-6.12 (m, 4H), 5.82 (dd, J=7.9, 1.6 Hz, 2H), 4.23 (t, J=10.7 Hz, 2H), 3.44 (d, J=11.2 Hz, 2H), 3.09-2.68 (m, 12H), 1.78 (d, J=13.0 Hz, 2H), 1.29 (dt, J=6.8, 1.9 Hz, 18H), 1.19 (ddd, J=7.1, 3.6, 2.0 Hz, 18H), 1.17-1.14 (m, 6H), 1.14-1.11 (m, 6H), 1.09 (dd, J=7.0, 1.9 Hz, 6H), 1.06 (d, J=6.8 Hz, 6H), 0.94 (d, J=6.8 Hz, 6H), 0.86 (d, J=6.9 Hz, 6H), 0.78 (d, J=8.5 Hz, 2H), 0.72 (d, J=13.1 Hz, 2H), 0.61 (d, J=13.2 Hz, 2H). $^{13}$C NMR (101 MHz, Benzene-$d_6$) δ 155.15, 151.90, 148.22, 147.82, 147.72, 147.60, 147.09, 146.58, 140.43, 140.12, 137.87, 137.66, 133.67, 133.24, 132.70, 131.67, 130.15, 129.85, 129.35, 129.02, 128.54, 128.15, 127.14, 126.61, 126.55, 126.18, 124.54, 124.32, 123.30, 122.60, 121.36, 121.06, 120.79, 120.75, 120.52, 120.33, 120.08, 116.92, 116.04, 112.43, 108.83, 81.55, 79.59, 34.57, 34.48, 30.54, 30.42, 30.33, 26.26, 24.79, 24.42, 24.36, 24.32, 24.29, 24.26, 24.10, 24.08, 24.04, 23.97, 23.91.

Example 64: Synthesis of Intermediate to Ligand 13

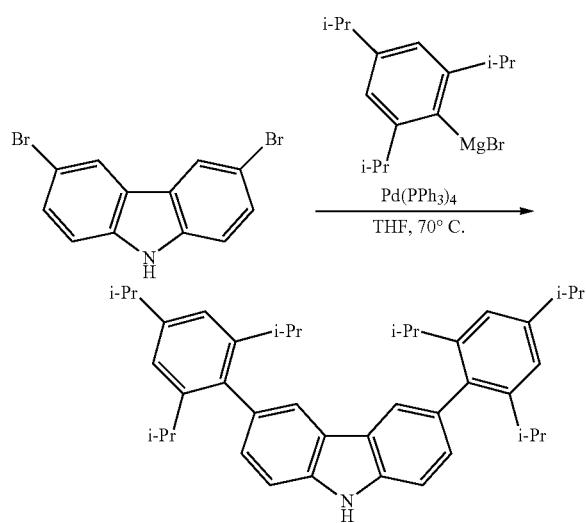

To a solution of 3,6-dibromocarbazole (2.000 g, 6.154 mmol, 1.00 eq) and Pd(PPh$_3$)$_4$ (0.711 g, 0.6155 mmol, 0.10 eq) in anhydrous deoxygenated THF (30 mL) in a nitrogen filled glovebox was added a solution of 2,4,6-triisopropylphenyl magnesium bromide (39.4 mL, 19.693 mmol, 3.30 eq, 0.5 M in THF) in a quick dropwise manner. The now golden yellow solution was placed in a mantle heated to 70° C., stirred (500 rpm) for 48 hrs, the resultant black solution was removed from the mantle, allowed to cool gradually to 23° C., neutralized with i-PrOH (10 mL), stirred for 2 mins, removed from the glovebox, diluted with CH$_2$Cl$_2$ (20 mL), suction filtered through silica gel, rinsed with CH$_2$Cl$_2$ (4×20 mL), the filtrate solution was concentrated onto celite, and purified via silica gel chromatography; hexanes 25% CH$_2$Cl$_2$ in hexanes to afford the disubstituted carbazole as a white solid (2.041 g, 3.569 mmol, 58%). NMR indicated pure product.

$^1$H NMR (500 MHz, Chloroform-d) δ 8.14 (s, 1H), 7.86-7.81 (m, 2H), 7.49 (dd, J=8.2, 0.7 Hz, 2H), 7.29-7.23 (m, 2H), 7.10 (s, 4H), 2.98 (hept, J=6.9 Hz, 2H), 2.75 (hept, J=6.9 Hz, 4H), 1.34 (d, J=7.0 Hz, 12H), 1.10 (d, J=6.9 Hz, 24H). $^{13}$C NMR (126 MHz, Chloroform-d) δ 147.64, 147.14, 138.58, 137.56, 131.93, 128.06, 123.04, 121.14, 120.52, 110.02, 34.28, 30.25, 24.35, 24.26, 24.12.

Example 65: Synthesis of Ligand 14

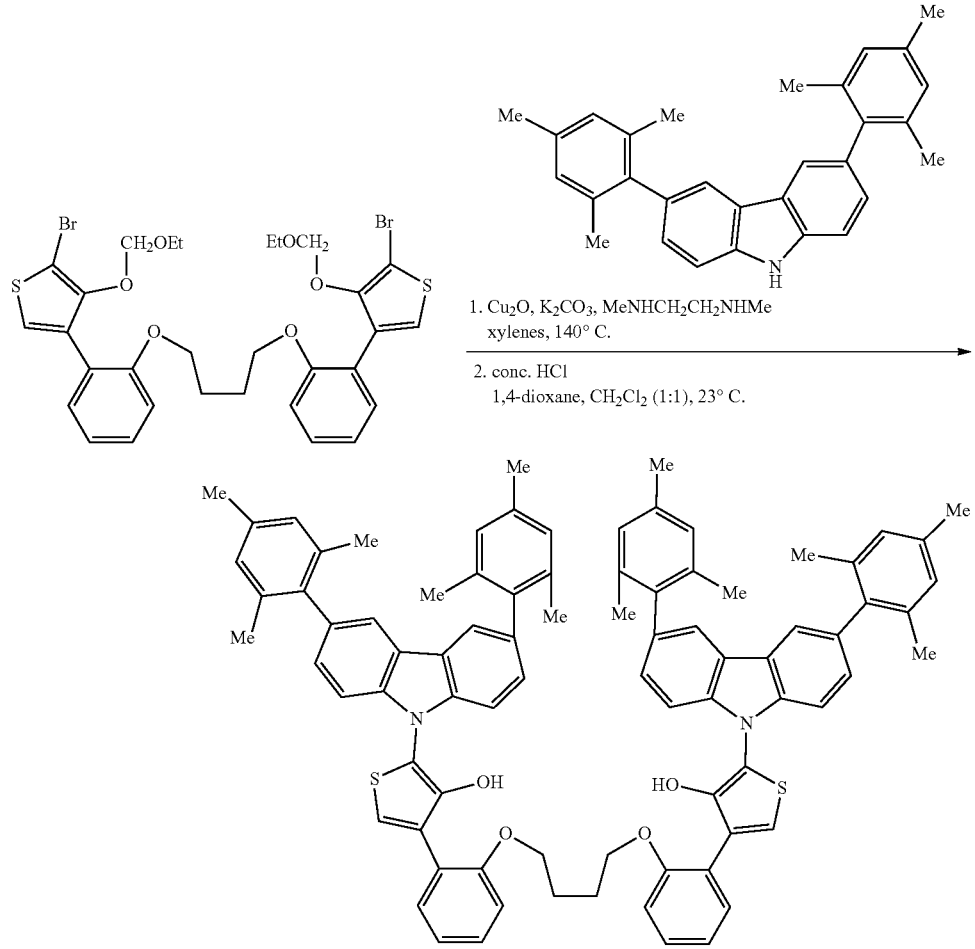

The dibromide was azeotropically dried using toluene (4×10 mL) prior to use. In a nitrogen filled glovebox a solid mixture of the dibromide (0.864 g, 1.213 mmol, 1.00 eq), the carbazole (1.512 g, 3.747 mmol, 3.10 eq), Cu$_2$O (0.868 g, 6.063 mmol, 5.00 eq), and K$_2$CO$_3$ (3.353 g, 24.260 mmol, 20.0 eq) in an oven-dried flask equipped with a stirbar and reflux condenser was suspended in anhydrous deoxygenated xylenes (25.0 mL), neat N,N'-dimethylethylenediamine (1.30 mL, 11.930 mmol, 10.00 eq) was added via syringe, the mixture was then sealed under nitrogen, removed from the glovebox, placed under nitrogen, placed in a mantle heated to 140° C., stirred vigorously (1000 rpm) for 72 hrs, the dark red heterogeneous mixture was removed from the mantle, allowed to cool gradually to 23° C., diluted with CH$_2$Cl$_2$ (30 mL), stirred vigorously (1000 rpm) for 2 mins, suction filtered over silica gel using CH$_2$Cl$_2$ as the eluent, rinsed with CH$_2$Cl$_2$ (4×25 mL), the golden orange filtrate was concentrated onto celite, and purified via silica gel chromatography; 10%-50% CH$_2$Cl$_2$ in hexanes to afford the biscarbazoyl-thiophene as a white foam (0.167 g, 0.1230 mmol, 11%). NMR indicated product which contained minor impurities. The product was used in the subsequent reaction without further purification.

To a solution of the protected hydroxythiophene (0.167 g, 0.1230 mmol, 1.00 eq) in CH$_2$Cl$_2$ (5 mL) and 1,4-dioxane (5 mL) was added concentrated HCl (5 mL) under nitrogen at 23° C. After stirring vigorously (1000 rpm) for 16 hrs the pale golden brown solution was diluted with aqueous HCl (20 mL, 1 N) and CH$_2$Cl$_2$ (20 mL), poured into a separatory funnel, partitioned, organics were washed with aqueous HCl (1×20 mL), residual organics were extracted from the aqueous layer using CH$_2$Cl$_2$ (2×20 mL), combined, dried over solid Na$_2$SO$_4$, decanted, concentrated onto celite, and purified via silica gel chromatography; 10%-50% CH$_2$Cl$_2$ in hexanes to afford the hydroxythiophene as a pale yellow foam (0.129 g, 0.1039 mmol, 85%, 9% two steps). NMR indicated pure product.

$^1$H NMR (400 MHz, Chloroform-d) δ 7.79 (s, 4H), 7.44 (dd, J=8.0, 4.6 Hz, 6H), 7.30 (td, J=7.9, 1.8 Hz, 2H), 7.15 (td, J=7.5, 1.0 Hz, 2H), 7.10 (s, 2H), 7.05 (dd, J=8.3, 1.6 Hz, 4H), 7.00 (s, 4H), 6.96 6.92 (m, 2H), 6.91 (s, 4H), 6.76 (s, 2H), 4.10-4.04 (m, 4H), 2.38 (s, 12H), 2.06 (s, 12H), 2.00 (t, J=3.4 Hz, 4H), 1.91 (s, 12H). $^{13}$C NMR (101 MHz, Chloroform-d) δ 154.07, 148.15, 141.09, 139.57, 136.65, 136.28, 133.18, 131.44, 130.59, 129.55, 128.01, 128.00 127.92 (m), 127.43, 124.49, 123.68, 123.02, 120.70, 119.97, 115.04, 113.89, 110.25, 70.12, 26.36, 21.07, 20.93.

Characterization of the Protected Ligand:
$^1$H NMR (400 MHz, Chloroform-d) δ 7.81 (s, 4H), 7.55 (dd, J=8.4, 4.0 Hz, 6H), 7.31 (s, 2H), 7.24 (dt, J=13.7, 8.0 Hz, 6H), 7.05 6.92 (m, 12H), 4.58 (s, 4H), 4.13 (d, J=4.8 Hz, 4H), 2.84 (q, J=7.0 Hz, 4H), 2.37 (s, 12H), 2.10 2.05 (m, 4H), 2.07 (s, 12H), 2.05 (s, 12H), 0.55 (t, J=7.0 Hz, 6H).

Example 66: Synthesis of Procatalyst 31

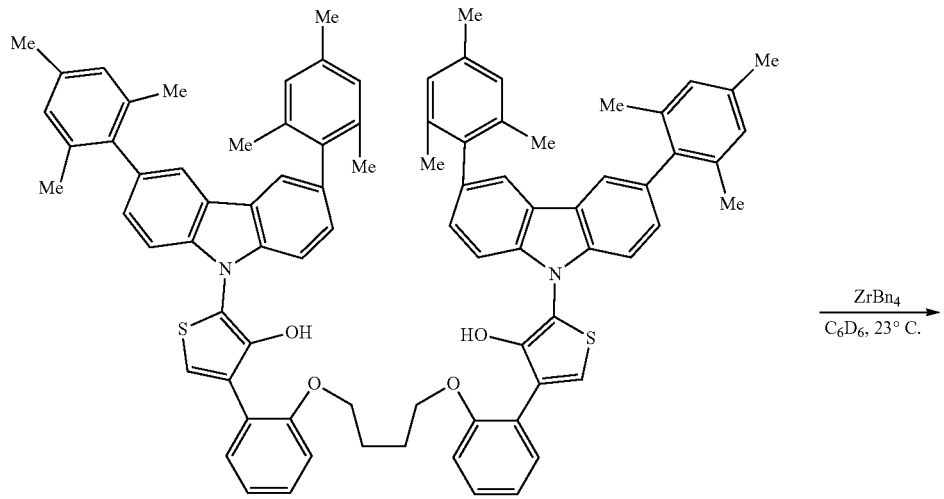

-continued

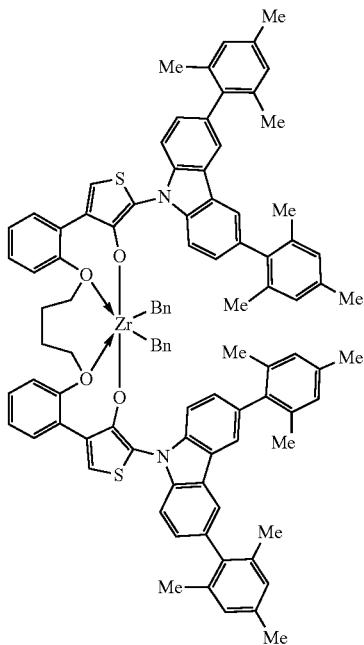

The thiophene ligand was azeotropically dried using toluene (4×10 mL) prior to use. To a clear colorless solution of the thiophene (11.0 mg, 0.00885 mmol, 1.00 eq) in anhydrous $C_6D_6$ (0.77 mL) in a nitrogen filled glovebox at 23° C. was added a solution of $ZrBn_4$ (4.1 mg, 0.00885 mmol, 1.00 eq) in $C_6D_6$ (0.17 mL) in a dropwise manner. After stirring (500 rpm) for 1 hr the pale golden yellow solution was filtered using a 0.20 μm PTFE submicron filter to afford the zirconium complex as a 0.01 M solution in $C_6D_6$. NMR indicated product. The same procedure can be used with toluene as the solvent to prepare the procatalyst solution (0.005 M) which is used directly after filtration for the polymerization experiments.

$^1$H NMR (400 MHz, Benzene-$d_6$) δ 7.93 (dd, J=1.6, 0.7 Hz, 2H), 7.79-7.74 (m, 4H), 7.50-7.45 (m, 2H), 7.41 (dd, J=8.4, 0.7 Hz, 2H), 7.33-7.22 (m, 4H), 6.95 (dddt, J=5.9, 2.1, 1.4, 0.7 Hz, 6H), 6.93-6.87 (m, 2H), 6.87-6.83 (m, 6H), 6.81-6.76 (m, 2H), 6.70-6.63 (m, 2H), 6.62 (s, 2H), 6.12 (dd, J=8.3, 1.3 Hz, 4H), 5.75 (dd, J=8.3, 1.2 Hz, 2H), 4.20 (t, J=10.6 Hz, 2H), 3.45 (d, J=12.5 Hz, 2H), 2.23 (s, 6H), 2.21 (s, 6H), 2.14 (s, 6H), 2.11 (s, 6H), 2.10 (s, 6H), 1.88 (s, 6H), 1.72 (d, J=12.2 Hz, 2H), 0.90 (d, J=12.2 Hz, 2H), 0.87-0.74 (m, 2H), 0.64 (d, J=13.0 Hz, 2H). $^{13}$C NMR (101 MHz, Benzene-$d_6$) δ 155.52, 151.75, 146.75, 140.31, 139.99, 139.56, 139.44, 136.69, 136.55, 136.26, 135.84, 135.80, 135.58, 134.03, 133.62, 133.10, 130.53, 130.35, 128.94, 128.44, 128.25, 126.26, 124.92, 123.10, 121.39, 120.94, 120.54, 116.94, 115.57, 112.75, 109.22, 80.80, 76.08, 26.15, 21.37, 21.02, 21.00, 20.91, 20.81, 20.72.

Example 67: Synthesis of Procatalyst 32

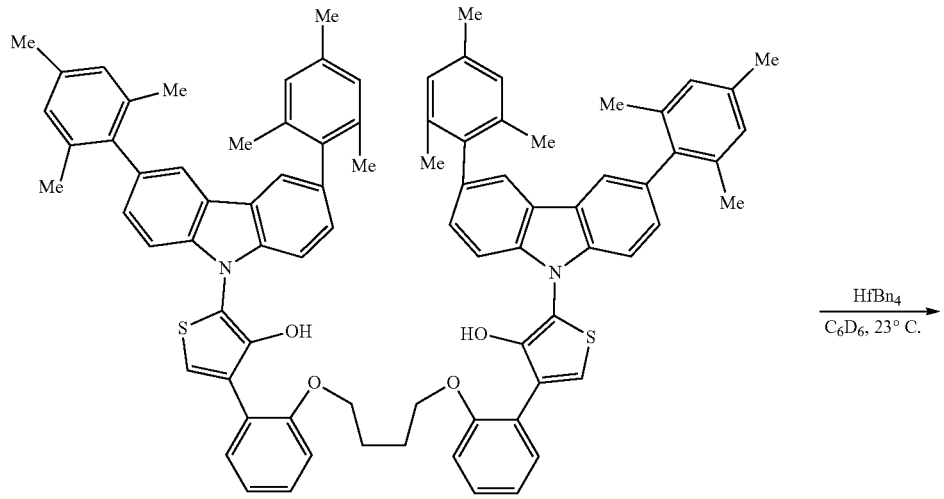

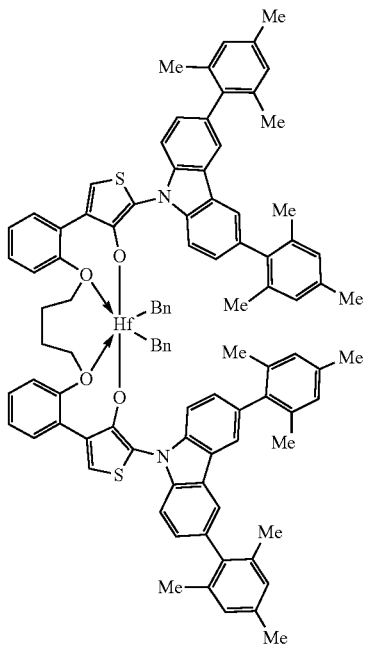

The thiophene ligand was azeotropically dried using toluene (4×10 mL) prior to use. To a clear colorless solution of the thiophene (15.2 mg, 0.0122 mmol, 1.00 eq) in anhydrous $C_6D_6$ (0.83 mL) in a nitrogen filled glovebox at 23° C. was added a solution of $HfBn_4$ (6.7 mg, 0.0122 mmol, 1.00 eq) in $C_6D_6$ (0.29 mL) in a dropwise manner. After stirring (500 rpm) for 1 hr the pale golden yellow solution was filtered using a 0.20 μm PTFE submicron filter to afford the hafnium complex as a 0.01 M solution in $C_6D_6$. NMR indicated product. The same procedure can be used with toluene as the solvent to prepare the procatalyst solution (0.005 M) which is used directly after filtration for the polymerization experiments.

$^1$H NMR (400 MHz, Benzene-$d_6$) δ 7.94 (dd, J=1.6, 0.6 Hz, 2H), 7.79 (t, J=1.1 Hz, 2H), 7.75 (dd, J=8.2, 0.7 Hz, 2H), 7.32 (d, J=0.8 Hz, 2H), 7.31 (d, J=1.5 Hz, 2H), 7.26-7.23 (m, 2H), 6.96 (tdd, J=3.6, 1.4, 0.7 Hz, 6H), 6.90 (tt, J=7.5, 2.3 Hz, 4H), 6.87-6.83 (m, 2H), 6.79 (td, J=7.6, 1.2 Hz, 2H), 6.70-6.64 (m, 2H), 6.62 (s, 2H), 6.63-6.58 (m, 4H), 6.13 (dd, J=8.2, 1.3 Hz, 4H), 5.75 (dd, J=8.3, 1.2 Hz, 2H), 4.27 (t, J=10.7 Hz, 2H), 3.57-3.44 (m, 2H), 2.23 (s, 6H), 2.21 (s, 6H), 2.14 (s, 6H), 2.11 (s, 6H), 2.10 (s, 6H), 1.89 (s, 6H), 1.55 (d, J=13.2 Hz, 2H), 0.79 (q, J=9.4, 8.8 Hz, 2H), 0.64 (d, J=13.2 Hz, 2H), 0.60-0.50 (m, 2H). $^{13}$C NMR (101 MHz, Benzene-$d_6$) δ 155.43, 151.81, 147.43, 140.20, 139.91, 139.58, 139.44, 137.46, 136.74, 136.57, 136.27, 135.55, 134.04, 133.61, 132.77, 131.69, 130.41, 129.85, 129.00, 128.54, 128.45, 128.27, 128.07, 127.06, 126.80, 126.58, 126.22, 125.26, 124.92, 123.34, 123.02, 121.38, 120.96, 120.47, 116.82, 116.02, 112.81, 109.15, 81.81, 79.70, 26.36, 21.39, 21.05, 21.00, 20.90, 20.81, 20.72.

Example 68: Synthesis of Intermediate to Ligand 14

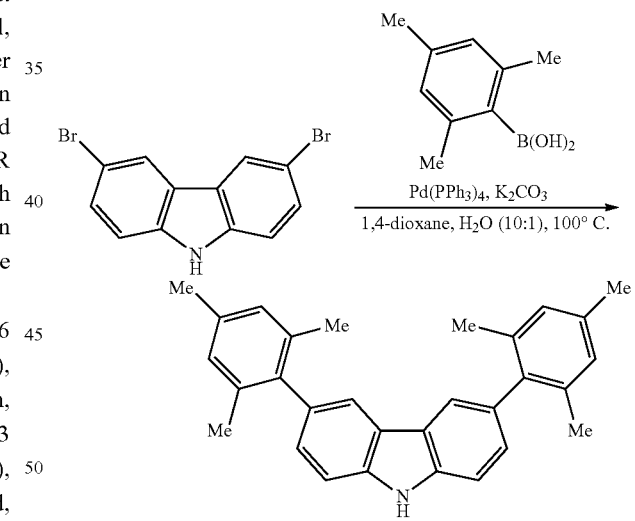

A mixture of the carbazole (2.000 g, 6.154 mmol, 1.00 eq), 2,4,6-trimethylphenyl boronic acid (6.056 g, 36.923 mmol, 6.00 eq), Pd(PPh$_3$)$_4$ (1.422 g, 1.231 mmol, 0.20 eq), and K$_2$CO$_3$ (15.309 g, 110.8 mmol, 18.0 eq) equipped with a reflux condenser was evacuated, then back-filled with nitrogen, this evacuation/re-fill process was repeated 3× more, freshly deoxygenated 1,4-dioxane (70 mL) and H$_2$O (7.0 mL) were added simultaneously via syringes, the golden yellow mixture was placed in a mantle heated to 100° C., stirred vigorously (1000 rpm) for 48 hrs, removed from the mantle, allowed to cool gradually to 23° C., the golden yellow suspension was suction filtered through silica gel, rinsed with CH$_2$Cl$_2$ (4×20 mL), the yellow filtrate solution was concentrated onto celite, and purified via silica gel chromatography; hexanes 50% CH₂Cl₂ in hexanes to afford the disubstituted carbazole as a white foam (1.542 g, 3.821 mmol, 62%). NMR indicated pure product.

¹H NMR (500 MHz, Chloroform-d) δ 8.04 (s, 1H), 7.90-7.86 (m, 2H), 7.53 (dd, J=8.2, 0.7 Hz, 2H), 7.28 (dd, J=8.2, 1.6 Hz, 2H), 7.08 (s, 4H), 2.45 (s, 6H), 2.15 (s, 12H). ¹³C NMR (126 MHz, Chloroform-d) δ 139.73, 138.67, 136.76, 136.44, 132.36, 128.13, 127.48, 123.56, 120.85, 110.66, 21.16, 21.12.

Example 69: Synthesis of Ligand 15 rinsed with CH₂Cl₂ (4×25 mL), the golden orange filtrate was concentrated onto celite, and purified via silica gel chromatography; 10%-50% CH₂Cl₂ in hexanes to afford the biscarbazoyl-thiophene as a white foam (0.560 g, 0.3418 mmol, 28%). NMR indicated product. The product was used in the subsequent reaction without further purification.

To a solution of the protected hydroxythiophene (0.560 g, 0.3418 mmol, 1.00 eq) in CH₂Cl₂ (5 mL) and 1,4-dioxane (5 mL) was added concentrated HCl (5 mL) under nitrogen at 23° C. After stirring vigorously (1000 rpm) for 16 hrs the pale golden brown solution was diluted with aqueous HCl (20 mL, 1 N) and CH₂Cl₂ (20 mL), poured into a separatory

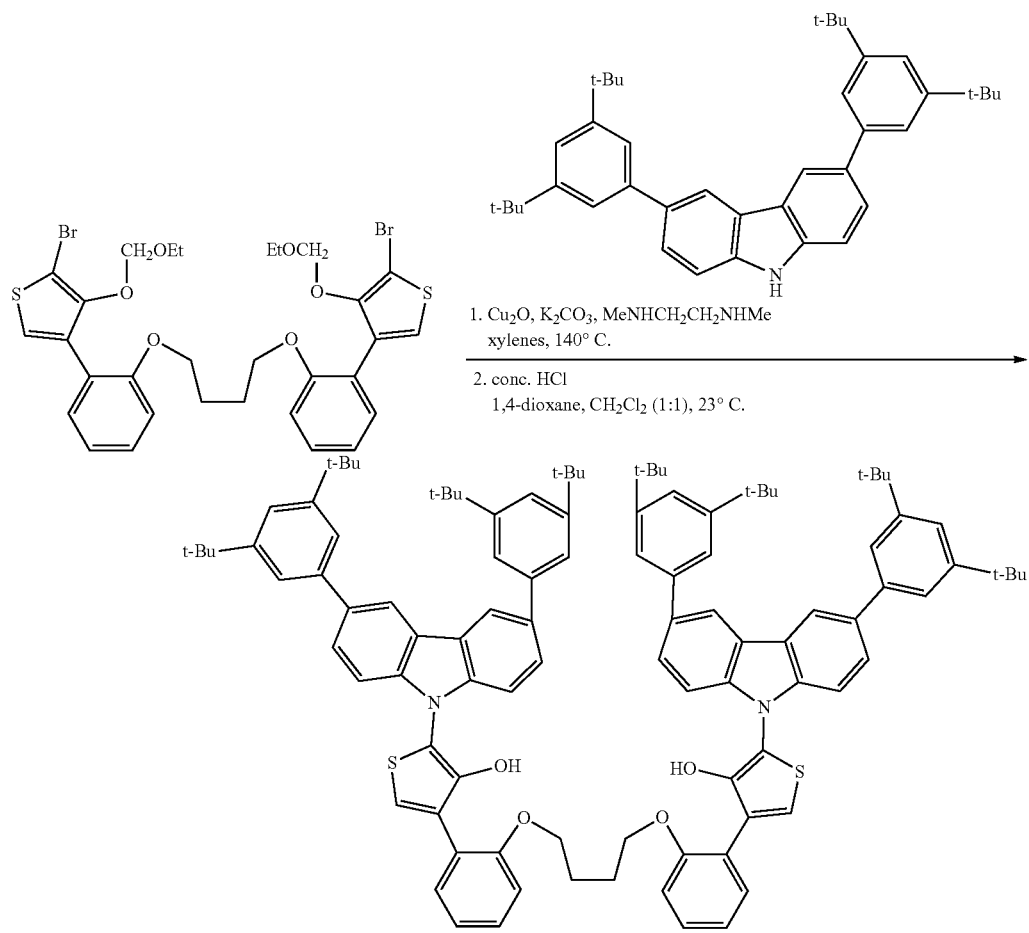

The dibromide was azeotropically dried using toluene (4×10 mL) prior to use. In a nitrogen filled glovebox a solid mixture of the dibromide (0.864 g, 1.213 mmol, 1.00 eq), the carbazole (1.557 g, 2.863 mmol, 2.36 eq), Cu₂O (0.868 g, 6.063 mmol, 5.00 eq), and K₂CO₃ (3.353 g, 24.260 mmol, 20.0 eq) in an oven-dried flask equipped with a stirbar and reflux condenser was suspended in anhydrous deoxygenated xylenes (25.0 mL), neat N,N'-dimethylethylenediamine (1.30 mL, 11.930 mmol, 10.00 eq) was added via syringe, the mixture was then sealed under nitrogen, removed from the glovebox, placed under nitrogen, placed in a mantle heated to 140° C., stirred vigorously (1000 rpm) for 72 hrs, the dark red heterogeneous mixture was removed from the mantle, allowed to cool gradually to 23° C., diluted with CH₂Cl₂ (30 mL), stirred vigorously (1000 rpm) for 2 mins, suction filtered over silica gel using CH₂Cl₂ as the eluent, funnel, partitioned, organics were washed with aqueous HCl (1×20 mL), residual organics were extracted from the aqueous layer using CH₂Cl₂ (2×20 mL), combined, dried over solid Na₂SO₄, decanted, concentrated onto celite, and purified via silica gel chromatography; 10%-50% CH₂Cl₂ in hexanes to afford the hydroxythiophene as a pale yellow foam (0.461 g, 0.3029 mmol, 89%, 25% two steps). NMR indicated pure product.

¹H NMR (400 MHz, Chloroform-d) δ 8.32 (d, J=1.6 Hz, 4H), 7.61 (dd, J=8.5, 1.7 Hz, 4H), 7.53-7.47 (m, 10H), 7.44 (t, J=1.8 Hz, 4H), 7.41 (d, J=8.4 Hz, 4H), 7.18 (s, 2H), 7.10 (td, J=7.8, 1.9 Hz, 2H), 7.04 (td, J=7.5, 1.2 Hz, 2H), 6.90 (s, 2H), 6.79 (dd, J=8.1, 1.2 Hz, 2H), 4.03 (d, J=4.9 Hz, 4H), 1.94-1.84 (m, 4H), 1.41 (s, 72H). ¹³C NMR (101 MHz, Chloroform-d) δ 154.06, 151.03, 148.00, 141.74, 141.55, 135.48, 131.26, 130.87, 129.70, 126.14, 124.23, 124.10, 122.73, 122.07, 120.80, 119.45, 119.24, 115.02, 113.51, 110.45, 69.56, 34.99, 31.59, 25.98.

Characterization of the Protected Ligand:

$^1$H NMR (400 MHz, Chloroform-d) δ 8.40 (s, 4H), 7.79-7.71 (m, 4H), 7.65-7.41 (m, 20H), 7.28 (t, J=7.8 Hz, 2H), 7.05 (q, J=8.3, 7.9 Hz, 4H), 4.62 (s, 4H), 4.21 (d, J=5.2 Hz, 4H), 2.92 (q, J=7.0 Hz, 4H), 2.21-2.11 (m, 4H), 1.49 (s, 72H), 0.62 (t, J=7.0 Hz, 6H). $^{13}$C NMR (101 MHz, Chloroform-d) δ 156.55, 151.12, 149.20, 141.73, 141.55, 135.72, 132.23, 131.04, 129.27, 126.40, 124.12, 122.11, 121.74, 120.93, 120.77, 120.59, 119.17, 112.34, 110.87, 96.83, 68.21, 64.56, 35.07, 31.68, 26.33, 14.29.

Example 70: Synthesis of Procatalyst 33

After stirring (500 rpm) for 1 hr the pale golden yellow solution was filtered using a 0.20 μm PTFE submicron filter to afford the zirconium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1$H NMR (400 MHz, Benzene-d$_6$) δ 8.56 (dd, J=1.7, 0.7 Hz, 2H), 8.10 (dd, J=1.8, 0.6 Hz, 2H), 7.78 (d, J=1.8 Hz, 4H), 7.77-7.70 (m, 4H), 7.65 (dd, J=8.5, 1.7 Hz, 2H), 7.60 (t, J=1.8 Hz, 2H), 7.53 (d, J=1.8 Hz, 4H), 7.47 (t, J=1.8 Hz, 2H), 7.34 (dd, J=8.4, 0.6 Hz, 2H), 7.13 (dd, J=7.7, 1.8 Hz, 2H), 7.01-6.96 (m, 4H), 6.94-6.89 (m, 2H), 6.73 (dddd, J=7.4, 6.1, 5.1, 1.2 Hz, 4H), 6.67 (s, 2H), 6.17-6.09 (m, 4H), 5.19 (dd, J=8.3, 1.1 Hz, 2H), 4.09 (t, J=10.5 Hz, 2H),

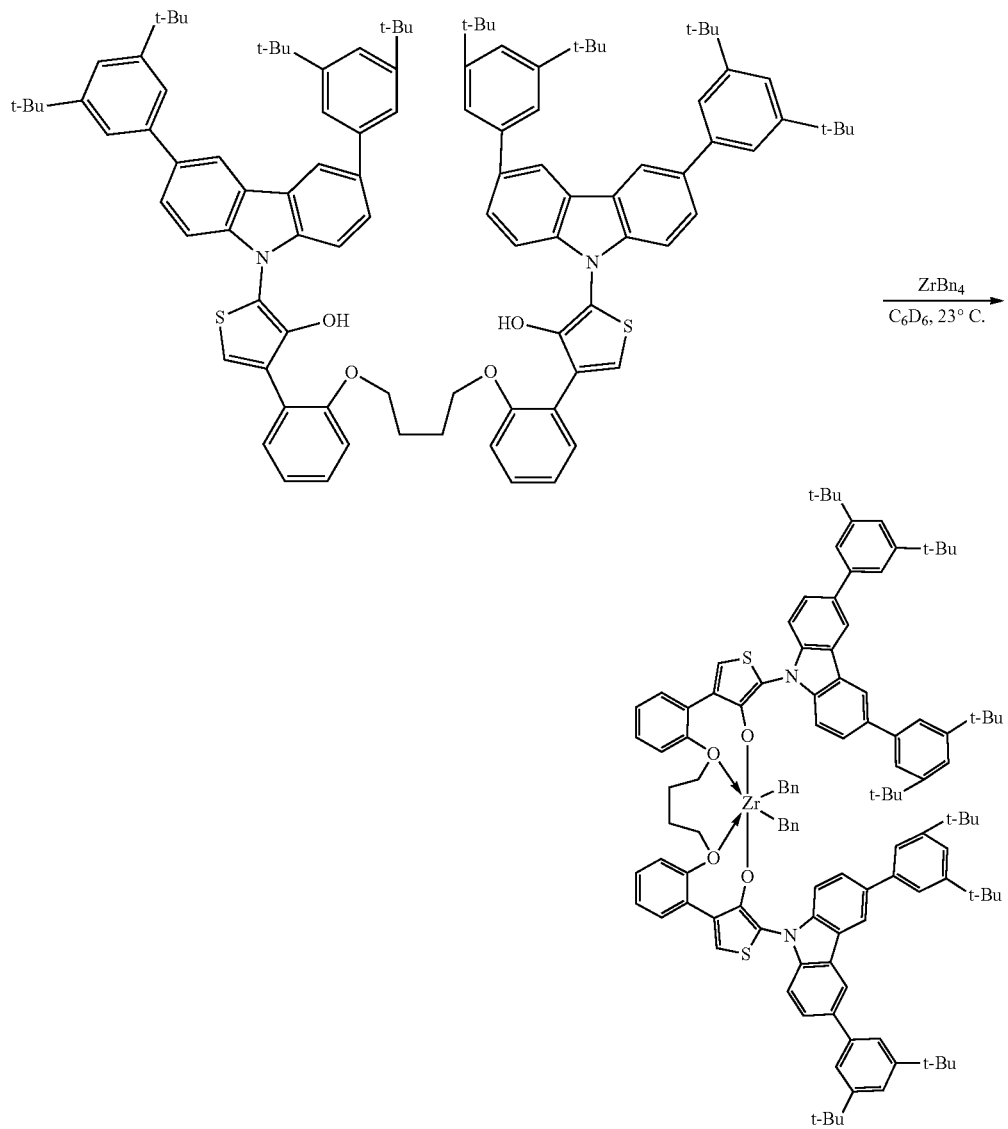

The thiophene ligand was azeotropically dried using toluene (4×10 mL) prior to use. To a clear colorless solution of the thiophene (14.9 mg, 0.00979 mmol, 1.00 eq) in anhydrous $C_6D_6$ (1.75 mL) in a nitrogen filled glovebox at 23° C. was added a solution of ZrBn$_4$ (4.5 mg, 0.00979 mmol, 1.00 eq) in $C_6D_6$ (0.19 mL) in a dropwise manner.

3.50-3.37 (m, 2H), 1.38 (s, 36H), 1.33 (s, 36H), 1.02 (d, J=12.1 Hz, 2H), 0.89-0.76 (m, 2H), 0.73-0.60 (m, 2H), 0.54 (d, J=12.1 Hz, 2H). $^{13}$C NMR (101 MHz, Benzene-d$_6$) δ 155.92, 152.28, 151.21, 150.56, 146.08, 142.48, 142.00, 141.42, 141.01, 136.51, 135.85, 133.02, 131.32, 130.44, 128.74, 128.15, 126.92, 125.90, 125.55, 125.26, 123.49, 123.30, 122.67, 122.36, 120.98, 120.58, 120.08, 119.62, 119.34, 117.07, 115.30, 112.77, 110.05, 80.79, 74.27, 34.79, 34.66, 31.43, 31.40, 31.37, 25.86.

Example 71: Synthesis of Procatalyst 34

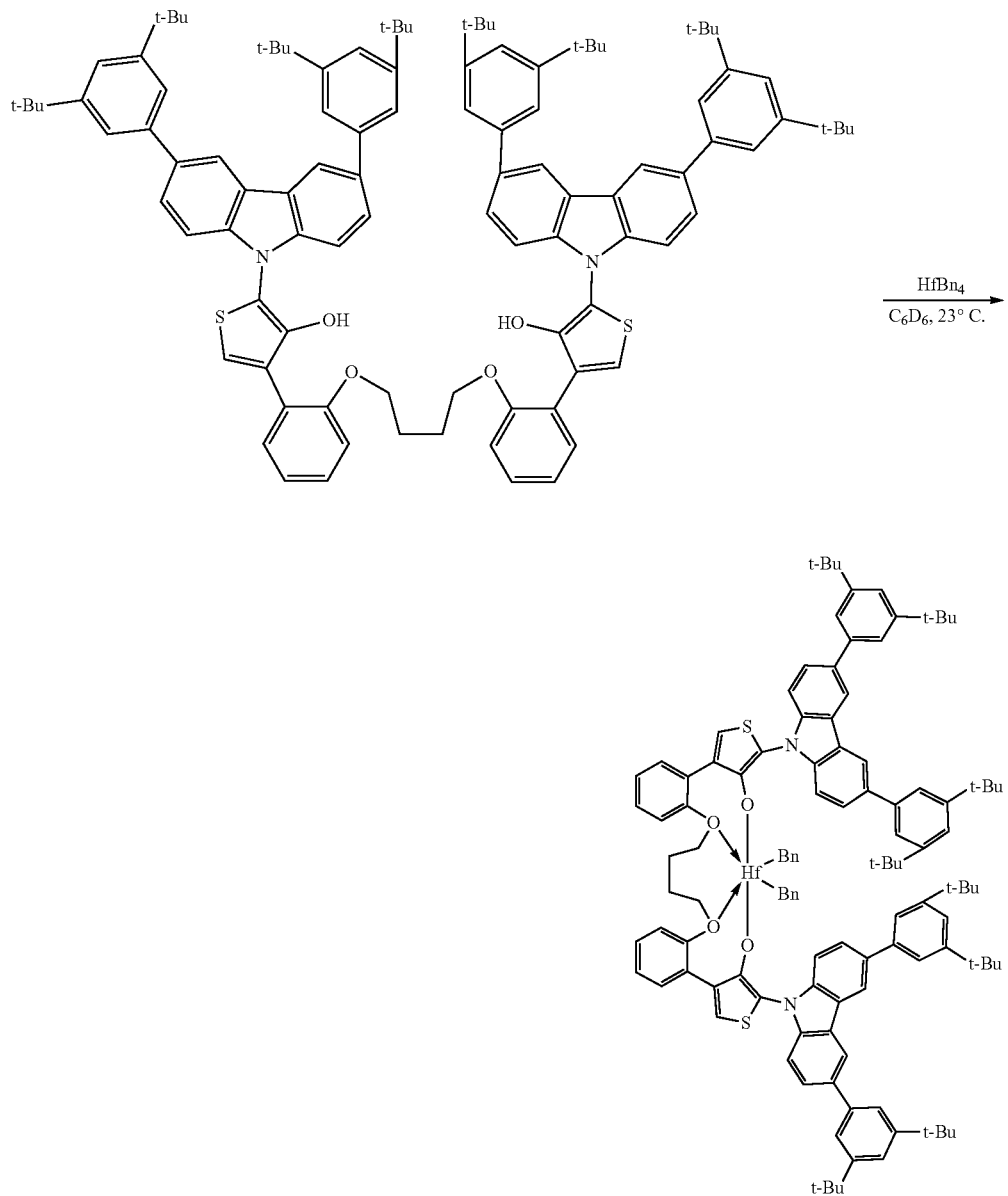

$^1$H NMR (400 MHz, Benzene-$d_6$) δ 8.61-8.55 (m, 2H), 8.10 (d, J=1.6 Hz, 2H), 7.78 (d, J=1.8 Hz, 4H), 7.76-7.67 (m, 4H), 7.65-7.58 (m, 4H), 7.53 (d, J=1.8 Hz, 4H), 7.47 (t, J=1.8 Hz, 2H), 7.26 (d, J=8.6 Hz, 2H), 7.13 (dd, J=7.7, 1.8 Hz, 2H), 7.05-6.99 (m, 2H), 6.98-6.90 (m, 4H), 6.74 (td, J=7.5, 1.1 Hz, 2H), 6.72-6.68 (m, 2H), 6.67 (s, 2H), 6.20-6.12 (m, 4H), 5.21-5.15 (m, 2H), 4.11 (t, J=10.8 Hz, 2H), 3.48 (d, J=9.3 Hz, 2H), 1.38 (s, 36H), 1.34 (s, 36H), 0.91 (d, J=13.2 Hz, 2H), 0.87-0.73 (m, 2H), 0.57 (d, J=13.0 Hz, 2H), 0.28 (d, J=13.2 Hz, 2H). $^{13}$C NMR (101 MHz, Benzene-$d_6$) δ 155.72, 152.33, 151.21, 150.55, 147.05, 142.51, 142.00, 141.35, 140.99, 136.54, 135.86, 132.67, 131.36, 130.50, 128.81, 128.15, 127.13, 127.08, 126.15, 125.62, 125.33, 125.26, 123.83, 123.23, 122.69, 122.35, 120.92, 120.58, 120.05, 119.58, 119.29, 116.96, 115.76, 112.85, 110.06, 81.80, 78.41, 34.79, 34.66, 31.45, 31.40, 26.05.

The thiophene ligand was azeotropically dried using toluene (4×10 mL) prior to use. To a clear colorless solution of the thiophene (15.9 mg, 0.0105 mmol, 1.00 eq) in anhydrous $C_6D_6$ (1.84 mL) in a nitrogen filled glovebox at 23° C. was added a solution of HfBn$_4$ (5.7 mg, 0.0105 mmol, 1.00 eq) in $C_6D_6$ (0.25 mL) in a dropwise manner. After stirring (500 rpm) for 1 hr the pale golden yellow solution was filtered using a 0.20 μm PTFE submicron filter to afford the hafnium complex as a 0.005 M solution in $C_6D_6$. NMR indicated product. The same procedure can be used with toluene as the solvent to prepare the procatalyst solution (0.005 M) which is used directly after filtration for the polymerization experiments.

Example 72: Synthesis of Intermediate to Ligand 15

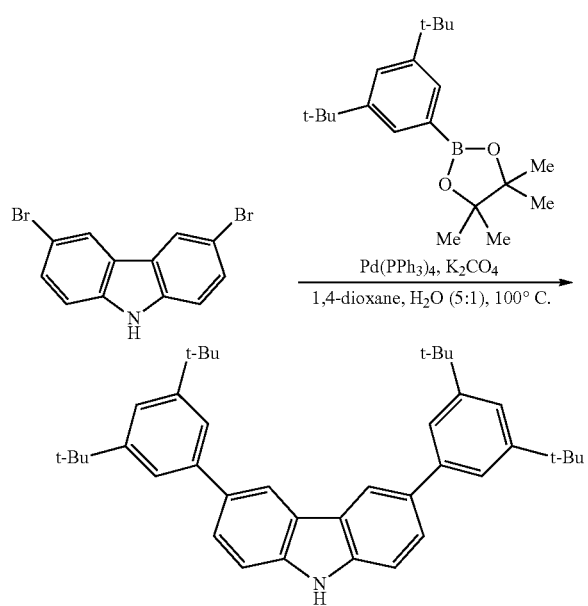

A mixture of the carbazole (1.062 g, 3.267 mmol, 1.00 eq), 3,5-di-t-butylphenyl boropinacolate ester (3.100 g, 9.801 mmol, 3.00 eq), Pd(PPh$_3$)$_4$ (0.755 g, 0.6534 mmol, 0.20 eq), and K$_3$PO$_4$ (6.241 g, 29.403 mmol, 9.00 eq) equipped with a reflux condenser was evacuated, then back-filled with nitrogen, this evacuation/re-fill process was repeated 3× more, freshly deoxygenated 1,4-dioxane (30 mL) and H$_2$O (5.0 mL) were added simultaneously via syringes, the golden yellow mixture was placed in a mantle heated to 100° C., stirred vigorously (1000 rpm) for 48 hrs, removed from the mantle, allowed to cool gradually to 23° C., the golden yellow suspension was suction filtered through silica gel, rinsed with CH$_2$Cl$_2$ (4×20 mL), the yellow filtrate solution was concentrated onto celite, and purified via silica gel chromatography; hexanes 50% CH$_2$Cl$_2$ in hexanes to afford the disubstituted carbazole as a white foam (1.551 g, 2.852 mmol, 87%). NMR indicated pure product.

$^1$H NMR (500 MHz, Chloroform-d) δ 8.34 8.29 (m, 2H), 8.10 (s, 1H), 7.68 (dd, J=8.4, 1.8 Hz, 2H), 7.54 (d, J=1.7 Hz, 4H), 7.51 (d, J=8.3 Hz, 2H), 7.45 (t, J=1.8 Hz, 2H), 1.43 (s, 36H). $^{13}$C NMR (126 MHz, Chloroform-d) δ 151.03, 141.57, 139.25, 134.55, 126.04, 123.93, 122.02, 120.74, 119.18, 110.71, 35.01, 31.60.

Example 73: Synthesis of Ligand 16

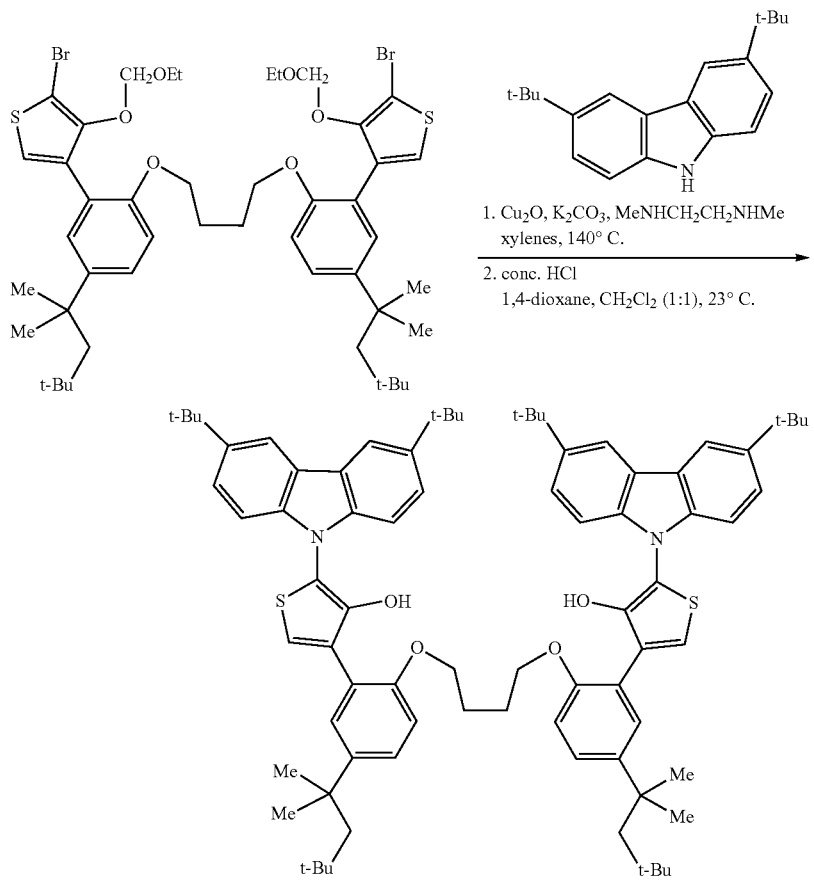

The dibromide was azeotropically dried using toluene (4×10 mL) prior to use. In a nitrogen filled glovebox a solid mixture of the dibromide (2.054 g, 2.192 mmol, 1.00 eq), the carbazole (3.063 g, 10.961 mmol, 5.00 eq), Cu$_2$O (1.568 g, 10.961 mmol, 5.00 eq), and K$_2$CO$_3$ (6.059 g, 43.844 mmol, 20.0 eq) in an oven-dried flask equipped with a stirbar and reflux condenser was suspended in anhydrous deoxygenated xylenes (50.0 mL), neat N,N'-dimethylethylenediamine (2.40 mL, 21.922 mmol, 10.00 eq) was added via syringe, the mixture was then sealed under nitrogen, removed from the glovebox, placed under nitrogen, placed in a mantle heated to 140° C., stirred vigorously (1000 rpm) for 72 hrs, the dark red heterogeneous mixture was removed from the mantle, allowed to cool gradually to 23° C., diluted with CH$_2$Cl$_2$ (30 mL), stirred vigorously (1000 rpm) for 2 mins, suction filtered over silica gel using CH$_2$Cl$_2$ as the eluent, rinsed with CH$_2$Cl$_2$ (4×25 mL), the golden orange filtrate was concentrated onto celite, and purified via silica gel chromatography; 10%-50% CH$_2$Cl$_2$ in hexanes to afford the biscarbazoyl-thiophene as a white foam (0.830 g, 0.6222 mmol, 28%). NMR indicated product. The product was used in the subsequent reaction without further purification.

To a solution of the protected hydroxythiophene (0.830 g, 0.6222 mmol, 1.00 eq) in CH$_2$Cl$_2$ (5 mL) and 1,4-dioxane (5 mL) was added concentrated HCl (5 mL) under nitrogen at 23° C. After stirring vigorously (1000 rpm) for 16 hrs the pale golden brown solution was diluted with aqueous HCl (20 mL, 1 N) and CH$_2$Cl$_2$ (20 mL), poured into a separatory funnel, partitioned, organics were washed with aqueous HCl (1×20 mL), residual organics were extracted from the aqueous layer using CH$_2$Cl$_2$ (2×20 mL), combined, dried over solid Na$_2$SO$_4$, decanted, concentrated onto celite, and purified via silica gel chromatography; 10%-50% CH$_2$Cl$_2$ in hexanes to afford the hydroxythiophene as a pale yellow foam (0.461 g, 0.4796 mmol, 77%, 22% two steps). NMR indicated pure product.

$^1$H NMR (500 MHz, Chloroform-d) δ 8.16 (dd, J=1.9, 0.6 Hz, 4H), 7.56 (d, J=2.5 Hz, 2H), 7.48 (dd, J=8.6, 1.9 Hz, 4H), 7.35 7.30 (m, 6H), 7.24 (s, 2H), 6.97 (s, 2H), 6.83 (d, J=8.6 Hz, 2H), 4.06 (d, J=4.2 Hz, 4H), 1.92 (q, J=2.7, 1.9 Hz, 4H), 1.81 (s, 4H), 1.49 (s, 36H), 1.45 (s, 12H), 0.82 (s, 18H). $^{13}$C NMR (126 MHz, Chloroform-d) δ 151.86, 147.93, 144.50, 143.11, 140.51, 131.44, 129.16, 127.22, 123.64, 123.53, 123.47, 119.02, 116.32, 115.57, 112.79, 109.73, 69.54, 56.98, 38.22, 34.78, 32.48, 32.11, 31.98, 31.71, 26.15.

Characterization of the Protected Ligand:

$^1$H NMR (400 MHz, Chloroform-d) δ 8.11 (d, J=1.9 Hz, 4H), 7.53 7.46 (m, 6H), 7.39 (d, J=8.6 Hz, 4H), 7.33-7.26 (m, 4H), 6.91 (d, J=8.6 Hz, 2H), 4.51 (s, 4H), 4.12 (d, J=4.7 Hz, 4H), 2.80 (q, J=7.0 Hz, 4H), 2.07 (s, 4H), 1.77 (s, 4H), 1.47 (s, 36H), 1.41 (s, 12H), 0.79 (s, 18H), 0.50 (t, J=7.0 Hz, 6H). $^{13}$C NMR (101 MHz, Chloroform-d) δ 154.30, 148.90, 143.23, 142.07, 140.55, 132.68, 128.72, 126.67, 123.79, 123.47, 123.42, 121.90, 120.33, 116.05, 111.56, 110.08, 96.36, 68.23, 64.38, 56.98, 38.06, 34.74, 32.41, 32.06, 31.90, 31.71, 26.45, 14.13.

Example 74: Synthesis of Procatalyst 35

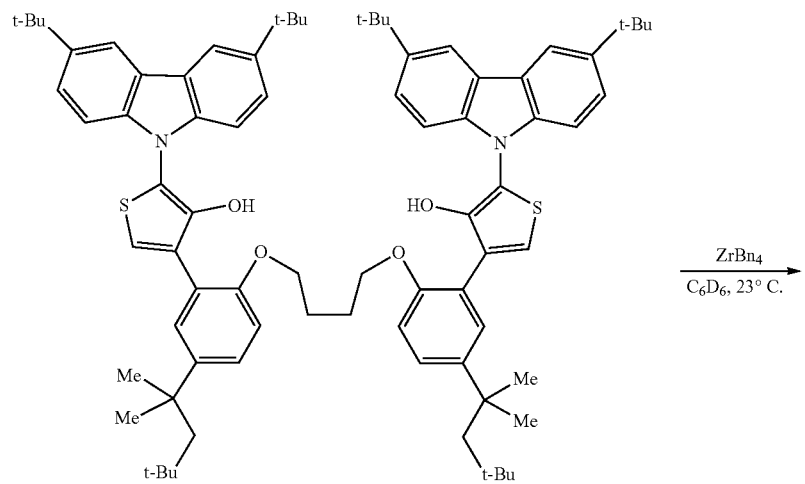

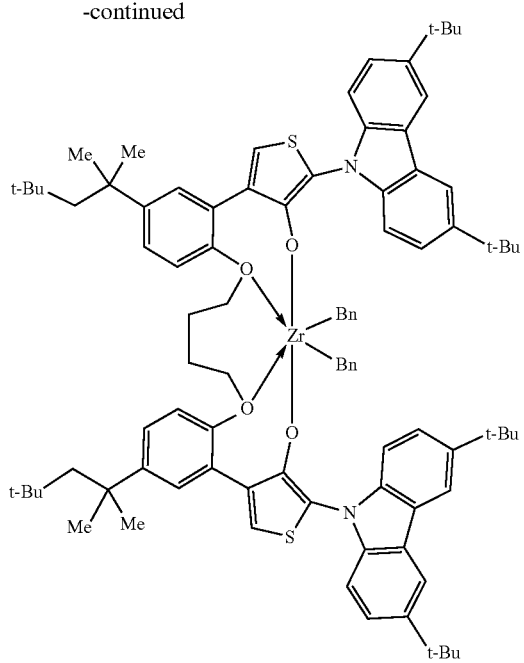

The thiophene ligand was azeotropically dried using toluene (4×10 mL) prior to use. To a clear colorless solution of the thiophene (15.2 mg, 0.0125 mmol, 1.00 eq) in anhydrous $C_6D_6$ (2.26 mL) in a nitrogen filled glovebox at 23° C. was added a solution of $ZrBn_4$ (5.7 mg, 0.0125 mmol, 1.00 eq) in $C_6D_6$ (0.24 mL) in a dropwise manner. After stirring (500 rpm) for 1 hr the pale golden yellow solution was filtered using a 0.20 μm PTFE submicron filter to afford the zirconium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1$H NMR (500 MHz, Benzene-$d_6$) δ 8.52 (dd, J=2.0, 0.6 Hz, 2H), 8.12 (dd, J=2.0, 0.6 Hz, 2H), 7.74 (dd, J=8.5, 0.6 Hz, 2H), 7.53 (dd, J=8.5, 1.9 Hz, 2H), 7.46-7.40 (m, 4H), 7.25 (dd, J=8.7, 0.6 Hz, 2H), 7.12-7.00 (m, 2H), 6.99-6.95 (m, 4H), 6.84 (tt, J=7.2, 1.3 Hz, 2H), 6.75 (s, 2H), 6.13-6.09 (m, 4H), 5.22 (d, J=8.7 Hz, 2H), 4.13 (t, J=10.8 Hz, 2H), 3.47 (dd, J=12.2, 4.6 Hz, 2H), 1.66 (d, J=14.6 Hz, 2H), 1.57 (s, 18H), 1.51 (d, J=14.6 Hz, 3H), 1.23 (s, 18H), 1.20 (s, 6H), 1.14 (s, 6H), 1.01 (d, J=12.1 Hz, 2H), 0.92 (d, J=5.4 Hz, 2H), 0.72 (s, 18H), 0.67 (d, J=5.4 Hz, 2H), 0.50 (d, J=12.4 Hz, 2H). $^{13}$C NMR (126 MHz, Benzene-$d_6$) δ 153.70, 151.82, 148.69, 146.79, 143.19, 142.99, 139.97, 139.55, 133.73, 128.21, 127.28, 126.81, 125.32, 124.96, 122.86, 122.68, 122.63, 120.61, 116.40, 116.35, 115.96, 115.88, 112.43, 109.47, 80.91, 74.39, 56.60, 38.21, 34.68, 34.37, 32.17, 32.08, 31.68, 31.65, 30.10, 25.85.

Example 75: Synthesis of Procatalyst 36

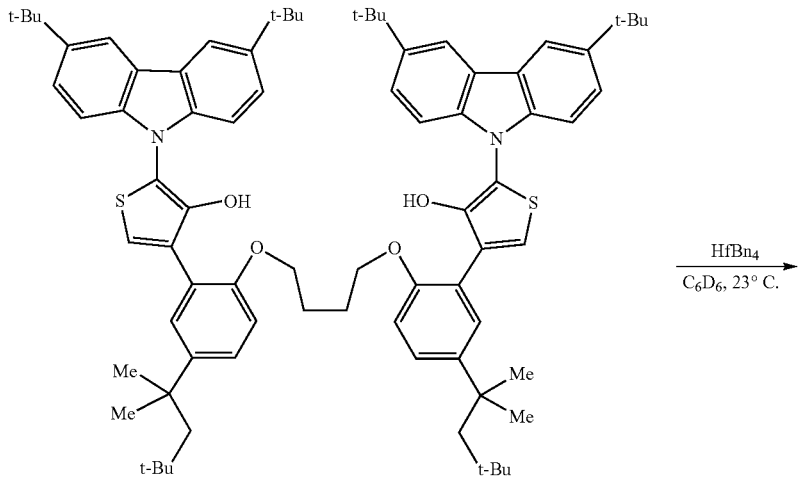

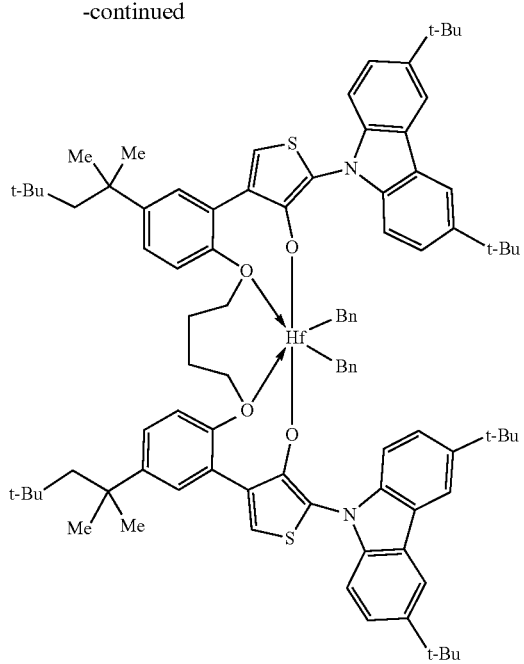

The thiophene ligand was azeotropically dried using toluene (4×10 mL) prior to use. To a clear colorless solution of the thiophene (17.5 mg, 0.0144 mmol, 1.00 eq) in anhydrous $C_6D_6$ (2.54 mL) in a nitrogen filled glovebox at 23° C. was added a solution of $HfBn_4$ (7.8 mg, 0.0144 mmol, 1.00 eq) in $C_6D_6$ (0.33 mL) in a dropwise manner. After stirring (500 rpm) for 1 hr the pale golden yellow solution was filtered using a 0.20 μm PTFE submicron filter to afford the hafnium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1$H NMR (500 MHz, Benzene-$d_6$) δ 8.54 (dd, J=2.0, 0.6 Hz, 2H), 8.13 (dd, J=2.0, 0.6 Hz, 2H), 7.72 (dd, J=8.5, 0.6 Hz, 2H), 7.53 (dd, J=8.5, 1.9 Hz, 2H), 7.43-7.40 (m, 4H), 7.15 (dd, J=8.8, 0.6 Hz, 2H), 7.07-7.05 (m, 2H), 7.01-6.95 (m, 4H), 6.81 (tt, J=7.3, 1.3 Hz, 2H), 6.75 (s, 2H), 6.14-6.10 (m, 4H), 5.24 (d, J=8.7 Hz, 2H), 4.24-4.13 (m, 2H), 3.58-3.49 (m, 2H), 1.66 (d, J=14.6 Hz, 2H), 1.57 (s, 18H), 1.51 (d, J=14.6 Hz, 2H), 1.24 (s, 18H), 1.20 (s, 6H), 1.14 (s, 6H), 0.90 (t, J=9.6 Hz, 2H), 0.87-0.81 (m, 2H), 0.72 (s, 18H), 0.61 (d, J=11.0 Hz, 2H), 0.27-0.21 (m, 2H). $^{13}$C NMR (126 MHz, Benzene-$d_6$) δ 153.50, 151.90, 149.03, 147.62, 143.23, 142.99, 139.92, 139.53, 137.49, 133.42, 129.03, 128.26, 128.17, 127.07, 126.99, 125.40, 125.29, 125.01, 122.95, 122.79, 122.56, 120.60, 116.40, 116.37, 116.25, 115.82, 112.50, 109.47, 81.81, 77.97, 56.59, 38.25, 34.69, 34.37, 32.18, 32.08, 31.70, 31.66, 31.59, 30.07, 26.00.

Example 76: Synthesis of Intermediate to Ligand 16

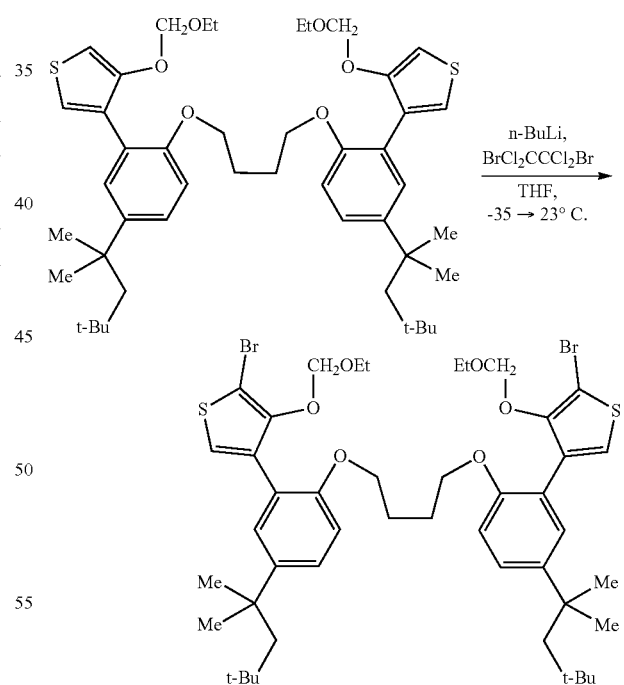

The bisthiophene was azeotropically dried using toluene (4×10 mL) prior to use. A clear colorless solution of the thiophene (1.974 g, 2.534 mmol, 1.00 eq) in deoxygenated anhydrous THF (40 mL) in a nitrogen filled glovebox was placed in a freezer cooled to −35° C. for 20 hrs upon which a precooled solution of n-BuLi (3.0 mL, 7.601 mmol, 3.00 eq, titrated 2.50 M in hexanes) was added via syringe in a dropwise manner. The now golden brown mixture was allowed to sit in the freezer for 3 hrs upon which it was removed and while stirring (500 rpm) solid 1,2-dibromotetrachloroethane (2.723 g, 8.361 mmol, 3.30 eq) was added in a quick dropwise manner. After stirring for 2.5 hrs at 23° C. the now golden yellow solution was removed from the glovebox, neutralized with brine (50 mL), diluted with CH₂Cl₂ (20 mL) and water (20 mL), poured into a separatory funnel, partitioned, residual organics were extracted from the aqueous layer using CH₂Cl₂ (2×20 mL), combined, dried over solid Na₂SO₄, decanted, concentrated onto celite, and purified via silica gel chromatography; hexanes –65% CH₂Cl₂ in hexanes to afford the dibromothiophene as a golden yellow amorphous oil (2.054 g, 2.192 mmol, 87%). NMR indicated pure product.

¹H NMR (400 MHz, Chloroform-d) δ 7.34 (d, J=2.5 Hz, 2H), 7.27 7.22 (m, 2H), 7.21 (s, 2H), 6.79 (d, J=8.6 Hz, 2H), 4.76 (s, 4H), 3.95-3.87 (m, 4H), 3.56 (q, J=7.1 Hz, 4H), 1.78 (q, J=3.0 Hz, 4H), 1.69 (s, 4H), 1.33 (s, 12H), 1.03 (t, J=7.1 Hz, 6H), 0.73 (s, 18H). ¹³C NMR (101 MHz, Chloroform-d) δ 153.87, 151.11, 142.13, 132.55, 128.60, 126.64, 122.97, 122.58, 111.68, 98.66, 96.83, 68.02, 65.15, 56.81, 38.00, 32.33, 31.81, 31.62, 25.94, 14.87.

Example 77: Synthesis of Intermediate to Ligand 16

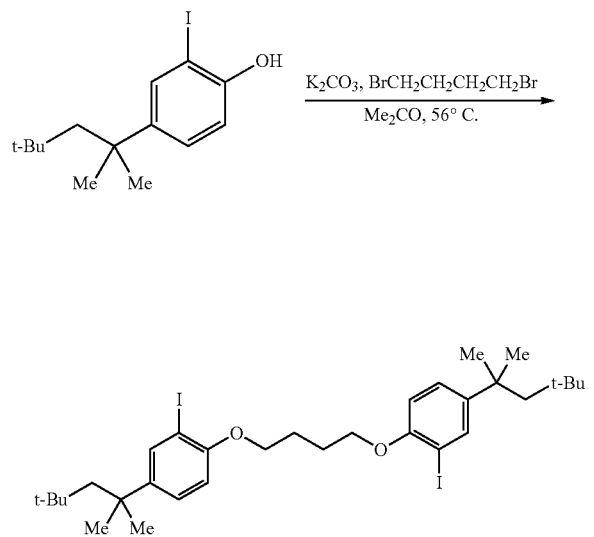

A white heterogeneous mixture of the iodophenol (3.240 g, 9.304 mmol, 2.00 eq), K₂CO₃ (3.858 g, 27.912 mmol, 6.00 eq), and 1,4-dibromobutane (0.56 mL, 4.652 mmol, 1.00 eq) in acetone (50 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with CH₂Cl₂ (50 mL), stirred for 2 mins, suction filtered over a pad of celite, rinsed with CH₂Cl₂ (4×20 mL), the resultant pale yellow filtrate was concentrated onto celite, and purified via silica gel chromatography using an ISCO chromatography purification system; hexanes –50% CH₂Cl₂ in hexanes to afford the iodophenyl ether as a white solid (3.180 g, 4.426 mmol, 95%). NMR indicated pure product.

¹H NMR (500 MHz, Chloroform-d) δ 7.73 (d, J=2.4 Hz, 2H), 7.28-7.24 (m, 2H), 6.73 (d, J=8.6 Hz, 2H), 4.14-4.06 (m, 4H), 2.14-2.06 (m, 4H), 1.68 (s, 4H), 1.32 (s, 12H), 0.73 (s, 18H). ¹³C NMR (126 MHz, Chloroform-d) δ 155.12, 144.49, 137.18, 127.03, 111.29, 86.27, 68.68, 56.87, 37.89, 32.35, 31.83, 31.57, 26.11.

Example 78: Synthesis of Intermediate to Ligand 16

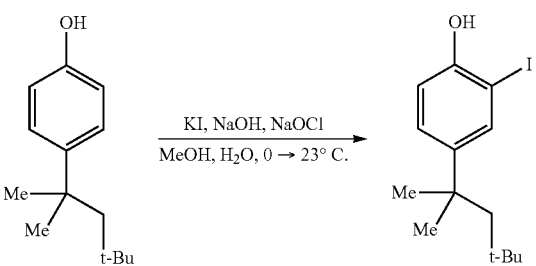 [SMILES: CC(C)(C)CC(C)(C)c1ccc(O)cc1 ; CC(C)(C)CC(C)(C)c1ccc(O)c(I)c1]

A clear colorless solution of the starting phenol (3.324 g, 16.110 mmol, 1.00 eq), KI (3.477 g, 20.943 mmol, 1.30 eq), and aqueous NaOH (21 mL, 20.943 mmol, 1.30 eq, 1 N) in methanol (100 mL) and water (50 mL) under nitrogen was placed in an ice bath and stirred vigorously for 1 hr, upon which precooled commercial aqueous bleach (26 mL, 20.943 mmol, 1.30 eq, 5.2% w/w) was added in a dropwise manner over 10 mins. The now pale opaque yellow mixture was stirred for 2 hrs at 0° C., the mixture was removed from the ice water bath, stirred at 23° C. for 3 hrs, solid NaH₂PO₄ (20 g) was added followed by a saturated aqueous mixture Na₂S₂O₃ (100 mL) to reduce residual iodine and water (100 mL), the mixture was stirred vigorously for 10 mins, diluted with CH₂Cl₂ (50 mL), the biphasic yellow mixture was poured into a separatory funnel, partitioned, organics were washed with aqueous Na₂S₂O₃ (2×50 mL), residual organics were extracted from the aqueous layer using CH₂Cl₂ (2×50 mL), combined, dried over solid Na₂SO₄, decanted, and concentrated onto celite, and purified via silica gel chromatography; hexanes 25% CH₂Cl₂ to afford the o-iodophenol as a clear colorless amorphous foam (3.240 g, 9.340 mmol, 58%). NMR indicated pure product.

¹H NMR (500 MHz, Chloroform-d) δ 7.60 (d, J=2.3 Hz, 1H), 7.24 (dd, J=8.5, 2.3 Hz, 1H), 6.90 (dd, J=8.6, 0.5 Hz, 1H), 5.11 (s, 1H), 1.68 (s, 2H), 1.32 (s, 6H), 0.73 (s, 9H). ¹³C NMR (126 MHz, Chloroform-d) δ 152.34, 144.65, 135.66, 128.14, 114.23, 85.38, 56.87, 37.93, 32.35, 31.81, 31.55.

Example 79: Synthesis of Ligand 17

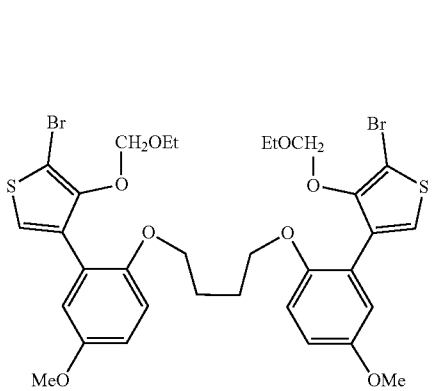
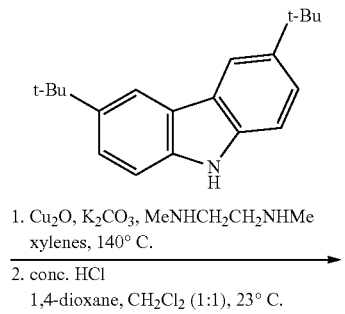
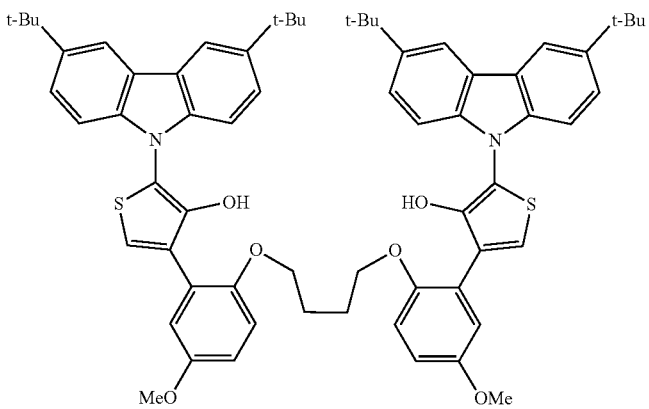

The dibromide was azeotropically dried using toluene (4×10 mL) prior to use. In a nitrogen filled glovebox a solid mixture of the dibromide (0.959 g, 1.241 mmol, 1.00 eq), the carbazole (1.734 g, 6.207 mmol, 5.00 eq), Cu$_2$O (0.888 g, 6.207 mmol, 5.00 eq), and K$_2$CO$_3$ (3.431 g, 24.826 mmol, 20.0 eq) in an oven-dried flask equipped with a stirbar and reflux condenser was suspended in anhydrous deoxygenated xylenes (30.0 mL), neat N,N'-dimethylethylenediamine (1.34 mL, 12.413 mmol, 10.00 eq) was added via syringe, the mixture was then sealed under nitrogen, removed from the glovebox, placed under nitrogen, placed in a mantle heated to 140° C., stirred vigorously (1000 rpm) for 72 hrs, the dark red heterogeneous mixture was removed from the mantle, allowed to cool gradually to 23° C., diluted with CH$_2$Cl$_2$ (30 mL), stirred vigorously (1000 rpm) for 2 mins, suction filtered over silica gel using CH$_2$Cl$_2$ as the eluent, rinsed with CH$_2$Cl$_2$ (4×25 mL), the golden orange filtrate was concentrated onto celite, and purified via silica gel chromatography; 25%-100% CH$_2$Cl$_2$ in hexanes to afford the biscarbazoyl-thiophene as a white solid (0.245 g, 0.2095 mmol, 17%). NMR indicated product. The product was used in the subsequent reaction without further purification.

To a solution of the protected hydroxythiophene (0.245 g, 0.2095 mmol, 1.00 eq) in CH$_2$Cl$_2$ (5 mL) and 1,4-dioxane (5 mL) was added concentrated HCl (5 mL) under nitrogen at 23° C. After stirring vigorously (1000 rpm) for 16 hrs the pale golden brown solution was diluted with aqueous HCl (20 mL, 1 N) and CH$_2$Cl$_2$ (20 mL), poured into a separatory funnel, partitioned, organics were washed with aqueous HCl (1×20 mL), residual organics were extracted from the aqueous layer using CH$_2$Cl$_2$ (2×20 mL), combined, dried over solid Na$_2$SO$_4$, decanted, concentrated onto celite, and purified via silica gel chromatography; 10%-50% CH$_2$Cl$_2$ in hexanes to afford the hydroxythiophene as a pale yellow foam (0.160 g, 0.1519 mmol, 73%, 12% two steps). NMR indicated pure product.

$^1$H NMR (500 MHz, Chloroform-d) δ 8.17 (dd, J=2.0, 0.6 Hz, 4H), 7.46 (dd, J=8.6, 1.9 Hz, 4H), 7.31 (d, J=0.6 Hz, 4H), 7.13 (dd, J=2.1, 1.3 Hz, 2H), 7.12 (s, 2H), 6.89 6.86 (m, 4H), 4.00 (t, J=3.9 Hz, 4H), 3.87 (s, 6H), 1.87 (q, J=3.4, 2.8 Hz, 4H), 1.49 (s, 36H). $^{13}$C NMR (126 MHz, Chloroform-d) δ 155.16, 148.33, 147.80, 143.18, 140.45, 130.73, 125.84, 123.68, 123.55, 119.35, 116.42, 116.32, 115.91, 115.78, 114.47, 109.74, 70.89, 55.80 (d, J=1.9 Hz), 34.78, 32.10, 26.07.

Characterization of the Protected Ligand:

$^1$H NMR (400 MHz, Chloroform-d) δ 8.06 (dd, J=1.9, 0.6 Hz, 4H), 7.42 (dd, J=8.6, 1.9 Hz, 4H), 7.32 (dd, J=8.5, 0.6 Hz, 4H), 7.29 (s, 2H), 7.13 (d, J=3.1 Hz, 2H), 6.91 (d, J=9.0 Hz, 2H), 6.83 (dd, J=8.9, 3.1 Hz, 2H), 4.49 (s, 4H), 4.03 (q, J=3.5, 2.7 Hz, 4H), 3.79 (s, 6H), 2.82 (q, J=7.0 Hz, 4H), 1.98 (q, J=3.3, 2.8 Hz, 4H), 1.42 (s, 36H), 0.52 (t, J=7.0 Hz, 6H). $^{13}$C NMR (101 MHz, Chloroform-d) δ 153.51, 150.88, 148.81, 143.30, 140.35, 131.83, 125.32, 123.81, 123.41, 120.59, 116.48, 116.02, 113.97, 113.83, 109.98, 96.71, 69.15, 64.48, 55.81, 34.70, 31.97, 26.44, 14.16.

Example 80: Synthesis of Procatalyst 37

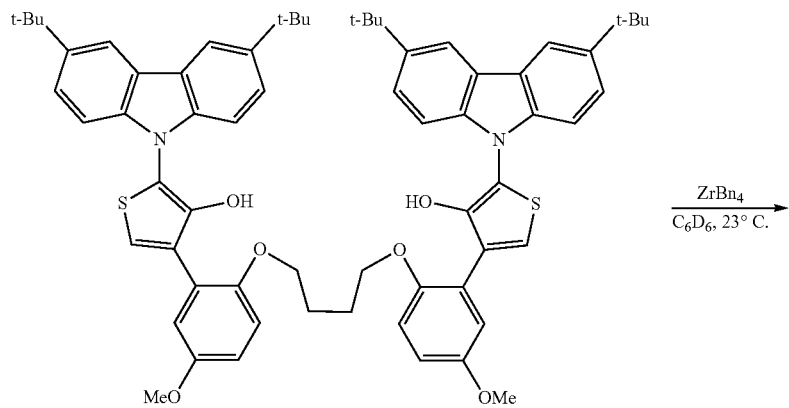

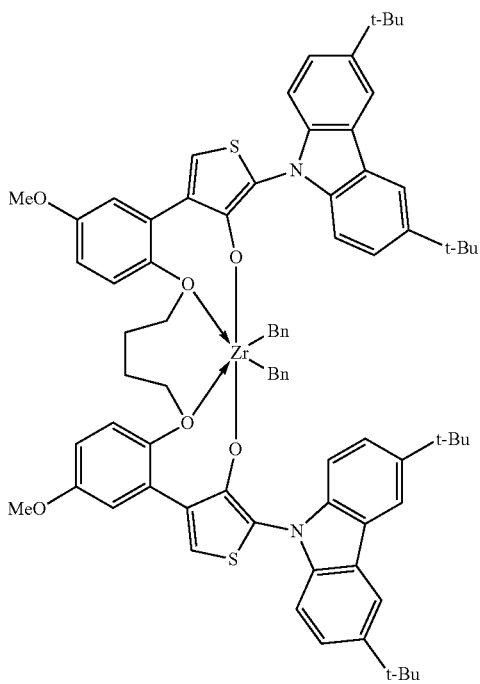

The thiophene ligand was azeotropically dried using toluene (4×10 mL) prior to use. To a white heterogeneous mixture of the thiophene (14.0 mg, 0.0133 mmol, 1.00 eq) in anhydrous $C_6D_6$ (2.41 mL) in a nitrogen filled glovebox at 23° C. was added a solution of $ZrBn_4$ (6.1 mg, 0.0133 mmol, 1.00 eq) in $C_6D_6$ (0.25 mL) in a dropwise manner. After stirring (500 rpm) for 1 hr the pale golden yellow solution was filtered using a 0.20 μm PTFE submicron filter to afford the zirconium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1H$ NMR (500 MHz, Benzene-$d_6$) δ 8.46 (dd, J=2.0, 0.6 Hz, 2H), 8.24 (dd, J=1.9, 0.6 Hz, 2H), 7.68 (dd, J=8.5, 0.6 Hz, 2H), 7.50 (ddd, J=8.5, 5.5, 1.9 Hz, 4H), 7.36 (dd, J=8.7, 0.6 Hz, 2H), 7.05-7.01 (m, 2H), 6.99-6.96 (m, 2H), 6.80-6.75 (m, 4H), 6.60 (s, 2H), 6.41 (dd, J=9.0, 3.2 Hz, 2H), 6.22 (dd, J=8.3, 1.3 Hz, 4H), 5.11 (d, J=9.0 Hz, 2H), 4.03 (t, J=10.8 Hz, 2H), 3.34 (dt, J=11.3, 5.9 Hz, 2H), 3.19 (s, 6H), 1.46 (s, 18H), 1.28 (s, 18H), 1.07 (d, J=12.1 Hz, 2H), 0.90-0.78 (m, 2H), 0.68-0.61 (m, 2H), 0.58 (d, J=12.1 Hz, 2H). $^{13}C$ NMR (126 MHz, Benzene-$d_6$) δ 157.29, 151.84, 149.26, 147.05, 143.40, 143.05, 140.02, 139.70, 133.10, 130.56, 129.63, 128.33, 128.03, 127.30, 126.71, 125.24, 124.90, 124.12, 122.82, 122.74, 120.67, 116.69, 116.41, 115.92, 115.73, 112.46, 109.47, 74.26, 71.94, 54.77, 34.57, 34.43, 31.96, 31.71, 25.80.

Example 81: Synthesis of Procatalyst 38

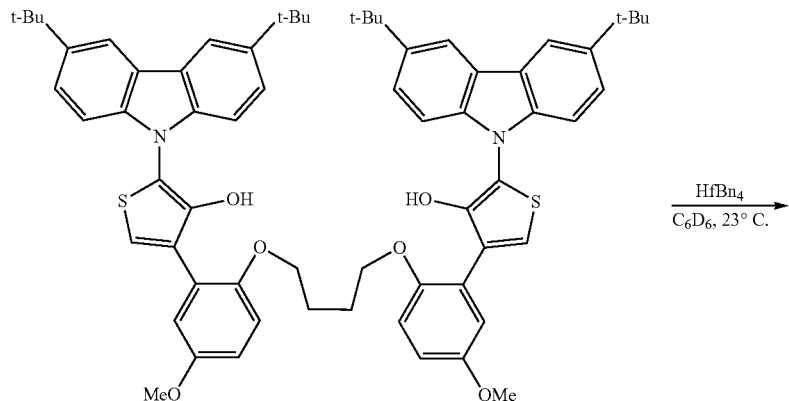

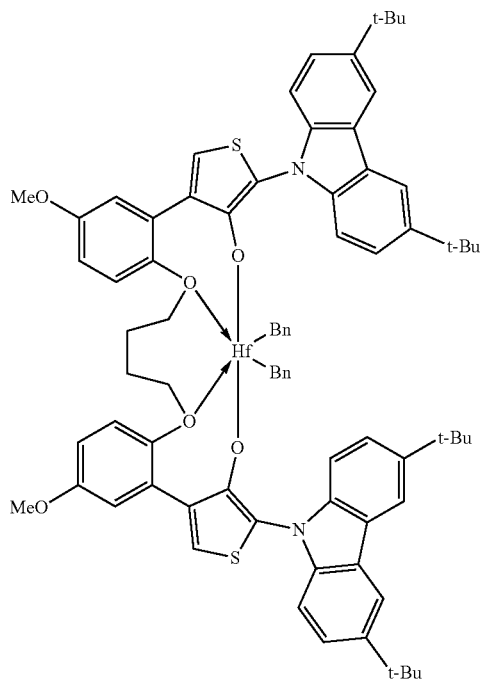

The thiophene ligand was azeotropically dried using toluene (4×10 mL) prior to use. To a white heterogeneous mixture of the thiophene (9.0 mg, 0.00854 mmol, 1.00 eq) in anhydrous C$_6$D$_6$ (1.51 mL) in a nitrogen filled glovebox at 23° C. was added a solution of HfBn$_4$ (4.7 mg, 0.00854 mmol, 1.00 eq) in C$_6$D$_6$ (0.20 mL) in a dropwise manner. After stirring (500 rpm) for 1 hr the pale golden yellow solution was filtered using a 0.20 µm PTFE submicron filter to afford the hafnium complex as a 0.005 M solution in C$_6$D$_6$. NMR indicated product. The same procedure can be used with toluene as the solvent to prepare the procatalyst solution (0.005 M) which is used directly after filtration for the polymerization experiments.

$^1$H NMR (500 MHz, Benzene-d$_6$) δ 8.48 (dd, J=1.9, 0.6 Hz, 2H), 8.24 (dd, J=2.0, 0.6 Hz, 2H), 7.66 (dd, J=8.5, 0.6 Hz, 2H), 7.51-7.46 (m, 4H), 7.27 (dd, J=8.7, 0.6 Hz, 2H), 7.09-7.06 (m, 4H), 6.79 (d, J=3.2 Hz, 2H), 6.76 (tt, J=7.4, 1.3 Hz, 2H), 6.60 (s, 2H), 6.43 (dd, J=9.0, 3.2 Hz, 2H), 6.26-6.23 (m, 4H), 5.11 (d, J=9.0 Hz, 2H), 4.12-3.99 (m, 2H), 3.45-3.35 (m, 2H), 3.19 (s, 6H), 1.46 (s, 18H), 1.28 (s, 18H), 0.92 (d, J=13.1 Hz, 2H), 0.81 (t, J=9.6 Hz, 2H), 0.60-0.50 (m, 2H), 0.31 (d, J=13.2 Hz, 2H). $^{13}$C NMR (126 MHz, Benzene-d$_6$) δ 157.44, 151.88, 149.10, 147.94, 143.45, 143.05, 139.96, 139.68, 132.76, 129.70, 128.01, 126.98, 126.94, 125.34, 124.97, 124.58, 122.66, 120.67, 116.56, 116.40, 116.17, 115.97, 115.68, 112.58, 109.48, 81.98, 78.16, 54.80, 34.58, 34.44, 31.97, 31.72, 25.99.

Example 82: Synthesis of Intermediate to Ligand 17

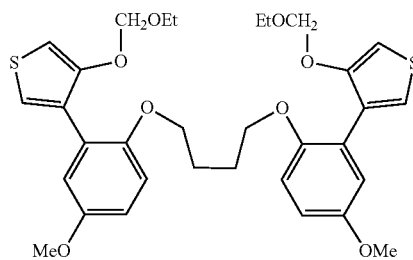

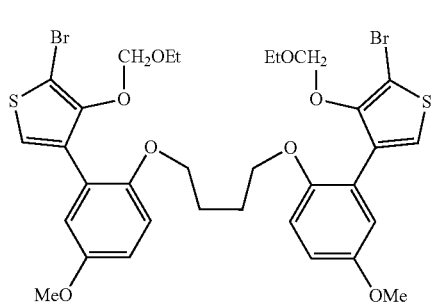

The bisthiophene was azeotropically dried using toluene (4×10 mL) prior to use. A clear purple-black solution of the thiophene (1.113 g, 1.810 mmol, 1.00 eq) in deoxygenated anhydrous THF (35 mL) in a nitrogen filled glovebox was placed in a freezer cooled to −35° C. for 20 hrs upon which a precooled solution of n-BuLi (2.20 mL, 5.431 mmol, 3.00 eq, titrated 2.50 M in hexanes) was added via syringe in a dropwise manner. The now golden purple-brown solution was allowed to sit in the freezer for 3 hrs upon which it was removed and while stirring (500 rpm) solid 1,2-dibromotetrachloroethane (1.945 g, 5.974 mmol, 3.30 eq) was added in a quick dropwise manner. After stirring for 2.5 hrs at 23° C. the now clear golden yellow solution was removed from the glovebox, neutralized with brine (50 mL), diluted with $CH_2Cl_2$ (20 mL) and water (20 mL), poured into a separatory funnel, partitioned, residual organics were extracted from the aqueous layer using $CH_2Cl_2$ (2×20 mL), combined, dried over solid $Na_2SO_4$, decanted, concentrated onto celite, and purified via silica gel chromatography; 10%-100% $CH_2Cl_2$ in hexanes to afford the dibromothiophene as a golden yellow amorphous oil (0.959 g, 1.241 mmol, 69%). NMR indicated pure product.

$^1$H NMR (400 MHz, Chloroform-d) δ 7.23 (s, 2H), 6.95 (dd, J=2.7, 0.8 Hz, 2H), 6.83-6.80 (m, 4H), 4.82 (s, 4H), 3.84 (p, J=3.2 Hz, 4H), 3.75 (s, 6H), 3.50 (q, J=7.1 Hz, 4H), 1.78 1.67 (m, 4H), 1.00 (t, J=7.0 Hz, 6H). $^{13}$C NMR (101 MHz, Chloroform-d) δ 153.46, 151.13, 150.55, 132.14, 124.62, 123.13, 116.00, 114.24, 98.86, 97.08, 69.03, 65.15, 55.76, 25.95, 14.79.

Example 83: Synthesis of Intermediate to Ligand 17

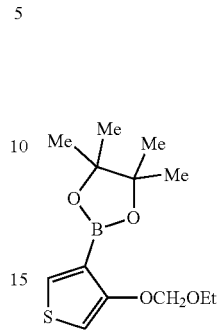

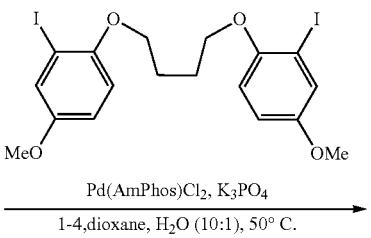

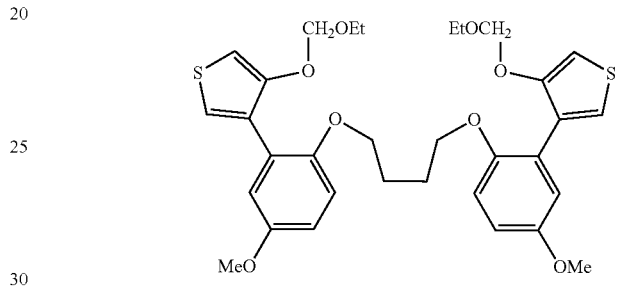

A mixture of the thiophene (2.363 g, 8.315 mmol, 3.00 eq, 67% pure), $K_3PO_4$ (5.884 g, 27.720 mmol, 9.00 eq), Pd(AmPhos)$Cl_2$ (0.436 g, 0.6160 mmol, 0.20 eq), and the bisphenyliodide (1.707 g, 3.080 mmol, 1.00 eq). The mixture was evacuated, then back-filled with nitrogen, this process was repeated 3× more, then deoxygenated 1,4-dioxane (40.0 mL) and deoxygenated water (4.0 mL) were added sequentially via syringe. The mixture was then placed in a mantle heated to 50° C. After stirring (1000 rpm) for 36 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 25%-100% $CH_2Cl_2$ in hexanes to afford the bisthiophene as a dark purple-black viscous oil (1.113 g, 1.810 mmol, 59%). NMR indicated pure product.

$^1$H NMR (400 MHz, Chloroform-d) δ 7.27 (d, J=3.4 Hz, 2H), 7.01 (d, J=2.9 Hz, 2H), 6.83 (d, J=8.9 Hz, 2H), 6.78 (dd, J=8.9, 3.0 Hz, 2H), 6.64 (d, J=3.5 Hz, 2H), 5.10 (s, 4H), 3.86-3.78 (m, 4H), 3.77 (s, 6H), 3.66 (q, J=7.1 Hz, 4H), 1.70 (h, J=2.7 Hz, 4H), 1.18 (t, J=7.1 Hz, 6H). $^{13}$C NMR (101 MHz, Chloroform-d) δ 153.31, 153.23, 150.66, 129.60, 125.10, 123.38, 116.70, 114.26, 113.27, 100.85, 94.87, 69.11, 64.13, 55.67, 26.07, 15.08.

Example 84: Synthesis of Intermediate to Ligand 17

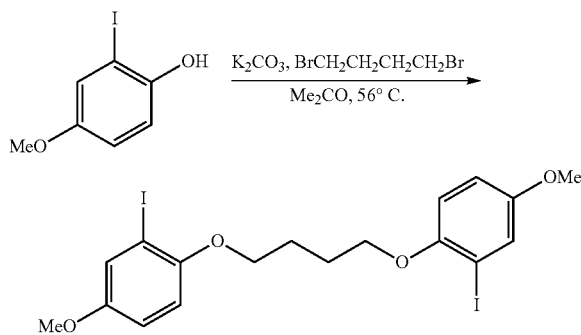

A white heterogeneous mixture of 2-iodophenol (1.890 g, 7.559 mmol, 2.00 eq), $K_2CO_3$ (3.134 g, 22.677 mmol, 6.00 eq), and 1,4-dibromobutane (0.45 mL, 3.779 mmol, 1.00 eq) in acetone (40 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with $CH_2Cl_2$ (50 mL), stirred for 2 mins, suction filtered over a pad of celite, rinsed with $CH_2Cl_2$ (4×20 mL), the resultant pale yellow filtrate was concentrated onto celite, and purified via silica gel chromatography using an ISCO chromatography purification system; 50%-100% $CH_2Cl_2$ in hexanes to afford the iodophenyl ether as a white solid (1.945 g, 3.510 mmol, 93%). NMR indicated pure product.

$^1$H NMR (500 MHz, Chloroform-d) δ 7.32 (d, J=2.9 Hz, 2H), 6.84 (dd, J=8.9, 3.0 Hz, 2H), 6.76 (d, J=8.9 Hz, 2H), 4.11 3.99 (m, 4H), 3.75 (s, 6H), 2.13 2.01 (m, 4H). $^{13}$C NMR (126 MHz, Chloroform-d) δ 154.26, 152.05, 124.61, 114.78, 113.06, 86.94, 69.58, 55.92, 26.15.

Example 85: Synthesis of Intermediate to Ligand 17

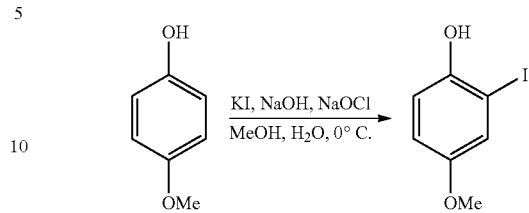

A clear colorless solution of the starting phenol (5.000 g, 40.277 mmol, 1.00 eq), KI (7.020 g, 42.291 mmol, 1.05 eq), and aqueous NaOH (201 mL, 201.39 mmol, 5.00 eq, 1 N) in methanol (300 mL) and water (200 mL) under nitrogen was placed in an ice bath and stirred vigorously for 1 hr, upon which precooled commercial aqueous bleach (61 mL, 42.291 mmol, 1.05 eq, 5.2% w/w) was added in a dropwise manner over 30 mins. The now dark orange mixture was stirred for 30 mins at 0° C., the mixture was removed from the ice water bath, solid $NaH_2PO_4$ (30 g) was added followed by aqueous $Na_2S_2O_3$ (200 mL) to reduce residual iodine and water (200 mL), the mixture was stirred vigorously for 10 mins, diluted with $CH_2Cl_2$ (50 mL), the biphasic dark red-orange mixture was poured into a separatory funnel, partitioned, organics were washed with aqueous $Na_2S_2O_3$ (2×50 mL), residual organics were extracted from the aqueous layer using $CH_2Cl_2$ (2×50 mL), combined, dried over solid $Na_2SO_4$, decanted, concentrated onto celite, and purified via silica gel chromatography; 25% $CH_2Cl_2$ in hexanes 100% $CH_2Cl_2$ to afford the o-iodophenol as a pale purple amorphous foam (0.877 g, 3.508 mmol, 9%) and recovered starting phenol (1.277 g, 10.287 mmol, 26%). NMR indicated pure product.

$^1$H NMR (500 MHz, Chloroform-d) δ 7.18 (d, J=2.9 Hz, 1H), 6.90 (d, J=8.9 Hz, 1H), 6.83 (dd, J=8.9, 2.9 Hz, 1H), 5.00 (s, 1H), 3.74 (s, 3H). $^{13}$C NMR (126 MHz, Chloroform-d) δ 153.93, 149.17, 122.66, 116.37, 115.13, 85.07, 55.99.

Example 86: Synthesis of Ligand 18

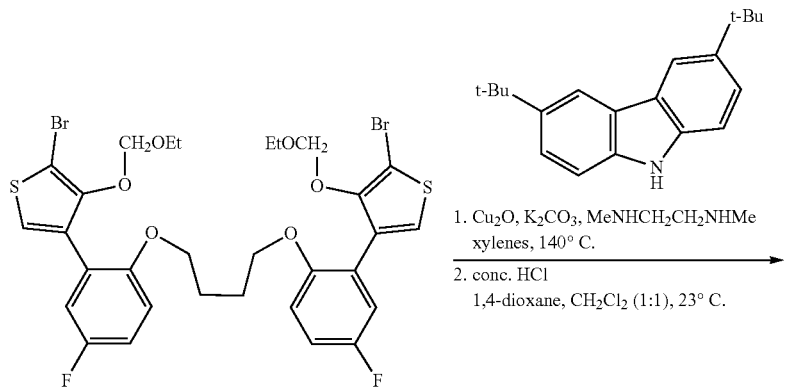

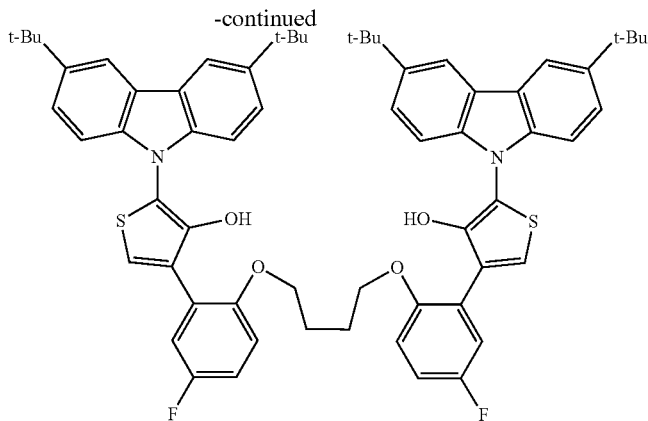

The dibromide was azeotropically dried using toluene (4×10 mL) prior to use. In a nitrogen filled glovebox a solid mixture of the dibromide (1.368 g, 1.828 mmol, 1.00 eq), the carbazole (2.553 g, 9.138 mmol, 5.00 eq), Cu$_2$O (1.308 g, 9.140 mmol, 5.00 eq), and K$_2$CO$_3$ (5.053 g, 36.560 mmol, 20.0 eq) in an oven-dried flask equipped with a stirbar and reflux condenser was suspended in anhydrous deoxygenated xylenes (40.0 mL), neat N,N'-dimethylethylenediamine (2.00 mL, 18.280 mmol, 10.00 eq) was added via syringe, the mixture was then sealed under nitrogen, removed from the glovebox, placed under nitrogen, placed in a mantle heated to 140° C., stirred vigorously (1000 rpm) for 72 hrs, the dark red heterogeneous mixture was removed from the mantle, allowed to cool gradually to 23° C., diluted with CH$_2$Cl$_2$ (30 mL), stirred vigorously (1000 rpm) for 2 mins, suction filtered over silica gel using CH$_2$Cl$_2$ as the eluent, rinsed with CH$_2$Cl$_2$ (4×25 mL), the golden orange filtrate was concentrated onto celite, and purified via silica gel chromatography; 25%-60% CH$_2$Cl$_2$ in hexanes to afford the biscarbazoyl-thiophene as a pale golden yellow foam (0.116 g, 0.1013 mmol, 6%). NMR indicated product.

To a solution of the protected hydroxythiophene (0.116 g, 0.1013 mmol, 1.00 eq) in CH$_2$Cl$_2$ (5 mL) and 1,4-dioxane (5 mL) was added concentrated HCl (5 mL) under nitrogen at 23° C. After stirring vigorously (1000 rpm) for 16 hrs the pale golden brown solution was diluted with aqueous HCl (20 mL, 1 N) and CH$_2$Cl$_2$ (20 mL), poured into a separatory funnel, partitioned, organics were washed with aqueous HCl (1×20 mL), residual organics were extracted from the aqueous layer using CH$_2$Cl$_2$ (2×20 mL), combined, dried over solid Na$_2$SO$_4$, decanted, concentrated onto celite, and purified via silica gel chromatography; 10%-50% CH$_2$Cl$_2$ in hexanes to afford the hydroxythiophene as a pale yellow foam (70.0 mg, 0.0680 mmol, 73%, 4% two steps). NMR indicated pure product.

$^1$H NMR (500 MHz, Chloroform-d) δ 8.10 (d, J=1.9 Hz, 4H), 7.39 (dd, J=8.5, 1.9 Hz, 4H), 7.28-7.24 (m, 2H), 7.21 (d, J=8.4 Hz, 6H), 6.98 (ddd, J=9.0, 7.6, 3.2 Hz, 2H), 6.83 (dd, J=9.0, 4.5 Hz, 2H), 6.63 (s, 2H), 4.01-3.94 (m, 4H), 1.88-1.82 (m, 4H), 1.43 (s, 36H). $^{19}$F NMR (470 MHz, Chloroform-d) 67 −121.03 (td, J=8.3, 4.6 Hz).

Example 87: Synthesis of Procatalyst 39

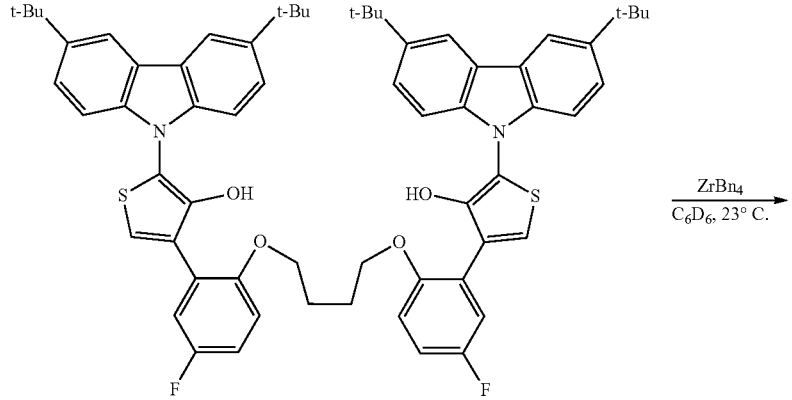

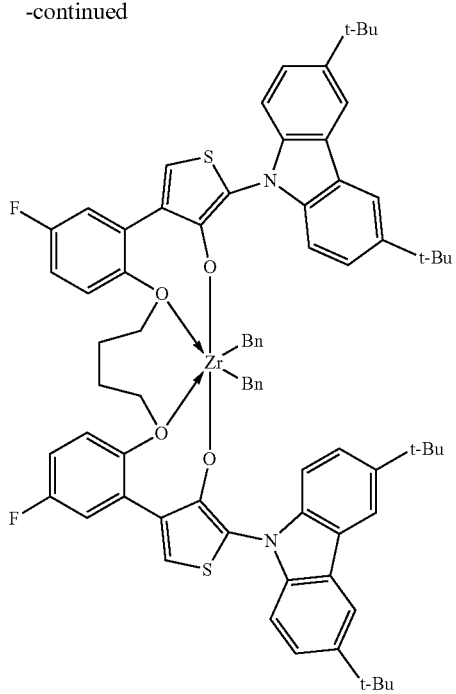

The thiophene ligand was azeotropically dried using toluene (4×10 mL) prior to use. To a white heterogeneous mixture of the thiophene (8.5 mg, 0.00826 mmol, 1.00 eq) in anhydrous $C_6D_6$ (1.49 mL) in a nitrogen filled glovebox at 23° C. was added a solution of $ZrBn_4$ (3.8 mg, 0.00826 mmol, 1.00 eq) in $C_6D_6$ (0.16 mL) in a dropwise manner. After stirring (500 rpm) for 1 hr the pale golden yellow solution was filtered using a 0.20 μm PTFE submicron filter to afford the zirconium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1$H NMR (400 MHz, Benzene-$d_6$) δ 8.37 (d, J=1.8 Hz, 2H), 8.27-8.24 (m, 2H), 7.56 (d, J=8.5 Hz, 2H), 7.46 (ddd, J=24.0, 8.6, 1.9 Hz, 4H), 7.39-7.33 (m, 2H), 6.99-6.94 (m, 4H), 6.80-6.71 (m, 4H), 6.50-6.44 (m, 2H), 6.44 (s, 2H), 6.17-6.11 (m, 4H), 5.06 (dd, J=9.0, 4.8 Hz, 2H), 3.96 (t, J=10.3 Hz, 2H), 3.28-3.18 (m, 2H), 1.39 (s, 18H), 1.28 (s, 18H), 0.93 (d, J=12.0 Hz, 2H), 0.73 (t, J=9.1 Hz, 2H), 0.68-0.57 (m, 2H), 0.51 (d, J=12.0 Hz, 2H). $^{19}$F NMR (376 MHz, Benzene-$d_6$) δ −116.15 (td, J=8.3, 5.0 Hz). $^{13}$C NMR (101 MHz, Benzene-$d_6$) δ 158.52, 151.78, 151.46 (d, J=2.7 Hz), 143.49 (d, J=33.9 Hz), 139.83 (d, J=29.4 Hz), 138.24 (d, J=157.9 Hz), 131.79 (d, J=1.3 Hz), 130.53, 130.26, 130.17, 128.13, 126.91, 125.15, 124.82, 124.55, 124.09, 122.86, 122.82, 121.23, 117.50, 117.17, 116.49, 115.98, 115.83, 112.15, 109.23, 80.63, 71.99, 34.50, 34.43, 31.88, 31.68, 25.53.

Example 88: Synthesis of Procatalyst 40

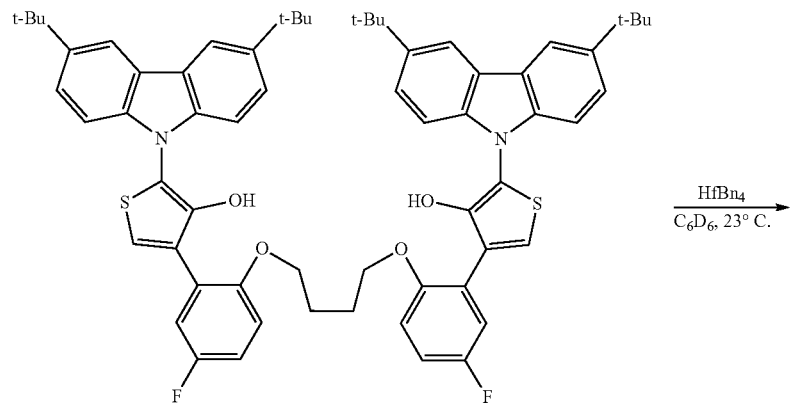

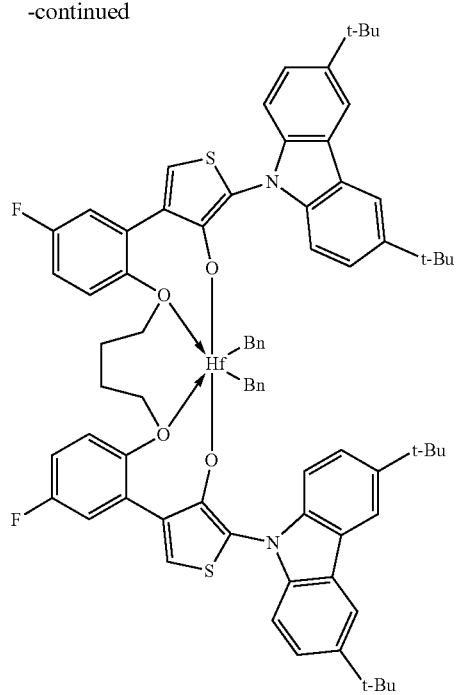

The thiophene ligand was azeotropically dried using toluene (4×10 mL) prior to use. To a white heterogeneous mixture of the thiophene (8.4 mg, 0.00816 mmol, 1.00 eq) in anhydrous $C_6D_6$ (1.49 mL) in a nitrogen filled glovebox at 23° C. was added a solution of $HfBn_4$ (4.4 mg, 0.00816 mmol, 1.00 eq) in $C_6D_6$ (0.16 mL) in a dropwise manner. After stirring (500 rpm) for 1 hr the pale golden yellow solution was filtered using a 0.20 μm PTFE submicron filter to afford the hafnium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1H$ NMR (400 MHz, Benzene-$d_6$) δ 8.39 (d, J=1.8 Hz, 2H), 8.28-8.24 (m, 2H), 7.54 (d, J=8.4 Hz, 2H), 7.45 (ddd, J=21.1, 8.6, 1.9 Hz, 4H), 7.31-7.25 (m, 2H), 7.08-6.94 (m, 1H), 6.89 (t, J=7.4 Hz, 1H), 6.78 (dd, J=8.8, 3.2 Hz, 2H), 6.73 (tt, J=7.4, 1.2 Hz, 2H), 6.51-6.44 (m, 4H), 6.43 (s, 2H), 6.24-6.18 (m, 4H), 5.03 (dd, J=9.0, 4.8 Hz, 2H), 3.94 (t, J=10.7 Hz, 2H), 3.23 (dd, J=14.0, 9.5 Hz, 2H), 1.39 (s, 18H), 1.28 (s, 18H), 0.90 (d, J=13.3 Hz, 2H), 0.75-0.62 (m, 2H), 0.52 (d, J=13.1 Hz, 2H), 0.24 (d, J=13.2 Hz, 2H). $^{19}F$ NMR (376 MHz, Benzene-$d_6$) δ -114.85--116.52 (m). $^{13}C$ NMR (101 MHz, Benzene-$d_6$) δ 159.91 (d, J=246.6 Hz), 151.69, 151.24 (d, J=2.8 Hz), 147.23, 143.54 (d, J=37.1 Hz), 139.73 (d, J=24.0 Hz), 131.42 (d, J=1.2 Hz), 130.36, 130.28, 128.54, 127.08, 126.85, 125.29, 124.91, 122.75, 122.71, 121.08, 117.43, 117.31, 117.20, 116.47 (d, J=5.7 Hz), 115.70, 112.37, 109.24, 81.73, 78.64, 34.50, 34.44, 31.88, 31.69, 25.76.

Example 89: Synthesis of Ligand 19

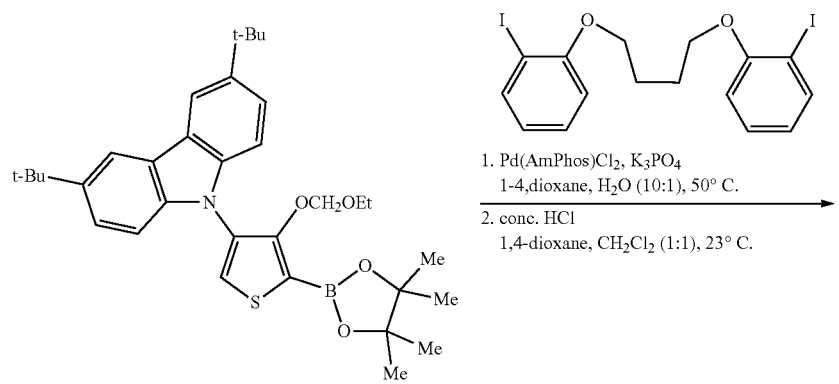

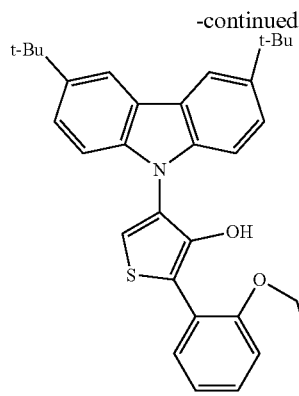
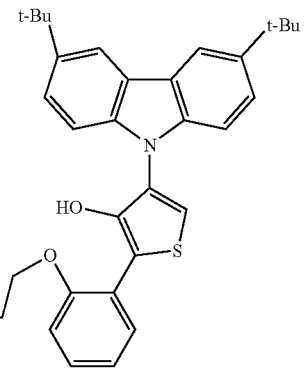

A mixture of the thiophene boropinacolate ester (2.017 g, 2.586 mmol, 3.00 eq, 72% pure by NMR), $K_3PO_4$ (1.647 g, 7.758 mmol, 9.00 eq), Pd(AmPhos)$Cl_2$ (122.0 mg, 0.1724 mmol, 0.20 eq), and the bisphenyliodide (0.426 g, 0.8620 mmol, 1.00 eq). The mixture was evacuated, then back-filled with nitrogen, this process was repeated 3× more, then deoxygenated 1,4-dioxane (17.0 mL) and deoxygenated water (1.7 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-50% $CH_2Cl_2$ in hexanes to afford the bisthiophene as a red amorphous oil (0.837 g, 0.7544 mmol, 88%). NMR indicated pure product.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a light tan solid (0.563 g, 0.5668 mmol, 75%, 66% two steps). NMR indicated pure product.

$^1$H NMR (500 MHz, Chloroform-d) δ 8.11 (d, J=2.0 Hz, 4H), 7.61 (dd, J=7.7, 1.7 Hz, 2H), 7.40 (dd, J=8.6, 1.9 Hz, 4H), 7.32 (s, 2H), 7.30-7.20 (m, 6H), 7.12 (t, J=7.5 Hz, 2H), 6.90 (d, J=8.2 Hz, 2H), 4.11-4.04 (m, 4H), 1.95-1.87 (m, 4H), 1.43 (s, 36H). $^{13}$C NMR (126 MHz, Chloroform-d) δ 153.71, 146.43, 142.65, 139.63, 130.50, 128.74, 127.55, 123.42, 123.16, 123.08, 122.96, 120.13, 116.18, 115.28, 114.09, 109.57, 69.98, 34.68, 32.02, 25.86.

Characterization of the Protected Coupled Product:

$^1$H NMR (500 MHz, Chloroform-d) δ 8.13 (h, J=1.9 Hz, 4H), 7.94 (ddd, J=7.6, 4.1, 2.3 Hz, 2H), 7.49-7.44 (m, 4H), 7.38-7.34 (m, 6H), 7.34-7.28 (m, 2H), 7.08-7.01 (m, 4H), 4.46 (t, J=3.0 Hz, 4H), 4.30-4.19 (m, 4H), 2.79 (qt, J=7.2, 2.7 Hz, 4H), 2.29-2.20 (m, 4H), 1.48 (s, 36H), 0.52 (tt, J=7.1, 2.9 Hz, 6H). $^{13}$C NMR (126 MHz, Chloroform-d) δ 155.83, 147.29, 142.72, 139.49, 131.10, 129.37, 129.13, 124.29, 123.66, 123.07, 121.52, 120.61, 119.19, 115.96, 112.07, 109.85, 96.97, 68.36, 64.61, 34.73, 32.06, 26.37, 14.17.

Example 90: Synthesis of Procatalyst 41

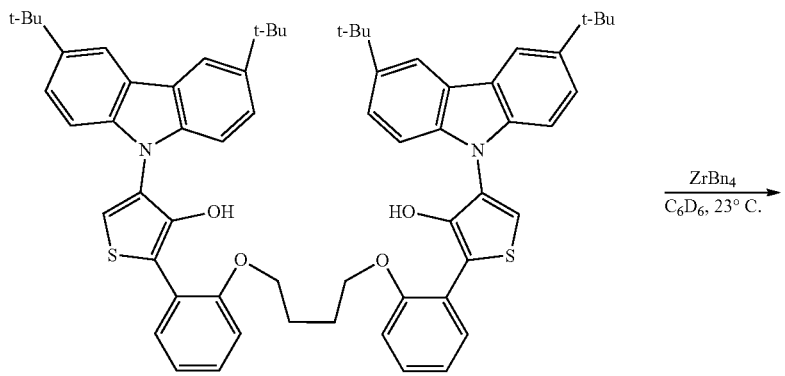

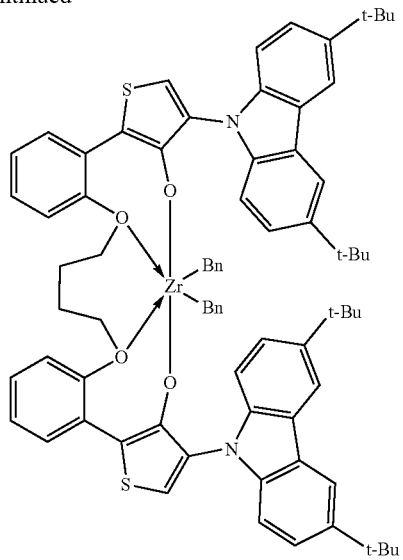

The thiophene ligand was azeotropically dried using toluene (4×10 mL) prior to use. To a clear colorless solution of the thiophene (7.4 mg, 7.45 µmol, 1.00 eq) in anhydrous $C_6D_6$ (1.34 mL) in a nitrogen filled glovebox at 23° C. was added a solution of $ZrBn_4$ (3.8 mg, 8.20 µmol, 1.10 eq) in $C_6D_6$ (0.15 mL) in a dropwise manner. After stirring (500 rpm) for 30 mins the pale golden yellow solution was filtered using a 0.20 µm PTFE submicron filter to afford the zirconium complex as a 0.005 M solution in $C_6D_6$. NMR indicated product. The same procedure can be used with toluene as the solvent to prepare the procatalyst solution (0.0025 M or 0.005 M) which is used directly after filtration for the polymerization experiments.

$^1$H NMR (500 MHz, Benzene-$d_6$) δ 8.48 (dd, J=2.0, 0.6 Hz, 2H), 8.22 (dd, J=1.9, 0.7 Hz, 2H), 7.50-7.46 (m, 4H), 7.31-7.24 (m, 6H), 6.98-6.96 (m, 4H), 6.86 (s, 2H), 6.83-6.75 (m, 4H), 6.70 (td, J=7.5, 1.2 Hz, 2H), 6.23-6.17 (m, 4H), 5.12 (dd, J=8.2, 1.2 Hz, 2H), 3.97-3.88 (m, 2H), 3.28-3.21 (m, 2H), 1.49 (s, 18H), 1.28 (s, 18H), 1.06 (d, J=12.4 Hz, 2H), 0.77-0.67 (m, 2H), 0.52-0.44 (m, 4H). $^{13}$C NMR (126 MHz, Benzene-$d_6$) δ 156.11, 152.23, 147.06, 143.09, 142.73, 139.24, 139.14, 130.95, 129.75, 126.42, 126.17, 125.92, 125.20, 124.55, 123.48, 122.65, 122.35, 120.75, 117.04, 116.94, 116.27, 115.52, 112.51, 108.85, 80.97, 75.18, 34.57, 34.41, 32.01, 31.71, 26.01.

Example 91: Synthesis of Procatalyst 42

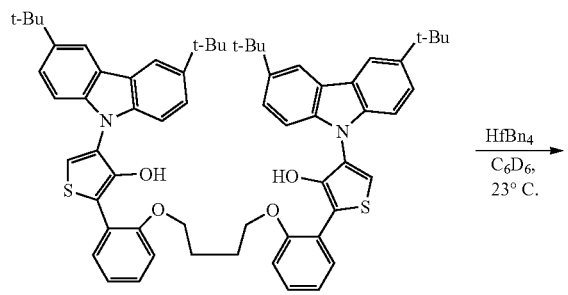

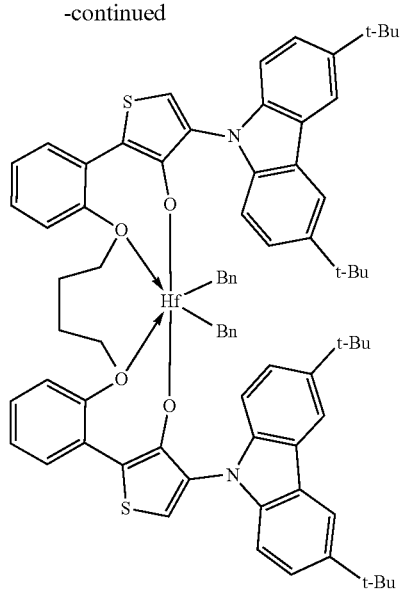

The thiophene ligand was azeotropically dried using toluene (4×10 mL) prior to use. To a clear colorless solution of the thiophene (14.0 mg, 14.09 µmol, 1.00 eq) in anhydrous $C_6D_6$ (2.49 mL) in a nitrogen filled glovebox at 23° C. was added a solution of $HfBn_4$ (8.4 mg, 15.50 µmol, 1.10 eq) in $C_6D_6$ (0.33 mL) in a dropwise manner. After stirring (500 rpm) for 30 mins the pale golden yellow solution was filtered using a 0.20 µm PTFE submicron filter to afford the hafnium complex as a 0.0025 M solution in $C_6D_6$. NMR indicated product. The same procedure can be used with toluene as the solvent to prepare the procatalyst solution (0.0025 M) which is used directly after filtration for the polymerization experiments.

$^1$H NMR (500 MHz, Benzene-$d_6$) δ 8.49 (dd, J=2.0, 0.6 Hz, 2H), 8.23 (dd, J=2.0, 0.6 Hz, 2H), 7.47 (ddd, J=8.8, 5.0, 1.9 Hz, 4H), 7.27 (ddd, J=8.5, 4.4, 1.2 Hz, 4H), 7.17 (dd, J=8.7, 0.6 Hz, 2H), 6.99-6.95 (m, 4H), 6.86 (s, 2H), 6.78 (dddd, J=8.6, 7.3, 3.6, 1.5 Hz, 4H), 6.71 (td, J=7.6, 1.2 Hz, 2H), 6.22-6.16 (m, 4H), 5.15 (dd, J=8.2, 1.2 Hz, 2H), 4.02-3.93 (m, 2H), 3.35-3.26 (m, 2H), 1.50 (s, 18H), 1.28 (s, 18H), 0.89 (d, J=13.3 Hz, 2H), 0.78-0.68 (m, 2H), 0.47-0.36 (m, 2H), 0.22 (d, J=13.3 Hz, 2H). $^{13}$C NMR (126 MHz, Benzene-d$_6$) δ 155.80, 152.29, 147.74, 143.15, 142.74, 139.23, 139.09, 130.95, 129.74, 128.54, 127.06, 126.75, 126.10, 125.28, 124.59, 123.68, 122.60, 122.28, 120.78, 117.11, 116.38, 116.26, 115.45, 112.56, 108.84, 81.81, 78.35, 34.57, 34.42, 32.01, 31.72, 26.11.

Example 92: Synthesis of Intermediate to Ligand 19

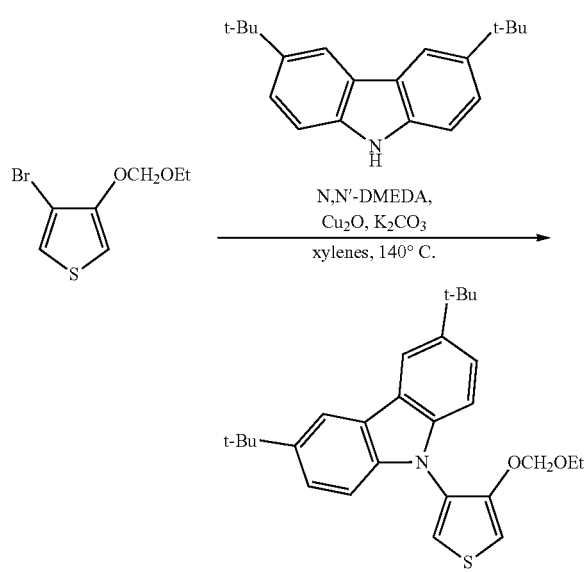

In a nitrogen filled continuous purge glovebox, a mixture of the bromothiophene (5.883 g, 24.811 mmol, 1.00 eq), 3,6-di-t-butylcarbazole (15.252 g, 54.585 mmol, 2.20 eq), Cu$_2$O (7.100 g, 49.622 mmol, 2.00 eq), and K$_2$CO$_3$ (34.290 g, 248.11 mmol, 10.00 eq) was suspended in deoxygenated anhydrous xylenes (200 mL), N,N'-DMEDA (21.5 mL, 199.84 mmol, 4.00 eq) was added, the mixture was equipped with a reflux condenser and a rubber septa, removed from the glovebox, placed under nitrogen, placed in a mantle heated to 140° C., stirred vigorously (1000 rpm) for 72 hrs, removed from the mantle, the now deep red-black mixture was allowed to cool gradually to 23° C., CH$_2$Cl$_2$ (100 mL) was added, the mixture was stirred for 5 mins, suction filtered over a pad of silica gel, rinsed with CH$_2$Cl$_2$ (4×75 mL), the golden brown filtrate was concentrated onto celite, and purified several times via silica gel chromatography using an ISCO chromatography purification system; 15% CH$_2$Cl$_2$ in hexanes to afford the thiophene-carbazole product as a white amorphous foam (7.699 g, 17.673 mmol, 71%). NMR indicated pure product.

$^1$H NMR (500 MHz, Chloroform-d) δ 8.12 (d, J=1.9 Hz, 2H), 7.45 (dd, J=8.6, 2.0 Hz, 2H), 7.32 (d, J=3.6 Hz, 1H), 7.20 (d, J=8.6 Hz, 2H), 6.89 (d, J=3.6 Hz, 1H), 3.56 (q, J=7.1 Hz, 2H), 1.47 (s, 18H), 1.16 (t, J=7.1 Hz, 3H). $^{13}$C NMR (126 MHz, Chloroform-d) δ 150.87, 142.60, 139.70, 127.62, 123.44, 123.08, 120.21, 116.07, 109.57, 102.36, 94.78, 64.37, 34.70, 32.03, 15.01.

Example 93: Synthesis of Intermediate to Ligand 19

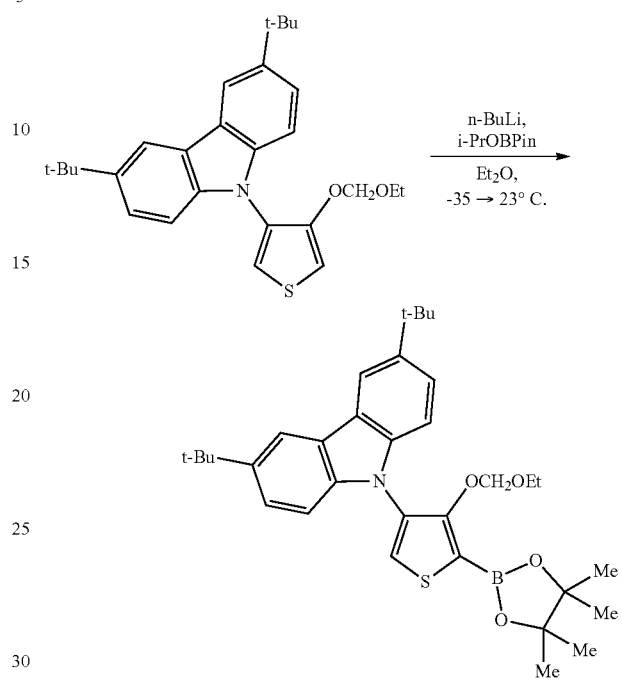

A golden yellow solution of the thiophene (3.000 g, 6.887 mmol, 1.00 eq) in anhydrous deoxygenated Et$_2$O (75 mL) in a nitrogen filled continuous purge glovebox was placed in the freezer (−35° C.), and allowed to precool for 14 hrs upon which a precooled solution of n-BuLi (3.50 mL, 8.608 mmol, 1.25 eq, titrated 2.5 M in hexanes) was added in a quick dropwise manner. The pale orange solution was allowed to sit in the freezer for 4 hrs upon which the isopropoxyboropinacolate ester (2.81 mL, 13.774 mmol, 2.00 eq) was added neat. The now golden yellow solution was allowed to stir at 23° C. for 2 hrs, the now white heterogeneous mixture was diluted with an aqueous phosphate buffer (20 mL, pH=8, 0.05 M), concentrated via rotary evaporation, the mixture was diluted with CH$_2$Cl$_2$ (25 mL) and water (25 mL), poured into a separatory funnel, partitioned, organics were washed with water (1×25 mL), residual organics were extracted with CH$_2$Cl$_2$ (2×25 mL), combined, dried over solid Na$_2$SO$_4$, decanted, concentrated, the resultant golden yellow foam was dissolved in CH$_2$Cl$_2$ (10 mL), suction filtered through a short pad of silica gel, rinsed with CH$_2$Cl$_2$ (4×20 mL), and the golden yellow filtrate solution was concentrated to afford the thiophene-boropinacolate ester as a pale golden yellow foam (2.581 g, 4.596 mmol, 67%, 72% pure by NMR). The impure product is used in the subsequent reaction without further purification.

$^1$H NMR (500 MHz, Chloroform-d) δ 8.11 8.08 (m, 2H), 7.62 (d, J=0.9 Hz, 1H), 7.45 (dt, J=8.6, 1.4 Hz, 2H), 7.23 (dd, J=8.7, 0.7 Hz, 2H), 4.88 (d, J=0.8 Hz, 2H), 2.96-2.88 (m, 2H), 1.46 (s, 18H), 1.38 (s, 12H), 0.58 (t, J=7.1 Hz, 3H). $^{13}$C NMR (126 MHz, Chloroform-d) δ 158.93, 142.70, 139.53, 130.88, 127.58, 123.65, 123.00, 115.86, 109.77, 98.24, 84.20, 64.53, 34.71, 32.03, 24.80, 14.14.

Example 94: Synthesis of Ligand 20

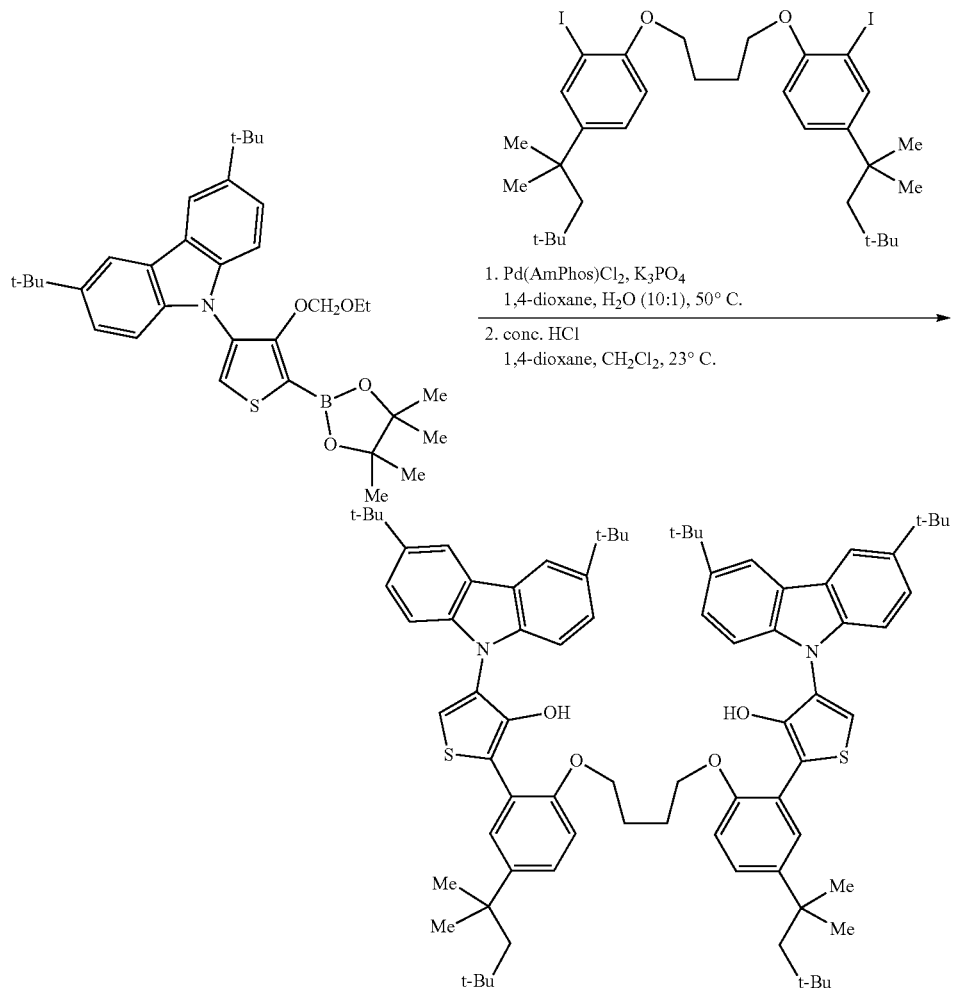

A mixture of the thiophene boropinacolate ester (0.605 g, 0.5387 mmol, 2.70 eq, 50% pure by NMR), K$_3$PO$_4$ (0.343 g, 1.616 mmol, 8.10 eq), Pd(AmPhos)Cl$_2$ (28.3 mg, 0.0399 mmol, 0.20 eq), and the bisphenyliodide (0.143 g, 0.2000 mmol, 1.00 eq). The mixture was evacuated, then back-filled with nitrogen, this process was repeated 3× more, then deoxygenated 1,4-dioxane (4.0 mL) and deoxygenated water (0.4 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH$_2$Cl$_2$ (4×20 mL), the clear black filtrate was concentrated, residual 1,4-dioxane was azeotropically removed using toluene (2×10 mL) via rotary evaporation, the black mixture was then suspended in CH$_2$Cl$_2$ (20 mL), suction filtered over a pad of silica gel, rinsed with CH$_2$Cl$_2$ (4×20 mL), the black filtrate was then concentrated onto celite, and purified via silica gel chromatography via an ISCO chromatography purification system; 10%-50% CH$_2$Cl$_2$ in hexanes to afford the bisthiophene as an off-white solid (0.168 g). NMR indicated product which contained minor impurities. The material was used in the subsequent deprotection without further purification.

To a solution of the impure coupled product in CH$_2$Cl$_2$-1,4-dioxane (8 mL, 1:1) under nitrogen at 23° C. was added conc. HCl (4 mL). The golden brown solution was stirred (500 rpm) for 20 hrs, diluted with 1N HCl (10 mL) and CH$_2$Cl$_2$ (10 mL), poured into separatory funnel, partitioned, organics were washed with 1N HCl (1×10 mL), residual organics were extracted from the aqueous using CH$_2$Cl$_2$ (2×10 mL), combined, dried over solid Na$_2$SO$_4$, decanted, concentrated onto celite, and purified via silica gel chromatography via an ISCO chromatography purification system; 10%-50% CH$_2$Cl$_2$ in hexanes to afford the bisthiophene as a light tan solid (80.0 mg, 0.0657 mmol, 33% two steps). NMR indicated pure product.

$^1$H NMR (400 MHz, Chloroform-d) δ 8.11 (d, J=1.9 Hz, 4H), 7.57 (d, J=2.3 Hz, 2H), 7.47 (s, 2H), 7.41 (dd, J=8.7, 1.9 Hz, 4H), 7.31 (s, 2H), 7.27-7.20 (m, 4H), 6.78 (d, J=8.6 Hz, 2H), 4.07-3.97 (m, 4H), 1.93-1.85 (m, 4H), 1.77 (s, 4H), 1.44 (s, 36H), 1.40 (s, 12H), 0.77 (s, 18H). $^{13}$C NMR (101 MHz, Chloroform-d) δ 151.42, 146.28, 144.75, 142.58, 139.67, 128.29, 127.66, 126.52, 123.39, 123.14, 121.99, 119.81, 116.16, 116.04, 113.38, 109.61, 69.95, 56.86, 38.19, 34.69, 32.41, 32.05, 31.91, 31.62, 25.90.

Example 95: Synthesis of Procatalyst 43

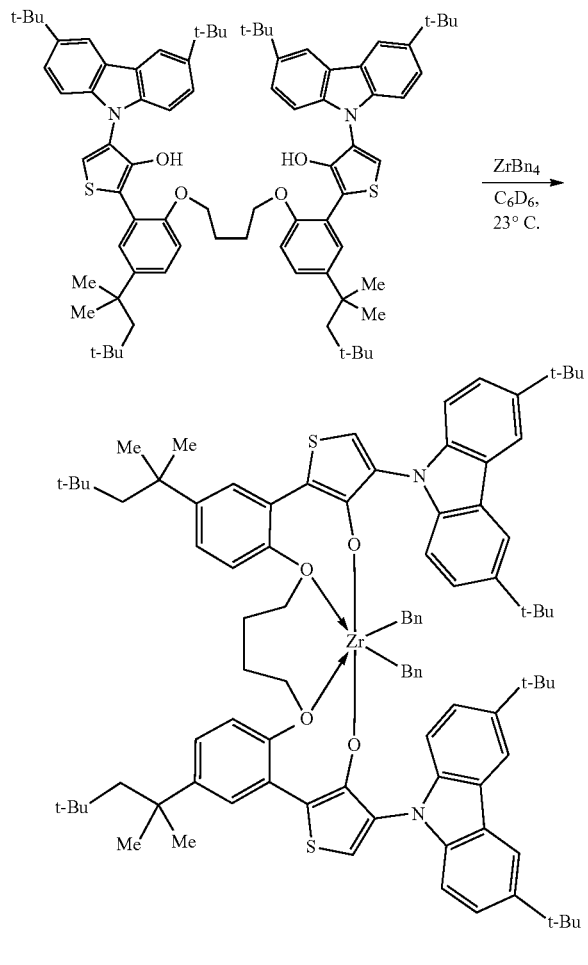

The thiophene ligand was azeotropically dried using toluene (4×10 mL) prior to use. To a clear colorless solution of the thiophene (7.4 mg, 6.08 μmol, 1.00 eq) in anhydrous $C_6D_6$ (1.09 mL) in a nitrogen filled glovebox at 23° C. was added a solution of $ZrBn_4$ (3.0 mg, 6.69 μmol, 1.10 eq) in $C_6D_6$ (0.13 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1$H NMR (400 MHz, Benzene-$d_6$) δ 8.55 (d, J=1.9 Hz, 2H), 8.15-8.11 (m, 2H), 7.57 (d, J=2.5 Hz, 2H), 7.51 (dd, J=8.6, 1.9 Hz, 2H), 7.43 (dd, J=8.7, 1.9 Hz, 2H), 7.34 (d, J=8.4 Hz, 2H), 7.21 (dd, J=8.7, 0.6 Hz, 2H), 7.09-7.04 (m, 2H), 7.03-6.97 (m, 2H), 6.98-6.94 (m, 2H), 6.84 (s, 2H), 6.86-6.81 (m, 2H), 6.24-6.17 (m, 4H), 5.17 (d, J=8.7 Hz, 2H), 4.08-3.98 (m, 2H), 3.42-3.34 (m, 2H), 1.68 (d, J=14.6 Hz, 2H), 1.57 (s, 18H), 1.51 (d, J=14.6 Hz, 2H), 1.23 (s, 18H), 1.20 (s, 6H), 1.16 (s, 6H), 1.02 (d, J=12.3 Hz, 2H), 0.89 (q, J=11.9, 10.7 Hz, 2H), 0.70 (s, 18H), 0.64-0.56 (m, 2H), 0.52 (d, J=12.3 Hz, 2H). $^{13}$C NMR (101 MHz, Benzene-$d_6$) δ 153.93, 152.24, 148.83, 147.09, 142.92, 142.61, 139.23, 139.15, 130.55, 128.65, 128.35, 128.32, 126.79, 126.61, 124.62, 124.10, 122.79, 122.65, 122.26, 120.58, 74.94, 72.00, 56.54, 38.25, 34.66, 34.36, 32.13, 32.10, 31.71, 31.66, 30.04, 25.93.

Example 96: Synthesis of Procatalyst 44

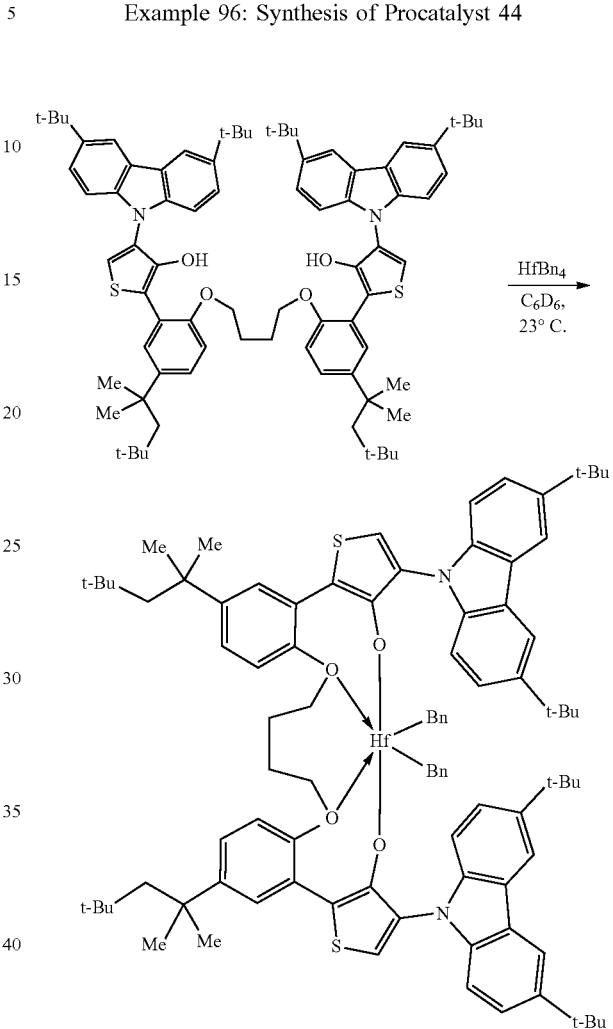

The thiophene ligand was azeotropically dried using toluene (4×10 mL) prior to use. To a clear colorless solution of the thiophene (8.3 mg, 6.82 μmol, 1.00 eq) in anhydrous $C_6D_6$ (1.19 mL) in a nitrogen filled glovebox at 23° C. was added a solution of $HfBn_4$ (4.1 mg, 7.50 μmol, 1.10 eq) in $C_6D_6$ (0.17 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1$H NMR (500 MHz, Benzene-$d_6$) δ 8.57 (dd, J=1.9, 0.6 Hz, 2H), 8.15 (dd, J=2.0, 0.7 Hz, 2H), 7.58 (d, J=2.5 Hz, 2H), 7.52 (dd, J=8.5, 1.9 Hz, 2H), 7.42 (dd, J=8.7, 1.9 Hz, 2H), 7.33 (dd, J=8.5, 0.6 Hz, 2H), 7.14-7.07 (m, 6H), 7.05-7.02 (m, 2H), 6.85 (s, 2H), 6.82 (tt, J=7.3, 1.2 Hz, 2H), 6.24-6.18 (m, 4H), 5.21 (d, J=8.7 Hz, 2H), 4.15-4.06 (m, 2H), 3.50-3.41 (m, 2H), 1.69 (d, J=14.6 Hz, 2H), 1.59 (s, 18H), 1.53 (d, J=14.7 Hz, 2H), 1.25 (s, 18H), 1.22 (s, 6H), 1.17 (s, 6H), 0.92 (t, J=9.5 Hz, 2H), 0.84 (d, J=13.2 Hz, 2H), 0.72 (s, 18H), 0.59-0.51 (m, 2H), 0.27 (d, J=13.2 Hz, 2H). $^{13}$C NMR (126 MHz, Benzene-$d_6$) δ 153.62, 152.32, 149.13, 147.76, 142.98, 142.63, 139.24, 139.11, 128.73, 128.66, 128.04, 127.05, 126.99, 126.92, 125.36, 124.67, 122.99, 122.61, 122.21, 120.63, 116.95, 116.79, 116.28, 115.61, 112.50, 108.93, 81.86, 77.99, 56.54, 38.31, 34.68, 34.37, 32.15, 32.12, 31.68, 31.65, 30.04, 26.03.

Example 97: Synthesis of Ligand 21

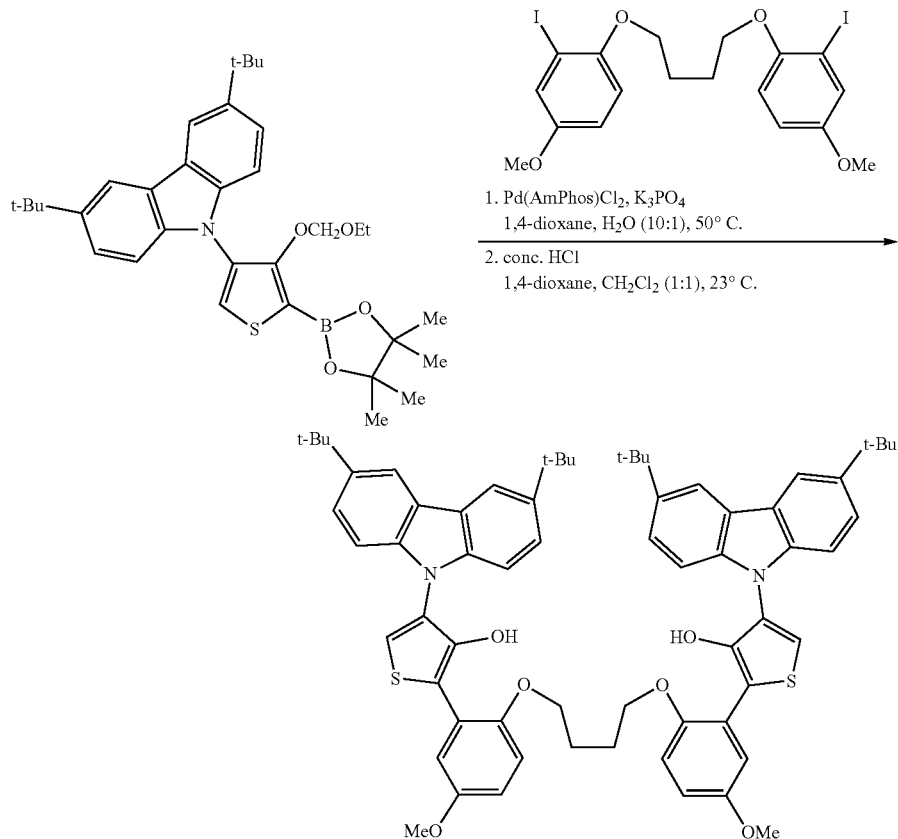

A mixture of the thiophene boropinacolate ester (2.017 g, 2.586 mmol, 3.00 eq, 72% pure by NMR), K$_3$PO$_4$ (1.647 g, 7.758 mmol, 9.00 eq), Pd(AmPhos)Cl$_2$ (122.0 mg, 0.1724 mmol, 0.20 eq), and the bisphenyliodide (0.478 g, 0.8620 mmol, 1.00 eq). The mixture was evacuated, then back-filled with nitrogen, this process was repeated 3× more, then deoxygenated 1,4-dioxane (17.0 mL) and deoxygenated water (1.7 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH$_2$Cl$_2$ (4×20 mL), the clear black filtrate was concentrated, residual 1,4-dioxane was azeotropically removed using toluene (2×10 mL) via rotary evaporation, the black mixture was then suspended in CH$_2$Cl$_2$ (20 mL), suction filtered over a pad of silica gel, rinsed with CH$_2$Cl$_2$ (4×20 mL), the black filtrate was then concentrated onto celite, and purified via silica gel chromatography via an ISCO chromatography purification system; 10%-50% CH$_2$Cl$_2$ in hexanes to afford the bisthiophene as a red amorphous oil (0.747 g, 0.6387 mmol, 74%). NMR indicated pure product.

To a solution of the impure coupled product in CH$_2$Cl$_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and CH$_2$Cl$_2$ (10 mL), poured into separatory funnel, partitioned, organics were washed with 1 N HCl (1×10 mL), residual organics were extracted from the aqueous using CH$_2$Cl$_2$ (2×10 mL), combined, dried over solid Na$_2$SO$_4$, decanted, concentrated onto celite, and purified via silica gel chromatography via an ISCO chromatography purification system; 10%-75% CH$_2$Cl$_2$ in hexanes to afford the bisthiophene as a light tan solid (0.514 g, 0.4879 mmol, 76%, 57% two steps). NMR indicated pure product.

$^1$H NMR (500 MHz, Chloroform-d) δ 8.14 (d, J=1.9 Hz, 4H), 7.68 (s, 2H), 7.42 (dd, J=8.6, 1.9 Hz, 4H), 7.35 (s, 2H), 7.25 (d, J=8.6 Hz, 4H), 7.14 (d, J=2.9 Hz, 2H), 6.84 (d, J=9.0 Hz, 2H), 6.79 (dd, J=8.9, 2.9 Hz, 2H), 3.99 (q, J=3.5, 2.1 Hz, 4H), 3.84 (s, 6H), 1.83 (q, J=2.8 Hz, 4H), 1.46 (s, 36H). $^{13}$C NMR (126 MHz, Chloroform-d) δ 155.34, 147.83, 146.76, 142.68, 139.64, 127.76, 124.50, 123.45, 123.19, 120.26, 120.23, 116.56, 116.20, 115.24, 115.18, 113.95, 109.61, 71.38, 55.77, 34.71, 32.05, 25.85.

Characterization of the Protected Coupled Product:

$^1$H NMR (500 MHz, Chloroform-d) δ 8.10 (d, J=1.9 Hz, 4H), 7.55 (d, J=3.1 Hz, 2H), 7.44 (dd, J=8.6, 1.9 Hz, 4H), 7.35-7.31 (m, 6H), 6.94 (d, J=9.0 Hz, 2H), 6.84 (dd, J=9.0, 3.1 Hz, 2H), 4.47 (s, 4H), 4.16 (d, J=5.0 Hz, 4H), 3.81 (s, 6H), 2.80 (q, J=7.1 Hz, 4H), 2.22-2.12 (m, 4H), 1.46 (s, 36H), 0.52 (t, J=7.0 Hz, 6H). $^{13}$C NMR (126 MHz, Chloroform-d) δ 153.53, 150.14, 147.42, 142.73, 139.47, 129.40, 123.90, 123.65, 123.06, 122.44, 119.40, 116.10, 115.94, 114.29, 113.64, 109.85, 96.97, 69.27, 64.70, 55.89, 34.71, 32.04, 26.46, 14.16.

Example 98: Synthesis of Procatalyst 45

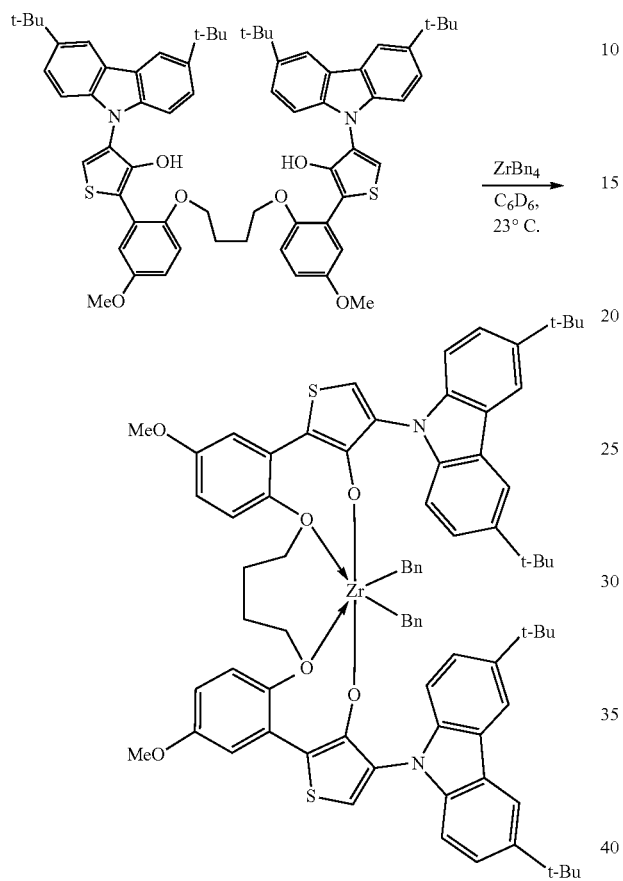

The thiophene ligand was azeotropically dried using toluene (4×10 mL) prior to use. To a clear colorless solution of the thiophene (7.4 mg, 7.02 µmol, 1.00 eq) in anhydrous $C_6D_6$ (1.25 mL) in a nitrogen filled glovebox at 23° C. was added a solution of $ZrBn_4$ (3.7 mg, 7.72 µmol, 1.10 eq) in $C_6D_6$ (0.16 mL) in a dropwise manner. After stirring (500 rpm) for 30 mins the pale golden yellow solution was filtered using a 0.20 µm PTFE submicron filter to afford the zirconium complex as a 0.005 M solution in $C_6D_6$. NMR indicated product. The same procedure can be used with toluene as the solvent to prepare the procatalyst solution (0.0025 M or 0.005 M) which is used directly after filtration for the polymerization experiments.

$^1$H NMR (400 MHz, Benzene-$d_6$) δ 8.47 (dd, J=2.0, 0.6 Hz, 2H), 8.24 (dd, J=1.9, 0.6 Hz, 2H), 7.49 (td, J=8.6, 1.9 Hz, 4H), 7.30 (ddd, J=8.5, 5.3, 0.6 Hz, 4H), 7.08-7.03 (m, 2H), 6.96 (dtd, J=6.9, 1.4, 0.7 Hz, 2H), 6.92 (d, J=3.1 Hz, 2H), 6.84 (s, 2H), 6.78 (tt, J=7.3, 1.3 Hz, 2H), 6.45 (dd, J=9.1, 3.1 Hz, 2H), 6.31-6.26 (m, 4H), 5.04 (d, J=9.1 Hz, 2H), 3.95-3.85 (m, 2H), 3.28-3.19 (m, 2H), 3.16 (s, 6H), 1.47 (s, 18H), 1.27 (s, 18H), 1.08 (d, J=12.3 Hz, 2H), 0.88-0.74 (m, 2H), 0.58 (d, J=12.3 Hz, 2H), 0.56-0.51 (m, 2H). $^{13}$C NMR (101 MHz, Benzene-$d_6$) δ 157.39, 152.38, 149.56, 147.35, 143.13, 142.70, 139.32, 139.16, 128.21, 128.19, 128.15, 126.46, 125.20, 124.57, 124.45, 122.63, 122.35, 120.62, 117.06, 116.85, 116.29, 115.68, 115.54, 114.96, 112.51, 108.91, 81.18, 75.06, 54.73, 34.55, 34.42, 31.99, 31.72, 25.92.

Example 99: Synthesis of Procatalyst 46

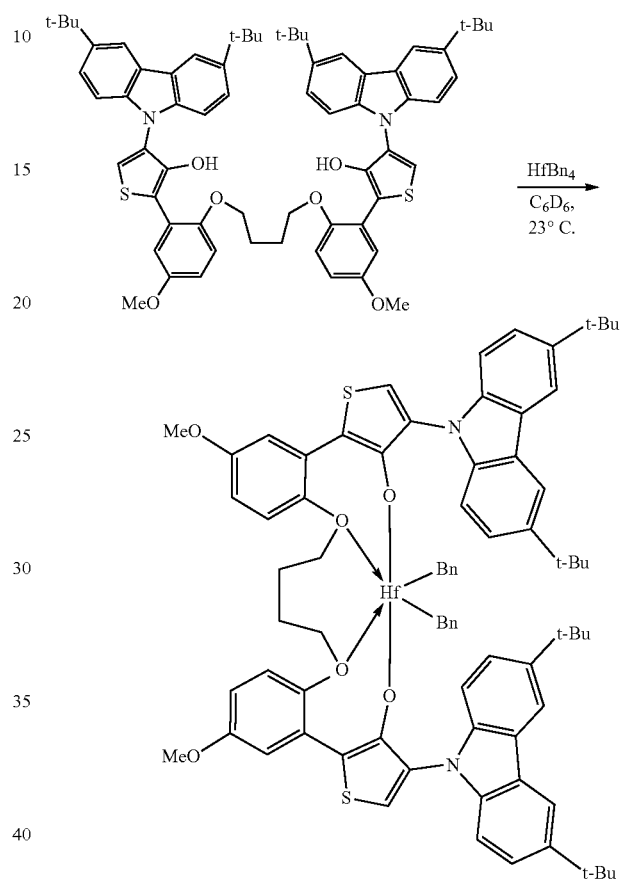

The thiophene ligand was azeotropically dried using toluene (4×10 mL) prior to use. To a clear colorless solution of the thiophene (10.2 mg, 9.68 µmol, 1.00 eq) in anhydrous $C_6D_6$ (1.70 mL) in a nitrogen filled glovebox at 23° C. was added a solution of $HfBn_4$ (5.8 mg, 10.65 µmol, 1.10 eq) in $C_6D_6$ (0.24 mL) in a dropwise manner. After stirring (500 rpm) for 30 mins the pale golden yellow solution was filtered using a 0.20 µm PTFE submicron filter to afford the hafnium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1$H NMR (500 MHz, Benzene-$d_6$) δ 8.50 (dd, J=2.0, 0.6 Hz, 2H), 8.26 (dd, J=1.9, 0.6 Hz, 2H), 7.50 (dd, J=2.5, 1.9 Hz, 2H), 7.48 (t, J=2.1 Hz, 2H), 7.29 (dd, J=8.5, 0.6 Hz, 2H), 7.23 (dd, J=8.7, 0.6 Hz, 2H), 6.99-6.95 (m, 2H), 6.93 (d, J=3.1 Hz, 2H), 6.85 (s, 2H), 6.79-6.74 (m, 2H), 6.52-6.44 (m, 4H), 6.32-6.28 (m, 4H), 5.09 (d, J=9.0 Hz, 2H), 4.02-3.92 (m, 2H), 3.33-3.25 (m, 2H), 3.17 (s, 6H), 1.48 (s, 18H), 1.29 (s, 18H), 0.92 (d, J=13.3 Hz, 2H), 0.85-0.77 (m, 2H), 0.55 (m, 2H), 0.31 (d, J=13.3 Hz, 2H). $^{13}$C NMR (126 MHz, Benzene-$d_6$) δ 157.52, 152.44, 149.28, 148.02, 143.20, 142.73, 139.32, 139.12, 129.89, 128.60, 128.57, 128.03, 127.04, 126.83, 124.63, 124.35, 122.58, 122.30, 120.69, 117.13, 116.30, 115.70, 115.48, 114.96, 112.58, 108.91, 83.01, 78.24, 54.76, 34.57, 34.43, 32.00, 31.73, 26.04.

Example 100: Synthesis of Ligand 22

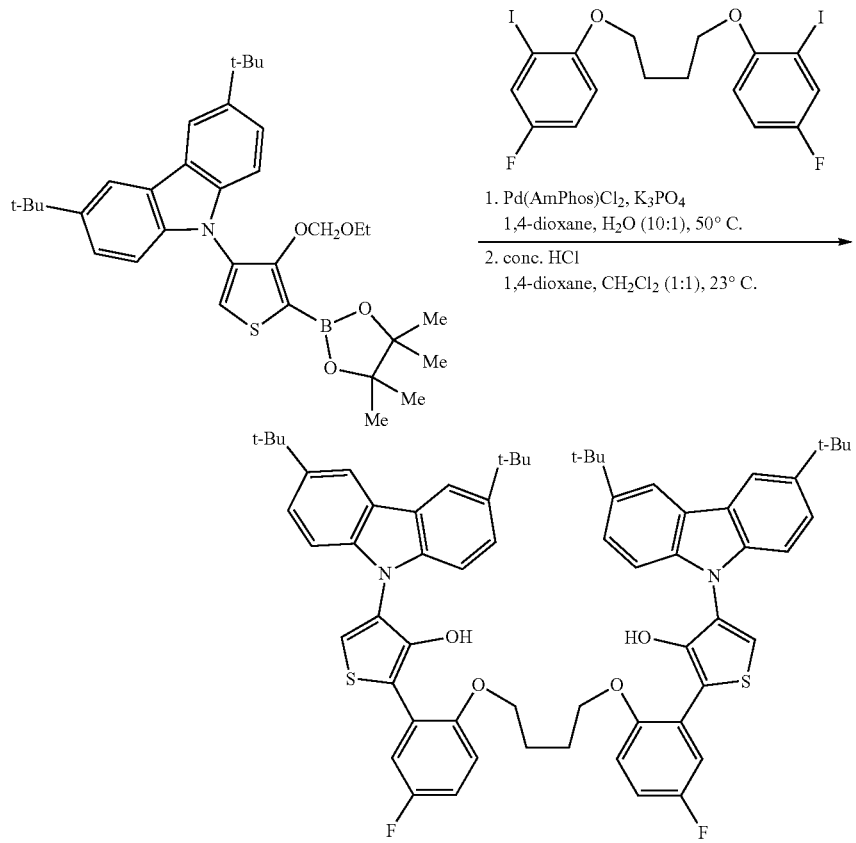

A mixture of the thiophene boropinacolate ester (0.605 g, 0.5387 mmol, 2.70 eq, 50% pure by NMR), K₃PO₄ (0.343 g, 1.616 mmol, 8.10 eq), Pd(AmPhos)Cl₂ (28.3 mg, 0.0399 mmol, 0.20 eq), and the bisphenyliodide (0.106 g, 0.1995 mmol, 1.00 eq). The mixture was evacuated, then back-filled with nitrogen, this process was repeated 3× more, then deoxygenated 1,4-dioxane (4.0 mL) and deoxygenated water (0.4 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH₂Cl₂ (4×20 mL), the clear black filtrate was concentrated, residual 1,4-dioxane was azeotropically removed using toluene (2×10 mL) via rotary evaporation, the black mixture was then suspended in CH₂Cl₂ (20 mL), suction filtered over a pad of silica gel, rinsed with CH₂Cl₂ (4×20 mL), the black filtrate was then concentrated onto celite, and purified via silica gel chromatography via an ISCO chromatography purification system; 10%-50% CH₂Cl₂ in hexanes to afford the bisthiophene as an off-white solid (0.101 g). NMR indicated product which contained minor impurities. The material was used in the subsequent deprotection without further purification.

To a solution of the impure coupled product in CH₂Cl₂-1,4-dioxane (6 mL, 1:1) under nitrogen at 23° C. was added conc. HCl (3 mL). The golden brown solution was stirred (500 rpm) for 20 hrs, diluted with 1N HCl (10 mL) and CH₂Cl₂ (10 mL), poured into separatory funnel, partitioned, organics were washed with 1 N HCl (1×10 mL), residual organics were extracted from the aqueous using CH₂Cl₂ (2×10 mL), combined, dried over solid Na₂SO₄, decanted, concentrated onto celite, and purified via silica gel chromatography via an ISCO chromatography purification system; 10%-75% CH₂Cl₂ in hexanes to afford the bisthiophene as a light tan solid (52.0 mg, 0.05052 mmol, 25% two steps). NMR indicated pure product.

¹H NMR (400 MHz, Chloroform-d) δ 8.10 (d, J=1.9 Hz, 4H), 7.43-7.29 (m, 8H), 7.25 (d, J=10.3 Hz, 2H), 7.19 (d, J=8.6 Hz, 4H), 6.90 (td, J=8.2, 7.5, 3.0 Hz, 2H), 6.80 (dd, J=9.1, 4.6 Hz, 2H), 4.01 (d, J=4.8 Hz, 4H), 1.92-1.81 (m, 4H), 1.42 (s, 36H). ¹⁹F NMR (376 MHz, Chloroform-d) δ -120.34 (td, J=8.5, 4.7 Hz). ¹³C NMR (101 MHz, Chloroform-d) δ 158.08 (d, J=241.4 Hz), 149.83 (d, J=2.3 Hz), 146.99, 142.85, 139.52, 127.55, 124.80 (d, J=8.6 Hz), 123.50, 123.21, 120.82, 116.56 (d, J=24.7 Hz), 116.24, 115.69 (d, J=8.8 Hz), 114.72 (d, J=23.3 Hz), 114.00 (d, J=1.8 Hz), 109.47, 70.96, 34.68, 31.99, 25.83.

Characterization of the Protected Coupled Thiophene: 1H NMR (400 MHz, Chloroform-d) δ 8.08 (dd, J=1.9, 0.7 Hz, 4H), 7.78 (dd, J=9.7, 2.9 Hz, 2H), 7.42 (dd, J=8.6, 1.9 Hz, 4H), 7.33 (s, 2H), 7.31-7.26 (m, 4H), 7.02-6.86 (m, 4H), 4.43 (s, 4H), 4.20-4.14 (m, 4H), 2.86 (q, J=7.0 Hz, 4H), 2.25-2.15 (m, 4H), 1.43 (s, 38H), 0.55 (t, J=7.1 Hz, 6H). 19F NMR (376 MHz, Chloroform-d) δ -123.44 (ddd, J=9.9, 7.4, 4.8 Hz).

Example 101: Synthesis of Procatalyst 47

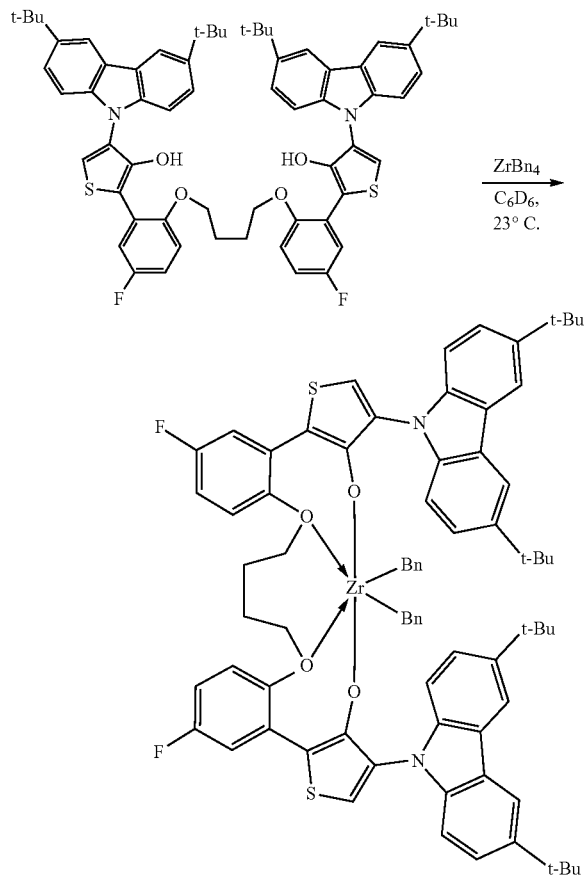

The thiophene ligand was azeotropically dried using toluene (4×10 mL) prior to use. To a clear colorless solution of the thiophene (9.2 mg, 8.94 μmol, 1.00 eq) in anhydrous $C_6D_6$ (1.61 mL) in a nitrogen filled glovebox at 23° C. was added a solution of $ZrBn_4$ (4.5 mg, 9.83 μmol, 1.10 eq) in $C_6D_6$ (0.18 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1$H NMR (500 MHz, Benzene-$d_6$) δ 8.42 (dd, J=2.0, 0.6 Hz, 2H), 8.28 (dd, J=1.9, 0.7 Hz, 2H), 7.51 (dd, J=8.7, 1.9 Hz, 2H), 7.44 (dd, J=8.5, 1.9 Hz, 2H), 7.33 (dd, J=8.7, 0.6 Hz, 2H), 7.21 (dd, J=8.5, 0.7 Hz, 2H), 7.01-6.95 (m, 2H), 6.83 (s, 2H), 6.79-6.74 (m, 2H), 6.50 (ddd, J=9.0, 7.4, 3.2 Hz, 4H), 6.36-6.32 (m, 2H), 6.27-6.23 (m, 4H), 4.99 (dd, J=9.0, 4.8 Hz, 2H), 3.87-3.75 (m, 2H), 3.11 (dd, J=11.8, 4.6 Hz, 2H), 1.43 (s, 18H), 1.30 (s, 18H), 1.02 (d, J=12.4 Hz, 2H), 0.98-0.82 (m, 2H), 0.75-0.63 (m, 2H), 0.52 (d, J=12.3 Hz, 2H). $^{19}$F NMR (470 MHz, Benzene-$d_6$) δ −114.74-−117.39 (m). $^{13}$C NMR (126 MHz, Benzene-$d_6$) δ 159.84 (d, J=246.8 Hz), 152.62, 151.81 (d, J=2.6 Hz), 146.41, 143.19 (d, J=49.2 Hz), 139.19 (d, J=20.1 Hz), 130.56, 128.33, 128.06, 126.53, 125.18, 124.92 (d, J=8.9 Hz), 124.30 (d, J=47.3 Hz), 122.56 (d, J=38.4 Hz), 121.16, 118.06, 116.69 (d, J=47.1 Hz), 116.69, 115.98 (d, J=91.0 Hz), 115.83 (d, J=1.9 Hz), 112.30, 108.75, 74.98, 72.01, 34.52, 34.45, 31.94, 31.72, 25.71.

Example 102: Synthesis of Procatalyst 48

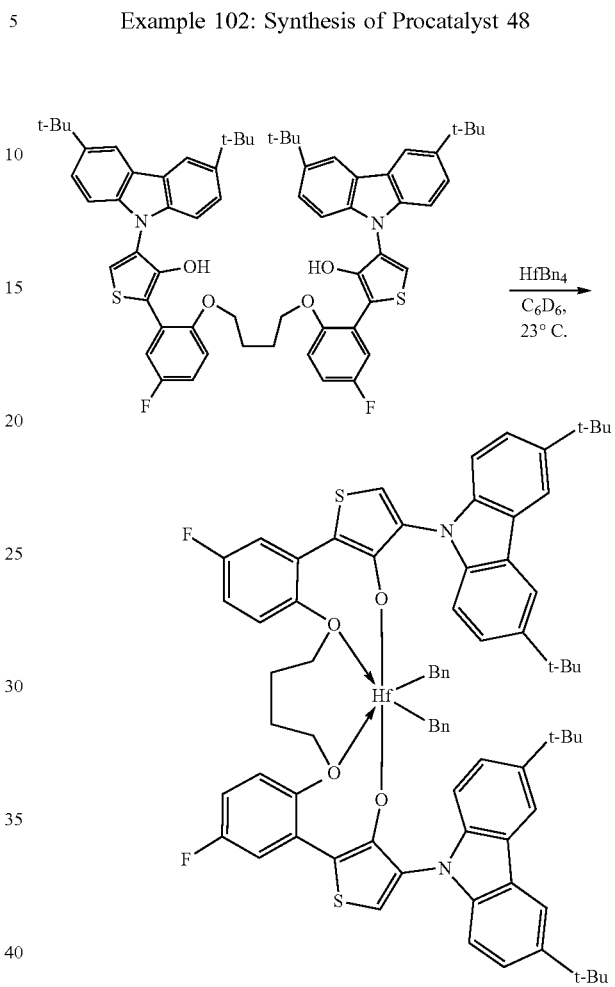

The thiophene ligand was azeotropically dried using toluene (4×10 mL) prior to use. To a clear colorless solution of the thiophene (7.7 mg, 7.48 μmol, 1.00 eq) in anhydrous $C_6D_6$ (1.37 mL) in a nitrogen filled glovebox at 23° C. was added a solution of $HfBn_4$ (4.5 mg, 8.23 μmol, 1.10 eq) in $C_6D_6$ (0.19 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1$H NMR (500 MHz, Benzene-$d_6$) δ 8.43 (dd, J=2.0, 0.6 Hz, 2H), 8.29 (dd, J=1.9, 0.6 Hz, 2H), 7.49 (dd, J=8.7, 1.9 Hz, 2H), 7.44 (dd, J=8.5, 1.9 Hz, 2H), 7.24 (dd, J=8.7, 0.6 Hz, 2H), 7.19 (dd, J=8.5, 0.6 Hz, 2H), 7.02-6.96 (m, 2H), 6.94-6.90 (m, 2H), 6.82 (s, 2H), 6.75 (tt, J=7.5, 1.3 Hz, 2H), 6.55-6.47 (m, 4H), 6.30-6.25 (m, 4H), 5.01 (dd, J=9.0, 4.8 Hz, 2H), 3.89-3.78 (m, 2H), 3.15 (dd, J=12.4, 4.7 Hz, 2H), 1.43 (s, 18H), 1.30 (s, 18H), 0.90 (d, J=13.4 Hz, 2H), 0.73-0.62 (m, 2H), 0.49-0.40 (m, 2H), 0.24 (d, J=14.0 Hz, 2H). $^{19}$F NMR (470 MHz, Benzene-$d_6$) δ −115.11-−115.24 (m). $^{13}$C NMR (126 MHz, Benzene-$d_6$) δ 159.97 (d, J=247.4

Hz), 152.66, 151.46 (d, J=2.7 Hz), 147.32, 143.24 (d, J=55.5 Hz), 139.14 (d, J=26.6 Hz), 138.52, 130.56, 128.38 (d, J=11.1 Hz), 127.15, 126.72, 124.55, 124.35, 122.64, 122.33, 121.13, 118.09, 116.76 (d, J=23.4 Hz), 116.46 (d, J=23.3 Hz), 116.32, 115.52, 115.27, 112.43, 108.74, 82.00, 78.84, 34.52, 34.46, 31.94, 31.72, 25.86.

Example 103: Synthesis of Ligand 23

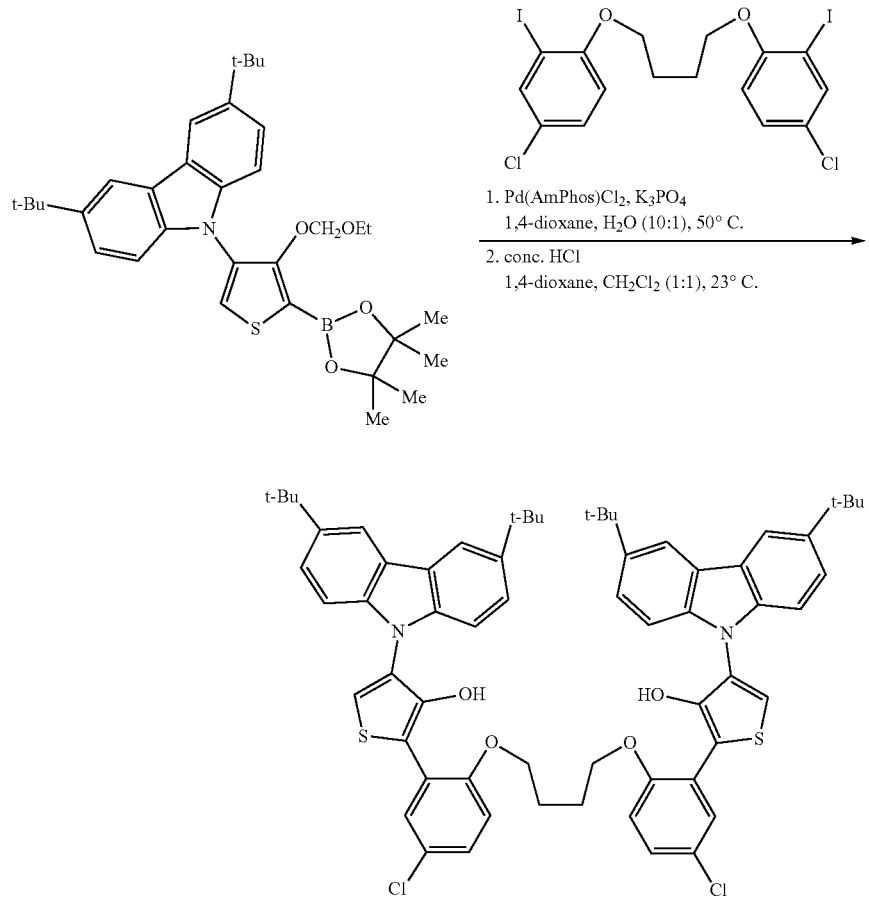

A mixture of the thiophene boropinacolate ester (1.000 g, 1.104 mmol, 2.70 eq, 62% pure by NMR), $K_3PO_4$ (0.703 g, 3.312 mmol, 8.10 eq), Pd(AmPhos)$Cl_2$ (58.0 mg, 0.0818 mmol, 0.20 eq), and the bisphenyliodide (0.230 g, 0.4089 mmol, 1.00 eq). The mixture was evacuated, then back-filled with nitrogen, this process was repeated 3× more, then deoxygenated 1,4-dioxane (8.0 mL) and deoxygenated water (0.8 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-75% $CH_2Cl_2$ in hexanes to afford the impure bisthiophene as a pale red amorphous foam (0.232 g). NMR indicated product which contained impurities. The impure material was used in the subsequent reaction.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a white foam (0.143 g, 0.1346 mmol, 33% two steps). NMR indicated pure product.

$^1$H NMR (500 MHz, Chloroform-d) δ 8.15 (dd, J=1.9, 0.6 Hz, 4H), 7.66 (d, J=2.6 Hz, 2H), 7.42 (dd, J=8.6, 1.9 Hz, 4H), 7.35 (s, 2H), 7.24-7.20 (m, 4H), 7.18 (dd, J=8.7, 2.6 Hz, 2H), 7.04 (s, 2H), 6.79 (d, J=8.8 Hz, 2H), 4.04 (q, J=3.6, 2.8 Hz, 4H), 1.91 (q, J=2.8, 2.4 Hz, 4H), 1.47 (s, 36H). 13C NMR (126 MHz, Chloroform-d) δ 152.34, 146.98, 142.94, 139.54, 129.92, 128.19, 127.84, 127.46, 124.63, 123.58, 123.27, 120.85, 116.30, 115.08, 113.72, 109.51, 70.29, 34.74, 32.05, 25.81.

Example 104: Synthesis of Procatalyst 49

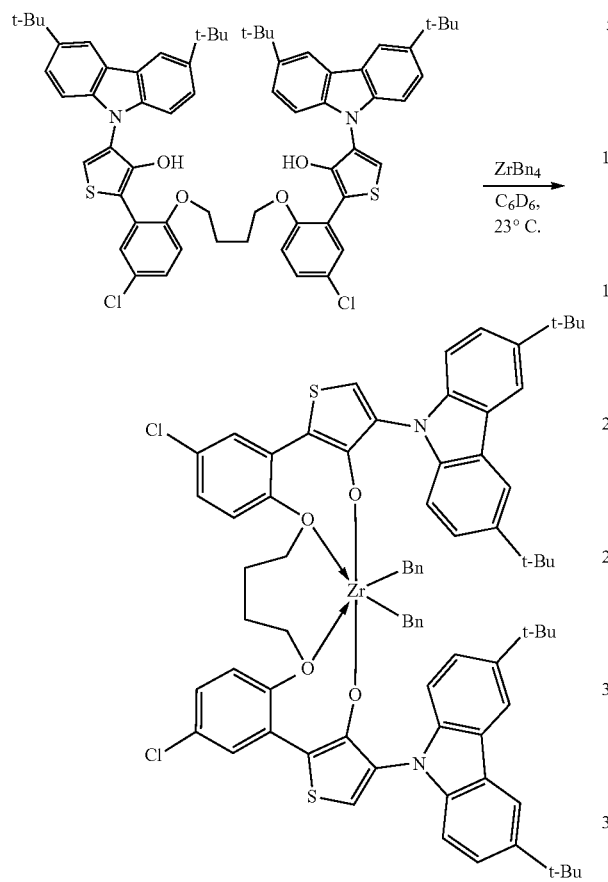

The thiophene ligand was azeotropically dried using toluene (4×10 mL) prior to use. To a clear colorless solution of the thiophene (9.2 mg, 8.66 μmol, 1.00 eq) in anhydrous $C_6D_6$ (1.55 mL) in a nitrogen filled glovebox at 23° C. was added a solution of $ZrBn_4$ (4.3 mg, 9.53 μmol, 1.10 eq) in $C_6D_6$ (0.18 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with toluene as the solvent to prepare the procatalyst solution (0.0025 M or 0.005 M) which is used directly after filtration for the polymerization experiments.

$^1$H NMR (500 MHz, Benzene-$d_6$) δ 8.43 (dd, J=2.0, 0.6 Hz, 2H), 8.29 (dd, J=1.9, 0.6 Hz, 2H), 7.53-7.48 (m, 4H), 7.45 (dd, J=8.5, 1.9 Hz, 2H), 7.34 (dd, J=8.7, 0.6 Hz, 2H), 7.31 (d, J=2.6 Hz, 2H), 7.22-7.19 (m, 2H), 6.91-6.86 (m, 2H), 6.83 (dd, J=8.7, 2.7 Hz, 2H), 6.81 (s, 2H), 6.79-6.74 (m, 2H), 6.24-6.19 (m, 4H), 4.98 (d, J=8.7 Hz, 2H), 3.88-3.78 (m, 2H), 3.12 (dd, J=11.9, 4.7 Hz, 2H), 1.44 (s, 18H), 1.29 (s, 18H), 0.98 (d, J=12.3 Hz, 2H), 0.71-0.64 (m, 2H), 0.53 (d, J=12.3 Hz, 2H), 0.53-0.47 (m, 2H). $^{13}$C NMR (126 MHz, Benzene-$d_6$) δ 154.32, 152.71, 146.13, 143.43, 143.02, 139.29, 139.12, 131.33, 130.56, 130.43, 129.56, 128.90, 128.33, 126.54, 126.07, 125.16, 124.69, 124.51, 124.12, 122.73, 122.43, 121.25, 118.17, 116.44, 115.69, 115.54, 112.22, 108.73, 74.66, 72.01, 34.54, 34.46, 31.94, 31.71, 25.77.

Example 105: Synthesis of Procatalyst 50

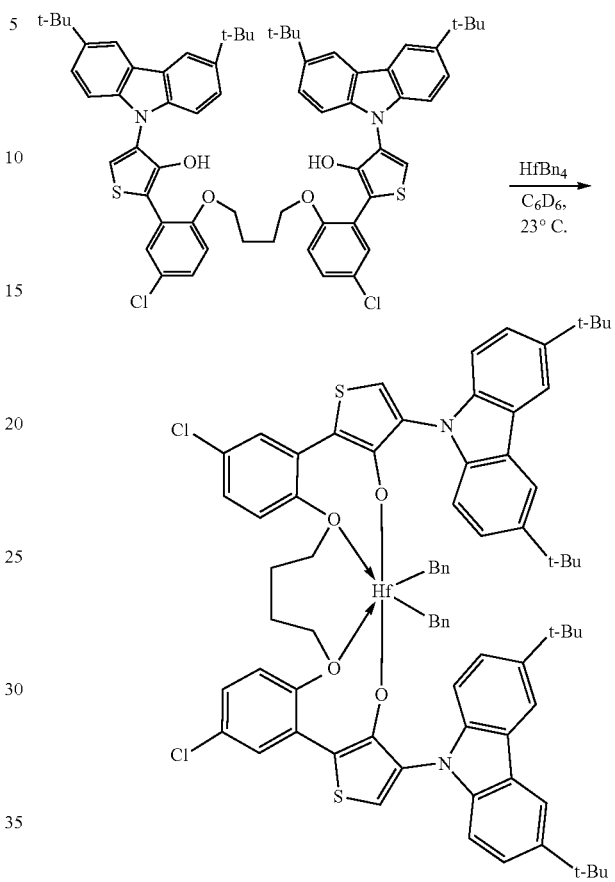

The thiophene ligand was azeotropically dried using toluene (4×10 mL) prior to use. To a clear colorless solution of the thiophene (6.8 mg, 6.40 μmol, 1.00 eq) in anhydrous $C_6D_6$ (1.12 mL) in a nitrogen filled glovebox at 23° C. was added a solution of $HfBn_4$ (3.8 mg, 7.04 μmol, 1.10 eq) in $C_6D_6$ (0.16 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1$H NMR (400 MHz, Benzene-$d_6$) δ 8.43 (d, J=1.9 Hz, 2H), 8.28 (d, J=1.8 Hz, 2H), 7.49 (dd, J=8.7, 1.9 Hz, 2H), 7.43 (dd, J=8.6, 2.0 Hz, 2H), 7.31 (d, J=2.6 Hz, 2H), 7.24 (d, J=8.7 Hz, 2H), 7.17 (d, J=8.6 Hz, 2H), 6.98-6.93 (m, 2H), 6.92-6.87 (m, 2H), 6.83 (dd, J=8.8, 2.7 Hz, 2H), 6.79 (s, 2H), 6.73 (tt, J=7.3, 1.3 Hz, 2H), 6.27-6.22 (m, 4H), 4.96 (d, J=8.8 Hz, 2H), 3.88-3.76 (t, J=10.8 Hz, 2H), 3.19-3.06 (m, 2H), 1.43 (s, 18H), 1.28 (s, 18H), 0.89 (d, J=13.4 Hz, 2H), 0.70-0.57 (m, 2H), 0.47-0.36 (m, 2H), 0.27-0.20 (m, 2H). $^{13}$C NMR (101 MHz, Benzene-$d_6$) δ 153.93, 152.73, 147.19, 143.50, 143.04, 139.24, 139.01, 138.50, 131.61, 130.40, 129.58, 129.05, 128.32, 126.62, 124.98, 124.56, 124.34, 122.64, 122.33, 121.16, 118.13, 116.39, 115.56, 114.96, 112.37, 108.72, 82.98, 78.97, 34.53, 34.45, 31.93, 31.70, 25.93.

Example 106: Synthesis of Intermediate to Ligand 23

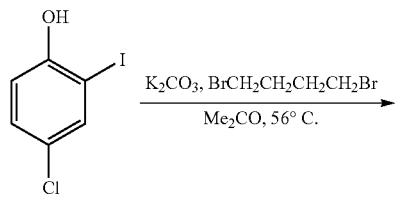

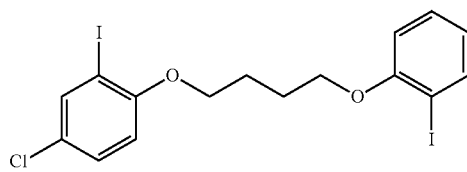

A white heterogeneous mixture of the iodophenol (1.604 g, 6.303 mmol, 2.00 eq), K₂CO₃ (2.613 g, 18.909 mmol, 6.00 eq), and 1,4-dibromobutane (0.38 mL, 3.151 mmol, 1.00 eq) in acetone (60 mL) equipped with a reflux condenser under nitrogen was placed in a mantle heated to 60° C., after stirring (500 rpm) for 48 hrs the white heterogeneous mixture was removed from the mantle, allowed to cool to 23° C., diluted with CH₂Cl₂ (50 mL), stirred vigorously (1000 rpm) for 5 mins, suction filtered over a pad of celite, rinsed with CH₂Cl₂ (3×25 mL), the resultant filtrate solution was concentrated onto celite, and purified via silica gel chromatography; 10% CH₂Cl₂ in hexanes –50% CH₂Cl₂ in hexanes to afford the bisiodophenyl ether as a white solid (1.712 g, 3.041 mmol, 97%). NMR indicated product.

¹H NMR (500 MHz, Chloroform-d) δ 7.73 (d, J=2.5 Hz, 2H), 7.27 7.23 (m, 2H), 6.73 (d, J=8.8 Hz, 2H), 4.14-4.04 (m, 4H), 2.10 (h, J=2.4 Hz, 4H). 13C NMR (126 MHz, Chloroform-d) δ 156.29, 138.50, 129.17, 126.28, 112.40, 86.72, 69.01, 25.92.

Example 107: Synthesis of Ligand 24

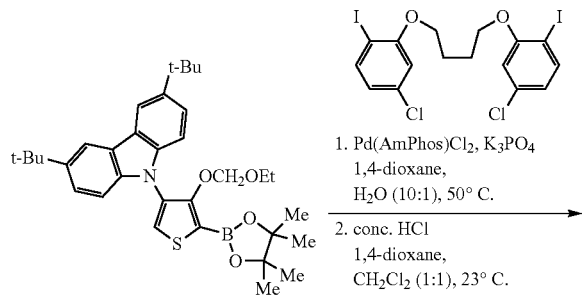

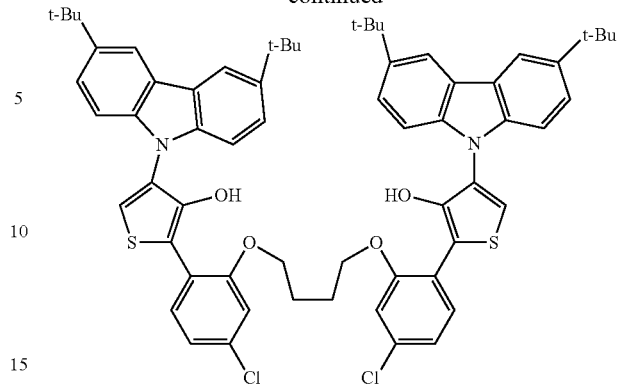

A mixture of the thiophene boropinacolate ester (1.000 g, 1.104 mmol, 2.70 eq, 62% pure by NMR), K₃PO₄ (0.703 g, 3.312 mmol, 8.10 eq), Pd(AmPhos)Cl₂ (58.0 mg, 0.0818 mmol, 0.20 eq), and the bisphenyliodide (0.230 g, 0.4089 mmol, 1.00 eq). The mixture was evacuated, then back-filled with nitrogen, this process was repeated 3× more, then deoxygenated 1,4-dioxane (8.0 mL) and deoxygenated water (0.8 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with CH₂Cl₂ (4×20 mL), the clear black filtrate was concentrated, residual 1,4-dioxane was azeotropically removed using toluene (2×10 mL) via rotary evaporation, the black mixture was then suspended in CH₂Cl₂ (20 mL), suction filtered over a pad of silica gel, rinsed with CH₂Cl₂ (4×20 mL), the black filtrate was then concentrated onto celite, and purified via silica gel chromatography via an ISCO chromatography purification system; 10%-75% CH₂Cl₂ in hexanes to afford the impure bisthiophene as a pale red amorphous foam (0.161 g). NMR indicated product which contained impurities. The impure material was used in the subsequent reaction.

To a solution of the impure coupled product in CH₂Cl₂-1,4-dioxane (10 mL, 1:1) under nitrogen at 23° C. was added conc. HCl (5 mL). The golden brown solution was stirred (500 rpm) for 20 hrs, diluted with 1N HCl (10 mL) and CH₂Cl₂ (10 mL), poured into separatory funnel, partitioned, organics were washed with 1N HCl (1×10 mL), residual organics were extracted from the aqueous using CH₂Cl₂ (2×10 mL), combined, dried over solid Na₂SO₄, decanted, concentrated onto celite, and purified via silica gel chromatography via an ISCO chromatography purification system; 10%-75% CH₂Cl₂ in hexanes to afford the bisthiophene as a white solid (0.121 g, 0.1139 mmol, 24% two steps). NMR indicated pure product.

¹H NMR (500 MHz, Chloroform-d) δ 8.13 (d, J=1.9 Hz, 4H), 7.60 (d, J=8.3 Hz, 2H), 7.39 (dd, J=8.6, 1.9 Hz, 4H), 7.31 (s, 2H), 7.20 (d, J=8.6 Hz, 4H), 7.10 (dd, J=8.4, 2.0 Hz, 2H), 6.94 (d, J=2.0 Hz, 2H), 6.70 (s, 2H), 4.09-4.02 (m, 4H), 1.99-1.90 (m, 4H), 1.44 (s, 36H). ¹³C NMR (126 MHz, Chloroform-d) δ 154.27, 146.45, 142.91, 139.52, 133.98, 131.08, 127.26, 123.54, 123.24, 122.78, 121.45, 120.37, 116.29, 114.09, 114.02, 109.48, 69.93, 34.70, 32.01, 25.84.

Example 108: Synthesis of Procatalyst 51

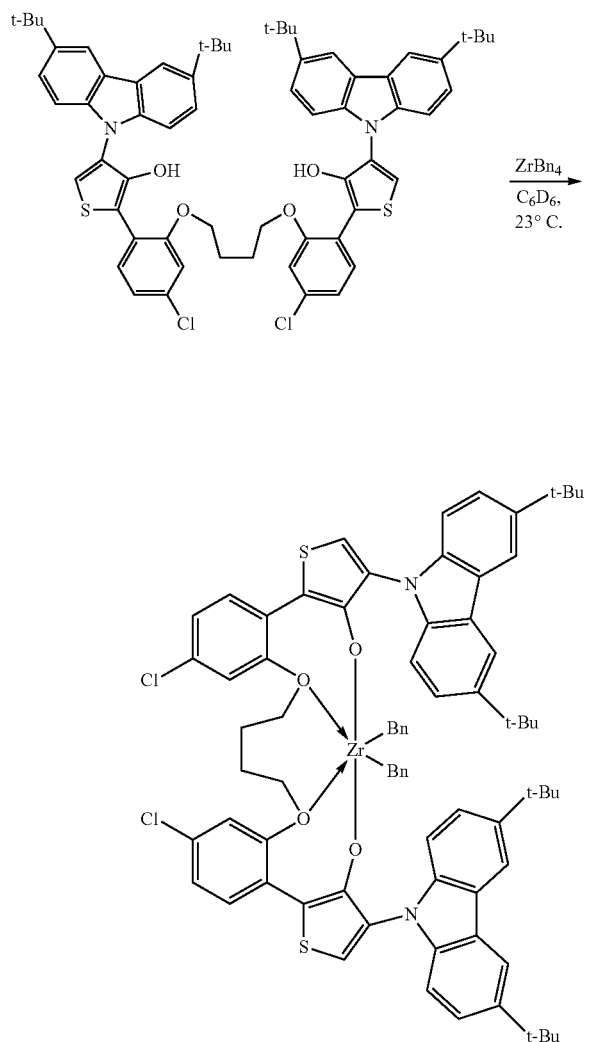

The thiophene ligand was azeotropically dried using toluene (4×10 mL) prior to use. To a clear colorless solution of the thiophene (10.7 mg, 10.10 μmol, 1.00 eq) in anhydrous $C_6D_6$ (1.82 mL) in a nitrogen filled glovebox at 23° C. was added a solution of $ZrBn_4$ (5.0 mg, 11.10 μmol, 1.10 eq) in $C_6D_6$ (0.20 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with toluene as the solvent to prepare the procatalyst solution (0.0025 M or 0.005 M) which is used directly after filtration for the polymerization experiments.

$^1$H NMR (500 MHz, Benzene-$d_6$) δ 8.51-8.44 (m, 4H), 8.35-8.26 (m, 2H), 7.63-7.54 (m, 4H), 7.29-7.26 (m, 2H), 7.14 (d, J=8.3 Hz, 2H), 6.94 (s, 2H), 6.91 (dd, J=8.3, 2.1 Hz, 2H), 6.85-6.77 (m, 4H), 6.51-6.48 (m, 4H), 6.40-6.32 (m, 2H), 5.86 (d, J=2.1 Hz, 2H), 3.48-3.38 (m, 2H), 3.32 (m, 2H), 1.73 (d, J=13.1 Hz, 2H), 1.33 (s, 18H), 1.23 (s, 18H), 1.03-0.96 (m, 2H), 0.92-0.79 (m, 2H), 0.50 (d, J=13.1 Hz, 2H). $^{13}$C NMR (126 MHz, Benzene-$d_6$) δ 152.92, 151.61, 146.86, 146.45, 143.89, 143.60, 143.13, 142.96, 140.01, 138.84, 138.68, 134.86, 130.56, 126.63, 126.27, 124.11, 123.99, 123.63, 123.00, 122.36, 121.39, 116.78, 115.97, 75.66, 72.03, 34.54, 34.50, 34.47, 34.41, 31.82, 31.69.

Example 109: Synthesis of Procatalyst 52

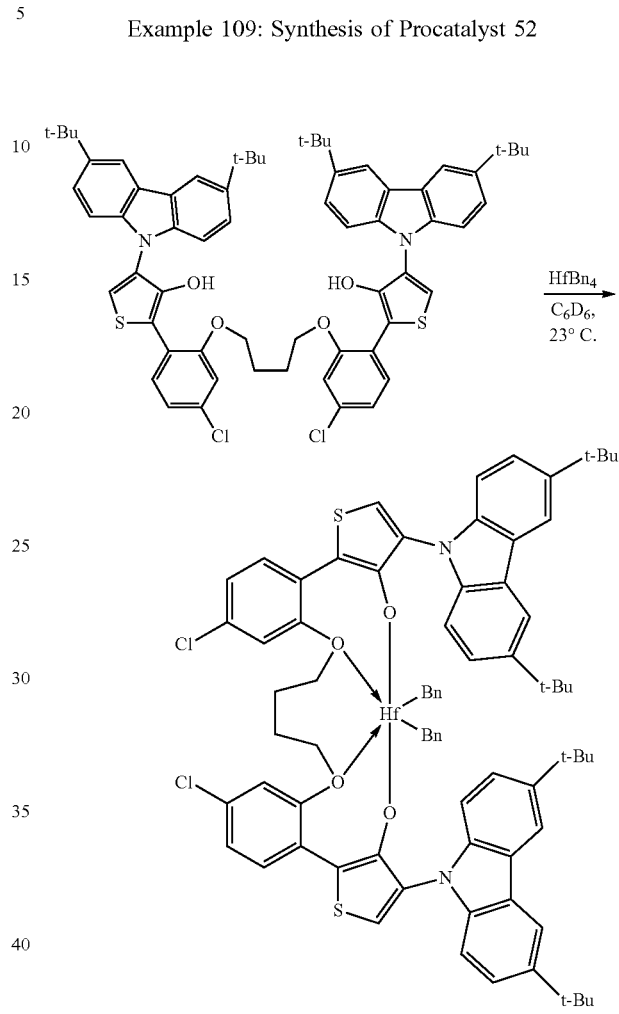

The thiophene ligand was azeotropically dried using toluene (4×10 mL) prior to use. To a clear colorless solution of the thiophene (12.0 mg, 11.30 μmol, 1.00 eq) in anhydrous $C_6D_6$ (1.99 mL) in a nitrogen filled glovebox at 23° C. was added a solution of $HfBn_4$ (6.8 mg, 12.43 μmol, 1.10 eq) in $C_6D_6$ (0.27 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with toluene as the solvent to prepare the procatalyst solution (0.005 M) which is used directly after filtration for the polymerization experiments.

$^1$H NMR (400 MHz, Benzene-$d_6$) δ 8.57 (d, J=1.9 Hz, 2H), 8.43-8.38 (m, 2H), 7.60-7.43 (m, 4H), 7.18 (d, J=8.6 Hz, 2H), 6.96 (ddq, J=7.4, 1.4, 0.7 Hz, 4H), 6.91-6.85 (m, 2H), 6.81 (s, 2H), 6.82-6.79 (m, 2H), 6.75 (tt, J=7.3, 1.2 Hz, 2H), 6.66 (dd, J=8.4, 2.1 Hz, 2H), 6.50-6.45 (m, 4H), 5.54 (d, J=2.1 Hz, 2H), 3.66-3.53 (m, 2H), 2.90-2.83 (m, 2H), 1.33 (s, 18H), 1.22 (s, 18H), 1.05 (dd, J=13.4, 5.9 Hz, 2H), 0.91-0.71 (m, 2H), 0.55-0.40 (m, 2H), 0.34 (d, J=13.6 Hz, 2H).

Example 110: Synthesis of Intermediate to Ligand 24

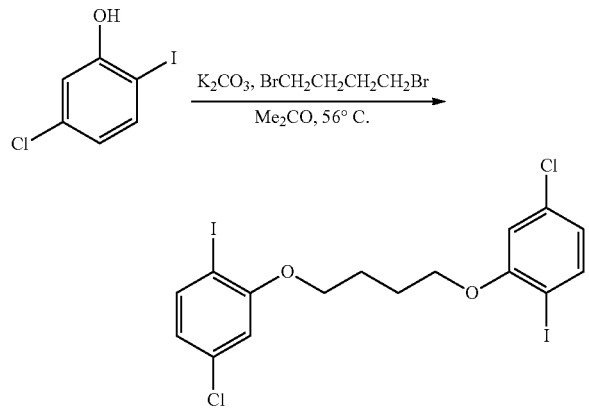

A white heterogeneous mixture of the iodophenol (2.475 g, 9.727 mmol, 2.00 eq), K$_2$CO$_3$ (4.033 g, 29.180 mmol, 6.00 eq), and 1,4-dibromobutane (0.58 mL, 4.864 mmol, 1.00 eq) in acetone (100 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with CH$_2$Cl$_2$ (50 mL), stirred vigorously (1000 rpm) for 5 mins, suction filtered over a pad of celite, rinsed with CH$_2$Cl$_2$ (3×25 mL), the resultant filtrate solution was concentrated onto celite, and purified via silica gel chromatography; 10% CH$_2$Cl$_2$ in hexanes 50% CH$_2$Cl$_2$ in hexanes to afford the bisiodophenyl ether as a white solid (2.456 g, 4.362 mmol, 90%). NMR indicated product.

$^1$H NMR (400 MHz, Chloroform-d) δ 7.64 (d, J=8.3 Hz, 2H), 6.79 (d, J=2.2 Hz, 2H), 6.70 (dd, J=8.3, 2.2 Hz, 2H), 4.16 4.03 (m, 4H), 2.15 2.04 (m, 4H). NMR (101 MHz, Chloroform-d) δ 158.00, 139.68, 135.13, 122.49, 112.66, 83.83, 68.90, 25.86.

Example 111—Polymers Yielded from Procatalysts

Catalyst efficiency (g polymer yield/g Metal) and resulting polymer characteristics were assessed for Procatalysts 1-52. The polymerization reactions were carried out in a 2-L semi-batch reactor initially without diethyl zinc (DEZ), and then with three different loading of DEZ added (0, 50, and 200 μmol). The activator was bis(hydrogenated tallow alkyl) methylammonium tetrakis(pentafluorophenyl)borate in amounts of 1.5 molar equivalents. Procatalysts 7, 8, 11, and 12 were premixed in 0.005 M solution with excess MMAO-3A (10.0 eq) for 10 mins prior to subjection to the polymerization experiment.

The procatalysts in Table 1 are capable of producing polymer at temperatures up to 190° C. with a range of low to high efficiency (grams polymer/gram metal). The highest catalyst process efficiency is observed when the procatalyst possesses an unsubstituted or substituted carbazole substituent ortho to the oxygen forming the covalent bond with the metal center as observed by procatalysts. The highest molecular weight capabilities are observed when the 3,5-di-tert-butylphenyl, 3,6-bis-(2,4,6-triisopropylphenyl)carbazole, and the 3,6-di-tert-butylcarbazole substituents are ortho to the anionic donor as observed, in example, by procatalysts 5, 6, 13, and 30. In general, these catalysts produce polymer with narrow PDI (<4) and a mid-to-high range of comonomer incorporation (5-21%) under these reactor conditions.

TABLE 1

Polymerization Data from Semi-Batch Reactor Experiments

| Procatalyst No. | Temp. (° C.) | Efficiency (g poly/g Metal) | Mw (g/mol) | PDI (Mw/Mn) | Mol % Octene | T$_M$ (° C.) |
|---|---|---|---|---|---|---|
| 1 | 120 | 5,831,799 | 68,112 | 2.3 | 10.4 | 75.3 |
| 1 | 150 | 745,418 | 53,024 | 2.3 | 13.0 | 49.3 |
| 2 | 120 | 896,409 | 431,535 | 2.3 | 11.8 | 54.9 |
| 2 | 150 | 336,153 | 278,591 | 2.2 | 12.9 | 50.6 |
| 3 | 120 | 176,854 | 253,668 | 2.9 | 5.0 | 92.2 |
| 3 | 150 | 51,522 | 121,522 | 2.8 | 5.4 | 85.7 |
| 4 | 120 | 13,726 | 250,776 | 2.1 | 5.7 | 83.9 |
| 4 | 150 | 14,490 | 62,618 | 2.2 | 7.1 | 83.0 |
| 5 | 120 | 396,825 | 1,223,356 | 3.4 | 10.9 | 63.1 |
| 5 | 150 | 92,629 | 609,069 | 24.6 | 11.0 | 67.6 |
| 6 | 120 | 20,169 | 504,923 | 2.3 | 9.7 | 60.2 |
| 6 | 150 | 8,124 | 162,680 | 2.7 | 10.5 | 55.4 |
| 7 | 120 | 591,949 | 58,047 | 2.2 | 9.1 | 78.0 |
| 7 | 150 | 649,289 | 45,241 | 2.0 | 10.4 | 67.6 |
| 7 | 190 | 142,506 | 26,860 | 21.1 | 10.9 | 61.3 |
| 9 | 120 | 2,959,747 | 71,894 | 2.4 | 10.6 | 70.6 |
| 9 | 150 | 1,132,743 | 50,792 | 2.2 | 11.6 | 65.8 |
| 10 | 120 | 105,328 | 463,556 | 2.8 | 12.5 | 49.0 |
| 10 | 150 | 242,030 | 309,786 | 2.2 | 15.7 | 44.8 |
| 10 | 190 | 42,579 | 148,737 | 2.3 | 12.5 | 48.9 |
| 11 | 120 | 1,753,924 | 63,408 | 2.2 | 9.6 | 72.8 |
| 11 | 150 | 734,456 | 49,917 | 2.1 | 9.9 | 67.6 |
| 12 | 120 | 154,631 | 498,846 | 2.3 | 13.2 | 49.4 |
| 12 | 150 | 202,812 | 316,911 | 2.2 | 14.6 | 45.3 |
| 12 | 190 | 43,700 | 138,212 | 2.2 | 13.8 | N.D. |
| 13 | 120 | 243,357 | 902,915 | 2.6 | 11.4 | 55.3 |
| 13 | 150 | 122,775 | 632,172 | 4.0 | 12.6 | 55.2 |
| 13 | 190 | 18,087 | 96,624 | 8.7 | 8.7 | 67.2 |
| 15 | 120 | 5,919,495 | 68,440 | 3.3 | 6.8 | 98.0 |
| 15 | 150 | 1,425,064 | 54,721 | 2.5 | 6.9 | 95.1 |
| 15 | 190 | 118,390 | 44,188 | 2.4 | 6.3 | 93.7 |
| 16 | 120 | 327,189 | 417,312 | 2.5 | 7.8 | 84.6 |
| 16 | 150 | 291,333 | 281,855 | 2.3 | 8.3 | 78.8 |
| 16 | 190 | 67,231 | 149,730 | 2.5 | 8.3 | 79.1 |
| 17 | 120 | 13,702,534 | 95,914 | 2.0 | 9.4 | 69.3 |
| 17 | 150 | 3,124,178 | 69,935 | 2.1 | 10.4 | 78.8 |
| 17 | 190 | 246,646 | 68,435 | 2.3 | 9.7 | 65.7 |
| 18 | 120 | 263,320 | 619,169 | 2.1 | 13.4 | 51.9 |
| 18 | 150 | 242,030 | 371,937 | 2.1 | 14.0 | 47.7 |
| 19 | 120 | 331,053 | 388,712 | 3.1 | 12.0 | 56.3 |
| 19 | 150 | 76,734 | 197,268 | 2.8 | 12.3 | 53.7 |
| 21 | 120 | 1,034,815 | 197,244 | 2.1 | 8.5 | 68.1 |
| 21 | 150 | 381,479 | 139,976 | 2.0 | 10.0 | 67.0 |
| 23 | 120 | 8,660,002 | 106,352 | 5.0 | 10.4 | 67.1 |
| 23 | 150 | 3,135,140 | 50,360 | 3.0 | 10.7 | 70.0 |
| 23 | 190 | 1,041,393 | 37,279 | 2.9 | 10.5 | 66.0 |
| 24 | 120 | 1,086,896 | 363,058 | 2.4 | 13.4 | 48.0 |
| 24 | 150 | 252,115 | 241,376 | 2.3 | 13.8 | 46.7 |
| 24 | 190 | 138,943 | 131,835 | 2.2 | 13.4 | 50.4 |
| 25 | 120 | 252,127 | 235,985 | 3.8 | 19.0 | 0.4 |
| 25 | 150 | 97,745 | 178,300 | 5.3 | 19.3 | 0.0 |
| 27 | 120 | 91,350 | 123,626 | 5.0 | 16.7 | 43.7 |
| 27 | 150 | 41,656 | 94,379 | 5.5 | 15.8 | 46.2 |
| 29 | 120 | 1,753,924 | 483,691 | 2.1 | 8.7 | 72.2 |
| 29 | 150 | 652,241 | 323,091 | 2.2 | 9.5 | 66.4 |
| 30 | 120 | 141,184 | 1,045,031 | 3.0 | 8.9 | 67.1 |
| 30 | 150 | 44,820 | 680,671 | 2.3 | 10.2 | 61.4 |
| 31 | 120 | 5,163,115 | 239,014 | 2.9 | 12.8 | 53.4 |
| 31 | 150 | 1,172,937 | 174,037 | 3.0 | 13.0 | 48.5 |
| 33 | 120 | 16,267,649 | 36,717 | 2.3 | 18.0 | 17.7 |
| 33 | 150 | 2,937,823 | 31,830 | 2.1 | 17.0 | 22.2 |
| 34 | 120 | 946,832 | 277,427 | 4.8 | 20.2 | 4.2 |
| 34 | 150 | 425,794 | 210,059 | 2.9 | 20.8 | 5.0 |
| 35 | 120 | 21,441,726 | 81,869 | 2.2 | 11.2 | 66.4 |
| 35 | 150 | 4,165,570 | 57,119 | 2.2 | 11.8 | 62.4 |
| 36 | 120 | 1,535,100 | 463,799 | 3.7 | 12.4 | 52.6 |
| 36 | 150 | 285,730 | 280,931 | 3.2 | 13.6 | 46.4 |
| 37 | 120 | 20,257,827 | 140,954 | 2.5 | 13.6 | 62.2 |
| 37 | 150 | 6,401,824 | 112,772 | 2.3 | 10.1 | 65.9 |

TABLE 1-continued

Polymerization Data from Semi-Batch Reactor Experiments

| Pro-catalyst No. | Temp. (° C.) | Efficiency (g poly/g Metal) | Mw (g/mol) | PDI (Mw/Mn) | Mol % Octene | $T_M$ (° C.) |
|---|---|---|---|---|---|---|
| 38 | 120 | 1,708,779 | 773,963 | 3.1 | 12.1 | 53.0 |
| 38 | 150 | 733,935 | 461,662 | 2.4 | 12.3 | 52.5 |
| 39 | 120 | 9,624,660 | 101,897 | 2.3 | 12.4 | 60.5 |
| 39 | 150 | 2,685,697 | 74,961 | 2.2 | 12.3 | 60.2 |
| 41 | 120 | 5,678,330 | 92,493 | 2.9 | 10.8 | N.D. |
| 41 | 150 | 774,650 | 99,217 | 3.2 | 10.6 | N.D. |
| 42 | 120 | 364,166 | 458,028 | 4.7 | 12.7 | N.D. |
| 42 | 150 | 127,458 | 376,097 | 2.8 | 12.7 | N.D. |
| 43 | 120 | 31,526,791 | 85,989 | 2.2 | 9.8 | 71.8 |
| 43 | 150 | 3,595,545 | 60,262 | 2.2 | 10.7 | 67.2 |
| 44 | 120 | 761,947 | 389,278 | 5.0 | 11.7 | 62.6 |
| 44 | 150 | 156,872 | 261,242 | 3.9 | 11.1 | 51.4 |
| 45 | 120 | 12,211,699 | 281,510 | 4.5 | 10.4 | 66.6 |
| 45 | 150 | 2,288,323 | 113,398 | 2.4 | 9.7 | 68.8 |
| 46 | 120 | 1,299,793 | 710,559 | 3.8 | 12.4 | N.D. |
| 46 | 150 | 252,115 | 497,795 | 2.6 | 12.2 | N.D. |
| 47 | 120 | 5,042,533 | 149,196 | 2.8 | 11.2 | 62.2 |
| 47 | 150 | 869,654 | 84,119 | 2.2 | 12.2 | 59.2 |
| 48 | 120 | 173,679 | 389,517 | 6.1 | 15.0 | 49.0 |
| 48 | 150 | 52,524 | 406,182 | 3.1 | 14.2 | 43.6 |
| 49 | 120 | 5,437,166 | 88,886 | 2.1 | 14.9 | 58.5 |
| 49 | 150 | 767,342 | 68,351 | 2.2 | 13.7 | 55.6 |
| 50 | 120 | 257,718 | 366,966 | 4.9 | 16.9 | 42.7 |
| 50 | 150 | 64,990 | 346,870 | 3.5 | 16.5 | 36.3 |
| 51 | 120 | 7,147,242 | 477,034 | 2.4 | 11.6 | 68.1 |
| 51 | 150 | 5,042,533 | 387,440 | 2.7 | 11.0 | 61.6 |

The standard semi-batch reactor conditions of the results in Table 1 for polymerization reaction at 120° C. include 46 g ethylene and 303 g 1-octene in 611 g of IsoparE. The standard semi-batch reactor conditions of the results in Table 1 for polymerization reaction at 150° C. include 43 g ethylene and 303 g 1-octene in 547 g of IsoparE. The standard semi-batch reactor conditions of the results in Table 1 for polymerization reaction at 190° C. include 46 g ethylene and 292 g of 1-octene in 515 g of IsoparE. *Mol % Octene or C8/olefin is defined as: (moles 1-octene/(total moles 1-octene and ethylene))×100. N.D.=not determined.

To determine the chain transfer rate for the more efficient procatalysts, a semi-batch campaign was conducted using varying amounts of the chain transfer agent, $Et_2Zn$ (0, 50, and 200 µmoles). All reactions employed 1.2 equivalents of bis(hydrogenated tallow alkyemethylammonium tetrakis (pentafluorophenyeborate as the activator at 120 or 150° C., and procatalysts 7, 8, 11, and 12 were premixed in a 0.005 M solution with excess MMAO-3A (10.0 eq) for 10 mins prior to subjection to the polymerization experiment. The batch campaign was conducted at 120° C. or 150° C. with 11.1 or 12.1 g of ethylene under a pressure of 76-136 psi, 56 g or 57 g of 1-octene, and 528 g or 555 g of IsoparE. The catalyst efficiency as well as the Mw, PDI and comonomer incorporation of the corresponding produced polymers is presented in Table 2.

TABLE 2

Polymerization Data from Semi-Batch Reactor Experiments w/$Et_2Zn$ (DEZ)

| Pro-catalyst No. | Temp. (° C.) | DEZ (µmol) | Efficiency (g poly/g Metal) | Mw (g/mol) | PDI (Mw/Mn) | Mol % Octene |
|---|---|---|---|---|---|---|
| 1 | 120 | 0 | 2,148,557 | 56,981 | 2.4 | 10.5 |
| 1 | 120 | 50 | 1,769,584 | 55,005 | 2.2 | 9.4 |
| 1 | 120 | 200 | 353,221 | 37,599 | 2.2 | 11.4 |
| 1 | 150 | 0 | 274,051 | 53,213 | 2.3 | 9.2 |
| 1 | 150 | 50 | 182,700 | 41,123 | 2.3 | 11.3 |
| 1 | 150 | 200 | 82,824 | 24,636 | 2.2 | 12.9 |
| 2 | 150 | 0 | 54,158 | 248,485 | 2.2 | 10.9 |
| 2 | 150 | 50 | 40,338 | 84,109 | 2.4 | 11.7 |
| 2 | 150 | 200 | 38,418 | 30,011 | 2.5 | 11.0 |
| 3 | 120 | 0 | 38,732 | 226,834 | 3.0 | 5.0 |
| 3 | 120 | 50 | 18,087 | 55,416 | 2.5 | 4.0 |
| 3 | 120 | 200 | 13,977 | 26,477 | 2.5 | 4.0 |
| 4 | 120 | 0 | 6,910 | 113,444 | 2.2 | 5.6 |
| 4 | 120 | 50 | 5,603 | 35,845 | 1.8 | 5.2 |
| 4 | 120 | 200 | 5,939 | 15,281 | 1.6 | 5.4 |
| 5 | 120 | 0 | 143,603 | 1,205,619 | 4.0 | 9.0 |
| 5 | 120 | 50 | 107,428 | 264,471 | 3.2 | 7.9 |
| 5 | 120 | 200 | 208,855 | 106,087 | 3.1 | 8.0 |
| 6 | 120 | 0 | 8,964 | 279,271 | 2.6 | 8.9 |
| 6 | 120 | 50 | 4,202 | 33,130 | 2.5 | 7.1 |
| 6 | 120 | 200 | 5,789 | 17,130 | 2.4 | 8.7 |
| 7 | 150 | 0 | 208,279 | 44,484 | 2.1 | 9.3 |
| 7 | 150 | 50 | 295,975 | 36,755 | 2.1 | 9.9 |
| 7 | 150 | 200 | 246,646 | 24,058 | 2.1 | 10.1 |
| 9 | 150 | 0 | 289,398 | 50,084 | 2.2 | 12.3 |
| 9 | 150 | 50 | 196,163 | 41,396 | 2.2 | 11.9 |
| 9 | 150 | 200 | 124,236 | 22,114 | 2.1 | 12.5 |
| 10 | 120 | 0 | 99,445 | 455,057 | 2.2 | 12.0 |
| 10 | 120 | 50 | 76,568 | 148,028 | 2.6 | 12.4 |
| 10 | 120 | 200 | 58,827 | 41,746 | 2.3 | 12.5 |
| 11 | 150 | 0 | 285,013 | 49,833 | 2.1 | 10.2 |
| 11 | 150 | 50 | 266,743 | 41,055 | 2.1 | 10.1 |
| 11 | 150 | 200 | 214,369 | 26,051 | 2.1 | 11.5 |
| 12 | 150 | 0 | 67,231 | 262,369 | 2.2 | 10.9 |
| 12 | 150 | 50 | 27,639 | 93,045 | 2.6 | 12.8 |
| 12 | 150 | 200 | 15,127 | 28,399 | 3.2 | 11.8 |
| 13 | 150 | 0 | 38,732 | 534,681 | 8.3 | 9.8 |
| 13 | 150 | 50 | 20,238 | 144,165 | 6.0 | 10.8 |
| 13 | 150 | 200 | 12,110 | 51,168 | 3.9 | 10.9 |
| 15 | 150 | 0 | 153,468 | 55,434 | 2.5 | 6.6 |
| 15 | 150 | 50 | 76,734 | 43,660 | 2.4 | 6.1 |
| 15 | 150 | 200 | 131,544 | 26,795 | 2.3 | 6.4 |
| 16 | 150 | 0 | 138,196 | 264,646 | 2.3 | 7.0 |
| 16 | 150 | 50 | 98,978 | 111,569 | 2.2 | 6.7 |
| 16 | 150 | 200 | 88,520 | 49,304 | 2.2 | 6.8 |
| 17 | 150 | 0 | 920,810 | 83,896 | 2.2 | 8.4 |
| 17 | 150 | 50 | 570,025 | 68,507 | 2.5 | 10.1 |
| 17 | 150 | 200 | 390,979 | 40,101 | 2.3 | 10.1 |
| 18 | 150 | 0 | 110,184 | 357,468 | 2.2 | 12.3 |
| 18 | 150 | 50 | 81,797 | 136,140 | 2.5 | 11.3 |
| 18 | 150 | 200 | 72,460 | 53,368 | 2.6 | 11.8 |
| 19 | 150 | 0 | 20,828 | 224,880 | 5.8 | 11.6 |
| 19 | 150 | 50 | 20,280 | 84,406 | 4.4 | 10.5 |
| 19 | 150 | 200 | 14,981 | 28,774 | 3.4 | 10.6 |
| 21 | 150 | 0 | 127,160 | 132,642 | 2.1 | 8.2 |
| 21 | 150 | 50 | 96,466 | 80,152 | 2.1 | 8.2 |
| 21 | 150 | 200 | 89,889 | 41,088 | 2.4 | 8.7 |
| 23 | 150 | 0 | 471,367 | 159,513 | 7.2 | 8.0 |
| 23 | 150 | 50 | 188,547 | 83,634 | 4.6 | 8.6 |
| 23 | 150 | 200 | 118,390 | 68,020 | 4.0 | 7.9 |
| 24 | 150 | 0 | 282,369 | 240,096 | 2.2 | 12.0 |
| 24 | 150 | 50 | 211,777 | 158,995 | 2.4 | 11.8 |
| 24 | 150 | 200 | 188,246 | 76,845 | 2.6 | 12.5 |
| 25 | 150 | 0 | 29,232 | 154,840 | 5.9 | 16.7 |
| 25 | 150 | 50 | 30,694 | 81,284 | 2.6 | 15.2 |
| 25 | 150 | 200 | 28,136 | 39,456 | 2.9 | 15.0 |
| 27 | 150 | 0 | 20,280 | 90,177 | 12.8 | 13.0 |
| 27 | 150 | 50 | 14,470 | 78.408 | 6.6 | 11.8 |
| 27 | 150 | 200 | 16,443 | 46,165 | 3.8 | 12.4 |
| 29 | 150 | 0 | 166,623 | 350,221 | 2.3 | 7.2 |
| 29 | 150 | 50 | 175,392 | 208,805 | 2.3 | 6.9 |
| 29 | 150 | 200 | 190,739 | 94,729 | 2.4 | 7.2 |
| 30 | 150 | 0 | 22,970 | 206,268 | 3.1 | 7.8 |
| 30 | 150 | 50 | 9,711 | 143,815 | 2.4 | 8.5 |
| 30 | 150 | 200 | 7,003 | 60,044 | 3.3 | 7.7 |
| 31 | 150 | 0 | 306,937 | 231,434 | 3.6 | 10.9 |

TABLE 2-continued

Polymerization Data from Semi-Batch Reactor Experiments w/Et$_2$Zn (DEZ)

| Procatalyst No. | Temp. (° C.) | DEZ (μmol) | Efficiency (g poly/ g Metal) | Mw (g/mol) | PDI (Mw/ Mn) | Mol % Octene |
|---|---|---|---|---|---|---|
| 31 | 150 | 50 | 292,321 | 160,290 | 3.3 | 10.2 |
| 31 | 150 | 200 | 232,395 | 83,550 | 3.1 | 9.1 |
| 33 | 150 | 0 | 811,190 | 32,777 | 2.2 | 16.0 |
| 33 | 150 | 50 | 619,355 | 30,049 | 2.2 | 15.3 |
| 33 | 150 | 200 | 460,405 | 23,685 | 2.3 | 15.6 |
| 34 | 150 | 0 | 141,931 | 198,359 | 2.6 | 18.2 |
| 34 | 150 | 50 | 106,449 | 111,102 | 2.5 | 17.6 |
| 34 | 150 | 200 | 77,735 | 49,904 | 2.5 | 16.5 |
| 35 | 150 | 0 | 876,692 | 61,317 | 2.1 | 10.5 |
| 35 | 150 | 50 | 871,481 | 53,255 | 2.2 | 9.9 |
| 35 | 150 | 200 | 1,003,026 | 42,311 | 2.2 | 9.5 |
| 36 | 150 | 0 | 108,316 | 293,521 | 2.5 | 11.5 |
| 36 | 150 | 50 | 96,364 | 128,990 | 2.6 | 11.4 |
| 36 | 150 | 200 | 88,707 | 48,143 | 2.6 | 11.1 |
| 37 | 150 | 0 | 1,315,443 | 115,923 | 2.3 | 9.0 |
| 37 | 150 | 50 | 1,085,241 | 83,082 | 2.3 | 8.7 |
| 37 | 150 | 200 | 1,304,481 | 45,207 | 2.3 | 8.6 |
| 38 | 150 | 0 | 280,128 | 359,686 | 2.2 | 10.3 |
| 38 | 150 | 50 | 165,275 | 117,589 | 2.5 | 9.3 |
| 38 | 150 | 200 | 155,004 | 47,380 | 2.8 | 9.1 |
| 39 | 150 | 0 | 734,456 | 79,173 | 2.2 | 10.5 |
| 39 | 150 | 50 | 624,836 | 64,653 | 2.2 | 9.7 |
| 39 | 150 | 200 | 624,836 | 18,066 | 2.2 | 10.6 |
| 41 | 150 | 0 | 360,833 | 142,634 | 4.3 | 10.0 |
| 41 | 150 | 50 | 226,092 | 77,127 | 3.1 | 11.4 |
| 41 | 150 | 200 | 157,122 | 44,969 | 3.2 | 12.1 |
| 42 | 150 | 0 | 84,038 | 384,172 | 2.4 | 11.6 |
| 42 | 150 | 50 | 71,232 | 211,586 | 2.6 | 11.3 |
| 42 | 150 | 200 | 60,639 | 84,703 | 2.6 | 12.2 |
| 43 | 150 | 0 | 1,183,899 | 66,142 | 2.2 | 7.6 |
| 43 | 150 | 50 | 1,227,747 | 56,679 | 2.0 | 7.5 |
| 43 | 150 | 200 | 1,161,975 | 32,840 | 2.2 | 9.2 |
| 44 | 150 | 0 | 100,846 | 268,932 | 3.4 | 9.7 |
| 44 | 150 | 50 | 82,918 | 111,759 | 2.6 | 9.5 |
| 44 | 150 | 200 | 84,038 | 56,857 | 2.6 | 8.9 |
| 45 | 150 | 0 | 612,047 | 121,233 | 2.6 | 9.7 |
| 45 | 150 | 50 | 516,129 | 81,833 | 2.5 | 10.8 |
| 45 | 150 | 200 | 422,821 | 57,348 | 2.9 | 11.1 |
| 46 | 150 | 0 | 93,002 | 472,636 | 2.5 | 10.6 |
| 46 | 150 | 50 | 92,936 | 214,149 | 2.7 | 11.3 |
| 46 | 150 | 200 | 87,604 | 83,733 | 2.6 | 11.4 |
| 47 | 150 | 0 | 328,861 | 86,877 | 2.3 | 10.9 |
| 47 | 150 | 50 | 280,902 | 70,934 | 2.3 | 11.4 |
| 47 | 150 | 200 | 235,361 | 51,056 | 2.5 | 12.0 |
| 48 | 150 | 0 | 38,888 | 400,140 | 2.4 | 13.2 |
| 48 | 150 | 50 | 38,844 | 182,395 | 2.5 | 13.2 |
| 48 | 150 | 200 | 35,016 | 73,481 | 2.7 | 13.1 |
| 49 | 150 | 0 | 292,321 | 66,882 | 2.2 | 12.6 |
| 49 | 150 | 50 | 274,051 | 53,911 | 2.2 | 12.0 |
| 49 | 150 | 200 | 285,013 | 34,647 | 2.3 | 12.8 |
| 50 | 150 | 0 | 39,918 | 335,371 | 2.7 | 15.0 |
| 50 | 150 | 50 | 115,674 | 140,068 | 2.5 | 13.9 |
| 50 | 150 | 200 | 28,293 | 61,446 | 2.5 | 14.1 |
| 51 | 150 | 0 | 460,405 | 401,969 | 2.8 | 10.4 |
| 51 | 150 | 50 | 91,350 | 248,698 | 4.2 | 9.4 |
| 51 | 150 | 200 | 292,321 | 154,430 | 5.2 | 10.8 |

The standard semi-batch reactor conditions of the results in Table 2 for polymerization reaction at 120° C. include 11 g ethylene and 59 g 1-octene in 610 g of IsoparE. The standard semi-batch reactor conditions of the results in Table 2 for polymerization reaction at 150° C. include 12 g ethylene and 59 g 1-octene in 531 g of IsoparE. *Mol % Octene or C8/olefin is defined as: (moles 1-octene/(total moles 1-octene and ethylene))×100.

The $M_n$ for each run was calculated using Equation 3 with the values of Ca and $M_{n0}$ fit using the Microsoft Excel Solver to minimize the squared deviations between the fitted and experimental molecular weight data for all the runs with a particular catalyst. Plots of $M_n$ versus [CSA] for procatalysts 1-7 and 9-52 are shown in FIG. 5 including a line showing the expected dependence of $M_n$ on [CSA] from the best fit value for Ca, and the calculated Ca values are presented in Table 3.

TABLE 3

Chain Transfer Rates from Semi-Batch Reactor Experiments w/Et$_2$Zn (DEZ)

| Procatalyst No. | Temperature. (° C.) | Chain Transfer Constant (Ca) |
|---|---|---|
| 1 | 150 | 1.5 |
| 2 | 150 | 2.5 |
| 3 | 120 | 3.6 |
| 4 | 120 | 3.5 |
| 5 | 120 | 1.0 |
| 6 | 120 | 7.8 |
| 7 | 150 | 1.3 |
| 9 | 150 | 1.6 |
| 10 | 120 | 1.7 |
| 11 | 150 | 1.3 |
| 12 | 150 | 2.8 |
| 13 | 150 | 2.9 |
| 15 | 150 | 1.2 |
| 16 | 150 | 1.3 |
| 17 | 150 | 1.1 |
| 18 | 150 | 1.6 |
| 19 | 150 | 3.3 |
| 21 | 150 | 1.4 |
| 23 | 150 | 0.43 |
| 24 | 150 | 0.78 |
| 25 | 150 | 0.75 |
| 27 | 150 | 0.33 |
| 29 | 150 | 0.60 |
| 30 | 150 | 1.5 |
| 31 | 150 | 0.70 |
| 33 | 150 | 0.97 |
| 34 | 150 | 1.3 |
| 35 | 150 | 0.60 |
| 36 | 150 | 1.5 |
| 37 | 150 | 0.97 |
| 38 | 150 | 1.9 |
| 39 | 150 | 0.91 |
| 41 | 150 | 1.3 |
| 42 | 150 | 0.81 |
| 43 | 150 | 0.93 |
| 44 | 150 | 1.2 |
| 45 | 150 | 0.99 |
| 46 | 150 | 0.91 |
| 47 | 150 | 0.71 |
| 48 | 150 | 1.0 |
| 49 | 150 | 1.0 |
| 50 | 150 | 1.3 |
| 51 | 150 | 1.2 |

The high chain transfer constants for the many of the procatalysts (Ca≥1) at 120° C. and 150° C. indicates that these catalysts have a high sensitivity to chain transfer agents and rapidly undergo chain transfer with these agents. Overall, either a similar or a decrease in PDI is observed for each procatalyst (except procatalysts 2, 12, and 51) as the amount of Et$_2$Zn is increased is evidence that these procatalysts undergo reversible chain transfer with a CSA as opposed to irreversible chain transfer.

The invention claimed is:
1. A catalyst system comprising:
a metal-ligand complex according to formula (I):

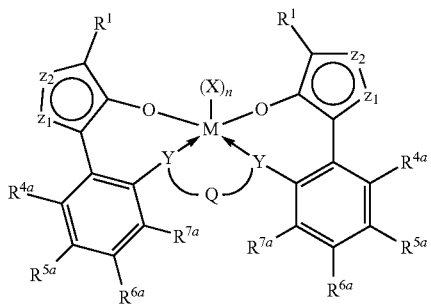

where:
- M is a metal chosen from titanium, zirconium, or hafnium, the metal having a formal oxidation state of +2, +3, or +4;
- each X is a monodentate or bidentate ligand independently chosen from unsaturated $(C_2-C_{20})$hydrocarbon, unsaturated $(C_2-C_{50})$heterohydrocarbon, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$diene, halogen, —$OR^C$, —$N(R^N)_2$, or —$NCOR^C$;
- each Y is oxygen, sulfur, or $NR^N$;
- n is 1 or 2;
- each $R^1$ is chosen from $(C_1-C_{50})$hydrocarbyl, $(C_1-C_{50})$heterohydrocarbyl, $(C_6-C_{50})$aryl, $(C_4-C_{50})$heteroaryl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, —$P(O)(R^P)_2$, $R^CS(O)_2$—, $(R^C)_2C=N$—, $R^CC(O)O$—, $R^COC(O)$—, $R^CC(O)N(R)$—, $(R^C)_2NC(O)$—, halogen, or —H, wherein each $R^N$, $R^C$, and $R^P$ is independently selected from the group consisting of $(C_1-C_{20})$hydrocarbyl, $(C_1-C_{20})$heterohydrocarbyl, and —H;
- Q is $(C_1-C_{12})$alkylene, $(C_1-C_{12})$heteroalkylene, (—$CH_2Si(R_Q)_2CH_2$—), (—$CH_2CH_2Si(R_Q)_2CH_2CH_2$—), (—$CH_2Ge(R_Q)_2CH_2$—), or (—$CH_2CH_2Ge(R_Q)_2CH_2CH_2$—), where $R_Q$ is $(C_1-C_{20})$hydrocarbyl;
- each $z_1$ and $z_2$ is independently selected from the group consisting of sulfur, oxygen, —$N(R^C)$—, and —$C(R^C)$—, provided one of $z_1$ and $z_2$ in each individual ring containing groups $z_1$ and $z_2$ is sulfur;
- each $R^{4a}$, $R^{5a}$, $R^{6a}$, and $R^{7a}$ is independently chosen from $(C_1-C_{50})$hydrocarbyl, $(C_1-C_{50})$heterohydrocarbyl, $(C_6-C_{50})$aryl, $(C_4-C_{50})$heteroaryl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, —$P(O)(R^P)_2$, $R^CS(O)_2$—, $(R^C)_2C=N$—, $R^CC(O)O$—, $R^COC(O)$—, $R^CC(O)N(R)$—, $(R^C)_2NC(O)$—, halogen, or —H, in which optionally $R^{4a}$ and $R^{5a}$, or $R^{5a}$ and $R^{6a}$, or $R^{6a}$ and $R^{7a}$, are covalently connected to form an aromatic ring or a non-aromatic ring;
- each $R^C$, $R^N$, and $R^P$ in formula (I) is independently selected from the group consisting of $(C_1-C_{20})$hydrocarbyl, $(C_1-C_{20})$heterohydrocarbyl, and —H; and
- a chain transfer agent.

2. The catalyst system of claim 1 further comprising a second catalyst.

3. The catalyst system of claim 1, wherein each $R^1$ is chosen from carbazol, carbazol-9-yl substituted with $R^S$ or more than one $R^S$, phenyl, phenyl substituted with $R^S$ or more than one $R^S$, anthracenyl, anthracene-9-yl substituted with $R^S$ or more than one $R^S$, naphthyl, or naphthyl substituted $R^S$ or more than one $R^S$, in which $R^S$ is a $(C_1-C_{30})$hydrocarbyl, or wherein $R^S$ is chosen from $(C_1-C_{12})$alkyl, $(C_6-C_{15})$aryl, or $(C_3-C_{12})$cycloalkyl.

4. The catalyst system of claim 1, wherein $R^1$ is chosen from carbazol-9-yl, 3,6-di-tert-butylcarbazol-9-yl, 3,6-bis-(3,5-di-tert-butylphenyl)carbazol-9-yl, 2,7-di-tert-butylcarbazol-9-yl, anthracene-9-yl, 3,5-di-tert-butylphenyl, 1,1':3',1"-terphenyl-5'-yl, 3,3",5,5"-tetra-tert-butyl-1,1':3',1"-terphenyl-5'-yl.

5. The catalyst system of claim 1, wherein $z_1$ is sulfur.
6. The catalyst system of claim 1, wherein $z_2$ is sulfur.
7. The catalyst system of claim 1, wherein Y is oxygen.
8. The catalyst system of claim 1 further comprising one or more cocatalysts.
9. The catalyst system of claim 1, wherein the metal-ligand complex is any one of Procatalyst 1-52:

Procatalyst 1

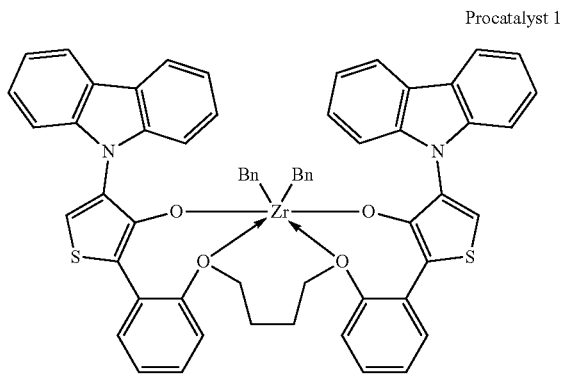

Procatalyst 2

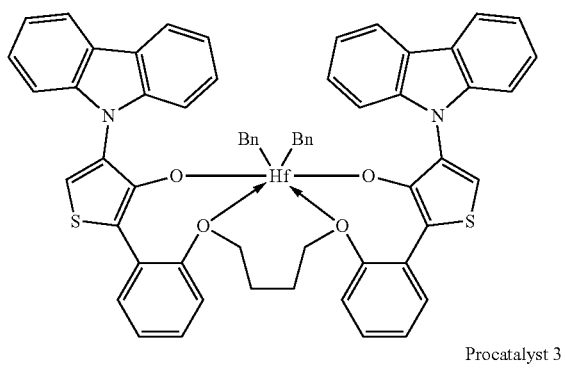

Procatalyst 3

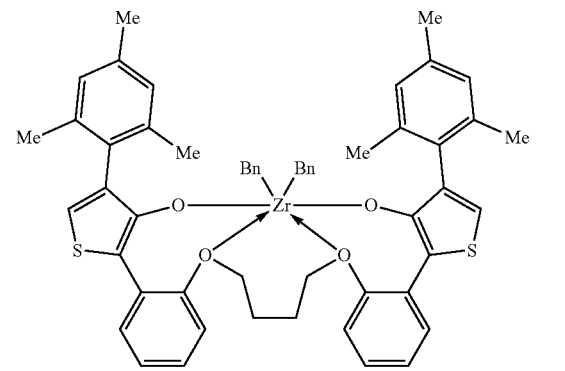

Procatalyst 4
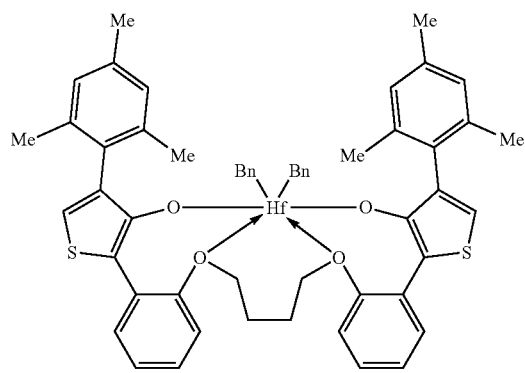
Procatalyst 5
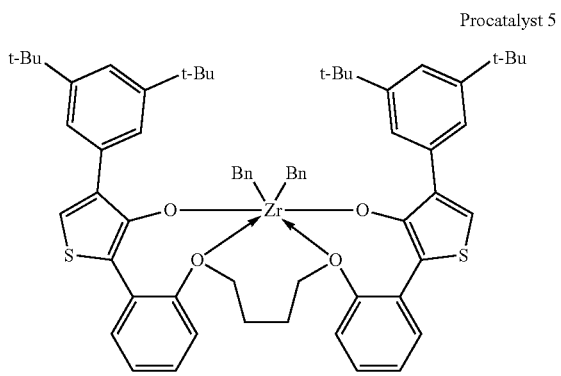
Procatalyst 6
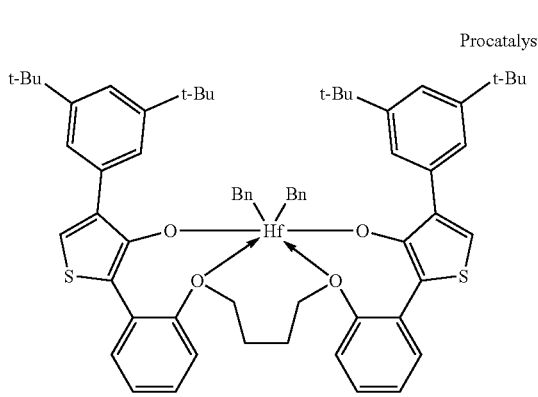
Procatalyst 7
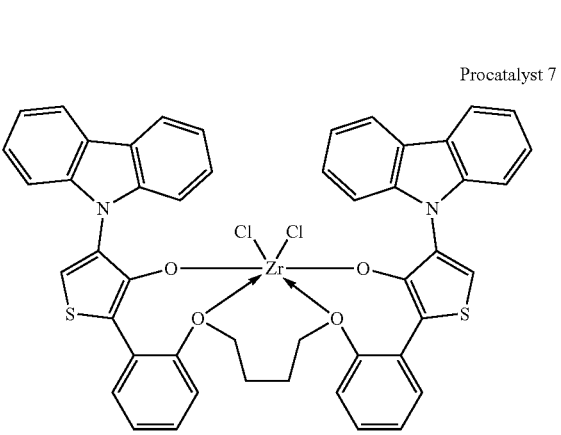
Procatalyst 8
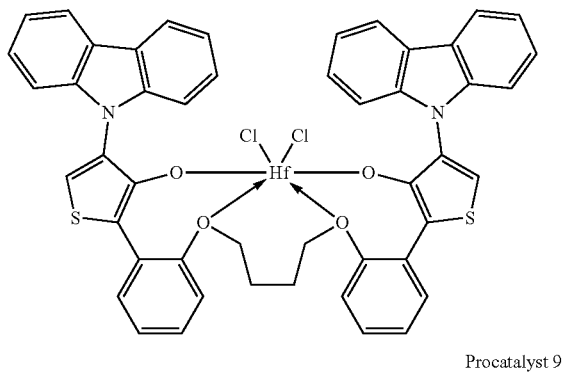
Procatalyst 9
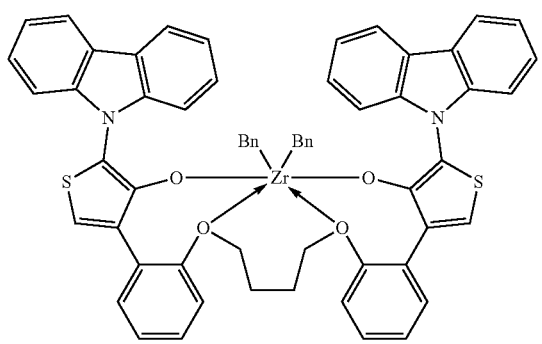
Procatalyst 10
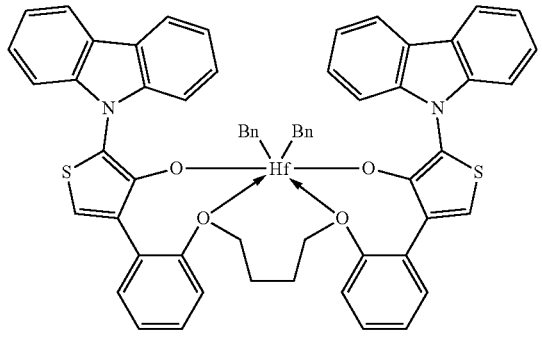
Procatalyst 11
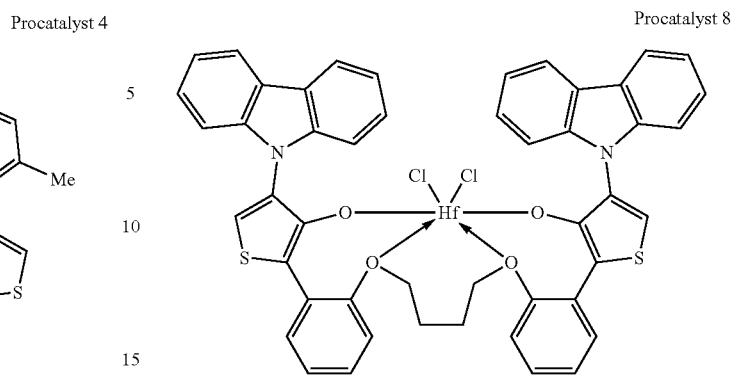

-continued
Procatalyst 12
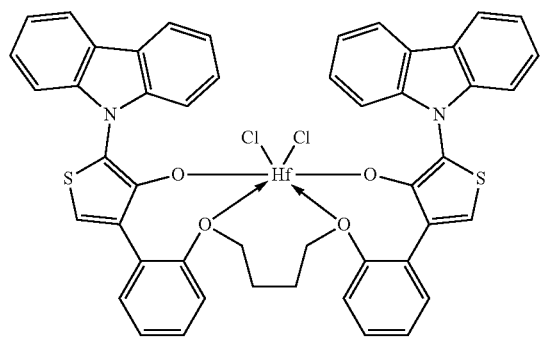
Procatalyst 13
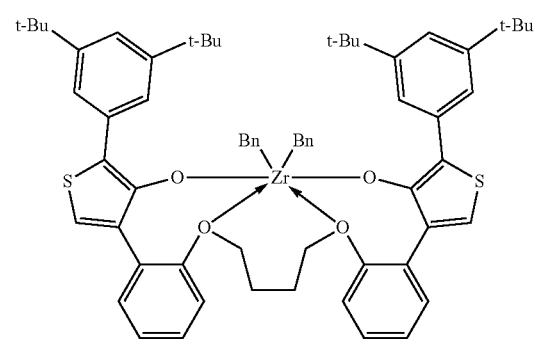
Procatalyst 14
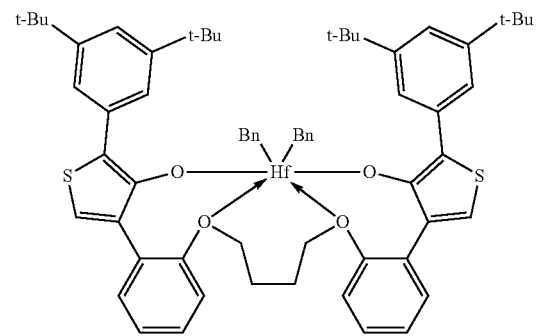
Procatalyst 15
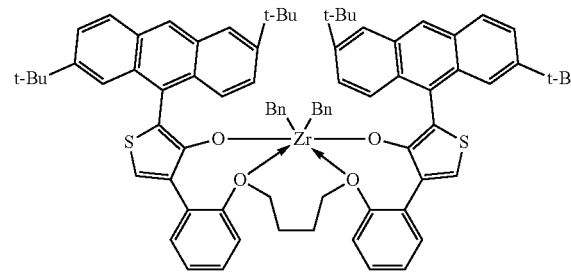
-continued
Procatalyst 16
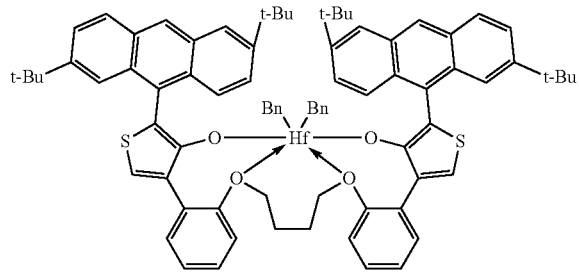
Procatalyst 17
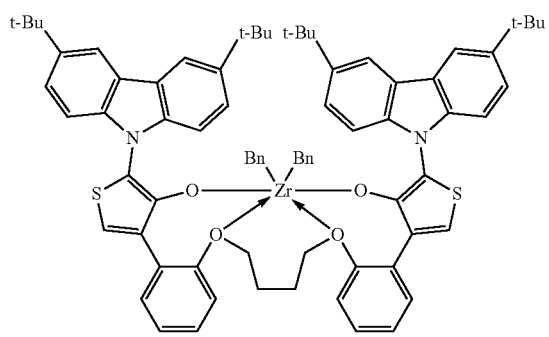
Procatalyst 18
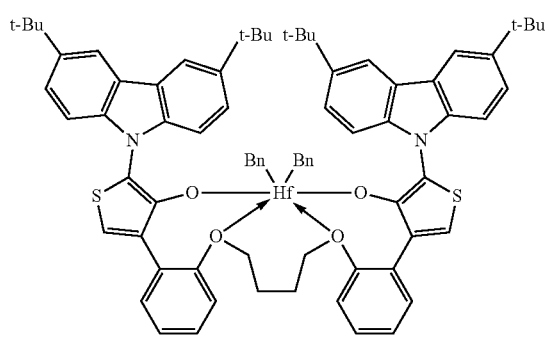
Procatalyst 19
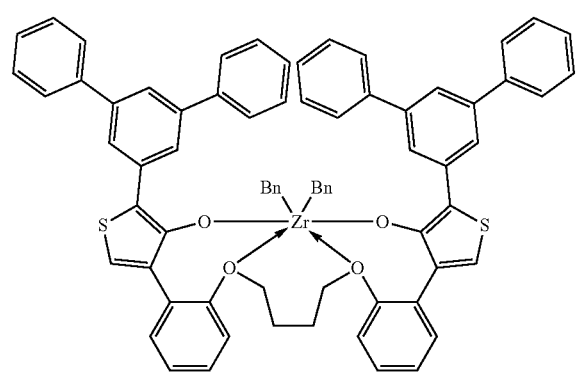

Procatalyst 20
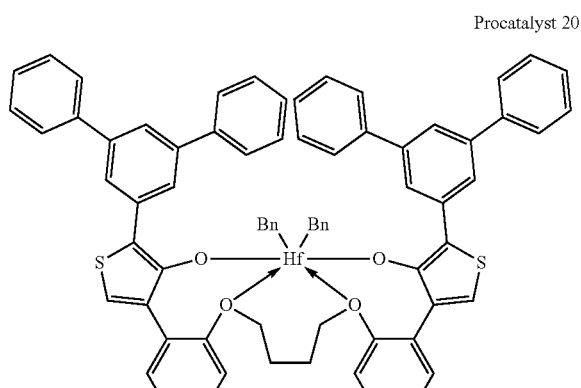
Procatalyst 24
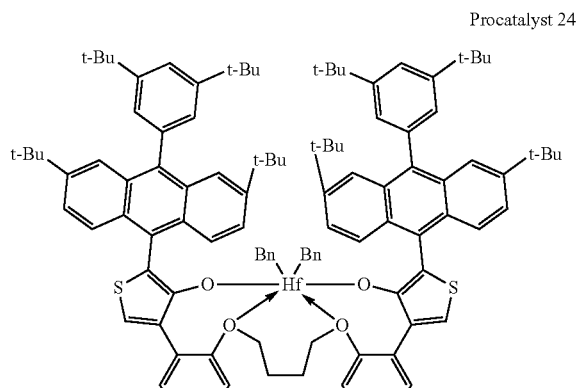
Procatalyst 21
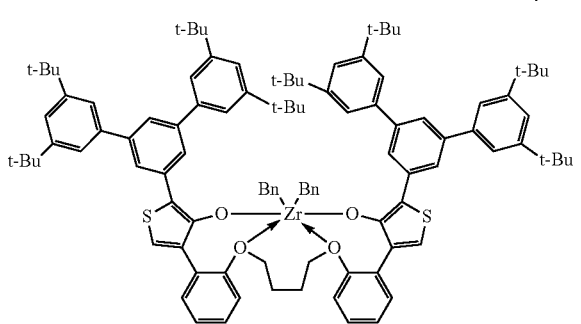
Procatalyst 25
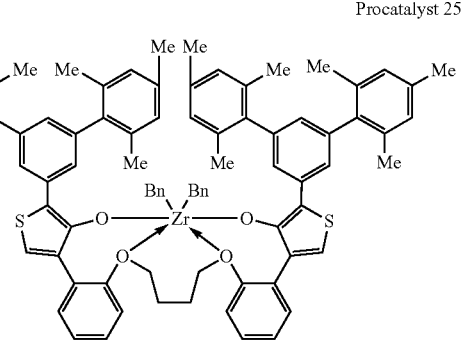
Procatalyst 22
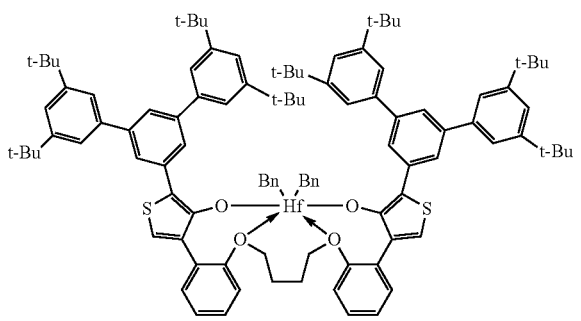
Procatalyst 26
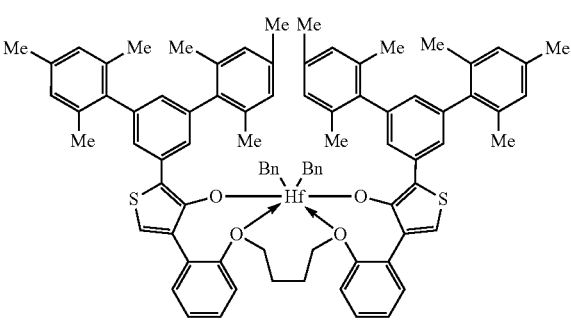
Procatalyst 23
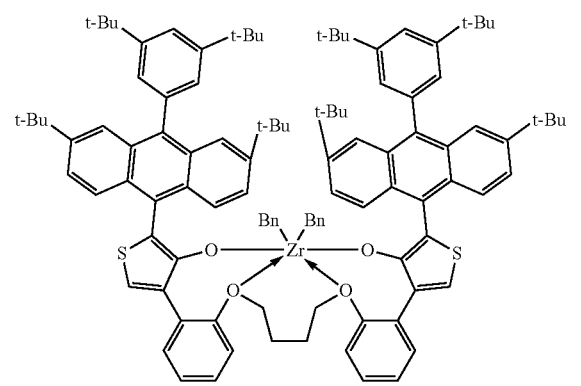
Procatalyst 27
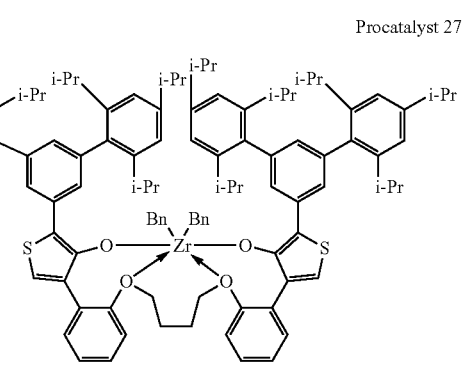

Procatalyst 28
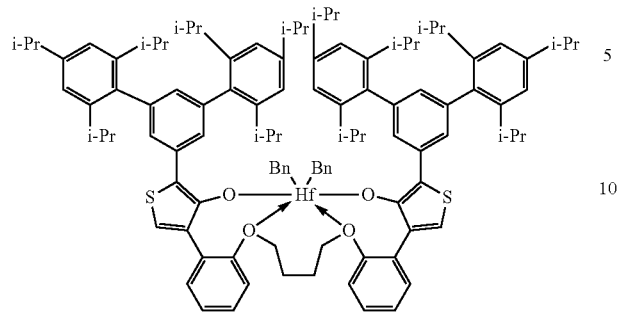
Procatalyst 29
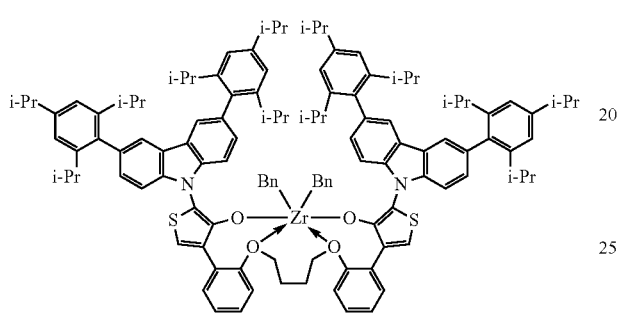
Procatalyst 30
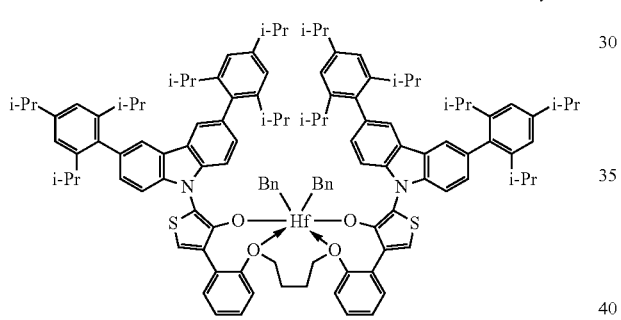
Procatalyst 31
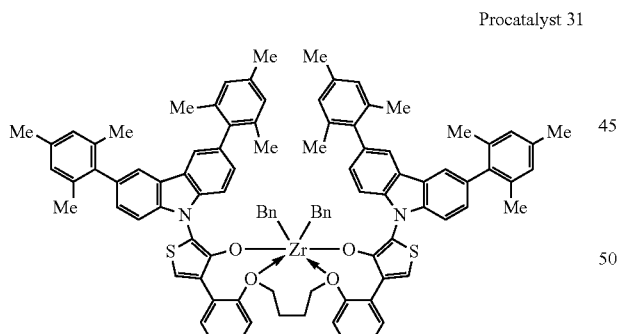
Procatalyst 32
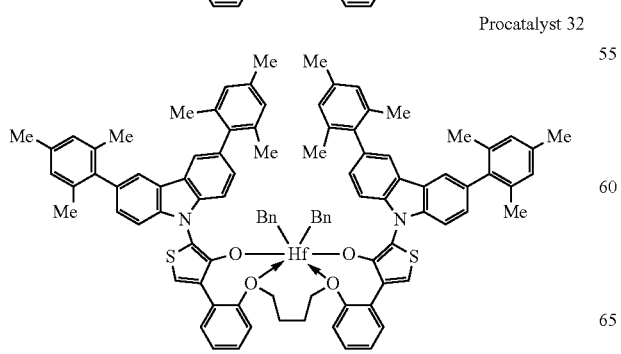
Procatalyst 33
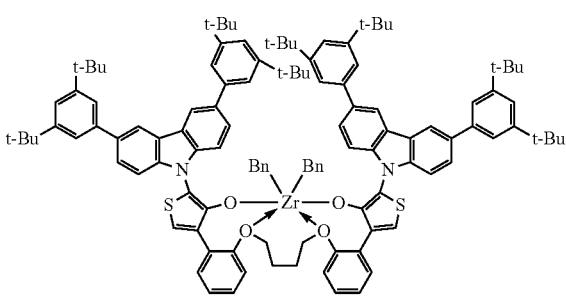
Procatalyst 34
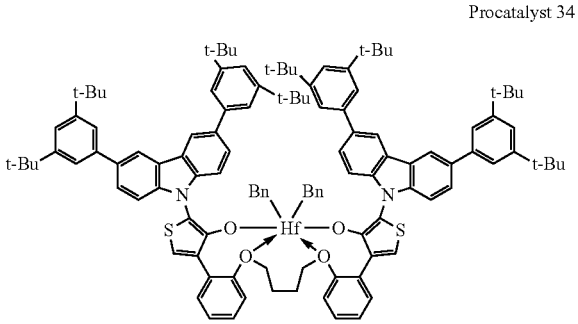
Procatalyst 35
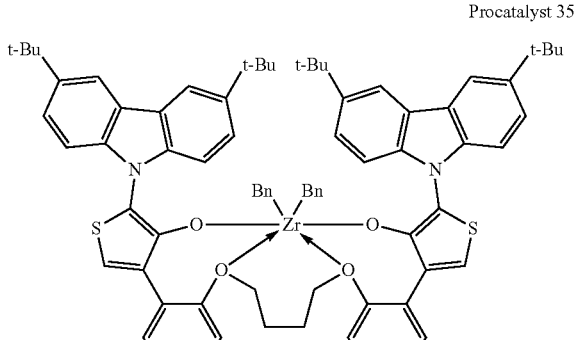
Procatalyst 36
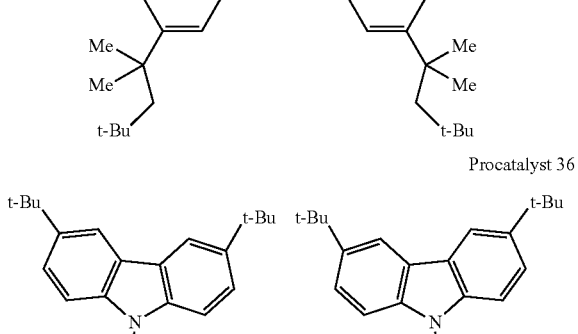
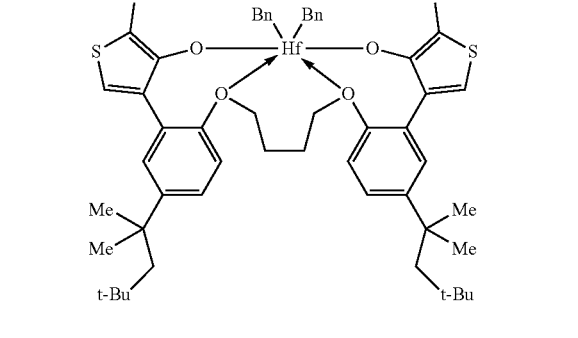

Procatalyst 37
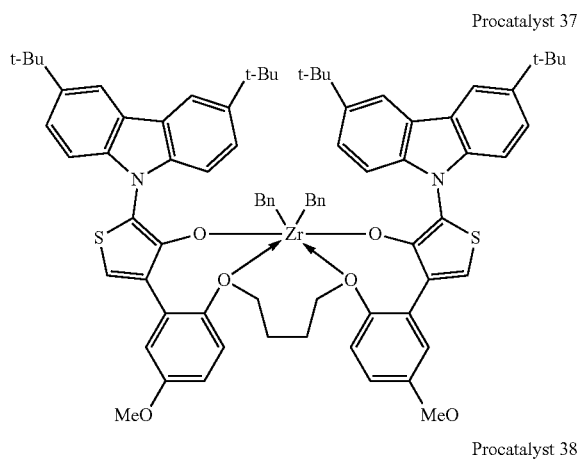
Procatalyst 38
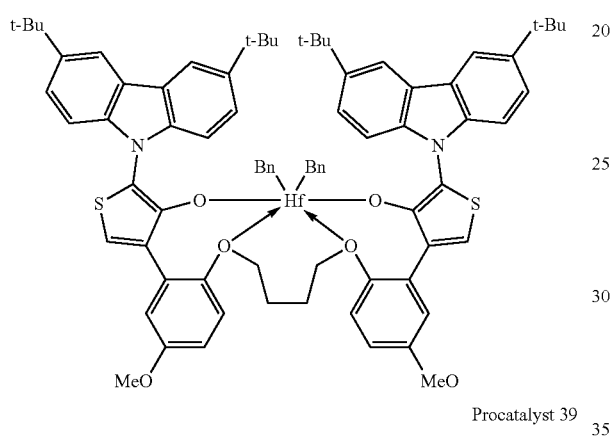
Procatalyst 39
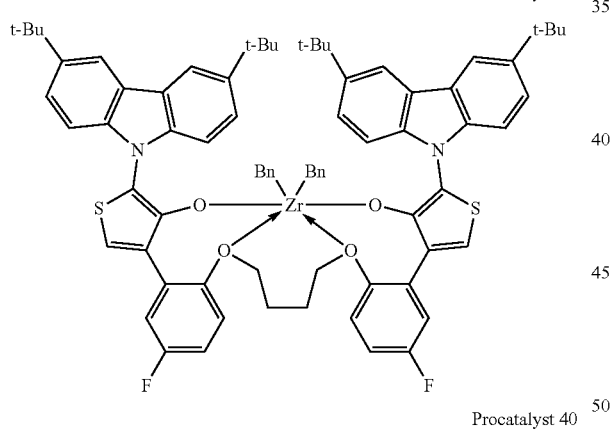
Procatalyst 40
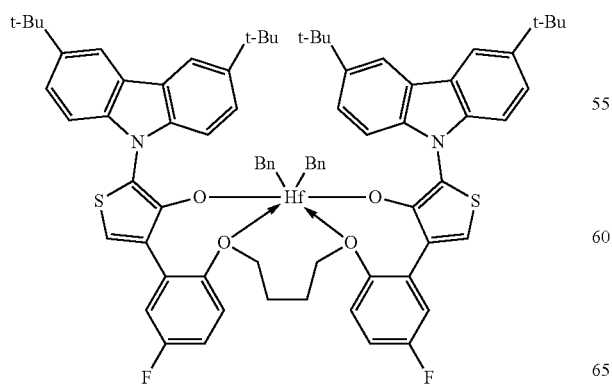
Procatalyst 41
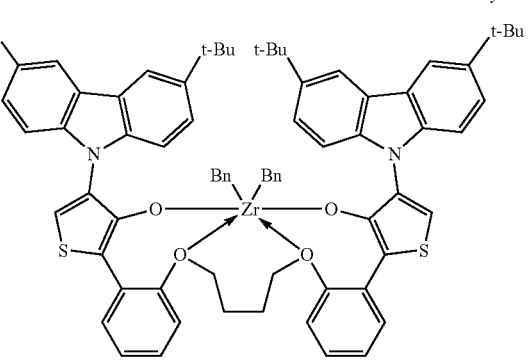
Procatalyst 42
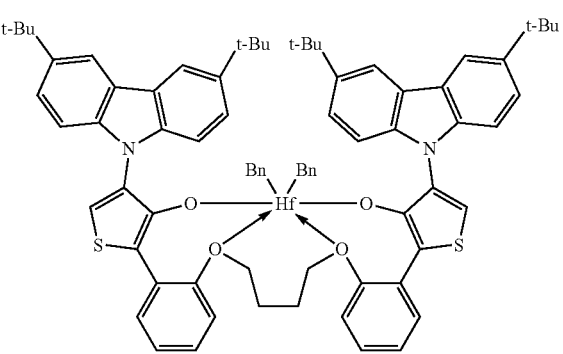
Procatalyst 43
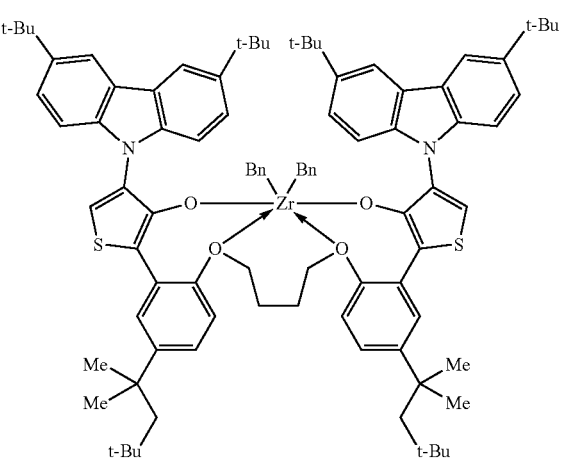

Procatalyst 44
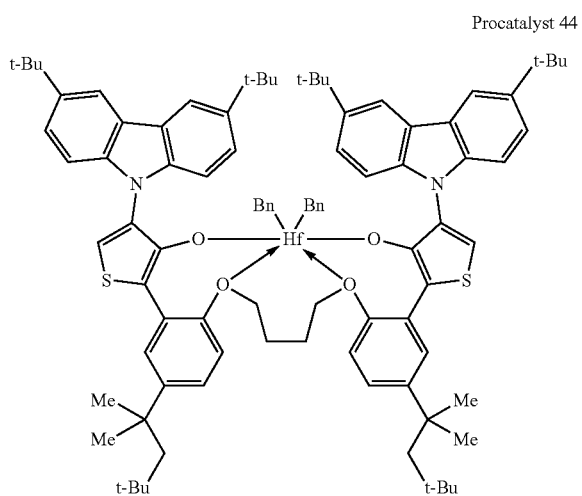
Procatalyst 45
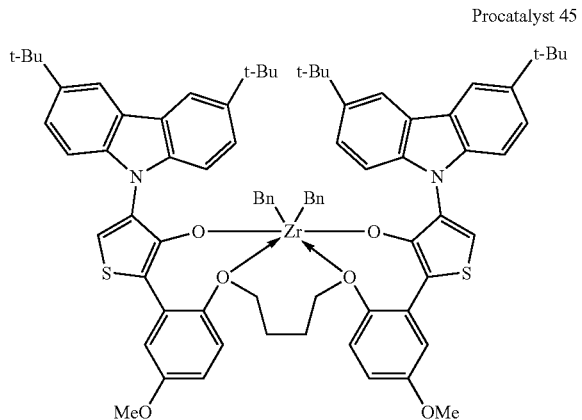
Procatalyst 46
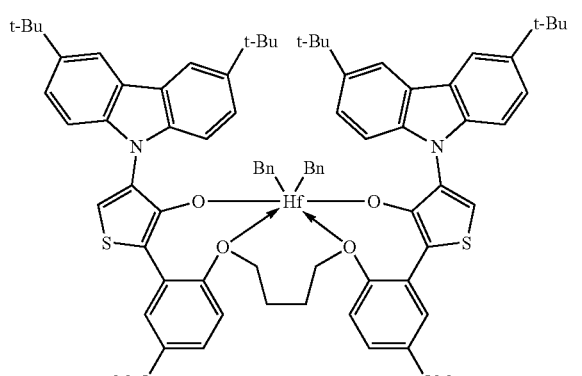
Procatalyst 47
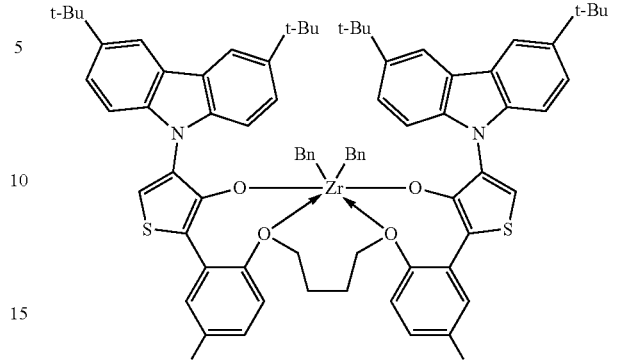
Procatalyst 48
Procatalyst 49
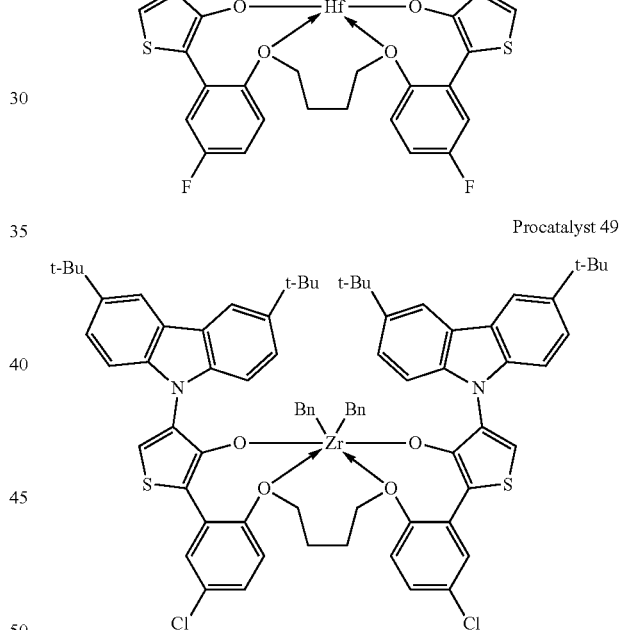
Procatalyst 50
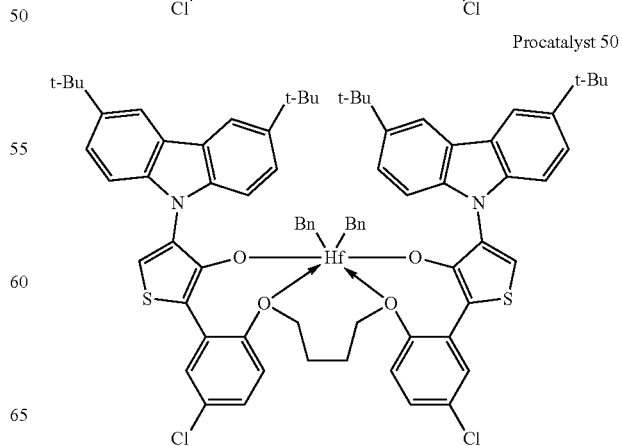

-continued
Procatalyst 51
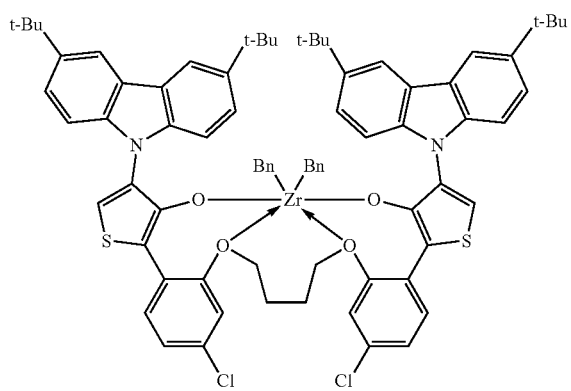
-continued
Procatalyst 52
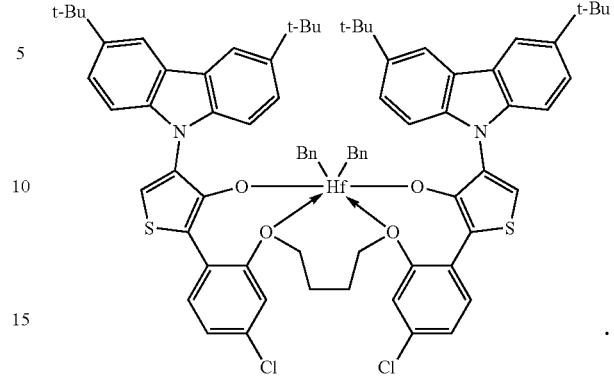
10. A process for producing ethylene-based polymers, the process comprising contacting ethylene and one or more ($C_1$-$C_{20}$)α-olefin in the presences of one or more catalysts systems according to claim 1.
* * * * *